US006577812B1

(12) United States Patent
Kikuchi et al.

(10) Patent No.: US 6,577,812 B1
(45) Date of Patent: *Jun. 10, 2003

(54) DIGITAL RECORDING SYSTEM USING VARIABLE RECORDING RATE

(75) Inventors: Shinichi Kikuchi, Yokohama (JP); Hideo Ando, Tokyo (JP); Kazuhiko Taira, Yokohama (JP); Yuji Ito, Tokyo (JP); Hideki Mimura, Yokohama (JP); Hitoshi Otomo, Yokohama (JP); Takahiro Seita, Kamakura (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 113 days.

This patent is subject to a terminal disclaimer.

(21) Appl. No.: 09/630,600

(22) Filed: Aug. 1, 2000

Related U.S. Application Data

(62) Division of application No. 09/209,474, filed on Dec. 11, 1998.

(30) Foreign Application Priority Data

Dec. 12, 1997 (JP) .............................. 9-343041
Jul. 7, 1998 (JP) ............................ 10-192065

(51) Int. Cl.[7] .............................. H04N 7/52; H04N 7/06; H04N 7/04
(52) U.S. Cl. ..................... 386/105; 786/104; 786/106
(58) Field of Search ................... 386/104, 105, 386/106, 96, 125, 126, 109, 111, 112, 124, 46, 1, 27, 33, 39, 45, 95, 98; H04N 7/52, 7/06, 7/04

(56) References Cited

U.S. PATENT DOCUMENTS 5,434,991 A * 7/1995 Maeda et al.
6,314,235 B1 * 11/2001 Gotoh et al.

FOREIGN PATENT DOCUMENTS

| EP | 0295148 A1 | 12/1988 |
| EP | 0417277 A1 | 3/1991 |
| EP | 0584991 A2 | 3/1994 |
| EP | 0778572 A2 | 6/1997 |
| EP | 0802682 A1 | 10/1997 |
| JP | 9-198846 | 7/1997 |
| JP | 10-40876 | 2/1998 |
| JP | 10-106167 | 4/1998 |
| JP | 10-162550 | 6/1998 |
| JP | 10-222963 | 8/1998 |
| JP | 10-222964 | 8/1998 |
| JP | 10-228728 | 8/1998 |
| JP | 3137624 | 12/2000 |
| JP | 3137626 | 12/2000 |
| JP | 3154703 | 2/2001 |
| JP | 3159692 | 2/2001 |
| JP | 2001-52467 | 2/2001 |
| JP | 3199711 | 6/2001 |
| WO | WO 97/32436 | 9/1997 |

OTHER PUBLICATIONS

Japanese Office Action (Notification of Reasons for Rejections) re: Japanese Patent Application No. 2001–281866, Mailing Date: Aug. 20, 2002, Mailing No. 276000 (with English Translation).

(List continued on next page.)

Primary Examiner—Robert Chevalier
(74) Attorney, Agent, or Firm—Oblon, Spivak, McClelland, Maier & Neustadt, P.C.

(57) ABSTRACT

An erase prohibition setting unit sets erase prohibition in accordance with an instruction. When the range is not set in units of cells of the current cell, the current cell is divided by a cell separator to set a sequence of advanced cells. A reconstruction part reconstructs management information for playing back the advanced cells and current cell, and appends erase prohibition information to the management information for playing back the advanced cells that belong to the range.

3 Claims, 60 Drawing Sheets

OTHER PUBLICATIONS

Japanese Office Action (Notification of Reasons for Rejections) re: Japanese Patent Application No. 2001–281867, Mailing Date: Aug. 20, 2002, Mailing No. 276004 (with English Translation).

Japanese Office Action (Notification of Reasons for Rejections) re: Japanese Patent Application No. 2001–281868, Mailing Date: Aug. 20, 2002, Mailing No. 275999 (with English Translation).

Japanese Office Action (Notification of Reasons for Rejections) re: Japanese Patent Application No. 2001–281869, Mailing Date: Aug. 20, 2002, Mailing No. 276003 (with English Translation).

Japanese Office Action (Notification of Reasons for Rejections) re: Japnaese Patent Application No. 2001–281870, Mailing Date: Aug. 20, 2002, Mailing No. 276002 (with English Translation).

Kondo S et al: "A Real Time Variable Bit Rate MPEG2 Video Coding Method For Digital Storage Media", IEEE Transactions on Consumer Electronics, IEEE Inc. New York, US, vol. 43, No. 3, Aug. 1, 1997(Aug. 1, 1997), pp. 537–543, XP000742529, ISSN: 0098 3063, *page 537: Abstract*.

* cited by examiner

PHYSICAL FORMAT INFORMATION

| BYTE POSITION | CONTENTS | NUMBER OF BYTES |
|---|---|---|
| 0 | VERSION | 1 BYTE |
| 1 | DISC SIZE & MINIMUM READ-OUT RATE | 1 BYTE |
| 2 | DISC STRUCTURE | 1 BYTE |
| 3 | RECORDING DENSITY | 1 BYTE |
| 4~15 | DATA AREA ALLOCATION | 12 BYTES |
| 16 | BURST CUTTING AREA (BCA) DESCRIPTOR | 1 BYTE |
| 17~20 | FREE SPACE (FREE AREA) | 4 BYTES |
| 21~31 | RESERVED | 11 BYTES |
| 32~2047 | RESERVED | 2016 BYTES |

DIRECTORY RECORD

| RBP | FILE NAME | CONTENTS |
|---|---|---|
| 0 | DIRECTORY RECORD LENGTH (LEN DR) | |
| 1 | RECORD LENGTH OF EXTENT ATTRIBUTE | |
| 2 | POSITION OF EXTENT | |
| 10 | DATA LENGTH | |
| 18 | DATE/TIME OF RECORDING (CF. TABLE 9 OF ISO9660) | |
| 25 | FILE FLAG (CF. TABLE 10 OF ISO9660) | |
| 26 | FILE UNIT SIZE | |
| 27 | INTERLEAVED GAP SIZE | |
| 28 | VOLUME SEQUENCE NUMBER | |
| 32 | FILE ID LENGTH (LEN_FI) | |
| 33 | FILE ID | |
| · | PADDING | |
| | SYSTEM USE (COPY RIGHT MANAGEMENT INFORMATION) | |
| | READ FLAG (PLAYED BACK FLAG) | 0=NOT YET PLAYED BACK; 1=COMPLETELY PLAYED BACK |
| | ARCHIVE FLAG (PERMANENT KEEP FLAG) | 0=FREE (ERASABLE); 1=KEEP (UNERASABLE) |

RBP=RELATIVE BYTE POSITION

FIG. 8

ARRANGEMENT OF PRESENTATION CONTROL INFORMATION PCI

CONTENTS OF PRESENTATION CONTROL INFORMATION PCI

| SYMBOL | CONTENTS | NUMBER OF BYTES |
|---|---|---|
| PCI_GI | PCI GENERAL INFORMATION | 60 |
| NSML_AGLI | ANGLE INFORMATION FOR NON-SEAMLESS | 36 |
| HLI | HIGHLIGHT INFORMATION | 694 |
| RECI | RECORDING INFORMATION | 189 |

CONTENTS OF PCI GENERAL INFORMATION PCI_GI

| SYMBOL | CONTENTS | NUMBER OF BYTES |
|---|---|---|
| NV_PCK_LBN | LOGICAL BLOCK NUMBER OF NAV PACKS | 4 |
| VOBU_CAT | CATEGORY OF VOBU | 2 |
| VOBU_UOP_CTL | USER OPERATION CONTROL OF VOBU | 4 |
| VOBU_S_PTM | START PRESENTATION TIME OF VOBU | 4 |
| VOBU_E_PTM | END PRESENTATION TIME OF VOBU | 4 |
| VOBU_SE_E_PTM | END PRESENTATION TIME OF SEQUENCE END IN VOBU | 4 |
| C_ELTM | CELL ELAPSE TIME | 4 |
| RESERVED | RESERVED | 32 |

FIG. 15

VIDEO MANAGER INFORMATION MANAGEMENT TABLE VMGI_MAT

| RBP | SYMBOL | CONTENTS | NUMBER OF BYTES |
|---|---|---|---|
| 0-11 | VMG_ID | VMG IDENTIFIER | 12 |
| 12-15 | VMG_EA | END ADDRESS OF VMG | 4 |
| 16-27 | RESERVED | RESERVED | 12 |
| 28-31 | VMGI_EA | END ADDRESS OF VMGI | 4 |
| 32-33 | VERN | VERSION OF DVD SPEC. | 2 |
| 34-37 | VMG_CAT | VIDEO MANAGER CATEGORY | 4 |
| 38-45 | VLMS_ID | VOLUME SET IDENTIFIER | 8 |
| 46-49 | FREE_SPACE | FREE SPACE/FREE AREA | 14 |
| 50-61 | RESERVED | RESERVED | 12 |
| 62-63 | VTS_Ns | NUMBER OF VTS | 2 |
| 64-95 | PVR_ID | PROVIDER UNIQUE ID | 32 |
| 96-127 | RESERVED | RESERVED | 32 |
| 128-131 | VMGI_MAT_EA | VMGI_MAT END ADDRESS | 4 |
| 132-135 | FP_PGCI_SA | FP_PGCI START ADDRESS | 4 |
| 136-191 | RESERVED | RESERVED | 56 |
| 192-195 | VMGM_VOBS_SA | VMGM_VOBS START ADDRESS | 4 |
| 196-199 | TT_SRPT_SA | TT_SRPT START ADDRESS | 4 |
| 200-203 | VMGM_PGCI_UT_SA | VMGM_PGCI_UT START ADDRESS | 4 |
| 204-207 | PTL_MAIT_SA | PTL_MAIT START ADDRESS | 4 |
| 208-211 | VTS_ATRT_SA | VTS_ATRT START ADDRESS | 4 |
| 212-215 | TXTDT_MG_SA | TXTDT_MG START ADDRESS | 4 |
| 216-219 | VMGM_C_ADT_SA | VMGM_C_ADT START ADDRESS | 4 |
| 220-223 | VMGM_VOBU_ADMAP_SA | VMGM_VOBU_ADMAP START ADDRESS | 4 |
| 224-255 | RESERVED | RESERVED | 32 |
| 256-257 | VMGM_V_ATR | VIDEO ATTRIBUTE OF VMGM | 2 |
| 258-259 | VMGM_AST_Ns | NUMBER OF AUDIO STREAMS OF VMGM | 2 |
| 260-267 | VMGM_AST-ATR | AUDIO STREAM ATTRIBUTE OF VMGM | 8 |
| 268-323 | RESERVED | RESERVED | 56 |
| 324-339 | RESERVED | RESERVED | 16 |
| 340-341 | VMGM_SPST_Ns | NUMBER OF SUB-PICTURE STREAMS OF VMGM | 2 |
| 342-347 | VMGM_SPST_ATR | SUB-PICTURE STREAM ATTRIBUTE OF VMGM | 6 |
| 348-1023 | RESERVED | RESERVED | 676 |
| 1024-2291 (MAX) | FP_PGCI | FIRST PLAY PGCI | 0 OR 236-268 |

FIG. 17

VIDEO TITLE SET INFORMATION MANAGEMENT TABLE VTSI_MAT

| RBP | SYMBOL | CONTENTS | NUMBER OF BYTES |
|---|---|---|---|
| 0-11 | VTS_ID | VTS IDENTIFIER | 12 |
| 12-15 | VTS_EA | END ADDRESS OF VTS | 4 |
| 16 | PLAY_END Flag | 0=NOT YET PLAYED BACK; 1=COMPLETELY PLAYED BACK | 1 |
| 17 | ARCHIVE Flag | 0=FREE (ERASABLE); 1=KEEP (UNERASABLE) | 1 |
| 18-27 | RESERVED | RESERVED | 10 |
| 28-31 | VTSI_EA | END ADDRESS OF VTSI | 4 |
| 32-33 | VERN | VERSION OF DVD SPEC. | 2 |
| 34-37 | VTS_CAT | VTS CATEGORY | 4 |
| 38-127 | RESERVED | RESERVED | 90 |
| 128-131 | VTSI_MAT_EA | END ADDRESS OF VTSI_MAT | 4 |
| 132-191 | RESERVED | RESERVED | 60 |
| 192-195 | VTSM_VOBS_SA | START ADDRESS OF VTSM_VOBS | 4 |
| 196-199 | VTSTT_VOBS_SA | START ADDRESS OF VTSTT_VOBS | 4 |
| 200-203 | VTS_PTT_SRPT_SA | START ADDRESS OF VTS_PTT_SRPT | 4 |
| 204-207 | VTS_PGCIT_SA | START ADDRESS OF VTS_PGCIT | 4 |
| 208-211 | VTSM_PGCI_UT_SA | START ADDRESS OF VTSM_PGCI_UT | 4 |
| 212-215 | VTS_TMAPT_SA | START ADDRESS OF VTS_TMAPT | 4 |
| 216-219 | VTSM_C_ADT_SA | START ADDRESS OF VTSM_C_ADT | 4 |
| 220-223 | VTSM_VOBU_ADMAP_SA | START ADDRESS OF VTSM_VOBU_ADMAP | 4 |
| 224-227 | VTS_C_ADT_SA | START ADDRESS OF VTS_C_ADT | 4 |
| 228-231 | VTS_VOBU_ADMAP_SA | START ADDRESS OF VTS_VOBU_ADMAP | 4 |
| 232-255 | RESERVED | RESERVED | 24 |
| 256-579 | | ATTRIBUTES OF VIDEO, AUDIO, SUP-PICTURE, ETC. | 324 |
| 580-595 | RESERVED | RESERVED | 16 |
| 596-597 | VTS_SPST_Ns | NUMBER OF SUB-PICTURE STREAMS OF VTS | 2 |
| 598-789 | VTS_SPST_ATRT | SUB-PICTURE STREAM ATTRIBUTE TABLE OF VTS | 192 |
| 790-791 | RESERVED | RESERVED | 2 |
| 792-983 | VTS_MU_AST_ATRT | MULTICHANNEL AUDIO STREAM ATTRIBUTE TABLE OF VTS | 192 |
| 984-2047 | RESERVED | RESERVED | 1064 |

FIG. 19

VIDEO TITLE SET
INFORMATION VTSI

| VIDEO TITLE SET INFORMATION MANAGEMENT TABLE VTSI_MAT (MANDATORY) |
|---|
| VIDEO TITLE SET PART_OF_TITLE SEARCH POINTER TABLE VTS_PTT_SRPT (MANDATORY) |
| VIDEO TITLE SET PROGRAM CHAIN INFORMATION TABLE VTS_PGCIT (MANDATORY) |
| VIDEO TITLE SET MENU PGCI UNIT TABLE VTSM_PGCI_UT (MANDATORY WHEN VTSM_VOBS EXISTS) |
| VIDEO TITLE SET TIME MAP TABLE VTS_TMAPT (OPTIONAL) |
| VIDEO TITLE SET MENU CELL ADDRESS TABLE VTSM_C_ADT (MANDATORY WHEN VTSM_VOBS EXISTS) |
| VIDEO TITLE SET MENU VIDEO OBJECT UNIT ADDRESS MAP VTSM_VOBU_ADMAP (MANDATORY WHEN VTSM_VOBS EXISTS) |
| VIDEO TITLE SET CELL ADDRESS TABLE VTS_C_ADT (MANDATORY) |
| VIDEO TITLE SET VIDEO OBJECT UNIT ADDRESS MAP VTS_VOBU_ADMAP (MANDATORY) |

| VIDEO TITLE SET PGCI TABLE INFORMATION VTS_PGCITI |
|---|
| VTS_PGCI SEARCH POINTER #1 VTS_PGCI_SRP#1 |
| ⋮ |
| VTS_PGCI SEARCH POINTER #n VTS_PGCI_SRP#n |
| VIDEO TITLE SET PROGRAM CHAIN INFORMATION VTS_PGCI |
| ⋮ |
| VIDEO TITLE SET PROGRAM CHAIN INFORMATION VTS_PGCI |

FIG. 20

CONTENTS OF CELL PLAYBACK INFORMATION C_PBI OF PROGRAMS

| RBP | SYMBOL | CONTENTS | NUMBER OF BYTES |
|---|---|---|---|
| 0~3 | C_CAT | CELL CATEGORY | 4 |
| 4~7 | C_PBTM | CELL PLAYBACK TIME | 4 |
| 8~11 | C_FVOBU_SA | START ADDRESS OF FIRST VOBU IN CELL | 4 |
| 12~15 | C_FILVU_EA | END ADDRESS OF FIRST ILVU IN CELL | 4 |
| 16~19 | C_LVOBU_SA | START ADDRESS OF LAST VOBU IN CELL | 4 |
| 20~23 | C_LVOBU_EA | END ADDRESS OF LAST VOBU IN CELL | 4 |
| 236~236 | CELL TYPE | ERASE PROHIBITION FLAG 0=FREE (ERASABLE); 1=KEEP (UNERASABLE) | 1 |
|  |  | TOTAL | 25 |

FIG. 23

PROGRAM CHAIN GENERAL INFORMATION PGC_GI

| RBP | SYMBOL | CONTENTS | NUMBER OF BYTES |
|---|---|---|---|
| 0-3 | PGC_CNT | PGC CONTENTS | 4 |
| 4-7 | PGC_PB_TM | PGC PLAYBACK TIME | 4 |
| 8-11 | PGC_UOP_CTL | PGC USER OPERATION CONTROL | 4 |
| 12-27 | PGC_AST_CTLT | PGC AUDIO STREAM CONTROL TABLE | 16 |
| 28-155 | PGC_SPST_CTLT | PGC SUB-PICTURE STREAM CONTROL TABLE | 128 |
| 156-163 | PGC_NV_CTL | PGC NAVIGATION CONTROL | 8 |
| 164-227 | PGC_SP_PLT | PGC SUB-PICTURE PALETTE | 4×16 |
| 228-229 | PGC_CMDT_SA | START ADDRESS OF PGC_CMDT | 2 |
| 230-231 | PGC_PGMAP_SA | START ADDRESS OF PGC_PGMAP | 2 |
| 232-233 | C_PBIT_SA | START ADDRESS OF C_PBIT | 2 |
| 234-235 | C_POSIT_SA | START ADDRESS OF C_POSIT | 2 |

TOTAL 236 BYTES

FIG. 25

DIGITAL RECORDING SYSTEM USING VARIABLE RECORDING RATE

This application is a Division of application Ser. No. 09/209,474 Filed on Dec. 11, 1998.

BACKGROUND OF THE INVENTION

The present invention relates to a digital information recording medium having a limited storage amount and premised on variable bit rate recording.

The present invention also relates to a digital information recording/playback system using a digital information recording medium having a limited storage amount.

Furthermore, the present invention relates to a digital video recorder for recording and playing back information such as digital moving pictures and the like, which are compressed by MPEG.

In recent years, systems for playing back the contents of optical discs that record video data (moving pictures), audio data, and the like have been developed, and have prevailed for the purpose of playing back movie software titles, karaoke data, and the like as in LDs (laser discs), video CDs (video compact discs), and the like.

DVD (digital versatile disc) standards that use MPEG2 (moving picture expert group) international standards, and also use an audio compression scheme such as AC-3 (digital audio compression), or the like, have been proposed. The DVD standards include read-only DVD video (or DVD-ROM), write-once DVD-R, recordable/readable DVD-RW (or DVD-RAM).

The DVD video (DVD-ROM) standards support MPEG2 as a moving picture compression scheme, and AC-3 audio and MPEG audio in addition to linear PCM as audio recording schemes in accordance with the MPEG2 system layer. Furthermore, the DVD video standards are configured by adding sub-picture data obtained by runlength-compressing bitmap data for superimposed dialogs, and presentation control data (navigation data) for fastforward, rewind, data search, and the like. The standards also support the UDF Bridge format (a hybrid of UDF and ISO9660) to allow computers to read data.

An optical disc currently used in DVD video (DVD-ROM) is a single-sided, single-layered 12-cm disc having a storage amount around 4.7 GB (gigabytes). A single-sided, two-layered disc has a storage amount around 9.5 GB, and a double-sided, two-layered disc is capable of recording a large amount of data around 18 GB (when a laser of a wavelength of 650 nm is used for reading).

An optical disc currently used in DVD-RW (DVD-RAM) is a 12-cm disc, and has a storage amount of 2.6 GB (gigabytes) on one surface, i.e., 5.2 GB on the two surfaces. The currently available DVD-RAM optical disc has a smaller storage amount than that of a DVD-ROM disc of the corresponding size. However, technical developments for expanding the amount of the DVD-RAM disc have been extensively made, and it is certain that a DVD-RAM disc having a storage amount more than 4.7 GB on one surface will be available in the near future.

However, since an MPEG2 video file that can obtain high picture quality has a large data size, the currently available DVD-RAM disc (single-sided 2.6 GB disc or double-sided 5.2 GB disc) does not always have a sufficient recordable time (around 1 hour for 2.6 GB disc, around 2 hours for 5.2 GB disc).

That is, the storage amounts of individual DVD-RAM discs do not have an enough margin for the purpose of long-time moving picture recording in the status quo, and efficient data management (release of unnecessary storage areas, management of variable recording rates in correspondence with the remaining recordable amount and/or monitoring of the remaining recordable time at a variable recording rate, and the like) is required. Even if the storage amount of a DVD-RAM disc increases in the future, requirements for longer-time recording arise accordingly, and efficient data management is also required.

In an optical disc such as a DVD-RAM on which data can be written or rewritten, a function of allowing the user to easily edit data is demanded. However, no recording/playback apparatus which can be easily handled by the user for home use is available to date.

BRIEF SUMMARY OF THE INVENTION

It is an object of the present invention to provide a variable bit rate digital information recording/playback system, which can extend the recordable time for a digital recording medium having a limited storage amount.

It is another object of the present invention to provide a digital information recording/playback system, which can inform or display the remaining recordable time upon executing digital recording on a digital recording medium having a limited storage amount at a variable bit rate.

It is still another object of the present invention to provide a digital recording medium which can compression-record digital moving picture information at a variable bit rate, and can record dummy data that is used for editing recorded information after recording.

It is still another object of the present invention to provide a remote controller which makes a system, which performs digital information recording at a variable bit rate on a digital recording medium having a limited storage amount, inform or display the recording bit rate and/or the remaining recordable time at that bit rate.

It is still another object of the present invention to provide a computer program or a method corresponding to the processing contents of this program, which is used for achieving the above objects using a computer system such as a personal computer or an information processing terminal comprising a microcomputer.

It is still another object of the present invention to provide a recording method, recording apparatus, or recording medium, which allows user's easy edit operation to attain flexible edit operations.

It is still another object of the present invention to provide a recording method, recording apparatus, or recording medium, which can efficiently manage data and, consequently, can flexibly manage keep units.

It is still another object of the present invention to provide a recording method, recording apparatus, or recording medium, which can efficiently manage data by assigning erase or delete prohibition flags in units of cells.

In order to achieve the above objects, a digital information recording/playback system according to an embodiment of the present invention informs or displays the average recording rate used currently and/or the remaining recordable time upon executing digital recording at a variable recording rate on a digital recording medium having a limited storage amount.

Also, a digital information recording/playback system according to an embodiment of the present invention adjusts the recording quality and recordable time for a digital recording medium by changing the variable recording rate.

Furthermore, a digital information recording/playback system according to an embodiment of the present invention changes the average recording rate upon recording a program of a predetermined duration in correspondence with the remaining amount of a recording medium so as to record the entire program.

Moreover, a digital information recording/playback system according to an embodiment of the present invention changes the average recording rate upon recording unrecorded programs in correspondence with the remaining amount of a recording medium, the number of unrecorded programs, and the recording times required by these programs, so as to record all the predetermined number of programs.

A digital recording medium according to an embodiment of the present invention records digital moving picture information in a predetermined unit at a variable rate, and also records dummy information that can be used for editing recorded information in a unit corresponding to the predetermined unit.

A remote controller according to an embodiment of the present invention has an operation key for making a system, which performs digital information recording on a digital recording medium having a limited storage amount at a variable bit rate, inform or display the average recording rate used currently and/or the remaining recordable time.

A computer readable program or a processing method corresponding to this program according to an embodiment of the present invention includes: a process for, when a free space or area that remains on a medium having a limited storage amount becomes smaller than a predetermined value as a result of information recording on the medium at a variable recording rate, calculating the remaining recordable time on the medium on the basis of the free space and variable recording rate; and a process for displaying the variable recording rate and the remaining recordable time at that variable recording rate on the basis of the result of the remaining recordable time calculation process.

A computer readable program or a processing method corresponding to this program according to an embodiment of the present invention includes: a process for, when a recordable free space remains on a medium which has a limited storage amount and undergoes information recording at a variable recording rate, calculating an average recording rate for the medium on the basis of the free space and a length of information to be recorded on the medium; and a process for setting the calculated average recording rate as a recording rate for the free space.

A computer readable program or a processing method corresponding to this program according to an embodiment of the present invention includes: a process for, when a free space that remains on a medium having a limited storage amount becomes short upon information recording on the medium for a predetermined period of time at a variable recording rate, decreasing an average recording rate for the medium discontinuously or stepwise on the basis of the free space and an information recording time; and a process for setting the decreased average recording rate as a recording rate for the free space.

A computer readable program or a processing method corresponding to this program according to an embodiment of the present invention includes: a first average recording rate calculation process for calculating an average recording rate for a medium having a limited storage amount on the basis of a remaining amount on the medium and the information recording time upon information recording on the medium for a predetermined period of time; a second average recording rate calculation process for, when the calculated average recording rate is smaller than a predetermined lower limit value, changing recording contents of the information, and then calculating an average recording rate for the medium on the basis of the changed information recording time and the remaining amount on the medium; and a process for, when the average recording rate calculated by the first or second average recording rate calculation process is not less than the predetermined lower limit value, setting the calculated average recording rage as a recording rate of the recording contents of the information for the remaining amount.

A computer readable program or a processing method corresponding to this program according to an embodiment of the present invention includes: a process for, when a remaining amount of a medium having a limited storage amount is not less than a predetermined value upon digital moving picture recording on the medium at a variable recording rate, performing the digital moving picture recording by MPEG2; and a process for, when the remaining amount of the medium is smaller than the predetermined value upon digital moving picture recording on the medium at a variable recording rate, performing the digital moving picture recording by MPEG1.

A computer readable program or a processing method corresponding to this program according to an embodiment of the present invention includes: a process for, when a remaining recordable amount on a medium having a limited storage amount is not less than a predetermined value, recording dummy information together with predetermined information to be recorded; and a process for, when the remaining recordable amount on the medium is smaller than the predetermined value, canceling recording of the dummy information.

In an embodiment of the present invention, means for setting an erase prohibition range indicates the erase prohibition range of a file. When this range is not set in units of cells of the current cell, the current cell is divided by a cell separator to set an advanced cell sequence. A reassemble means reassembles presentation management information of the advanced cells and current cell, and appends erase prohibition information to the presentation management information of the advanced cells that belong to the set range.

With the above arrangement, playback information can be subjected to flexible playback sequence management, and user's operations are easy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a view for explaining the contents of a directory record corresponding to the directory structure shown in FIG. 7;

FIG. 15 is a view for explaining the contents of presentation control information general information PCI_GI shown in FIG. 14;

FIG. 17 is a view for explaining the contents of video manager information management table VMGI_MAT shown in FIG. 16;

FIG. 19 is a view for explaining the contents of video title set information management table VTSI_MAT shown in FIG. 18;

FIG. 20 is a view for explaining the contents of video title set program chain information table VTSI_PGCIT shown in FIG. 18;

FIG. 23 is a view for explaining the contents of cell playback information C_PBI shown in FIG. 22;

FIG. 25 is a view for explaining the contents of program chain general information PGC_GI shown in FIG. 21;

DETAILED DESCRIPTION OF THE INVENTION

A digital information recording/playback system according to an embodiment of the present invention will be explained hereinafter with reference to the accompanying drawings.

As a typical embodiment of a digital information recording/playback system according to the present invention, an apparatus which records/plays back moving pictures encoded by MPEG2 at a variable bit rate, e.g., a DVD digital video recorder, is known. (An example of the DVD digital video recorder will be described in detail later.)

Figure 1:
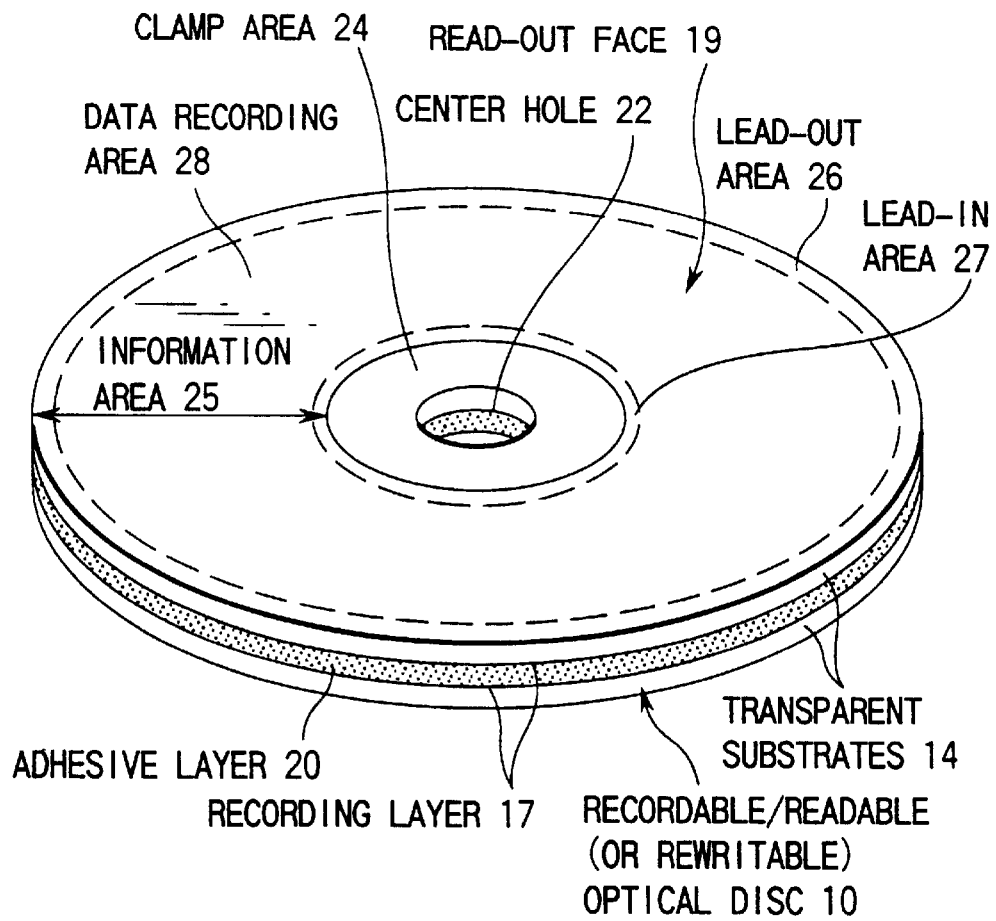
FIG. 1 is a perspective view for explaining the structure of a recordable/readable optical disc (DVD-RAM or DVD-RW disc)

FIG. 1 is a perspective view for explaining the structure of recordable/readable optical disc 10 used in the DVD digital video recorder.

As shown in FIG. 1, this optical disc 10 has a structure obtained by adhering a pair of transparent substrates 14 each having recording layer 17 using adhesive layer 20. Each substrate 14 can be formed of a 0.6-mm thick polycarbonate film, and adhesive layer can consist of a very thin (e.g., 40-$\mu$m thick) ultraviolet setting resin. When the pair of 0.6-mm thick substrates 14 are adhered to each other so that their recording layers 17 contact each other on the surfaces of adhesive layer 20, a 1.2-mm thick large-amount optical disc 10 is obtained.

Optical disc 10 has center hole 22, and clamp areas 24 used for clamping optical disc 10 upon its rotation are formed around center hole 22 on the two surfaces of the disc. Center hole 22 receives the spindle of a disc motor when disc 10 is loaded into a disc drive (not shown). Optical disc 10 is clamped at its clamp areas 24 by a disc clamper (not shown).

Optical disc 10 has information areas 25 that can record video data, audio data, and other information around clamp areas 24 on its two surfaces.

Each information area 25 has lead-out area 26 on its outer periphery side, and lead-in area 27 on its inner periphery side that contacts clamp area 24. The area between lead-out and lead-in areas 26 and 27 is defined as data recording area 28.

On recording layer (optical reflection layer) 17 of information area 25, a recording track is continuously formed in, e.g., a spiral pattern. The continuous track is divided into a plurality of physical sectors, which have serial numbers. Various data are recorded on optical disc 10 using these sectors as recording units.

Data recording area 28 serves as an actual data recording area, and records video data (main picture data) such as a movie or the like, sub-picture data such as superimposed dialogs, menus, and the like, and audio data such as words, effect sounds, and the like as similar pit trains (physical shapes or phase states that bring about change in optical conditions).

When optical disc 10 is a double-sided recording RAM disc in which each surface has one recording layer, each recording layer 17 can be formed by three layers, i.e., by sandwiching a phase-change recording material layer (e.g., $Ge_2Sb_2Te_5$) between two zinc sulfide.silicon oxide ($ZnS.SiO_2$) mixture layers.

When optical disc 10 is a single-sided recording RAM disc in which each surface has one recording layer, recording layer 17 on the side of read-out surface 19 can be formed by three layers including the phase-change recording material layer. In this case, layer 17 on the side opposite to read-out surface 19 need not be an information recording layer but may merely be a dummy layer.

When optical disc 10 is a one-side read type two-layered RAM/ROM disc, two recording layers 17 can comprise a single phase-change recording layer (on the side farther from read-out surface 19; read/write), and a single semi-transparent metal reflection layer (on the side closer to read-out surface 19; read-only).

When optical disc 10 is a write-once DVD-R, a polycarbonate substrate is used, gold can be used as a reflection layer (not shown), and an ultraviolet setting resin can be used as a protection layer (not shown). In this case, an organic dye is used in recording layer 17. As the organic dyes, cyanine, squarilium, chroconic, and triphenylmenthane dyes, xanthene and quinone dyes (naphthoquinone, anthraquinone, and the like), metal complex dyes (phthalocyanine, porphyrin, dithiol complex, and the like), and so forth can be used.

Data can be written on such DVD-R disc using a semiconductor laser having a wavelength of 650 nm and an output of about 6 to 12 mW.

When optical disc 10 is a one-side read type two-layered ROM disc, two recording layers 17 can be comprised of a single metal reflection layer (on the side farther from read-out surface 19) and a single semi-transparent reflection layer (on the side closer to read-out surface 19).

In case of read-only DVD-ROM disc 10, pit trains are pre-formed by a stamper on substrate 14, and a reflection layer of, e.g., a metal, is formed on that surface of substrate 14, which is formed with pit trains. The reflection layer is used as recording layer 17. In such DVD-ROM disc 10, no grooves serving as recording tracks are especially formed, and the pit trains formed on the surface of substrate 14 serve as tracks.

In various types of optical discs 10 described above, read-only ROM information is recorded on recording layer 17 as an embossed pattern signal. By contrast, no such embossed pattern signal is formed on substrate 14 having read/write (or write-once) recording layer 17, and a continuous groove is formed instead. A phase-change recording layer is formed on such groove. In case of a read/write DVD-RAM disc, the phase-change recording layer in land portions is also used for information recording in addition to the groove.

When optical disc 10 is of one-side read type (independently of one or two recording layers), substrate 14 on the rear side viewed from read-out surface 19 need not always be transparent to the read/write laser beam used. In this case, a label may be printed on the entire surface of substrate 14 on the rear side.

A DVD digital video recorder (to be described later) can be designed to attain repetitive recording/repetitive playback (read/write) for a DVD-RAM disc (or DVD-RW disc), single recording/repetitive playback for a DVD-R disc, and repetitive playback for a DVD-ROM disc.

Figure 2A:
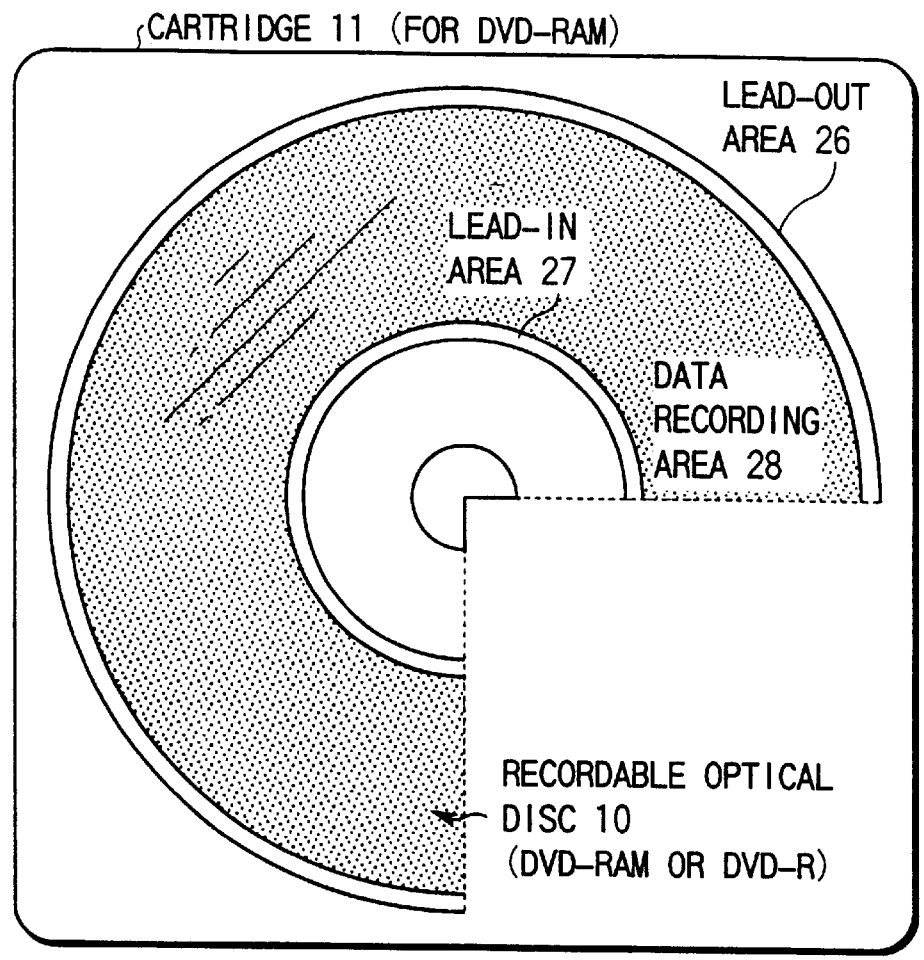
FIGS. 2A and 2B are views for explaining the correspondence between a data recording area and recording tracks of data recorded there in the optical disc (DVD-RAM) shown in FIG. 1.
Figure 2B:
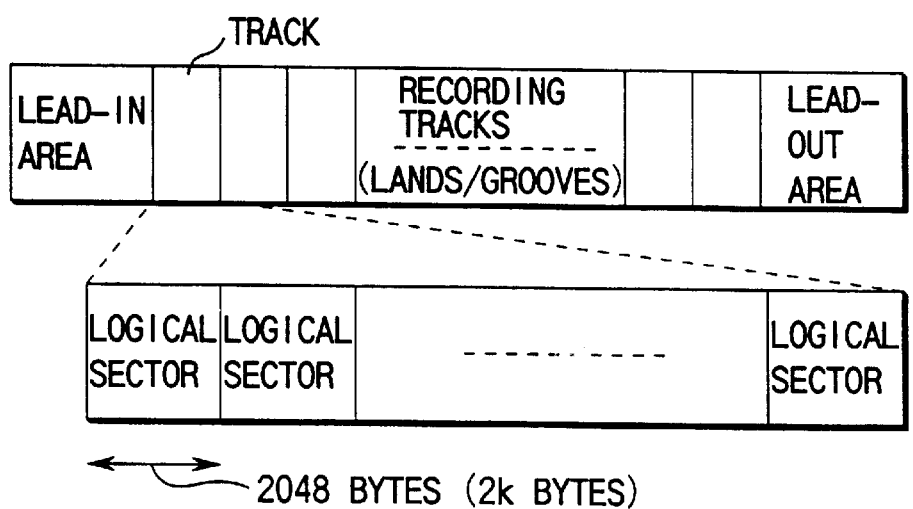

FIG. 2 is a view for explaining the correspondence between data recording area 28 on optical disc (DVD-RAM) 10 shown in FIG. 1, and recording tracks of data recorded there.

When disc 10 is a DVD-RAM (or DVD-RW), disc 10 itself is stored in cartridge 11 to protect its delicate disc surface. When DVD-RAM disc 10 in cartridge 11 is inserted into the disc drive of a DVD video recorder (to be described later), disc 10 is pulled out from cartridge 11, is clamped by the turntable of a spindle motor (not shown), and is rotated to face an optical head (not shown).

On the other hand, when disc 10 is a DVD-R or DVD-ROM, disc 10 itself is not stored in cartridge 11, and bare disc 10 is directly set on the disc tray of a disc drive.

Recording layer 17 of information area 25 shown in FIG. 1 is formed with a continuous data recording track in a spiral pattern. The continuous track is divided into a plurality of logical sectors (minimum recording units) each having a given storage amount, as shown in FIG. 2, and data are recorded with reference to these logical sectors. The recording amount per logical sector is determined to be 2,048 bytes (or 2 kbytes) which are equal to one pack data length (to be described later).

Data recording area 28 is an actual data recording area, which similarly records management data, main picture (video) data, sub-picture data, and audio data.

Note that data recording area 28 of disc 10 shown in FIG. 2 can be divided into a plurality of ring-shaped (annular) recording areas (a plurality of recording zones), although not shown. The disc rotational velocity varies in units of recording zones. However, within each zone, a constant linear or angular velocity can be set. In this case, an auxiliary recording area (free space or area) can be provided for each zone. These free spaces in units of zones may collectively form a reserve area for that disc 10. The storage amount (reserve amount) of this reserve area can be used in, e.g., automatic picture quality setting processing (FIG. 51; to be described later) and the like.

Figure 3:
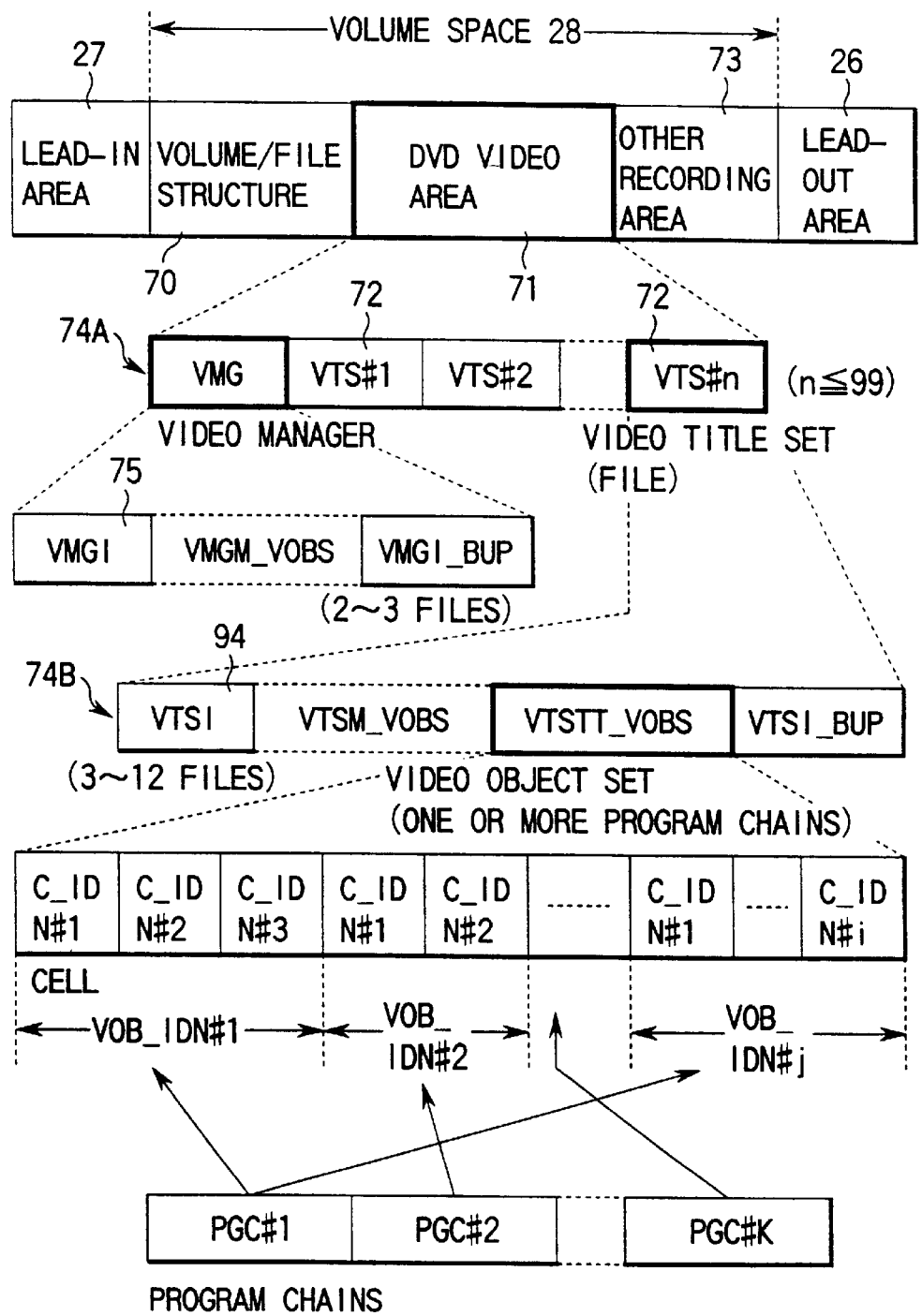
FIG. 3 is a view for explaining the hierarchical structure of information (the contents of the data recording area or a volume space of DVD video) recorded on the optical disc shown in FIGS. 2A and 2B.

FIG. 3 is a view for explaining the hierarchical structure of information recorded on optical disc 10 shown in FIG. 2.

Data recording area 28 formed on optical disc 10 shown in FIG. 2 has a structure, as shown in FIG. 3. The logical format of this structure is defined to comply with, e.g., the Universal Disc Format (UDF) Bridge (a hybrid of UDF and ISO9660) as one of standard formats.

Data recording area 28 between lead-in area 27 and lead-out area 26 is assigned as a volume space. Volume space 28 can include a space for information of the volume and file structures (volume/file structure 70), a space for the application of the DVD format (DVD video area 71), and a space for an application other than that of this format (other recording area 73).

Volume space 28 is physically divided into a large number of sectors, and these physical sectors have serial numbers.

The logical addresses of data recorded on this volume space (data recording area) 28 mean logical sector numbers, as defined by the UDF Bridge. The logical sector size in this space is 2,048 bytes (or 2 kbytes) as in the physical sector size. The logical sector numbers are assigned serial numbers in ascending order of physical sector numbers.

Unlike the logical sectors, each physical sector is added with redundant information such as error correction information and the like. For this reason, the physical sector size does not strictly match the logical sector size.

That is, volume space 28 has a hierarchical structure, which includes volume/file structure area 70, DVD video area 71 consisting of one or more video title sets VTS#n 72, and other recording area 73. These areas are split up on the boundaries of logical sectors. Note that one logical sector is defined to be 2,048 bytes, and one logical block is also defined to be 2,048 bytes. Hence, one logical sector is defined equivalently with one logical block.

Volume/file structure area 70 corresponds to a management area defined by the UDF Bridge. Based on the description of this area 70, the contents of video manager VMG are stored in an internal system memory (not shown) of the DVD video recorder (to be described later).

Referring to FIG. 3, video manager VMG consists of a plurality of files 74A. These files 74A describe information (video manager information VMGI, video object set VMGM_VOBS for video manager menus, and video manager information backup file VMGI_BUP) for managing video title sets (VTS#1 to VTS#n) 72.

Each video title set VTS 72 stores video data (video pack to be described later) compressed by MPEG, audio data compressed by a predetermined format or uncompressed audio data (audio pack), runlength-compressed sub-picture data (sub-picture pack to be described later; including bitmap data, each pixel of which is defined by a plurality of bits), and also information for playing back these data (navigation pack to be described later; including presentation control information PCI and data search information DSI).

Video title set VTS 72 is also made up of a plurality of files 74B as in video manager VMG. Each file 74B contains video title set information VTSI, object set VTSM_VOBS for video title set menus, video object sets VTSTT_VOBS for video title set titles, and backup information VTSI_BUP for video title set information.

Note that the number of video title sets (VTS#1 to VTS#n) 72 is limited to a maximum of 99, and the number of files 74B that make up each video title set VTS 72 is limited to a maximum of 12. These files 74A and 74B are similarly split up at the boundaries of logical sectors.

Other recording area 73 can record information that can be used in video title sets VTS 72 mentioned above or other kinds of information that do not pertain to video title sets. This area 73 is not mandatory, and may be deleted if it is not used.

As will be described later with reference to FIG. 9, each video object set VTSTT_VOBS for video title set titles defines a set of one or more video objects VOB. Each VOB defines a set of one or more cells. A set of one or more cells make up program chain PGC.

Assuming that one PGC corresponds to one drama, a plurality of cells that make up this PGC can correspond to various scenes in that drama. The contents of the PGC (or those of cells) are determined by, e.g., a software provider who produces the contents recorded on disc 10.

Figure 4:
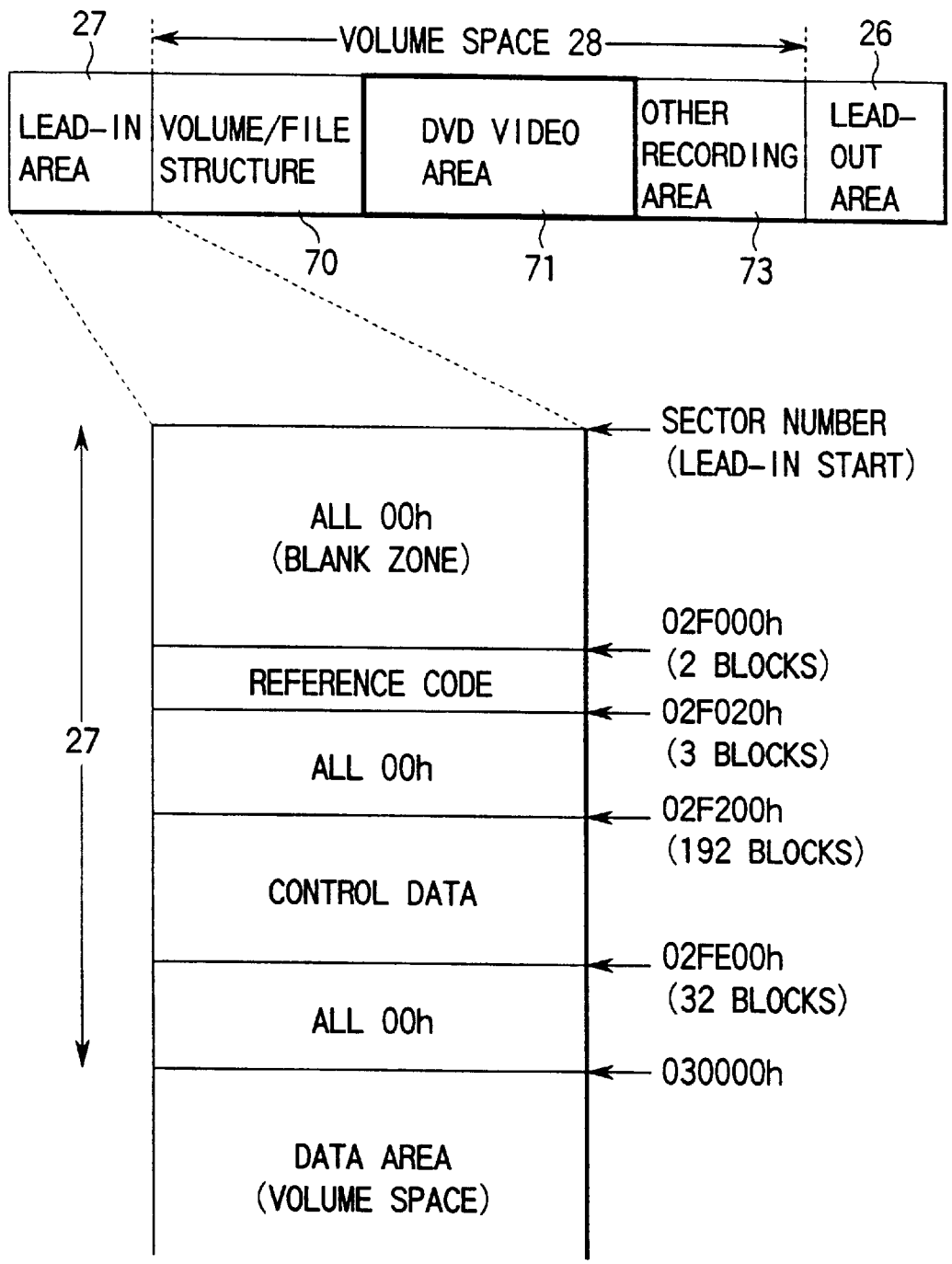
FIG. 4 is a view for explaining the logical structure of information (lead-in area) recorded on the optical disc shown in FIGS. 2A and 2B.

FIG. 4 is a view for explaining information recorded on lead-in area 27 of optical disc 10. When disc 10 is set in the DVD video recorder to be described later (or DVD video player not shown), information on lead-in area 27 is read first. Lead-in area 27 records a predetermined reference code and control data in ascending order of sector numbers.

The reference code in lead-in area 27 is made up of two error correction code blocks (ECC blocks). Each ECC block consists of 16 sectors. These two ECC blocks (32 sectors) are generated by adding scramble data. Upon playing back the reference code added with the scramble data, filter operation or the like on the playback side is done to play back a specific data symbol (e.g., 172), thus assuring data read precision after that.

The control data in lead-in area 27 is made up of 192 ECC blocks. This control data field repetitively records the contents for 16 sectors in each block 192 times.

Figures 5, 6:
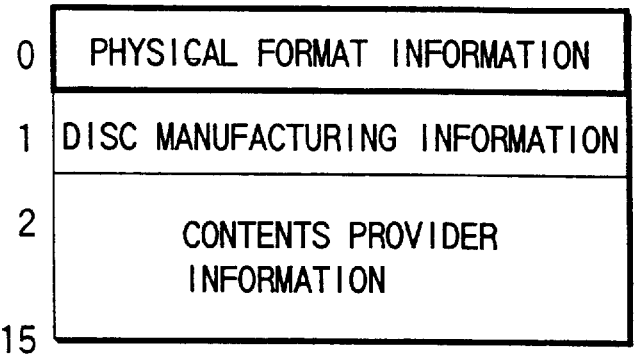
FIG. 5 is a view for explaining the contents of control data recorded on the lead-in area shown in FIG. 4.
FIG. 6 is a view for explaining the contents of physical format information contained in the control data shown in FIG. 5.

FIG. 5 shows the contents of the control data in lead-in area 27. This control data made up of 16 sectors contains physical format information in the first sector (2,048 bytes), and contains disc manufacturing information and contents provider information in the subsequent sectors.

FIG. 6 shows the contents of the 2,048-byte physical format information contained in the control data shown in FIG. 5.

The first byte position "0" describes the version of the DVD format that the recorded information complies with.

The second byte position "1" describes the size (12 cm, 8 cm, or the like) of a recording medium (optical disc 10) and minimum read-out rate. In case of a read-only DVD video, 2.52 Mbps, 5.04 Mbps, and 10.08 Mbps are prescribed minimum read-out rates, but other minimum read-out rates are reserved. For example, when a DVD video recorder capable of variable bit rate recording records at an average bit rate of 2 Mbps, the minimum read-out rate can be set to fall within the range from 1.5 to 1.8 Mbps using the reserve field.

The third byte position "2" describes the disc. structure (the number of recording layers, track pitch, recording layer type, and the like) of the recording medium (optical disc 10). Based on this recording layer type, disc 10 can be identified to be a DVD-ROM, DVD-R, or DVD-RAM (or DVD-RW).

The fourth byte position "3". describes the recording density (linear density & track density) of the recording medium (optical disc 10). The linear density indicates the recording length per bit (0.267 $\mu$m/bit, 0.293 $\mu$m/bit, or the like). On the other hand, the track density indicates the neighboring track spacing (0.74 $\mu$m/track, 0.80 $\mu$m/track, or the like). The fourth byte position "3" also includes a reserve field to designate other numerical values as the linear density and track density of a DVD-RAM or DVD-R.

The fifth byte position "4 to 15" describes the start and end sector numbers of data area 28 and the like of the recording medium (optical disc 10).

The sixth byte position "16" describes a burst cutting area (BCA) descriptor. This BCA is applied as an option to a DVD-ROM disc alone, and is an area for storing recorded information upon completion of the disc manufacturing process.

The seventh byte position "17 to 20" describes a free space or free area of the recording medium (optical disc 10). For example, when disc 10 is a single-sided recording DVD-RAM disc, information indicating 2.6 GB (or the number of sectors corresponding to this number of bytes) is stored at that position of disc 10. On the other hand, when disc 10 is a double-sided recording DVD-RAM disc, information indicating 5.2 GB (or the number of sectors corresponding to this number of bytes) is stored at that position.

The eighth and ninth byte positions "21 to 31" and "32 to 2,047" are reserved for the future.

Figure 7:
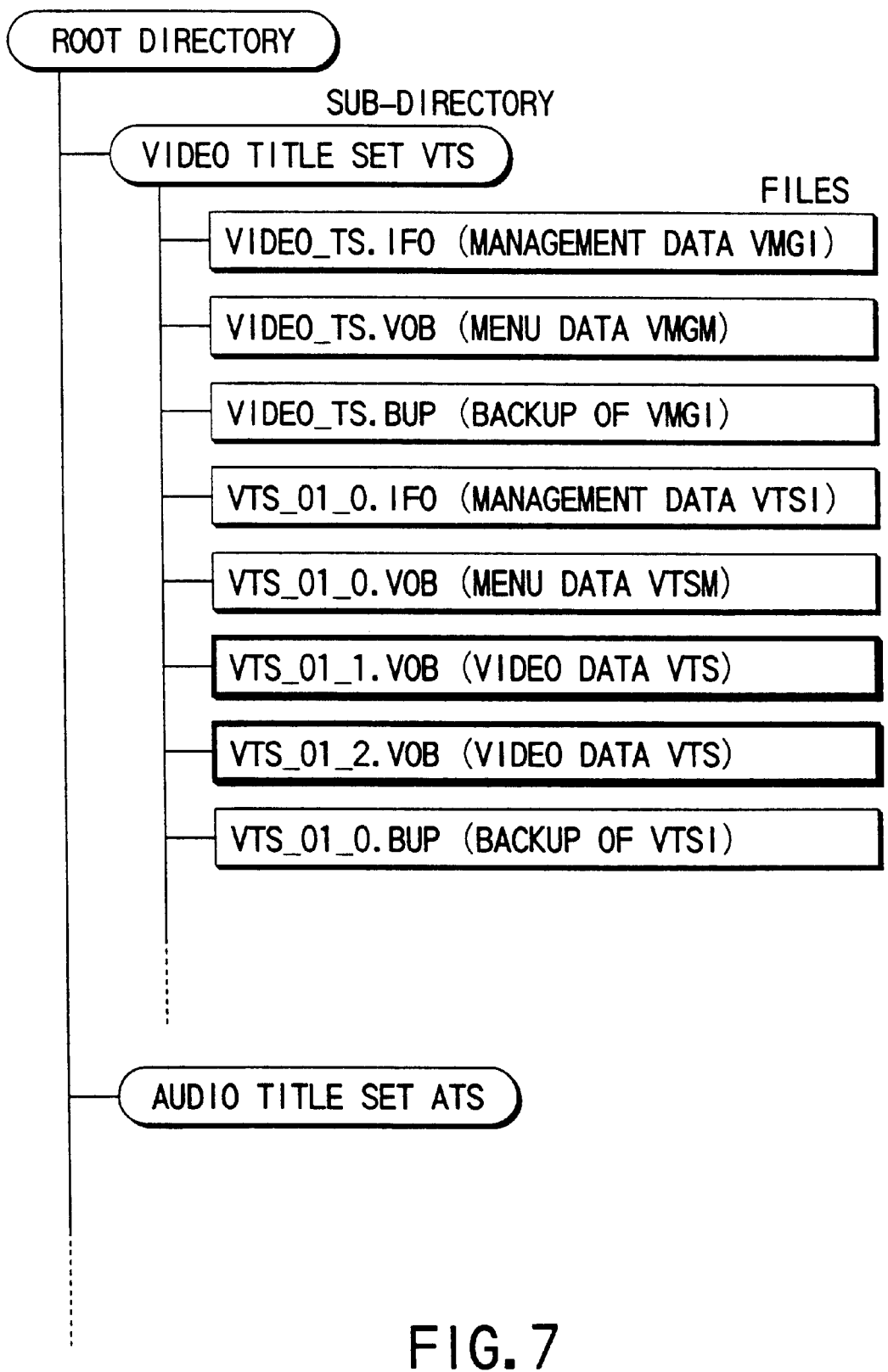
FIG. 7 is a view for explaining the directory structure of information (data file) recorded on the optical disc shown in FIGS. 2A and 2B.

FIG. 7 exemplifies the directory structure of information (data files) recorded on optical disc 10. As in the hierarchical file structure used by a versatile operating system of a computer, the subdirectory of video title set VTS and that of audio title set ATS are made under the root directory. Various video files (files VMGI, VMGM, VTSI, VTSM, VTS, and the like) are allocated in the subdirectory of video title set VTS to manage the individual files systematically. A specific file (e.g., specific VTS) can be accessed by designating the path from the root directory to that file.

DVD-RAM (DVD-RW) disc 10 or DVD-R disc 10 shown in FIG. 1 or 2 may be pre-formatted to have the directory structure shown in FIG. 7, and pre-formatted discs 10 may be put on the market as unused discs (raw discs) for DVD video recording.

That is, the root directory of pre-formatted raw disc 10 includes a subdirectory named a video title set (VTS). This subdirectory can contain various management data files (VIDEO_TS.IFO, VTS_01_0.IFO); backup files (VIDEO_TS.BUP, VTS_01_0.BUP) for backing up information of these management data files; and a video data file (VTS_01_1.VOB) which is managed based on the contents of the management data files and stores digital moving picture information.

The subdirectory can also contain menu data files (VMGM, VTSM) for storing predetermined menu information.

FIG. 8 shows the contents of a directory record corresponding to the directory structure shown in FIG. 7.

The first relative byte position "0" describes the directory record length.

The second relative byte position "1" describes the record length of an assigned extent attribute.

The third relative byte position "2" describes the first logical sector number assigned to an extent.

The fourth relative byte position "10" describes the data length of the file field.

The fifth relative byte position "18" describes the recording date/time of information in the extent described in the directory record. Data at the relative byte position "18" can be used for recording the recording date/time of a recorded program (corresponding to specific VTS) in the DVD video recorder.

The sixth relative byte position "25" describes a file flag indicating the characteristics of files defined in Table 10 of ISO9660.

The seventh relative byte position "26" describes the file unit size assigned to the file field.

The eighth relative byte position "27" describes the interleaved gap size assigned to the file field.

The ninth relative byte position "28" describes the volume sequence number in the volume set on the extent described in the directory record.

The 10th relative byte position "32" describes the file ID field length of the directory record.

The 11th relative byte position "33" describes the file ID or the directory defined by ISO9660.

Next to the file ID, a padding field serving as stuffing when the file ID field has an even-byte length is described.

Next to the padding field, copyright management information used by the system is described.

After the copyright management information, a read flag (or played back flag) indicating whether or not a specific recorded file (e.g., VTS_01_1.VOB in FIG. 7) has been read out once (or that VTS has been played back at least once previously) is described. The read flag for a file which is not yet read out is set at "0". If the file has been read out at least once, the read file of that file is set at "1".

Next to the read flag, an archive flag (or permanent keep flag) indicating whether or not a specific recorded file (e.g., VTS_01_1.VOB in FIG. 7) has contents to be kept permanently (or contents that are prevented from being erroneously erased or deleted) is described. The archive flag for a file which can be erased is set at "0". The archive flag for a file which is to be kept permanently without being erased is set at "1".

Figure 9:
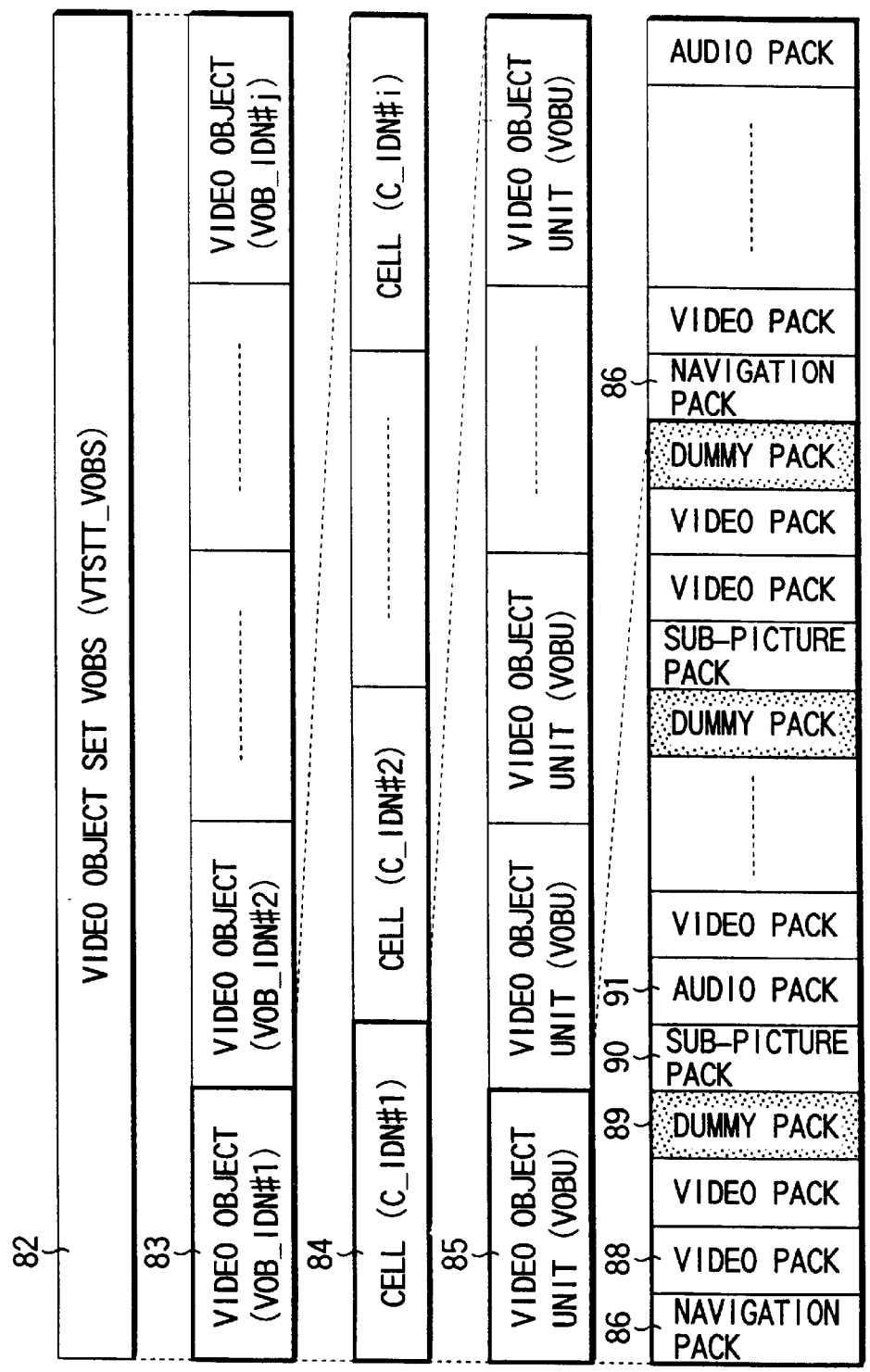
FIG. 9 is a view for explaining the hierarchical structure of information contained in video object set VTSTT_VOBS shown in FIG. 3.

FIG. 9 shows the hierarchical structure of information contained in video object set VTSTT_VOBS shown in FIG. 3.

As shown in FIG. 9, each cell 84 consists of one or more video object units (VOBU) 85. Each video object unit 85 is constituted as a set (pack sequence) of video packs (V packs) 88, sub-picture packs (SP packs) 90, and audio packs (A packs) 91 to have navigation pack (NV pack) 86 at the beginning of the sequence. That is, video object unit VOBU 85 is defined as a set of all packs recorded from certain navigation pack 86 to a pack immediately before the next navigation pack 86.

Each of these packs serves as a minimum unit for data transfer. The minimum unit for logical processing is a cell, and logical processing is done is units of cells.

Navigation pack 86 is built in each video object unit VOBU 85 to realize both angle changes (non-seamless playback and seamless playback).

The playback time of video object unit VOBU 85 corresponds to that of video data made up of one or more picture groups (groups of pictures; to be abbreviated as GOPs), and is set to fall within the range from 0.4 sec to 1.2 sec. One GOP is screen data which normally has a playback time of about 0.5 sec in the MPEG format, and is compressed to play back approximately 15 images during this interval.

When video object unit VOBU 85 includes video data, a video datastream is formed by arranging GOPs (complying with MPEG) each consisting of video packs 88, sub-picture packs 90, and audio packs 91. However, independently of the number of GOPs, video object unit VOBU 85 is defined with reference to the playback time of GOPs, and navigation pack 86 is always set at the beginning of unit 85, as shown in FIG. 9.

Even playback data consisting of audio data and/or sub-picture data alone is formed using video object unit VOBU 85 as one unit. For example, when video object unit VOBU 85 is formed by audio packs 91 alone to have navigation pack 86 at its beginning, audio packs 91 to be played back in the playback time of video object unit VOBU 85 to which the audio data belong are stored in that video object unit VOBU 85 as in video object VOB 83 of video data.

When a DVD video recorder can record video title set VTS containing video object sets 82 with the structure shown in FIG. 9 on optical disc 10, the user often wants to edit the recording contents after the VTS is recorded. In order to meet such requirement, dummy packs 89 can be appropriately inserted in each VOBU 85. Each dummy pack 89 can be used for recording edit data later.

As shown in FIG. 9, video object set (VTSTT_VOBS) 82 is defined as a set of one or more video objects (VOB) 83. Video objects VOB 83 in video object set VOBS 82 are used for the same purpose.

VOBS 82 for menus normally consists of one VOB 83, which stores a plurality of menu screen display data. By contrast, VOBS 82 for a title set normally consists of a plurality of VOBs 83.

Taking a concert video title of a certain rock band as an example, VOBs 83 that form video object set VTSTT_VOBS for a title set correspond to picture data of the performance of that band. In this case, by designating given VOB 83, for example, the third tune in the concert of the band can be played back.

VOB 83 that forms video object set VTSM_VOBS for menus stores menu data of all the tunes performed in the concert of the band, and a specific tune, e.g., an encore, can be played back according to the menu display.

Note that one VOB 83 can form one VOBS 82 in a normal video program. In this case, a single video stream comes to an end in one VOB 83.

On the other hand, in case of a collection of animations having a plurality of stories or an omnibus movie, a plurality of video streams (a plurality of video chains PGC) can be set in single VOB 82 in correspondence with the respective stories. In this case, the individual video streams are stored in corresponding VOBs 83. An audio stream and sub-picture stream pertaining to each video stream end in corresponding VOB 83.

VOBs 83 are assigned identification numbers (IDN#i; i=0 to i), and that VOB 83 can be specified by the identification number. VOB 83 consists of one or more cells 84. A normal video stream consists of a plurality of cells, but a video stream for menus often consists of single cell 84. Cells 84 are assigned identification numbers (C_IDN#j) as in VOBs 83.

Figure 10:
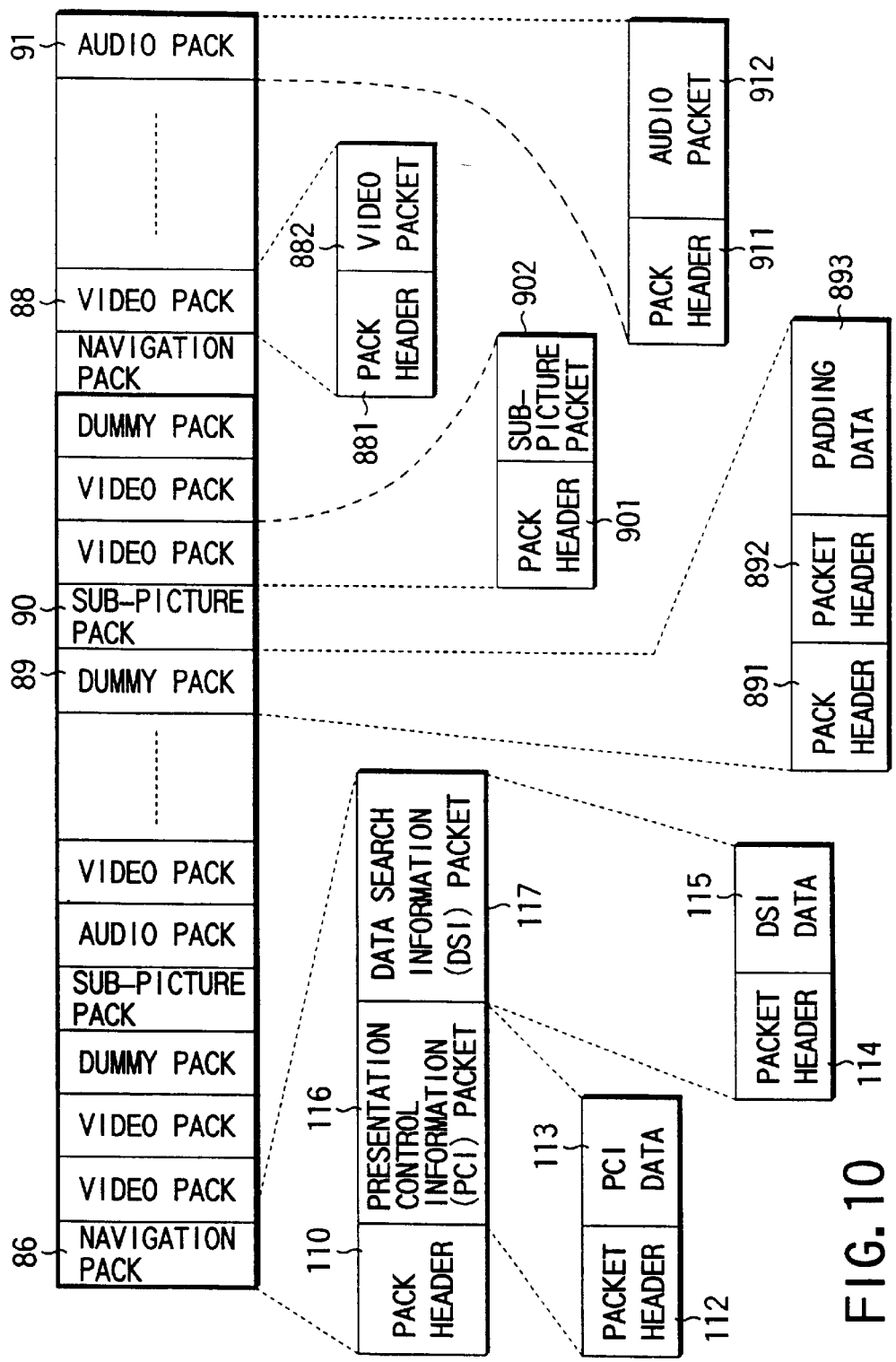
FIG. 10 is a view for explaining the contents of packs in the lowermost layer of the hierarchical structure shown in FIG. 9.

FIG. 10 exemplifies a data sequence (pack sequence) in the pack format, which is obtained after data recorded on the optical disc 10 are read out, and are subjected to signal demodulation/error correction in a disc drive (not shown). This pack sequence includes navigation pack (control pack) 86, video packs 88, dummy packs 89, sub-picture packs 90, and audio packs 91. All these packs consist of data in units of 2 kbytes as in the logical sectors shown in FIG. 2.

Navigation pack 86 includes pack header 110, playback control information/presentation control information (PCI) packet 116, and data search information (DSI) packet 117. PCI packet 116 is made up of packet header 112 and PCI data 113, and DSI packet 117 of packet header 114 and DSI data 115. PCI packet 116 contains control data used upon switching the non-seamless angles, and DSI packet 117 contains control data used upon switching the seamless angles.

Note that the angle switching means changes in angle (camera angle) of watching the object picture. In case of a rock concert video title, for example, the user can watch scenes from various angles, e.g., a scene that mainly captures a vocalist, a scene that mainly captures a guitarist, a scene that mainly captures a drummer, and the like in a performance scene of an identical tune (identical event).

The angle is switched (changed) when the viewer can select angles in accordance with his or her favor, and when an identical scene automatically repeats itself with different angles in the flow of story (if the software producer/provider has programmed the story in such way; or if the user of the DVD video recorder edits in such way).

The angles are set in the following cases: temporally discontinuous, non-seamless playback that presents an identical scene of different angles (for example, in a scene at the instance when a certain boxer throws a counterpunch, the camera angle is changed to another angle to play back a scene in which the counterpunch begins to be thrown), and temporally continuous, seamless playback that changes the angle between temporally continuous scenes (for example, at the instance when a certain boxer has made a counter punch, the camera angle is changed to another angle to play back a scene in which the other boxer who got the punch is blown off).

Video pack 88 is comprised of pack header 881 and video packet 882. Dummy pack 89 is comprised of pack header 891 and padding packet 890, and padding packet 890 of packet header 892 and padding data 893. Note that padding data 893 stores insignificant data.

Sub-picture pack 90 is made up of pack header 901 and sub-picture packet 902. Audio pack 91 is made up of pack header 911 and audio packet 912.

Note that video packet 882 in FIG. 10 contains a packet header (not shown), which records a decode time stamp (DST) and presentation time stamp (PTS). Each of sub-picture packet 902 and audio packet 912 contains a packet header (not shown), which records a presentation time stamp (PTS).

Figure 11:
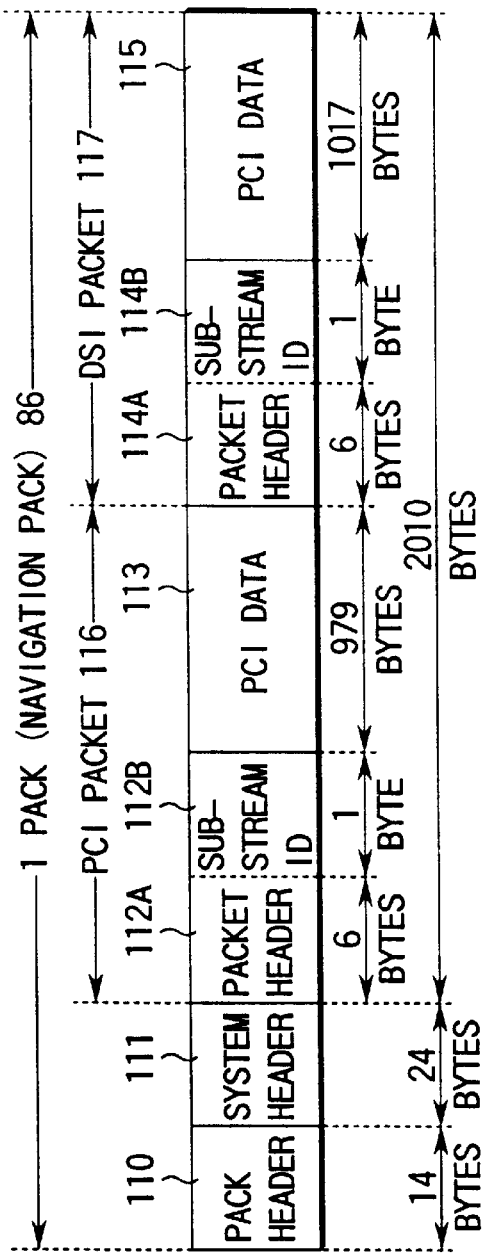
FIG. 11 is a view for explaining the contents of a navigation pack shown in FIG. 10.

FIG. 11 shows the data structure for one navigation pack shown in FIG. 10.

More specifically, one navigation pack 86 consists of 2,010-byte navigation data including 14-byte pack header 110, 24-byte system header 111, and two packets (116, 117). The two packets that form the navigation data are presentation control information (PCI) packet 116 and data search information (DSI) packet 117 in the description of FIG. 10.

PCI packet 116 consists of 6-byte packet header 112A, 1-byte substream identifier (substream ID) 112B, and 979-byte PCI data 113. The datastream of PCI data 113 is designated by an 8-bit code "00000000" of substream ID 112B.

DSI packet 117 is constructed by 6-byte packet header 114A, 1-byte substream identifier (substream ID) 114B, and 1,017-byte DSI data 115. The datastream of DSI data 115 is designated by an 8-bit code "00000001" of substream ID 114B.

The data length for one navigation pack 86 with the above structure is 2,048 bytes (2 kbytes) corresponding to one logical sector shown in FIG. 2.

Pack header 110 and system header 111 shown in FIG. 11 are defined by the MPEG2 system layer. More specifically, pack header 110 stores information such as a pack start code, system clock reference (SCR), and multiplexing rate, and system header 111 describes a bit rate and stream ID. Likewise, packet header 112A of PCI packet 116 and packet header 114A of DSI packet 117 each store a packet start code, packet length, and stream ID, as defined by the MPEG2 system layer.

Figure 12:
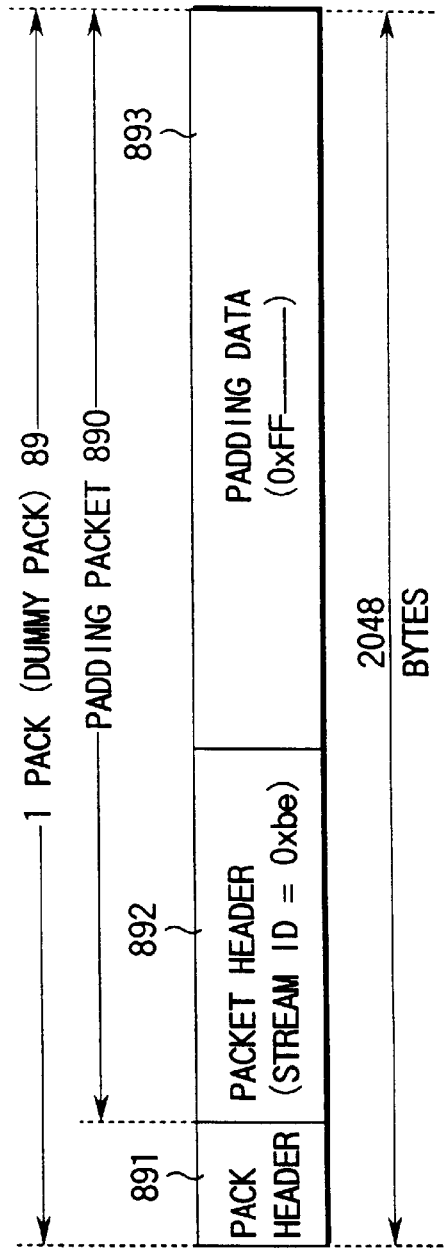
FIG. 12 is a view for explaining the contents of a dummy pack shown in FIG. 10.

FIG. 12 shows the structure for one dummy pack shown in FIG. 10. That is, one dummy pack 89 is made up of pack header 891, packet header 892 with a predetermined stream ID, and padding data 893 padded with a predetermined code. (Packet data 892 and padding data 893 form padding packet 890). The contents of padding data 893 in a non-used dummy pack are not especially significant. This dummy pack 89 can be appropriately used when the recording contents are to be edited after predetermined recording is done on disc 10 shown in FIG. 2.

For example, a case will be examined below wherein the contents of a video tape that recorded a family trip using a portable video camera are recorded and edited on DVD-RAM (or DVD-RW) disc 10.

In this case, only the video scenes to be stored in a single disc are selectively recorded on disc 10. These video scenes are recorded in video pack 88. Also, audio data simultaneously recorded by the video camera is recorded in audio pack 91.

Each VOBU 85 that includes video pack 88 and the like has navigation pack 86 at its beginning. As shown in FIG. 10, this navigation pack 86 contains presentation control information PCI and data search information DSI. Using this PCI or DSI, the playback procedure of each VOBU can be controlled (for example, discontinuous scenes can be automatically connected or a multiangle scene can be recorded).

After the contents of the video tape are edited and recorded on disc 10, when a voice, effect sound, and the like are to be postrecorded (or after-recorded) in each scene in units of VOBU or a background music (BGM) is added, such postrecording (or after-recording) audio data or BGM can be recorded in dummy pack 89. When a comment for the recorded contents is to be added, sub-pictures such as additional characters, figures, and the like can be recorded in dummy pack 89. Furthermore, when an additional video picture is to be inserted, the inserted video picture can be recorded in dummy pack 89.

The above-mentioned postrecording (or after-recording) audio data or the like is written in padding data 893 of dummy pack 89 used as an audio pack. The additional comment is written in padding data 893 of dummy pack 89 used as a sub-picture pack. Similarly, the inserted video picture is written in padding data 893 of dummy pack 89 used as a video pack.

Incidentally, when the postrecording (after-recording) is predetermined, silent audio data coded in the same manner as the original audio data can be written in the dummy pack. In this case, the original audio data may be recorded as a first steam, and the silent audio data may be recorded as a second steam.

More specifically, dummy pack 89 is a wildcard pack that can become any of an audio, sub-picture, and video packs depending on its purpose.

Figures 13, 14:
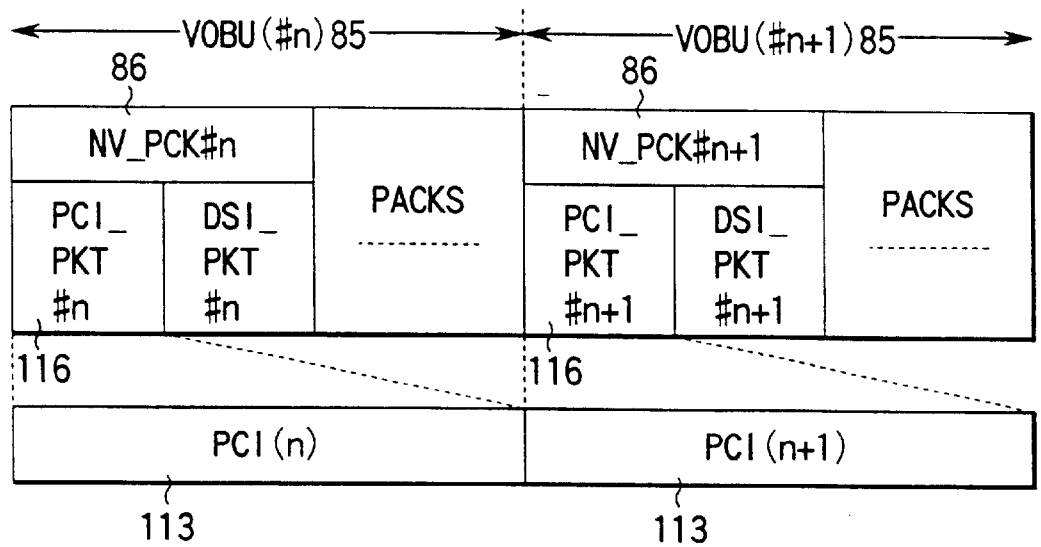
FIG. 13 is a view for explaining the contents of a PCI packet shown in FIG. 11.
FIG. 14 is a view for explaining the contents of presentation control information PCI shown in FIG. 13.

FIG. 13 shows PCI packet 116. included in navigation pack 86 located at the beginning of each VOBU 85. As shown in FIG. 13, PCI packet 116 includes presentation control information PCI (PCI data) 113 as navigation data used for changing the display or playback contents (presentation contents) in synchronism with the playback state of video data in video object unit (VOBU) 85.

FIG. 14 shows the contents of presentation control information (PCI data) 113 shown in FIG. 13. PCI data 113 includes 60-byte PCI general information (PCI_GI), 36-byte non-seamless playback angle information (NSML_AGLI), 694-byte highlight information (HLI), and 189-byte recording information (RECI). This recording information (RECI) can contain a copyright management code (ISRC) of the international standard.

Highlight information HLI is used upon execution of the following highlight processing. More specifically, the MPU (or CPU) of the DVD video recorder (to be described later) reads highlight information HLI, and detects the X-/Y-coordinate values, colors, contrast values, and the like of rectangular regions (highlight buttons) displayed by sub-picture data. The MPU of the DVD video recorder highlights the displayed menu selection item and the like in accordance with these detected data. This highlight processing is used as a means for allowing the user to easily recognize a specific displayed item on the visual user interface. More specifically, when a DVD video title recorded on optical disc 10 is a multilingual compatible program, a specific spoken language (e.g., English) and a specific superimposed dialogue language (e.g., Japanese) are selected by highlight buttons which are displayed to be visually outstanding by the highlight processing.

FIG. 15 shows the contents of presentation control information general information PCI_GI shown in FIG. 14.

Presentation control information general information PCI_GI describes the logical block number (NV_PCK_LBN) of a navigation pack, the category (VOBU_CAT) of a video object unit (VOBU), user operation control (VOBU_UOP_CTL) of the video object unit (VOBU), the start presentation time (VOBU_S_PTM) of the video object unit (VOBU), the end presentation time (VOBU_E_PTM) of the video object unit (VOBU), the end presentation time (VOBU_SE_PTM) of the sequence end in the video object unit (VOBU), and a cell elapse time (C_ELTM).

Note that the logical block number (NV_PCK_LBN) represents the address (recording location) of a navigation pack including the presentation control information (PCI) by the relative number of blocks from the first logical block in the video object set (VOBS) which includes that PCI.

The category (VOBU_CAT) describes the contents of copy protection of an analog signal corresponding to video and sub-picture data in the video object unit (VOBU) that includes the presentation control information (PCI).

The user operation control (VOBU_UOP_CTL) describes user operations which are prohibited during the display (presentation) period of the video object unit (VOBU) that includes the presentation control information (PCI).

The start presentation time (VOBU_S_PTM) describes the start time of display (presentation) of the video object unit (VOBU) that includes the presentation control information (PCI). More specifically, this VOBU_S_PTM indicates the start display time of the first video (first picture) in the display order of the first GOP in the video object unit (VOBU).

The end presentation time (VOBU_E_PTM) describes the end time of display (presentation) of the video object unit (VOBU) that includes the presentation control information (PCI). More specifically, this VOBU_E_PTM indicates the end display time of the last video (last picture) in the display order of the last GOP in the video object unit (VOBU).

On the other hand, when no video data is present in the video object unit (VOBU), or when playback of that video object unit (VOBU) is stopped, this VOBU_E_PTM indicates the end time of virtual video data aligned to the time grids at a field interval (1/60 sec in case of NTSC video).

The end presentation time (VOBU_SE_PTM) describes the end time of display (presentation) based on a sequence end code in video data in the video object unit (VOBU) that includes the presentation control information (PCI). More specifically, this end time indicates the end display time of the last video (last picture) in the display order, which picture includes the sequence end code, in the video object unit (VOBU). If no video (picture) with a sequence end code is present in the video object unit (VOBU), 00000000h (h is an abbreviation for hexadecimal) is set in VOBU_SE_PTM.

The cell elapse time (C_ELTM) describes the relative display (presentation) time from the first video frame in the display order of a cell that includes the presentation control information (PCI) to the first video frame in the display order of the video object unit (VOBU) that includes the PCI in hours, minutes, and seconds in the BCD format and frames. When no video data is present in the video object unit (VOBU), the first video frame of the virtual video data is used as the video frame.

Figure 16:
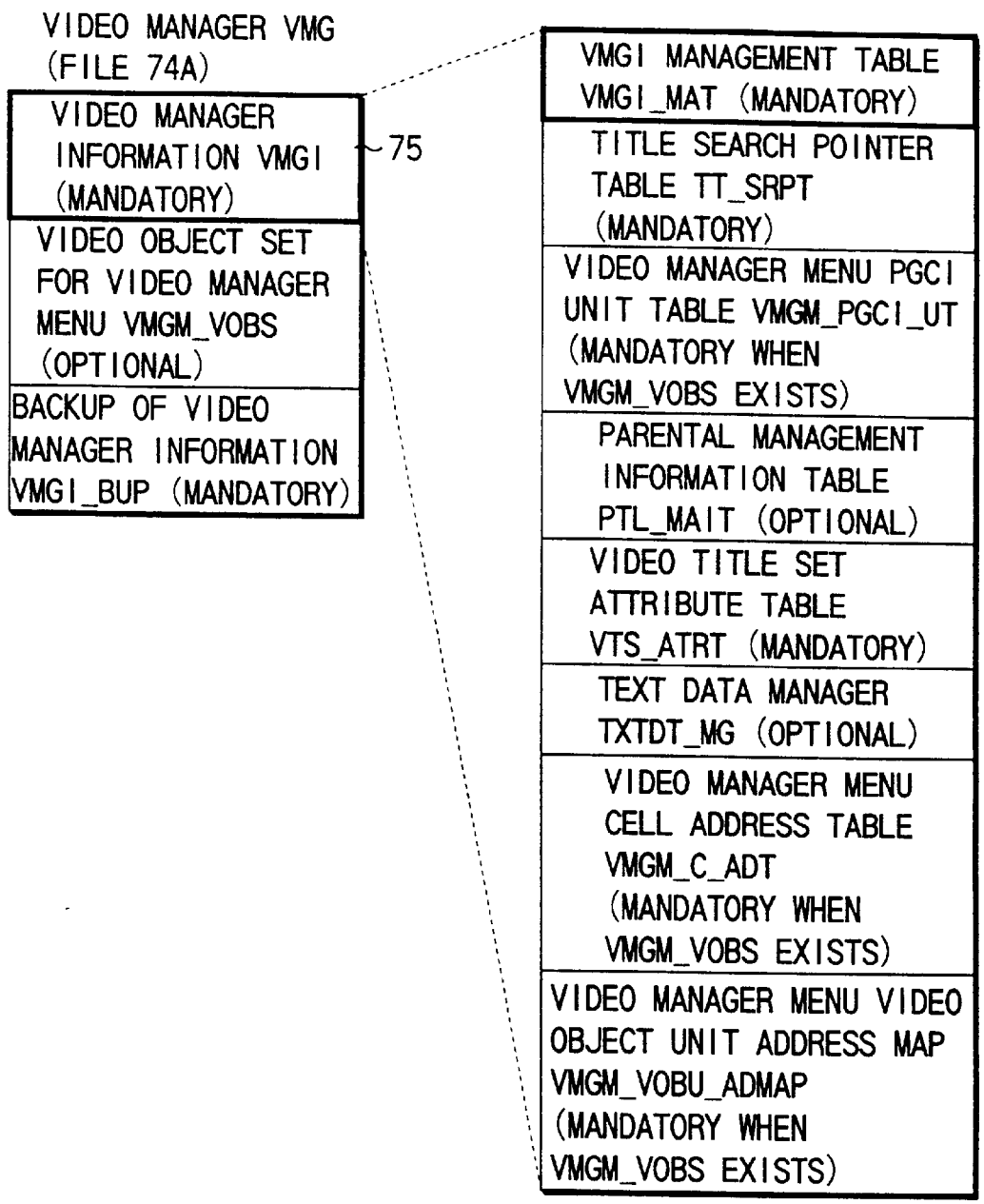
FIG. 16 is a view for explaining the contents of video manager information VMGI shown in FIG. 3.

FIG. 16 shows the contents of video manager VMG shown in FIG. 3. This VMG consists of a plurality of files 74A. Video manager VMG includes video manager information (VMGI) 75, object set (VMGM_VOBS) for video manager menus, and backup (VMGI_BUP) of video manager information in correspondence with each file.

Note that video manager information VMGI and backup VMGI_BUP of video manager information are mandatory items, and video object set VMGM_VOBS for displaying video manager information menu VMGM is optional.

As shown in FIG. 16, video manager information (VMGI) 75 set at the beginning of video manager VMG describes a video manager information management table (VMGI_MAT; mandatory), title search pointer table (TT_SRPT; mandatory), video manager menu program chain information unit table (VMGM_PGCI_UT; mandatory when VMGM_VOBS exists), parental management information table (PTL_MAIT; option), video title set attribute table (VTS_ATRT; mandatory), text data manager (TXTDT_MG; option), video manager menu cell address table (VMGM_C_ADT; mandatory when VMGM_VOBS exists), and video manager menu video object unit address map (VMGM_VOBU_ADMAP; mandatory when VMGM_VOBS exists) in this order.

Note that the addressees such as an end address (VMGI_MAT_EA) of video manager information management table VMGI_MAT, a start address (TT_SRPT_SA) of title search pointer TT_SRPT, and the like are described as the relative number of logical blocks from the head logical block that stores this table VMGI MAT.

Video manager information (VMGI) 75 contains information used upon playing back each video title set (VTS) 72 shown in FIG. 3, and such information is recorded on optical disc 10 to match the logical sector boundary.

Video manager information menu video object set VMGM_VOBS stores menu information (managed by video manager VMG) which pertains to video data, audio data, and sub-picture data recorded on optical disc 10.

With this video manager information menu video object set (VMGM_VOBS), the volume name of the optical disc to be played back, and audio and sub-picture comments upon displaying the volume name can be displayed. Also, selectable items can be displayed as sub-picture data.

For example, video manager information menu video object set (VMGM_VOBS) allows to display a comment indicating that the optical disc to be played back contains a video (in a single story or multi-story format) of the road to the world champion of given boxer X as sub-picture data. That is, the fighting pose of boxer X is played back as video data together with the volume name such as "glorious history of boxer X" or the like, his theme (if any) is output as audio data, and the chronological table of his career/records and the like are displayed as sub-picture data.

Also, as the selection items displayed as sub-picture data by VMGM video object set (VMGM_VOBS), (1) an inquiry as to whether a narration voice of the match is played back in English, Japanese, French, German, and the like, (2) an inquiry as to whether or not a superimposed dialog in a predetermined language is displayed as sub-picture data, and (3) an inquiry as to which one of a plurality of selectable language superimposed dialogs is selected, are output. The viewer (the user of the DVD video recorder; to be described later) can select English as the narration voice and Japanese as the sub-picture superimposed dialog from the displayed items by the VMGM video object set (VMGM_VOBS). In this way, the user is ready to watch the video of the match of boxer X.

The above-mentioned features such as comments of the recording contents using sub-picture data and/or audio data, arbitrary selection of a spoken language and superimposed dialog language, and the aforementioned playback angle changes are not available in a conventional video recorder (VHS VCR or the like), but the DVD video recorder of the present invention can have such features.

FIG. 17 shows the contents of video manager information management table VMGI_MAT shown in FIG. 16.

More specifically, video manager information management table VMGI_MAT describes a video manager identifier (VMG_ID); the end address (VMG_EA) of the video manager; the end address (VMGI_EA) of video manager information; a version number (VERN) of the format that optical disc (DVD disc) 10 of interest uses; a video manager category (VMG_CAT); a volume set identifier (VLMS_ID); free space (recordable amount) FREE_SPACE of optical disc 10 on which video title sets VTS shown in FIG. 3 are recorded; the number of video title sets (VTS_Ns); a provider unique identifier (PVR_ID); the end address (VMGI_MAT_EA) of the video manager management table; the start address (FP_PGCI_SA) of first play program chain information; the start address (VMGM_VOBS_SA) of the video manager menu video object set; the start address (TT_SRPT_SA) of the title search pointer table; the start address (VMGM_PGCI_UT_SA) of the video manager menu program chain information unit table; the start address (PTL_MAIT_SA) of the parental management information table; the start address (VTS_ATRT_SA) of the video title set attribute table; the start address (TXTDT_MG_SA) of the text data manager; the start address (VMGM_C_ADT_SA) of the video manager menu cell address table; the start address (VMGM_VOBU_ADMAP_SA) of the video manager menu video object unit address map; a video attribute (VMGM_V_ATR) indicated by the video manager menu; the number of audio streams (VMGM_AST_Ns) indicated by the video manager menu; an audio stream attribute (VMGM_AST_ATR) indicated by the video manager menu; the number of sub-picture streams (VMGM_SPST_Ns) indicated by the video manager menu; a sub-picture stream attribute (VMGM_SPST_ATR) indicated by the video manager menu; and first play program chain information (FP_PGCI).

Note that video manager category VMG_CAT of video manager information management table VMGI_MAT describes video copy flags and audio copy flags of the video manager and video title sets. Depending on the contents of these flags, whether or not video and audio data can be copied are independently determined.

Free space (recordable amount) FREE_SPACE shown in FIG. 17 equals free space data in the physical format information shown in FIG. 6. The free space of disc 10 may be stored in either a file descriptor (physical format information) or management information (VMGI_MAT). The disc free space after disc 10 is partially recorded can be written in FREE_SPACE in FIG. 17 and/or the free space field of the physical format information shown in FIG. 6 (in this case, that data is written in both FREE-SPACE and physical format information).

For example, in case of single-sided DVD-RAM disc having a storage amount of 2.6 GB, information indicating 2.6 GB is written at the byte position "17 to 20" in FIG. 6. If no data is recorded on this disc 10 at all, information indicating a value obtained by subtracting management data (including video manager VMG) and the like from 2.6 GB is written in FREE_SPACE in FIG. 17.

If recording for 1 GB has been done on this disc 10, information at the byte position "17 to 20" in FIG. 6 indicates 2.6 GB or equivalent, but information in FREE_SPACE in FIG. 17 is rewritten to that indicating 1.6 GB or equivalent. When such partially recorded disc 10 is set in the DVD video recorder (to be described later), the DVD video recorder initially reads the information at the byte position "17 to 20" in FIG. 6 to detect that set disc 10 is a 2.6-GB disc, and then reads the information in FREE_SPACE in FIG. 17 to detect that the free space of set disc 10 is 1.6 GB. If all the data on this disc 10 are erased, the contents of FREE_SPACE in FIG. 17 and information in the free space field of the physical format information in FIG. 6 are rewritten to indicate 2.6 GB or equivalent.

That is, upon expressing "free space", the free space in FIG. 6 and FREE_SPACE in FIG. 17 can have different contents.

Figure 18:
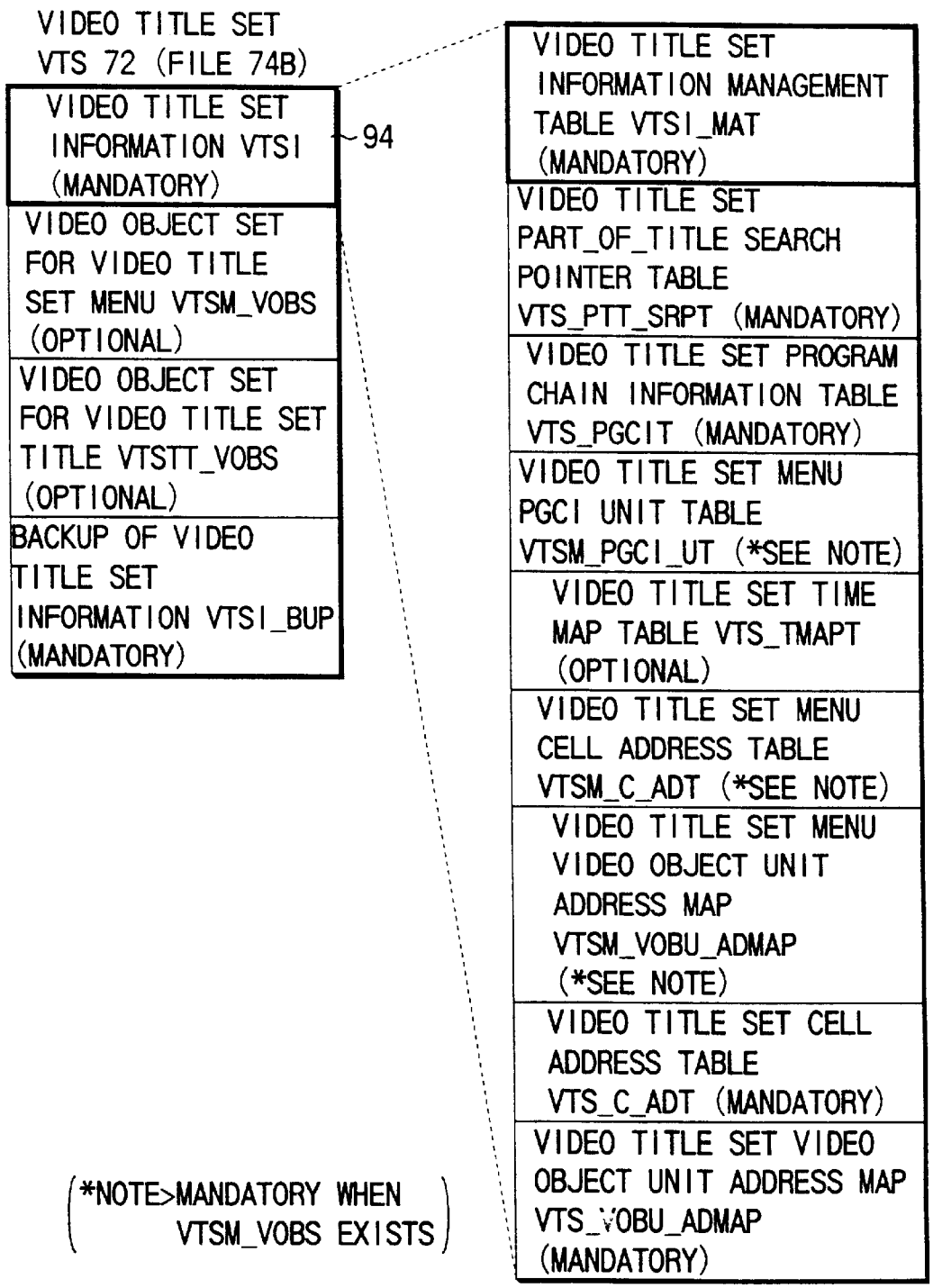
FIG. 18 is a view for explaining the contents of video title set information VTSI shown in FIG. 3.

FIG. 18 shows the contents of video title set VTS 72 in FIG. 3. Video title set VTS consists of a plurality of files 74B as in video manager VMG shown in FIG. 16. Each file 74B contains video title set information (VTSI) 94, object set (VTSM_VOBS) for video title set menus, video object sets (VTSTT_VOBS; nine files in maximum) for video title set titles, and backup information (VTSI_BUP) for video title set information.

As shown in FIG. 18, video title set information VTSI 94 set at the beginning of video title set VTS 72 describes a video title set information management table (VTSI_MAT; mandatory, a title search pointer table (VTS_PTT_SRPT; mandatory) for a video title set part_of_title (e.g., chapter of a program), a video title set program chain information table (VTS_PGCIT; mandatory), a video title set menu program chain information unit table (VTSM_PGCI_UT; mandatory when VTS_VOBS exists), a video title set time map table (VTS_TMAPT; option), a video title set menu cell address table (VTSM_C_ADT; mandatory when VTSM_VOBS exists), a video title set menu video object unit address map (VTSM_VOBU_ADMAP; mandatory when VTSM_VOBS exists), a video title set cell address table (VTS_C_ADT; mandatory), and a video title set video object unit address map (VTS_VOBU_ADMAP; mandatory) in this order.

FIG. 19 shows the contents of video title set information management table VTSI_MAT shown in FIG. 18.

As shown in FIG. 19, this video title set information management table VTSI_MAT describes a video title set identifier (VTS_ID), the end address (VTS_EA) of the video title set, a played back flag (PLAY_END Flag) indicating whether or not a program (e.g., VTS#1 in FIG. 3) recorded on optical disc 10 has been completely played back at least once, an archive flag (ARCHIVE Flag) which serves to prevent erase errors when a program (e.g., VTS#2 in FIG. 3) recorded on optical disc 10 is to be kept without being erased, the end address (VTSI_EA) of video title set information, a version number (VERN) of the format that this optical disc (DVD disc) 10 uses, a video title set category (VTS_CAT), the end address (VTSI_MAT_EA) of the video title set information management table, the start address (VTSM_VOBS_SA) of the video title set menu video object set, the start address (VTSTT_VOBS_SA) of the video title set title video object set, the start address of (VTS_PTT_SRPT_SA) of the video title set part_of_title search pointer table, the start address (VTS_PGCIT_SA) of the video title set program chain information table, the start address (VTSM_PGCI_UT_SA) of the video title set menu program chain information unit table, the start address (VTS_TMAST_SA) of the video title set time map table, the start address (VTSM_C_ADT_SA) of the video title set menu cell address table, the start address (VTSM_VOBU_ADMAP_SA) of the video title set menu video object unit address map, the start address (VTS_C_ADT_SA) of the video title set cell address table, the start address (VTS_VOBU_ADMAP_SA) of the video title set video object unit address map, information of attributes of video data, audio data, sub-picture data, and the like, the number of sub-picture streams (VTS_SPST_Ns) of the video title set, a sub-picture stream attribute table (VTS_SPST_ATRT) of the video title set, and a multichannel audio stream attribute table (VTS_MU_AST_ATRT) of the video title set.

Note that the respective information items of table VTSI_MAT are aligned to the logical block boundaries of data recorded on optical disc 10.

FIG. 20 shows the contents of video title set program chain information table VTS_PGCIT shown in FIG. 18.

As shown in FIG. 20, this video title set program chain information table VTS_PGCIT contains program title set program chain information table information (VTS_PGCITI), video title set program chain information search pointers (VTS_PGCI_SRP#1 to VTS_PGCI_SRP#n), and video title set program chain information (VTS_PGCI).

Note that the order of a plurality of pieces of video title set program chain information VTS_PGCI is set independently of that of the plurality of video title set program chain information search pointers VTS_PGCI_SRP#1 to VTS_PGCI_SRP#n. Hence, for example, single program chain information VTS_PGCI can be indicated by one or more program chain information search pointers VTS_PGCI_SRP.

Figure 21:
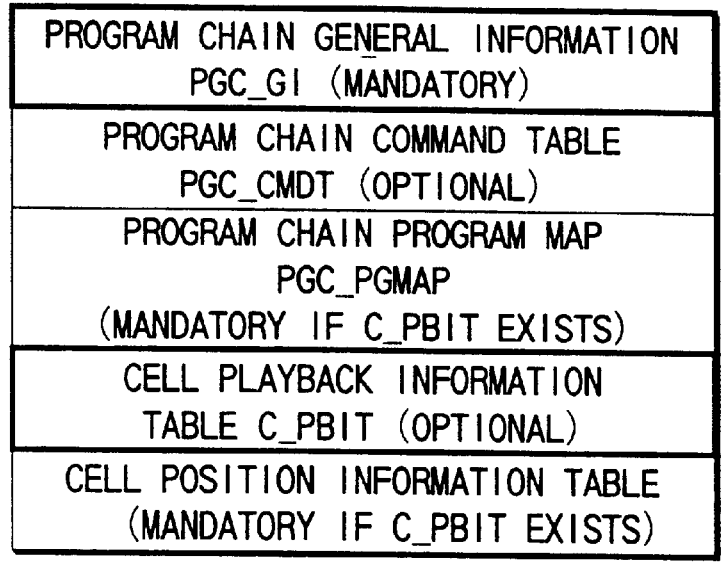
FIG. 21 is a view for explaining the contents of video title set program chain information VTS_PGCI shown in FIG. 20.

FIG. 21 shows the contents of video title set program chain information VTS_PGCI shown in FIG. 20. That is, program chain information (PGCI) is made up of program chain general information (PGC_GI; mandatory), a program chain command table (PGC_CMDT; option), a program chain program map (PGC_PGMAP; mandatory when C_PBIT to be described below exists), a cell playback information table (C_PBIT; option), and a cell position information table (C_POSIT; mandatory when C_PBIT above exists).

Figure 22:
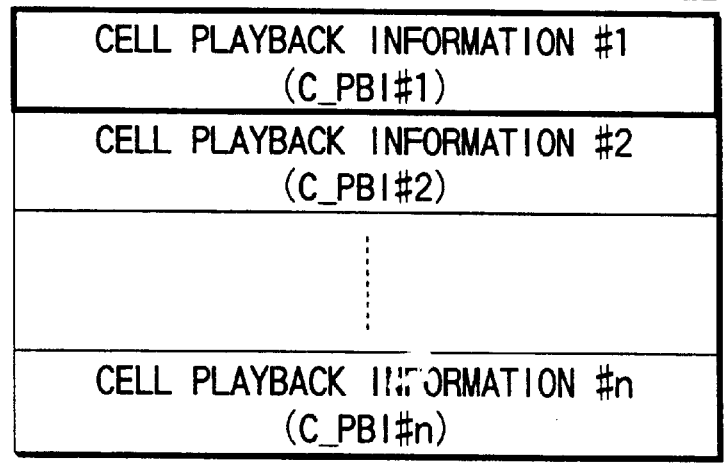
FIG. 22 is a view for explaining the contents of cell playback information table C_PBIT shown in FIG. 21.

FIG. 22 shows the contents of cell playback information table C_PBIT shown in FIG. 21. Cell playback information table C_PBIT has the structure shown in FIG. 22, and contains a maximum of 255 pieces of cell playback information (C_PBI#n; #n=#1 to #255).

FIG. 23 shows the contents of cell playback information C_PBI (C_PBI#1 to C_PBI#n). Each C_PBI includes a cell category (C_CAT; 4 bytes), cell playback time (C_PBTM; 4 bytes), the start address (C_FVOBU_SA; 4 bytes) of the first video object unit (VOBU) in the cell, the end address (C_FILVU_EA; 4 bytes) of the first interleaved unit (ILVU) in the cell, the start address (C_LVOBU_SA; 4 bytes) of the last video object unit (VOBU) in the cell, and the end address (C_LVOBU_EA; 4 bytes) of the last video object unit (VOBU) in the cell.

Especially, in this C_PBI, a 1-byte field for setting an erase prohibition flag is assured at a relative byte position (RBP). When "0" is described in this erase prohibition flag field, data can be freely erased; when "1" is described, data is to be permanently kept. This description can be freely made by the user.

Figure 24:
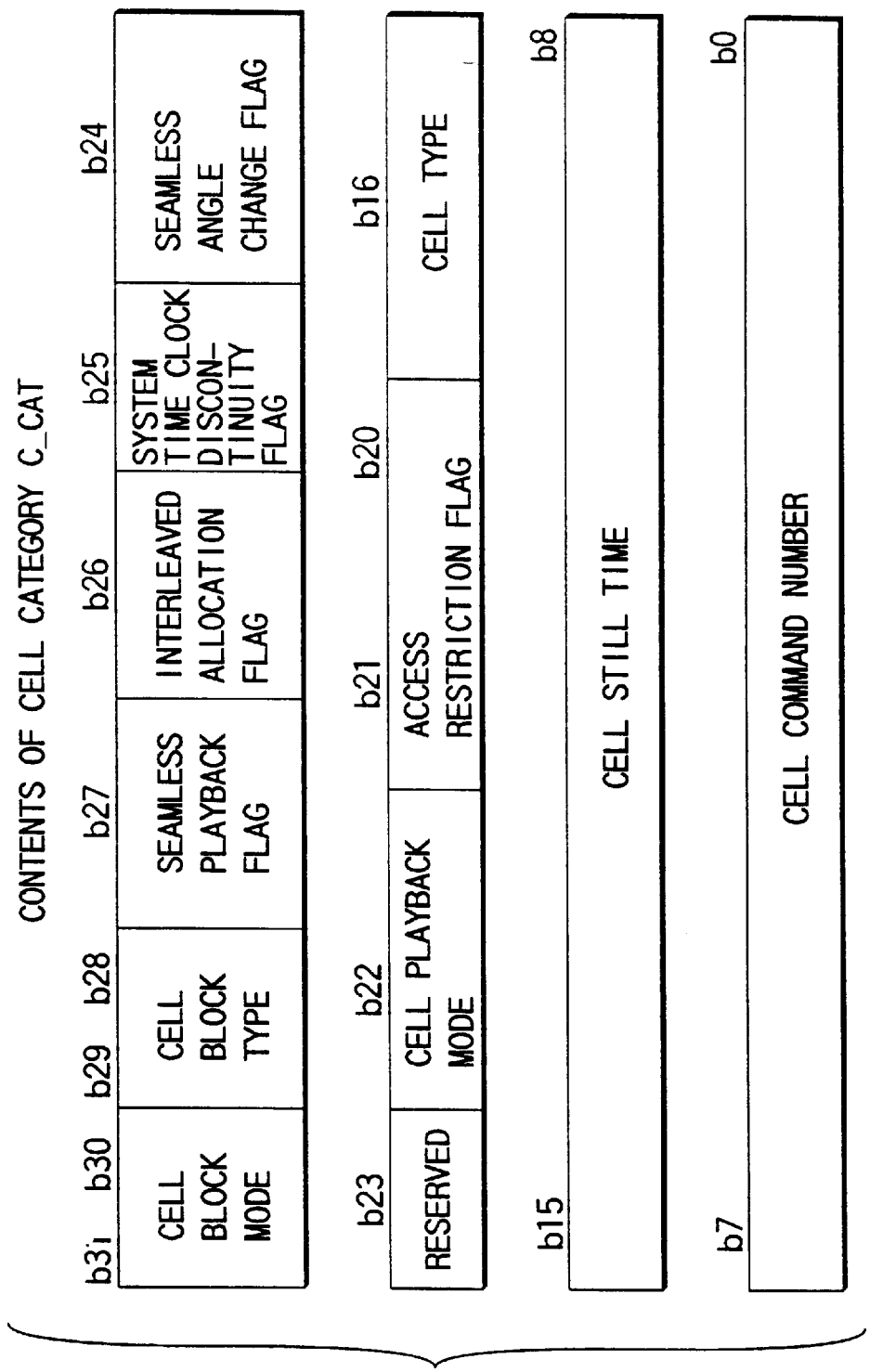
FIG. 24 is a view for explaining the contents of cell category C_CAT shown in FIG. 23.

FIG. 24 shows the contents of cell category C_CAT shown in FIG. 23. As shown in FIG. 24, the cell category (C_CAT) indicates the number of cell commands by the lower 8 bits (b0 to b7); the cell still time by the next 8 bits (b8 to b15); the cell type (e.g., karaoke) by the next 5 bits (b16 to b20); an access restriction flag by the next 1 bit (b21); the cell playback mode (e.g., movie or still) by the next 1 bit (b22); a seamless angle change flag by 1 bit (b24) after the next reserved bit; a system time clock (STC) discontinuity flag (to reset STC or not) by the next 1 bit (b25); an interleaved allocation flag (indicating if the cell designated by C_PBI is located in a continuous block or an interleaved block) by the next 1 bit (b26); a seamless playback flag (indicating if the cell designated by C_PBI is to be played back seamlessly) by the next 1 bit (b27); the cell block type (e.g., angle block) by the next two bits (b28 and b29); and the cell block mode (e.g., first cell in the block) by the last two bits (b30 and b31).

If the cell block mode bits are 00b (b means binary), this means that the cell is not the one in the block; if the bits are 01b, the cell is the first one in the block; if the bits are 10b, the cell is the one in the block; and if the bits are 11b, the cell is the last one in the block.

If the cell block type bits are 00b, this indicates that the cell block does not belong to the corresponding block; and if the bits are 01b, the corresponding block is an angle block (a block containing multiangle cells).

If the cell block type bits are not 01b during playback of a title containing multiangle cells, for example, an angle mark (not shown) is kept ON.

On the other hand, if this cell block type=01b is detected during playback, the DVD video recorder can inform the viewer that playback of the angle block is currently in progress by flickering the angle mark (not shown; or by changing the ON color or shape of the angle mark). With such information, the viewer can make sure that an image in another angle pertaining to the picture which is currently being played back is available.

If the interleaved allocation flag is 0b, it indicates that the corresponding cell belongs to a continuous block (that continuously records a plurality of VOBUs); if the interleaved allocation flag is 1b, the corresponding cell belongs to an interleaved block (that interleaved-records ILVUs each containing one or more VOBUs).

If the seamless angle change flag is set (=1b), it represents that the corresponding cell is to be seamlessly played back; if this flag is not set (=0b), the corresponding cell is to be non-seamlessly played back.

That is, if the interleaved allocation flag=1b and seamless angle change flag=0b, the angle can be changed non-seamlessly; if the interleaved allocation flag=1b and seamless angle change flag=1b, the angle can be changed seamlessly.

If a media drive system with a very short access time (a system that can access the beginning of a desired angle block within one video frame period; not limited to an optical disc drive system) is used, the angle can be changed smoothly even when the interleaved allocation flag=0b, i.e., between VOBU sets (different angle cells) which are not interleaved-recorded.

When optical disc 10 with relatively low access speed is used as a recording medium, one recording track of that disc is preferably assigned to recording of one interleaved block. In such format, since the trace destination of an optical head need only move in the radial direction of the disc by a very small distance corresponding to one track width, track jump suffering less time lag (suitable for seamless angle change) can be attained. In this case, if track jump for one video object unit (VOBU) is made, a time lag for a maximum of one revolution of the disc may be produced. Hence, the angle change that requires jumps in units of VOBUs is suitable for non-seamless angle change.

Note that the contents of the seamless angle change flag are normally determined in advance by the provider (the software producer who produces the program contents of titles recorded on DVD disc 10). That is, by determining the contents of the seamless angle change flag in advance, the provider can uniquely determine whether the non-seamless angle change or seamless angle change is to be used.

However, it is technically possible to design the DVD video recorder which allows the viewer (the user of the DVD video recorder to be described later) to arbitrarily change the contents of the seamless angle change flag in read data after cell data of the corresponding title set are read from the optical disc.

Since the seamless angle change flag represents whether the angle information described in navigation pack 86 indicates seamless or non-seamless angle information, if the user has changed this flag, he or she should modify angle information (not shown) in navigation pack 86 (e.g., modification from seamless angle information to non-seamless angle information). In this case, the arrangement of packs constituting the angle should also be modified, accordingly.

When the cell playback mode is 0b, it indicates continuous playback in the cell; if the mode is 1b, still playback in each VOBU present in the cell.

When the user makes recording, playback, and the like, the access restriction flag can be used upon prohibiting direct selection by user operation. For example, when the access restriction flag of a cell that records answers for a collection of questions, the user is prohibited from reading the answers by stealth.

The cell type can indicate the following ones by its 5-bit contents, for example, when the corresponding cell is formed for karaoke.

If the 5 bits are 00000b, no cell type is designated; if the 5 bits are 00001b, a title image of the karaoke is designated; if the 5 bits are 00010b, an introduction part of the karaoke is designated; if the 5 bits are 00011b, a song part other than a climax (bridge) part is designated; if the 5 bits are 00100b, a song part of the first climax part is designated; if the 5 bits are 00101b, a song part of the second climax part is designated; if the 5 bits are 00110b, a song part for a male vocal is designated; if the 5 bits are 00111b, a song part for a female vocal is designated; if the 5 bits are 01000b, a song part for mixed voices is designated; if the 5 bits are 01001b, an interlude part (instrumental part) is designated; if the 5 bits are 01010b, fading-in of the interlude part is designated; if the 5 bits are 01011b, fading-out of the interlude part is designated; if the 5 bits are 01100b, the first ending part is designated; and if the 5 bits are 01101b, the second ending part is designated. The contents of the remaining 5-bit code can be used for other purposes.

Note that the angle change can be applied to that for background video data of the karaoke. (For example, a full-figure shot, closeup shots of the face and mouth, and the like of a singer who is singing a guide vocal can be angle-changed seamlessly along with the flow of a karaoke music or non-seamlessly by going back some bars, or during repeat playback between desired bars, as the viewer desired.)

On the other hand, if the 8-bit contents of the cell still time in FIG. 24 are 00000000b, zero still time is designated; if the contents are 11111111b, limitless still time is designated; if the contents fall within the range from 00000001b to 11111110b, a still display time having a duration defined by the decimal value (1 to 254) designated by the contents and expressed in seconds is designated.

The number of cell commands indicates the number of commands to be executed upon completion of playback of the corresponding cell.

FIG. 25 shows the contents of program chain general information PGC_GI shown in FIG. 21.

As shown in FIG. 25, program chain general information PGC_GI describes program chain contents (PGC_CNT), a program chain playback time (PGC_PB_TM), program chain user operation control information (PGC_UOP_CTL), a program chain audio stream control table (PGC_AST_CTLT), a program chain sub-picture stream control table (PGC_SPST_CTLT), program chain navigation control information (PGC_NV_CTL), a program chain sub-picture palette (PGC_SP_PLT), the start address (PGC_CMDT_SA) of a program chain command table, the start address (PGC_PGMAP_SA) of a program chain program map, the start address (C_PBIT_SA) of a playback information table of cells in the program chain, and the start address (C_POSIT_SA) of a position information table of cells in the program chain.

Program chain contents. PGC_CNT indicate the number of programs and number of cells (a maximum of 255) in the program chain. In a program chain having no video object VOB, the number of programs is "0".

The program chain playback time (PGC_PB_TM) represents the total playback time of programs in that program chain in hours, minutes, seconds, and the number of video frames. This PGC_PB_TM also describes a flag (tc_flag) indicating the type of video frame, and a frame rate (25 or 30 frames per sec) or the like is designated by the contents of this flag.

Program chain user operation control information PGC_UOP_CTL indicates user operations prohibited in the program chain which is being played back.

Program chain audio stream control table PGC_AST_CTLT can contain control information for each of eight audio streams. Each control information includes a flag (availability flag) indicating if the corresponding audio stream is available in that program chain, and conversion information from an audio stream number to an audio stream number to be decoded.

Program chain sub-picture stream control table PGC_SPST_CTLT includes a flag (availability flag) indicating if that sub-picture stream is available in the corresponding program chain, and conversion information from a sub-picture stream number (32 numbers) into the sub-picture stream number to be decoded.

Program chain navigation control information PGC_NV_CTL includes Next_PGCN indicating the next program chain number to be played back after the program chain which is currently being played back, Previous_PGCN indicating a program chain number (PGCN) quoted by a navigation command "LinkPrevPGC" or "PrevPGC_Search( )", GoUp_PGCN indicating a program number to which that program chain is to return, a PG Playback mode indicating the playback mode (sequential playback, random playback, shuffle playback, and the like) of the program, and a Still time value indicating the still time after that program chain is played back.

Program chain sub-picture palette PGC_SP_PLT describes 16 sets of luminance signals and two color difference signals used in a sub-picture stream in that program chain.

Start address PGC_CMDT_SA of the program chain command table assures a description area for a precommand executed before PGC playback, a post-command executed after PGC playback, and a cell command executed after cell playback.

Start address PGC_PGMAP_SA of the program chain program map describes the start address of program map PGC_PGMAP representing the program configuration in the program chain by a relative address from the first byte of program chain information PGCI.

Start address C_PBIT_SA of the cell playback information table in the program chain describes the start address of cell playback information table C_PBIT that determines the playback order of cells in that program chain by a relative address from the first byte of program chain information PGCI.

Start address C_POSIT_SA of the position information table of cells in the program chain describes the start address of cell position information table C_POSIT indicating VOB identification numbers and cell identification numbers used in that program chain by a relative address from the first byte of program chain information PGCI.

Figure 26:
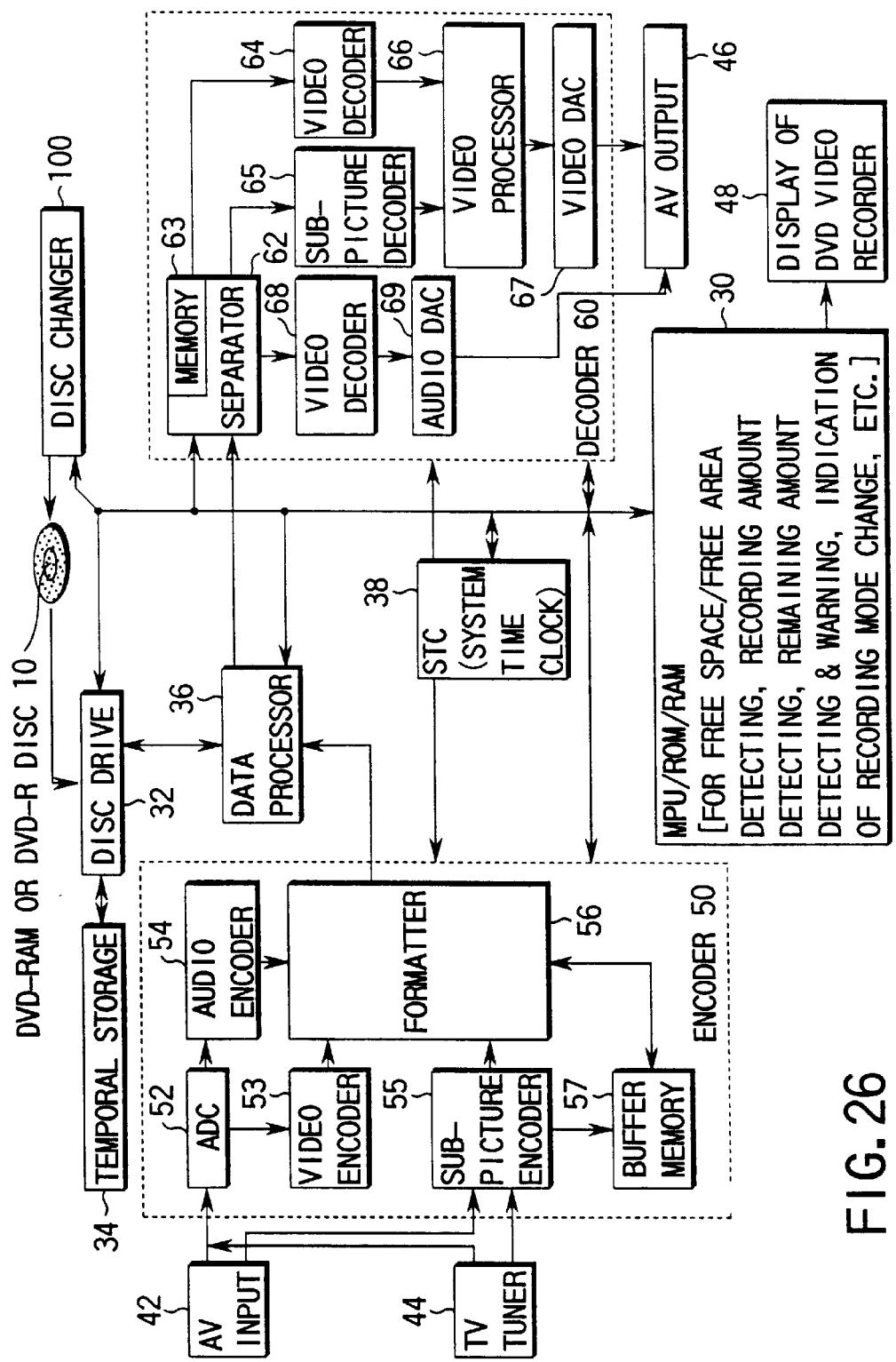
FIG. 26 is a block diagram for explaining the arrangement of an apparatus (DVD video recorder) for recording/playing back digital moving picture information at a variable recording rate using the information with the structures described with reference to FIGS. 3 to 25 on the disc shown in FIG. 1.

FIG. 26 shows an example of the arrangement of an apparatus (DVD video recorder) for recording and playing back digital moving picture information on and from a disc shown in FIG. 1 at a variable recording rate using information with the structure described above with reference to FIGS. 3 to 25.

The apparatus main body of the DVD video recorder shown in FIG. 26 is roughly constructed by a disc drive unit (32, 34, and the like) for rotating DVD-RAM or DVD-R disc 10, and reading/writing information to/from disc 10, encoder 50 on the recording side, decoder 60 on the playback side, and microcomputer block 30 for controlling operations of the apparatus main body.

Encoder 50 comprises ADC (analog-to-digital converter) 52, video encoder (V encoder) 53, audio encoder (A encoder) 54, sub-picture encoder (SP encoder) 55, formatter 56, and buffer memory 57.

ADC 52 receives an external analog video signal+external analog audio signal from AV input 42, or an analog TV signal+analog audio signal from TV tuner 44. ADC 52 converts the input analog video signal into a digital signal at sampling frequencies of, e.g., 13.5/6.75 MHz and 8 quantization bits. (That is, luminance component Y, color difference component Cr (or Y–R), and color difference component Cb (or Y–B) are respectively quantized, with the ratio of 4:2:2, by 8 bits).

Incidentally, all components Y, Cr and Cb may be sampled with 13.5 MHz, so that they are quantized, in the ratio of 4:4:4, by 8 bits.

Similarly, ADC 52 converts the input analog audio signal into a digital signal at a sampling frequency of, e.g., 48 kHz and 16 quantization bits.

When an analog video signal and digital audio signal are input to ADC 52, the digital audio signal passes through ADC 52. (The digital audio signal may be subjected to processing for reducing jitter alone, processing for changing the sampling rate or the number of quantization bits, and the like without changing its contents.)

On the other hand, when a digital video signal and digital audio signal are input to ADC 52, these signals pass through ADC 52 (these signals may also be subjected to jitter reduction, sampling rate change processing, and the like without changing their contents).

A digital video signal component output from ADC 52 is supplied to formatter 56 via video encoder (V encoder) 53. Also, a digital audio signal component output from ADC 52 is supplied to formatter 56 via audio encoder (A encoder) 54.

V encoder 53 has a function of converting the input digital video signal into a digital signal compressed at a variable bit rate by MPEG2 or MPEG1.

A encoder 54 has a function of converting the input digital audio signal into a digital signal compressed at a fixed bit rate (or linear PCM digital signal) by MPEG or AC-3.

When a DVD video signal with the data structure shown in FIGS. 9 and 10 is input from AV input 42 (e.g., a signal coming from a DVD video player with dedicated sub-picture signal output terminal), or when a DVD video signal with such data structure is broadcasted and received by TV tuner 44, a sub-picture signal component (sub-picture pack) in the DVD video signal is input to sub-picture encoder (SP encoder) 55. Sub-picture data input to SP encoder 55 is arranged into a predetermined signal format, and is then supplied to formatter 56.

Formatter 56 performs predetermined signal processing for the input video signal, audio signal, sub-picture signal, and the like while using buffer memory 57 as a work area, and outputs recording data that matches the format (file structure) described above with reference to FIGS. 3 to 25 to data processor 36.

The contents of standard encoding for generating the recording data will be briefly explained. That is, when encoder 50 shown in FIG. 26 starts encoding, parameters (see step ST20 in FIG. 34 or step ST508 in FIG. 53; to be described later) required for encoding video (main picture) data and audio data are set. The main picture data is pre-encoded using the set parameters to calculate an optimal code amount distribution for a predetermined average transfer rate (recording rate). Based on the code amount distribution obtained by pre-encoding, the main picture data is encoded. At this time, the audio data is encoded at the same time.

As a result of pre-encoding, when data compression is insufficient (when a desired video program cannot be stored in a DVD-RAM or DVD-R disc used to record data), if pre-encoding can be done again (for example, if the recording source is the one capable of repetitive playback such as a video tape, video disc, or the like), the main picture data is partially re-encoded, and the re-encoded main picture data portion replaces the previously pre-encoded main picture data portion. With a series of such processes, the main picture data and audio data are encoded, and the average bit rate value required for recording is reduced largely.

Likewise, parameters required for encoding the sub-picture data are set, and encoded sub-picture data is generated.

The encoded main picture data, audio data, and sub-picture data are combined and converted into the structure of video title set VTS.

That is, cells as minimum units of the main picture data (video data) are set, and cell playback information (C_PBI) shown in FIG. 23 is generated. Then, the structure of cells that construct a program chain shown in FIG. 3, attributes of main picture, sub-picture, and audio data, and the like are set (some of these attributes use information obtained upon encoding the individual data), and information management table information (VMGI_MAT in FIG. 17 and VTSI_MAT in FIG. 19) containing various kinds of information is created.

The encoded main picture data, audio data, and sub-picture data are segmented into packs each having a predetermined size (2,048 bytes) shown in FIG. 10, and dummy packs are appropriately inserted into these packs. Packs other than the dummy packs describe time stamps such as a PTS (presentation time stamp), DTS (decode time stamp), and the like. As for the PTS of sub-picture data, a time arbitrarily delayed from that of main picture data or audio data in the same playback time zone can be described.

The data cells are arranged while adding navigation pack 86 at the beginning of each VOBU 85 so as to play back data in the order of their time codes, thus forming VOB 83 constructed by a plurality of cells, as shown in FIG. 9. VOBS 82 containing one or more VOBs 83 is formatted to the structure of VTS 72 shown in FIG. 3.

When a DVD playback signal is digitally copied from a DVD video player, since the contents of cells, program chain, management tables, time stamps, and the like are predetermined, they need not be generated again. (When a DVD video recorder is designed to digitally copy a DVD playback signal, copyright protection means such as an electronic watermark, and the like must be taken.)

The disc drive unit that writes/reads (records/plays back) information to/from DVD disc 10 comprises disc changer 100, disc drive 32, temporal storage 34, data processor 36, and system time counter (or system time clock; STC) 38.

Temporal storage 34 is used for buffering a predetermined amount of those of data to be written in disc 10 via disc drive 32 (i.e., data output from encoder 50), and for buffering a predetermined amount of those of data played back from disc 10 via disc drive 32 (i.e., data input to decoder 60).

For example, when temporal storage 34 is comprised of a 4-Mbyte semiconductor memory (DRAM), it can buffer recording or playback data for approximately 8 sec at an average recording rate of 4 Mbps. On the other hand, when temporal storage 34 is comprised of a 16-Mbyte EEPROM (flash memory), it can buffer recording or playback data for approximately 30 sec at an average recording rate of 4 Mbps. Furthermore, when temporal storage 34 is comprised of 100-Mbyte very compact HDD (hard disc), it can buffer recording or playback data for 3 min or more at an average recording rate of 4 Mbps.

Temporal storage 34 can also be used for temporarily storing recording information until disc 10 is exchanged by a new one, when disc 10 has been fully recorded during recording.

Temporal storage 34 can be used for temporarily storing data excessively read out from the drive within a predetermined period of time when disc drive 32 uses a high-speed drive (double-speed or higher). When read data upon playback is buffered on temporal storage 34, even when an optical pickup (not shown) has produced read errors due to a vibration shock or the like, playback data buffered on temporal storage 34 can be used alternatively, thus preventing a played back picture from being interrupted.

When the DVD video recorder has an external card slot (not shown in FIG. 26), the EEPROM may be sold as an optional IC card. On the other hand, when the DVD video recorder has an external drive slot or SCSI interface, the HDD can be sold as an optional expansion drive.

In an embodiment (a DVD video recorder is implemented by software using a personal computer) shown in FIG. 33 (to be described later), the free space of a hard disc drive or a main memory of the personal computer can be partially used as temporal storage 34 in FIG. 26.

Data processor 36 in FIG. 26 supplies DVD recording data output from encoder 50 to disc drive 32, receives a DVD playback signal played back from disc 10 via drive 32, rewrites management information (the directory record in FIG. 8, VMGI_MAT in FIG. 17, VTSI_MAT in FIG. 19, and the like) recorded on disc 10, and erases data (files or VTS) recorded on disc 10 under the control of microcomputer block 30.

Microcomputer block 30 includes an MPU (or CPU), a ROM written with control programs and the like, and a RAM that provides a work area required for executing programs.

The MPU in microcomputer block 30 (to be also referred to as MPU 30 hereinafter) executes free space detection (ST12 in FIG. 34 and the like), recording amount (the number of recorded packs) detection (see FIGS. 29 to 32), remaining amount detection (ST420A in FIG. 36; ST424E in FIG. 42, and the like), warning (see FIG. 58), recording mode change instruction (ST421E in FIG. 42, ST424F, ST426F in FIG. 43, ST218 to ST226 in FIG. 50, and the like; see FIG. 59), and other processes (FIGS. 34 to 57) using the RAM as a work area in accordance with the control programs stored in the ROM.

Of the execution results of MPU 30, the contents (FIGS. 58 to 62, and the like) that the DVD video recorder user is informed of are displayed on display 48 of the DVD video recorder, or are displayed on a monitor display (FIG. 58) in an on-screen display (OSD) mode.

The control timings of disc changer 100, disc drive 32, data processor 36, and encoder 50 and/or decoder 60 by MPU 30 can be determined based on time data output from STC 38 (recording and playback are normally done in synchronism with time clocks from STC 38, but other processes may be executed at timings independently of STC 38).

Decoder 60 comprises separator 62 for separating and extracting packs from DVD playback data with the pack structure shown in FIG. 9, memory 63 used upon signal processes such as pack separation and the like, video decoder (V decoder) 64 for decoding main picture data (the contents of video pack 88 in FIG. 9) separated by separator 62, sub-picture decoder (SP decoder) 65 for decoding sub-picture data (the contents of sub-picture pack 90 shown in FIG. 9) separated by separator 62, audio decoder (A decoder) 68 for decoding audio data (the contents of audio pack 91 in FIG. 9) separated by separator 62, video processor 66 for appropriately synthesizing sub-picture data output from SP decoder 65 with video data output from v decoder 64, and outputting main picture data with superimposed sub-picture data such as menus, highlight buttons, superimpose dialog, and the like, video digital-to-analog converter (V•DAC) 67 for converting a digital video output from video processor 66 into an analog video signal, and audio digital-to-analog converter (A•DAC) 69 for converting a digital audio output from A decoder 68 into an analog audio signal.

The analog video signal output from V•DAC 67 and analog audio signal from A•DAC 69 are supplied to external components (not shown; a multichannel stereophonic apparatus having two to six channels+monitor TV or projector) via AV output 46.

Figure 58:
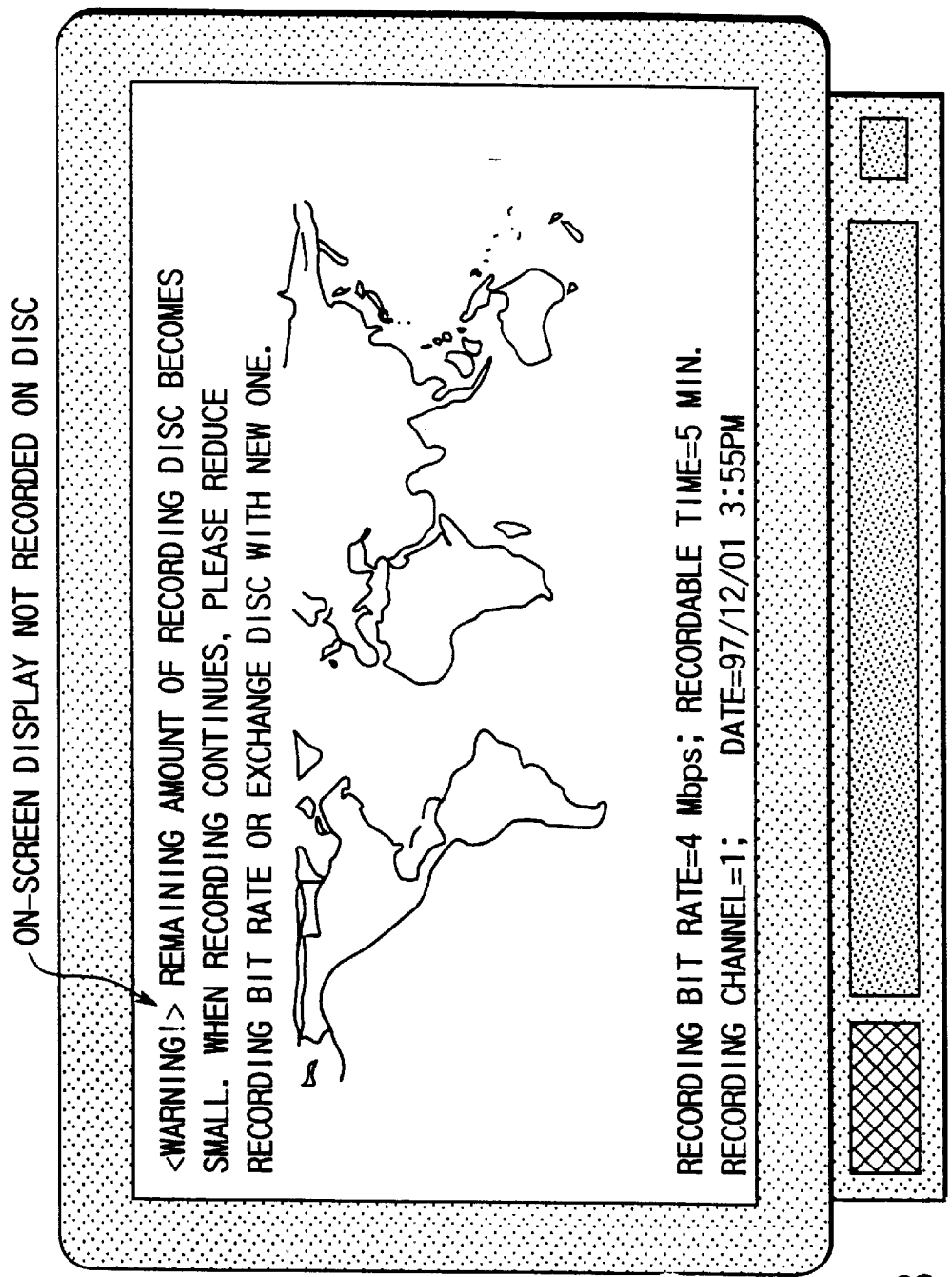
FIG. 58 shows a display example of a warning display, the average recording rate, the recordable time at that rate, and the like when the remaining amount of a disc in which data is being recorded becomes small.

OSD data output from MPU 30 is input to separator 62 of decoder 60, and is then input to video processor 66 through V decoder 64 (without being decoded). The OSD data is superimposed on main picture data, and these data are supplied to an external monitor TV connected to AV output 46. Then, a warning message shown in, e.g., FIG. 58 is displayed together with a main picture.

Figure 27:
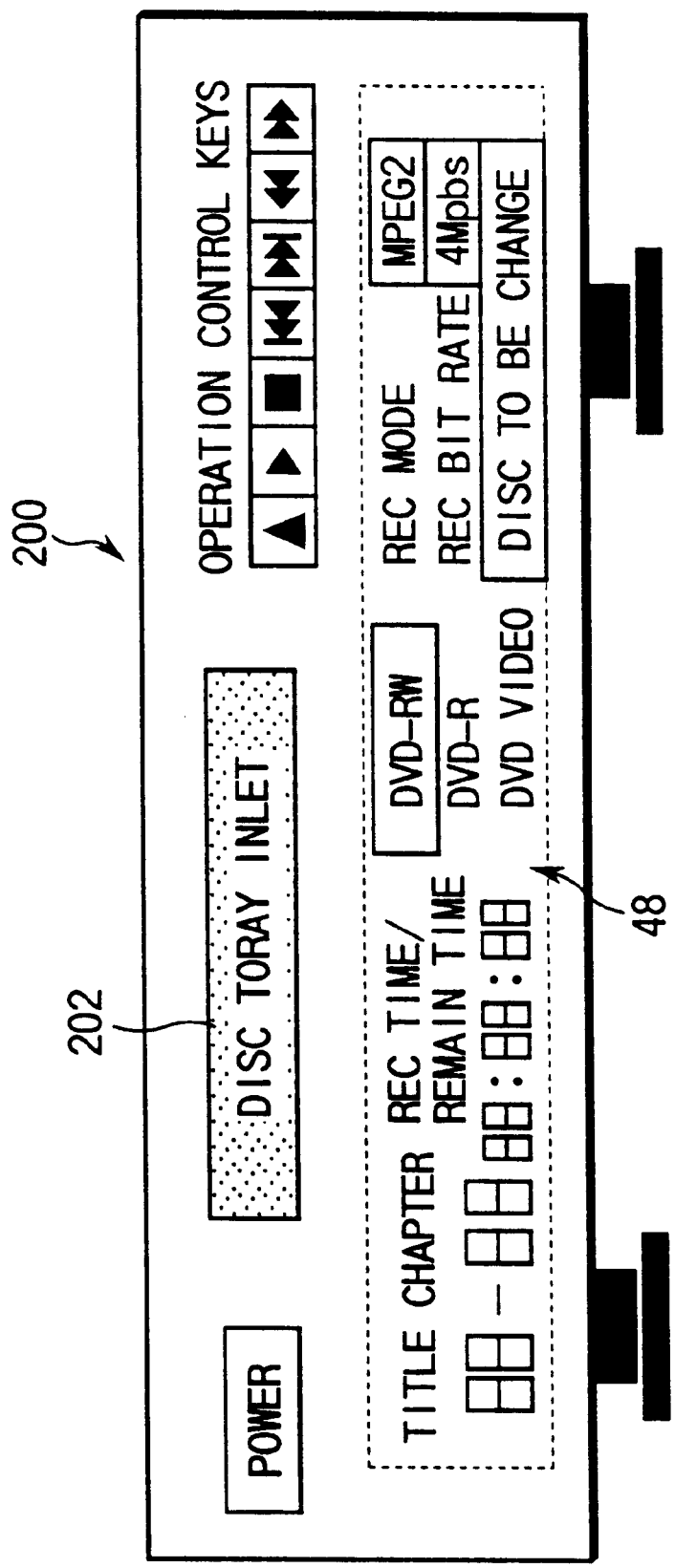
FIG. 27 shows an example of a front panel of the apparatus main body of the DVD video recorder shown in FIG. 26.

FIG. 27 shows the outer appearance of apparatus main body 200 of the DVD video recorder shown in FIG. 26, and an example of its front panel.

When the user has pressed open/close button 5g of remote controller 5 (to be described later with reference to FIG. 28), disc tray door 202 shown in FIG. 27 is opened toward the user side.

DVD-RAM or DVD-RW disc (a cartridge containing a disc) 10 or DVD-R disc (bear disc) 10 used in recording is set on this disc tray.

Subsequently, when the user has pressed open/close button 5g on remote controller 5, disc tray door 202 is closed, and disc (e.g., DVD-RW) set on the tray is loaded into disc drive 32 in apparatus main body 200.

Then, disc drive 32 is automatically started, and MPU 30 reads physical format information (including disc structure data, free space data of a blank disc, and the like) shown in FIG. 6. After that, MPU 30 reads a video manager information management table (including information FREE_SPACE indicating a practical free space, and the like) shown in FIG. 17, and a video title set information management table (including PLAY_END Flag indicating whether or not a specific title set has already been played back, ARCHIVE Flag indicating whether or not a specific title set is to be permanently kept, and the like) shown in FIG. 19.

When set disc 10 is a new DVD-RW disc (or DVD-RAM disc), an item "DVD-RW" (or "DVD-RAM") on display (liquid crystal or fluorescent display panel) 48 of the DVD video recorder shown in FIG. 27 is being prominented in an easy-to-see manner. Also, a recording time "00 (hour): 00 (min): 00 (sec)" is displayed, and a recording title/chapter "00-00" is displayed (once recording has been done, the recording title/chapter display changes like "01-01").

If the apparatus default or user setup indicates a recording mode=MPEG2 and a recording average bit rate=4 Mbps, items "MPEG2" and "4 Mbps" are displayed on display 48 to stand out.

Furthermore, when recording on set disc 10 has progressed, and the recordable time on that disc 10 becomes small (e.g., 5 min), the MPU in the block 30 detects it (e.g., YES in ST422A in FIG. 36), and an item "DISC TO BE CHANGED" that prompts the user to exchange the disc is displayed on display 48 in an easy-to-see manner.

The front panel of DVD video recorder main body 200 also has basic operation keys such as a power switch button, open/close key, playback key, stop key, chapter/program skip key, rewind key, fastforward key, recording start button (not shown), and the like.

Note that FIG. 27 assumes a case wherein the DVD video recorder does not incorporate any disc changer 100 in FIG. 26 (i.e., disc changer 100 is connected to apparatus main body 200 in FIG. 27 as an optional external device via a SCSI cable or the like). In such case, the above-mentioned item "DISC TO BE CHANGED" begins to be lit up or flicker slightly before disc 10 set in the apparatus main body is used up during recording. After that when the remaining amount of disc 10 becomes zero, recording automatically proceeds to one or more DVD-RW disc 10 set in external disc changer 100.

Alternatively, two or more DVD video recorders may be prepared, and their MPUs in the blocks 30 may be connected by daisy chain via a communication cable to attain relay recording using two or more DVD video recorders. In such case, it is possible that "the first recorder can record using MPEG2/average bit rate=4 Mbps for 1 hour, and the second recorder can record using MPEG2/average bit rate=2 Mbps for 2 hours".

In case of relay recording using a plurality of DVD video recorders, a message "the first recorder records using MPEG2/average bit rate=4 Mbps for 1 hour, and the second recorder records using MPEG2/average bit rate=2 Mbps for 2 hours" may be displayed on the monitor screen.

Note that the DVD video recorder shown in FIG. 26 does not record any warning or messages to the user shown in FIGS. 59 to 62 on disc 10. However, recording information (recording average bit rate, recording channel number, recording date/time, and the like) exemplified on the lower portion of the monitor screen shown in FIG. 53 may be recorded on disc 10 for several seconds immediately after the beginning of recording.

Figure 28:
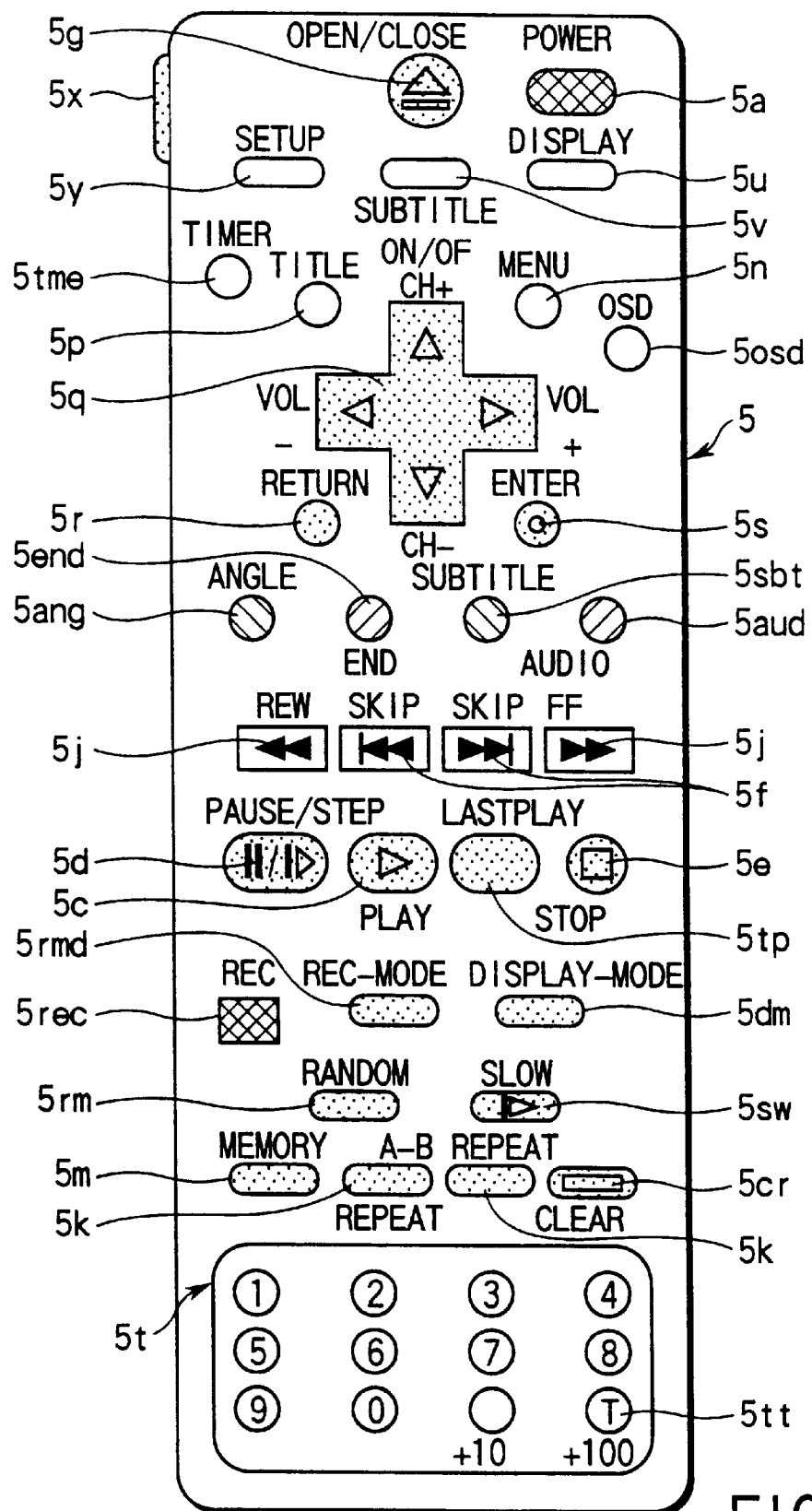
FIG. 28 shows an example of a remote controller for operating the DVD video recorder shown in FIG. 26.

FIG. 28 shows an example of remote controller 5 used for operating the DVD video recorder shown in FIG. 26. Fundamental operations may be made by operation keys provided to the front panel of DVD video recorder main body 200 shown in FIG. 27, but various kinds of operations that utilize the features of DVD are done by remote controller 5.

The functions (or the ways of use) of the respective keys on remote controller 5 shown in FIG. 28 will be explained below.

[Function of Power Key (POWER) 5a]

<1> The power key turns on/off the secondary side of an AC power supply circuit of the apparatus main body.

<2> When the power key is pressed while a disc is set inside the apparatus, the type of disc (DVD-RW, DVD-R, or DVD video) is determined and displayed. If that disc cannot be played back, a message indicating this is displayed.

<3> When the power key is pressed when a disc set inside the apparatus contains a first-play program chain (auto-start code), playback of that program chain automatically starts.

<4> When the power key is pressed while power is ON and the tray is open, the tray is closed, and the power supply is then turned off.

[Function of Open/close Key (OPEN/CLOSE) 5g]

<5> The open/close key opens/closes the disc tray. When the open/close key is pressed during disc playback, the apparatus operation made so far ends, and the disc tray is opened. During recording, the operation of key 5g is invalidated.

<6> When the open/close key is pressed while power is OFF and the tray is closed, the power supply is turned on, and the disc tray is opened.

<7> When the open/close key is pressed while the disc tray is open, the disc tray is retracted into the apparatus main body. At this time, if a disc is set on the tray, its management information is read, and the type of set disc (DVD-RW, DVD-R, or DVD video) is displayed. If that disc cannot be played back, a message indicating this is displayed.

<8> When the open/close key is pressed while the disc tray is open, the disc tray is retracted into the apparatus main body. At this time, if no disc is set on the tray, for example, a message "NO DISC" is displayed on display 48 or monitor TV (OSD).

<9> When the disc retracted into the apparatus main body upon ON of the open/close key contains a first-play program chain (auto-start code), playback of that program chain automatically starts.

[Function of Stop Key (STOP) 5e]

<10> When the stop key is pressed during disc playback or recording, playback or recording is stopped. When the stop key has been pressed in the halt state, the title number played back or recorded so far (or a default title number) is displayed.

[Function of Playback Key (PLAY) 5c]

<11> When the playback key is pressed while a disc is set on the disc tray, playback of that disc is started under the conditions (default setups, or the screen aspect ratio, spoken language, superimposed dialogue language, and the like set by the user) set at that time.

<12> When the playback key is pressed after a disc is set on the open tray, the tray is retracted into the apparatus main body, and playback starts from a default title (or a title designated by the title producer) recorded on the DVD disc. If the disc contains a first-play program chain (auto-start code), that chain is executed.

<13> Playback ends at the end of a title unless otherwise specified in information recorded on a disc.

<14> When the playback key is pressed while the chapter and title numbers are set on a memory setup screen which is being displayed, memory playback starts from the position of the set chapter and title numbers.

<15> When the playback key is pressed while a random mode is selected, the contents of a disc set on the tray are randomly played back.

<16> When the cell playback mode of the disc is switched to a still mode during playback, playback made so far is canceled, and a still image is played back.

[Function of Pause key (PAUSE) 5d]

<17> When the pause key is pressed during playback of a program chain in a certain title, a video frame in the program chain which is currently being played back is displayed as a still image. When the pause key has been pressed once again in this state, the displayed image is switched to a still image of the next frame. Likewise, every time the pause key has been pressed, the frame is switched in the direction of time progress, and the frame advances in correspondence with the number of times this key is depressed.

<18> During still image playback or frame-by-frame playback, sub-picture data may be played back, but audio data may be prohibited from being played back.

<19> The still image playback or frame-by-frame playback is allowed in only the program chain that is currently being played back, and after the frame reaches to the last one in the title, this key operation is invalidated.

<20> When a still image is displayed in the cell playback mode, this key operation is invalidated for the last still cell.

<21> When the playback key is pressed in the still image state set by that key operation, normal playback restarts.

[Function 1 of Skip Key (SKIP/Rightward Double-Triangular Mark with Vertical Bar) 5f; In Case of One Sequential Program Chain Title]

<22> When this skip key is pressed during playback, the next chapter (or program) in the title which is currently being played back is found by a search and played back. If no next chapter is available, this key operation is invalidated. During the chapter search, the search destination chapter number on display 48 (or OSD) is flickered to inform the user that a search is in progress.

<23> When this skip key is pressed in the halt state, the chapter next to the current chapter is selected. When the playback key is turned on in this state, the selected chapter is played back upon search.

In the halt state, chapters (or programs) present across two titles can be skipped. For example, when this skip key has been pressed while the last chapter number of title 1 is displayed, the first chapter number of title 2 is selected. When the playback key is turned on in this state, the selected chapter (chapter 1 of title 2) is played back upon search.

<24> When the skip key is kept pressed for a predetermined period of time or more in the halt state, the chapter number increases in unitary increments at a given speed (if the next title is available, the chapter number can be continuously changed from the current title to the next title). When the playback key is pressed after the skip key that has been held down is released, the chapter of the title selected at that time is played back upon search.

[Function 2 of Skip Key (SKIP/Rightward Double-Triangular Mark with Vertical Bar) 5f; In Case of Random Program Chain Title]

<25> When the skip key is pressed during playback, a chapter (or program) randomly selected next to the chapter in the title which is currently being played back is played back upon search. However, when the number of times of random playback loops has reached its maximum value, and no next program chain is available in the title, this operation is invalidated.

<26> When the skip key is pressed during playback of a still image, the selected chapter (or program) is located by a search, and a still image is played back at the beginning of that chapter. However, when a still image is displayed in the cell playback mode, the selected chapter is found by a search, and a still image at the beginning of that chapter is played back.

<27> The skip key can be used for selecting the chapter number (program number) and title number set on the memory setup window (to increment values, move the cursor forward, and so forth).

<28> The skip key can be used for changing the menu page forward.

[Function 1 of Skip Key (SKIP/Leftward Double-Triangular Mark with Vertical Bar) 5f; In Case of One Sequential Program Chain Title]

<29> When this skip key is pressed during playback, the beginning of the current playback chapter (or program) in the title which is currently being played back is played back upon search. When this key is kept pressed, the chapter number decreases in unitary decrements to chapter number 1.

<30> When this skip key is pressed in the halt state, the chapter immediately preceding the current chapter is selected. When the playback key is turned on in this state, the selected chapter is played back upon search.

In the halt state, chapters (or programs) present across two titles can be skipped. For example, when this skip key has been pressed while chapter number 1 of title 3 is displayed, the last chapter number X of title 2 is selected. When the playback key is turned on in this state, the selected chapter (chapter X of title 2) is played back upon search.

Chapter decrement skip across different titles can be executed until chapter 1 of title 1.

<31> When the skip key is held down for a predetermined period of time or more in the halt state, the chapter number decreases in unitary decrements at a given speed (until chapter 1 of title 1). When the playback key is pressed after the skip key that has been held down is released, the chapter of the title selected at that time is played back upon search.

[Function 2 of Skip Key (SKIP/Leftward Double-Triangular Mark with Vertical Bar) 5f; In Case of Random Program Chain Title]

<32> When the skip key is pressed during playback, the beginning of the chapter (or program) in the title which is currently being played back is played back upon search. In this case, the search destination can always be set at the beginning of the chapter (program) which is being currently played back even if the key is kept pressed.

<33> When the skip key is pressed during playback of a still image, the beginning of the current playback chapter (or program) is located by a search, and a still image is played back at the beginning of that chapter. However, when a still image is displayed in the cell playback mode, the chapter which is being played back is found by a search, and a still image at the beginning of that chapter is played back.

<34> The skip key can be used for selecting the chapter number (program number) and title number set on the memory setup window (to decrement values, move the cursor backward, and so forth).

<35> The skip key can be used for changing the menu page backward.

[Function of Menu key (MENU) 5n]

<36> When a disc is set on the tray, the root menu in the currently selected video title set recorded on the disc is played back and displayed. When no disc is set, an error (or warning) display is made (OSD).

<37> When no root menu is included in the currently selected video title set, an error (or warning) display is made (OSD).

<38> After a menu is played back by pressing this menu key during normal playback, when the control exits the menu display by pressing the menu key, playback restarts from the position played back before menu playback or a position designated by the menu.

<39> When the menu key is pressed while displaying the root menu, the display state returns to that before the root menu was displayed.

[Function of Title Key (TITLE) 5p]

<40> When a disc is set on the tray, and it records a title menu, the title menu is displayed. When no disc is set, an error (or warning) display is made (OSD).

<41> When no title menu is recorded on the disc set on the tray, the following operations can be made while the disc is being played back (or in the halt state).

More specifically, when the title key is pressed, the title number and chapter number are displayed on a portion (e.g., the upper left corner) of the screen. When a clear key (to be described later) is pressed, when the title key is pressed once again, or when a predetermined period of time (e.g., 3 sec) elapses without any key operations after that, the title number and chapter number are cleared from the screen.

When the title number (e.g., "1") and chapter number (e.g., "1") are displayed on the screen, and a desired title number (e.g., "2") is input from the ten-key pad in this state, the screen display changes to "title number: 2" and "chapter number: 1" in case of the above example. When the playback key is pressed in this state, or when the apparatus is left unoperated for a predetermined period of time (e.g., 2 sec), playback starts from chapter 1 of title 2.

In this case, during the search for the title and chapter, the destination title number and chapter number on display 48 are flickered to inform the user that a search is in progress.

<42> After the title menu is played back by pressing the title key during normal playback, when the title key is pressed again before title selection is confirmed, playback restarts from the position that has been played back before menu title playback.

[Function of Select Key/Cursor Key (Upward•Downward Triangular Mark Pair) 5q]

<43> The select key/cursor key is used for item selection in a disc menu (a menu called by the title key or menu key) and item selection in the setup menu. For example, when a certain item is selected by pressing the upward or downward triangular mark on the select key/cursor key, if that item includes some choices, the leftward or rightward triangular mark of this select key/cursor key can be used to select one of these choices.

<44> When the select key/cursor key is pressed during display of the setup value of one of an audio stream, sub-picture stream, and angle, if the upward triangular mark of this select key is pressed, the next stream or angle is selected; if the downward triangular mark is pressed, the immediately preceding stream or angle is selected.

<45> When the select key/cursor key is pressed during display of the title number by a character generator, if the upward triangular mark of this select key is pressed, the next title is selected; if the downward triangular mark is selected, the immediately preceding title is selected.

[Function of End Key (END) 5end]

<46> This key is used when the user informs the apparatus that he or she wants to end selection/setup processing (to exit the processing loop such as setups of angles that can be played back, and the like). (Alternatively, mouse operation or touch panel operation may be implemented although not shown.)

[Function of Confirmation Key (ENTER) 5s]

<47> This key is used to confirm an item selected in the disc menu or setup menu.

<48> This key can also be used to confirm the title number and chapter number on the memory screen.

[Function of Return Key (RETURN) 5r]

<49> The return key is used for making a search for the address on the disc, which is set in advance by the title producer (software provider). More specifically, this key is pressed to issue an exit instruction from the menu or a return instruction to the playback start (restart) point. Also, this key can be used to issue a return instruction to a selection branch point of multistories that can be selected by the user.

[Function 1 of Audio Key (AUDIO) 5aud; In Case of Playback]

<50> When the audio key is pressed during playback, the language name (when the type of audio stream is not a music or the like but is a language) of the audio stream which is currently being played back is displayed (OSD) on the playback screen for a predetermined period of time (e.g., 3 sec) using a character generator (after the audio stream information recorded on the disc is checked). When the audio key is pressed once again during this display, audio data of the next audio stream number is played back. When this audio key operation is repeated, audio data (various languages) of audio streams recorded in that title are cyclically played back.

<51> When select key/cursor key 5q is pressed while the audio stream setup value is displayed on the screen, an audio stream next to or immediately preceding the currently set audio stream can be selected. Then, the contents of the selected audio stream are played back.

<52> When a certain key on the ten-key pad is pressed while the audio stream setup value is displayed on the screen, an audio stream corresponding to the number input by the ten-key pad can be selected. Then, the contents of the selected audio stream are played back.

<53> When the clear key is pressed while the audio stream setup value is displayed on the screen, the audio stream setup value display can be cleared from the screen.

[Function 2 of Audio Key (AUDIO) 5aud; In Case of Halt State (During Display of Blue-back Screen)]

<54> When the audio key is pressed during the halt state, the language name (when the type of audio stream is a language) of an audio stream set in the currently selected title is displayed on the blue-back screen for a predetermined period of time (e.g., 3 sec) using the character generator (after the audio stream information recorded on the disc is checked). When the audio key is pressed once again during this display, the next audio stream number is set. By repeating this audio key operation, the numbers of audio streams recorded in that title are cyclically set and displayed.

<55> When select key/cursor key 5q is pressed while the audio stream setup value is displayed on the blue-back screen, an audio stream next to or immediately preceding the currently set audio stream is selected.

<56> When a certain key on the ten-key pad is pressed while the audio stream setup value is displayed on the blue-back screen, the audio stream with the number input by the ten-key pad is selected.

<57> When the clear key is pressed while the audio stream setup value is displayed on the blue-back screen, the audio stream setup value display is cleared from the screen.

[Function 1 of Subtitle Key (SUBTITLE) 5sbt; During Playback]

<58> When the subtitle key is pressed during playback, the language name of a sub-picture stream which is currently being played back (when the type of sub-picture stream is a language) is displayed (OSD) on the playback screen for a predetermined period of time (e.g., 3 sec) using the character generator (after the sub-picture stream information recorded on the disc is checked). When the subtitle key is pressed once again during this display, sub-picture data of the next stream number is played back. By repeating this subtitle key operation, sub-picture streams recorded in that title are cyclically played back.

<59> When select key/cursor key 5q is pressed while the sub-picture stream setup value is displayed on the screen, a sub-picture stream next to or immediately preceding the currently set sub-picture stream can be selected. Then, the contents of the selected sub-picture. stream are played back.

<60> When a certain key on the ten-key pad is pressed while the sub-picture stream setup value is displayed on the screen, a sub-picture stream with the number input by the ten-key pad can be selected. Then, the contents of the selected sub-picture stream are played back.

<61> When the clear key is pressed while the sub-picture stream setup value is displayed on the screen, the sub-picture stream setup value display can be cleared from the screen.

[Function 2 of Subtitle Key (SUBTITLE) 5sbt; In Halt State (During Display of Blue-back Screen)]

<62> When the subtitle key is pressed in the halt state, the language name of the sub-picture stream set in the currently selected title (when the type of sub-picture stream is a language) is displayed on the blue-back screen for a predetermined period of time (e.g., 3 sec) using the character generator (after the sub-picture stream information recorded on the disc is cracked). When the subtitle key is pressed once again during this display, the next sub-picture stream number is set. By repeating this subtitle key operation, the numbers of sub-picture streams recorded in that title are cyclically set and displayed.

<63> When select key/cursor key 5q is pressed while the sub-picture stream setup value is displayed on the blue-back screen, a sub-picture stream next to or immediately preceding the currently set sub-picture stream is selected.

<64> When a certain key on the ten-key pad is pressed while the sub-picture stream setup value is displayed on the blue-back screen, a sub-picture stream with the number input by the ten-key pad is selected.

<65> When the clear key is pressed while the sub-picture stream setup value is displayed on the blue-back screen, the sub-picture stream setup value display can be cleared from the screen.

[Function of Subtitle ON/OFF Key (SUBTITLE ON/OFF) 5v]

<66> This key is used for turning on/off sub-picture (subtitle) display.

<67> When the subtitle ON/OFF key is pressed while video playback is in progress and sub-picture display is made (sub-picture display ON setup state), the sub-picture stream number setup value is turned off, and after the setup value is displayed for a predetermined period of time (e.g., 3 sec) by the character generator, sub-picture data is cleared from the screen.

<68> When the subtitle ON/OFF key is pressed while video playback is in progress but no sub-picture display is made (sub-picture display OFF setup state), the sub-picture stream number setup value is turned on, and after the setup value is displayed for a predetermined period of time (e.g., 3 sec) by the character generator, sub-picture data of the language corresponding to the ON stream number is played back (when sub-picture data is recorded on the disc which is being played back).

<69> When the subtitle ON/OFF key is pressed while video playback halts, the sub-picture display alone can be turned on/off.

<70> In the sub-picture display OFF setup state, if a sub-picture stream having the same language code as that of the playback audio stream includes a forced image output command, sub-picture data corresponding to this command must be played back and output onto the screen.

[Function of Angle Key (ANGLE) 5ang]

<71> When the title having the angle block formed by multiangle information is selected, and the angle key is pressed while this angle block (angle period) is being played back, the currently played-back angle number is displayed (OSD) for a predetermined period of time (e.g., 5 sec) by the character generator. When the angle key is pressed once again during this angle number display period, the same time point of a cell with the next angle number is obtained by a search, and playback starts from there.

For example, assume that a home-run scene of a certain hitter is being played back in angle number 1 (a camera angle that watches the back of a pitcher from the center field side) of the multiangle block, the bat of the hitter meets the pitch 5 sec after the playback start time of that angle block cell, and that ball is gone into the right outfield stand 3 more sec after that. When the user who wants to watch this home-run scene in another camera angle presses the angle key and then select angle number 2, the playback start time point of that angle block cell is located by a search, and the playback of the home-run scene in angle 2 (e.g., a camera angle that covers the overall field from the first-base infield stand side) restarts.

When the angle key is further pressed during the angle number display period, the recorded angle numbers are cyclically selected, and playback of the selected angle restarts.

<72> When the angle number is displayed on the screen by the character generator, a desired angle number can be directly selected by operating the ten-key pad (if an angle number which does not exist in the angle block, playback of which is in progress, is input using the ten-key pad, that key input is invalidated). Alternatively, the angle number can be increased/decreased in unitary increments/decrements using select key/cursor key 5q.

<73> When angle switching is done during playback of a still image in a cell of the multiangle block, a similar playback time search is made and a still image in the obtained different angle is played back.

For example, assume that a still image of a given automobile is played back in angle number 1 (a camera angle that covers the front side of the automobile). When the user who wants to watch this automobile in another camera angle presses the angle key and selects angle number 2, the playback start time point of the angle block cell of angle number 2 is located by a search, and a still image in angle 2 (e.g., a camera angle that covers the automobile from, e.g., the right side surface) is played back.

When the angle key is further pressed during the angle number display period, the recorded angle numbers are cyclically switched, and a still image in the selected angle is played back.

<74> Angle setups (angle number switching) may be denied even when angle key operation is made while a cell other than those in the multiangle block is being played back. Angle setups (angle number switching) are accepted only when the title which is being played back includes multiangle block cells.

<75> When the selected title includes multiangle block cells, angle setups (angle number switching) may be accepted even in the halt state.

[Function of Fastforward (FWD) Key/Rewind (REW) Key (Leftward and Rightward Double-triangular marks) 5j]

<76> When the fastforward or rewind key is pressed while a movie or still image is being played back, fastforward or rewind playback is made at a speed higher than the normal playback speed (e.g., about twice the normal playback speed). (In case of a movie, its motion speed doubles; in case of a still picture, its frame-by-frame switching period halves.) When the fastforward or rewind key is kept pressed, fastforward or rewind playback is made at a speed still higher than the normal playback speed (e.g., about eight times the normal playback speed). (In case of a movie, its motion speed becomes an eight-fold speed; in case of a still picture, its frame-by-frame switching period is shortened to 1/8.)

Upon playing back and displaying main picture video data in case of fastforwarding/rewinding, I-picture+P-picture data in the MPEG format are played back at the double speed; I-picture data are played back at a speed higher than the double speed.

In such case, audio data may be played back as follows. More specifically, in case of double-speed playback, audio data are decoded by clocks of a rate twice those in normal playback to obtain double-speed audio data. Also, in case of playback higher than the double speed, audio data at the jump destination (from a certain I-picture to the next I-picture) is partially played back at a normal playback speed to decode audio data.

<77> When the playback key is pressed, the fastforward or rewind playback is canceled to restore normal-speed playback.

<78> The fastforward or rewind playback using the fastforward or rewind key is done in only a program chain which is being played back at the time of that key operation. After the program chain is fastforwarded to its end or is rewound to its beginning, the apparatus pauses temporarily.

<79> During the fastforward or rewind playback using the fastforward or rewind key, playback of audio (audio stream) and subtitle (sub-picture stream) can be automatically prohibited.

Note that audio data may be played back while changing its playback pitch in correspondence with the fastforward speed. For example, when a movie is a documentary film of a marathon race, and subtitle data is used for displaying the time elapsed from the start of the race, the subtitle data may be played back upon fastforward or rewind playback.

<80> When the cell playback mode is switched to a still mode during the fastforward or rewind playback using the fastforward or rewind key, the fastforward or rewind operation is canceled, and a still image is played back. When the fastforward key (or rewind key) is pressed while the cell playback mode is set in a still mode, continuous frame-by-frame fastforwarding (or rewinding) at a switching rate of approximately one frame per second can be started. At this time, when the fastforward key (or rewind key) is kept pressed, continuous frame-by-frame fastforwarding (or rewinding) at a rate of about 4 frames per second can be started. When the fastforward key is pressed once again, continuous frame-by-frame fastforwarding (or rewinding) at a rate of about one frame per second resumes. When the cell playback mode ends during this continuous frame-by-frame fastforwarding (or rewinding), fastforward (or rewind) playback at approximately double speed can be started.

If "the cell playback mode is switched to a still mode" in units of video object units shown in FIG. 9 (VOBU still), when the fastforward (or rewind) key is pressed, the next (or previous) VOBU is played back, and a still image is displayed upon completion of playback of that VOBU. In such case, if the fastforward (or rewind) key is pressed again during VOBU playback, that VOBU is fastforwarded (or rewound), and the VOBU still mode is then set to display a still image.

[Function of Display Key (DISPLAY) 5$u$]

<81> When this key is pressed in the halt or playback state, a display corresponding to various key operation contents at that time is made (on display 48 of the apparatus main body and/or on the screen of monitor 6).

[Function of Ten-key Pad ([0] to [9] & [+10]) 5$t$]

<82> During normal playback, the ten-key pad can be used for designating the chapter number in the title which is currently being played back. Simultaneously with confirmation of the ten-key input (the confirmation key operation), a search for the chapter with the designated number starts (this search may be attained by title number key T (to be described later)). A non-existing chapter number is not accepted.

<83> The ten-key pad can be used for designating the chapter number in the selected title in the halt state. Simultaneously with confirmation of the ten-key input, a search for the chapter with the designated number starts (this search may be attained by title number key T). A non-existing chapter number is not accepted.

<84> While a title containing a multiangle block is being played back (an angle cell is being played back) and an angle number is being displayed, the angle number input by the ten-key pad is directly selected. However, a non-existing chapter number is not accepted.

<85> During display of a disc menu, when the items on the disc menu screen are given with numbers, an item corresponding to the number input by the ten-key pad is selected and executed. However, a non-existing item number input is not accepted.

<86> When parental lock is set from the setup menu, the ten-key pad can be used for inputting a password.

[Function of Clear Key (CLEAR) 5cr]

<87> This key is used for canceling the key input of the title or chapter number.

<88> The clear key is used for canceling the password input for changing the parental level.

<89> The clear key is used for canceling a repeat mode (to be described later).

<90> The clear key is used for canceling the input number upon operation on the memory setup screen (to be described later).

<91> The clear key is used for canceling a memory playback mode (to be described later).

<92> The clear key is used for canceling a random playback mode (to be described later).

<93> The clear key is used for canceling the number display of a title, audio (audio stream), subtitle (sub-picture stream), and angle.

[Function of Repeat Key (REPEAT) 5$k$]

<94> The repeat key is used for setting a repeat mode of a chapter or title (only for the title of a one-sequential program chain).

<95> Every time this key is pressed, the repeat mode is cyclically switched like "chapter repeat"→"title repeat"→"repeat OFF"→"chapter repeat".

<96> When the repeat key is pressed during A–B repeat operation (to be described later), the A–B repeat operation is canceled to start the chapter repeat mode.

<97> When the playback position falls outside the repeat period upon operation of the fastforward key, rewind key, or skip key, the repeat operation is canceled.

<98> When the repeat period includes a multiangle block, angle change is permitted (the angle key is accepted even in the repeat mode).

[Function of A–B Repeat Key (A–B REPEAT) 5$k$]

<99> This key is used for setting the start and end points for the repeat operation between two points (only for the title of a one-sequential program chain).

<100> When this key is pressed once, the start point (A) is set, and when this key is pressed once more, the end point (B) is set. Simultaneously with completion of setting of the end point, a search for the set start point is made to repetitively play back the portion between A and B.

<101> The A–B repeat mode can be cleared by operating the clear key.

<102> When the playback position is changed to that in a title or chapter other than the period between the points A and B during the A–B repeat operation, or when the repeat key is pressed, the A–B repeat mode can be canceled.

<103> When the playback position falls outside the A–B repeat period upon operation of the fastforward key, rewind key, or skip key, the A–B repeat operation is canceled.

<104> By pressing the clear key, fastforward key, rewind key, or skip key before the repeat end point (B) is set, the A–B repeat operation can be canceled.

<105> When the title ends before the end point (B) is reached during the A–B repeat playback, the A–B repeat operation is canceled.

<106> The setup of the start point (A) for the A–B repeat mode can be invalidated during the multiangle block period. (The beginning of the multiangle block period can be set at the start point of the A–B repeat mode. For example, the camera angle scene of angle number 1 in a certain multiangle block may be set as an A–B repeat period in that angle block.)

<107> When a multiangle block is reached during A–B repeat playback, the A–B repeat operation can be canceled.

<108> The start point (A) and end point (B) set by the A–B repeat key indicate the beginning (start address) of the corresponding image data (GOP) immediately after setups.

[Function of Memory Key (MEMORY) 5m]

<109> When this key is pressed while the tray is closed and a disc is set, the memory setup screen is displayed (OSD). When this key is pressed while the memory setup screen is displayed, the state before the memory setup screen is displayed is restored.

<110> In the memory setup method, the title and chapter numbers to be played back in the memory mode are sequentially input using the ten-key pad and title number (T) key (to be described later) during display of the memory setup screen.

<111> When the memory setup input is made at a memory number at the cursor position by moving the cursor on the display screen using the select key/cursor key, the title and chapter numbers set at the memory numbers after that memory number shift one by one to the subsequent memory numbers.

For example, assume that "title 1•chapter 3" and "title 2•chapter 1" have already been set at memory numbers 1 and 2, and memory number 3 and the subsequent numbers have no entries. If "title 2•chapter 5" is set by setting the cursor at memory number 1, the contents set so far at memory numbers 1 and 2 shift to memory numbers 2 and 3, respectively. As a consequence, the setup contents of memory numbers 1, 2, and 3 respectively become "title 2•chapter 5", "title 1•chapter 3", and "title 2•chapter 1".

<112> When the clear key is operated at a memory number at the cursor position by moving the cursor on the display screen using the select key/cursor key, the contents set at that memory number are cleared, and the contents set at the subsequent memory numbers shift to the previous memory numbers.

For example, assume that "title 2•chapter 5", "title 1•chapter 3", and "title 2•chapter 1" are respectively set at memory numbers 1, 2, and 3, and memory number 4 and the subsequent numbers have no entries. If the clear key is operated by setting the cursor at memory number 2, the contents "title 1•chapter 3" set so far at memory number 2 are cleared, the contents set so far at memory number 3 shift to memory number 2, and the contents (no entry) set at memory number 4 shift to memory number 3. Consequently, the setup contents at memory numbers 1, 2, and 3 respectively become "title 2•chapter 5", "title 2•chapter 1", and "no entry".

Note that the number of memory setups (the upper limit memory number) need not always be determined. However, the maximum number of memory setups is selected to be, e.g., about 30, owing to the necessity in practical software, and the physical memory amount of the apparatus. (Even when 99 titles are recorded on a single disc, the normal user does not always require a maximum of 99 memory setups. On the other hand, in apparatuses for business use, memory setup requests may often be issued for a plurality of chapters in each of 99 titles, and in such case, the maximum number of memory setups may be set to be 99 or more.)

<113> When the playback key is pressed while the memory setup screen is displayed, memory playback starts in the memory setup registration order.

For example, assume that "title 2•chapter 5", "title 1•chapter 3", and "title 2•chapter 1" are respectively set at memory numbers 1, 2, and 3, and memory number 4 and the subsequent numbers have no entries. In such state, if the playback key is pressed while the memory setup screen is displayed, memory playback is executed as follows. More specifically, "title 2•chapter 5" is played back first, "title 1•chapter 3" is played back next, and "title 2•chapter 1" is played back lastly. Upon completion of playback of "title 2•chapter 1", playback stops.

<114> When the clear key is pressed during memory playback, the memory playback mode is canceled and normal playback can be started.

<115> The contents set on the memory setup screen can be cleared by the following methods.

(a) While the memory setup screen is displayed, all the set title and chapter numbers are cleared by the clear key.

(b) The tray is opened to eject the disc outside the apparatus. (However, an apparatus for business use may have an internal nonvolatile memory, which saves the memory setup contents together with a code that specifies a disc after the disc is ejected.)

[Function of Random Key (RANDOM) 5rm]

<116> When the selected title is a one-sequential program chain, chapters in that title are randomly played back.

<117> When this key is pressed during playback, random playback starts from a chapter next to the chapter which is currently being played back. (When the random key is pressed during playback of chapter 2 of a title that includes chapters 1 to 9, random playback starts when the playback position enters chapter 3, and chapters are randomly played back like chapters 5, 3, 7, 1, 9, . . .

<118> When the random key is pressed in the halt state, random playback starts upon next depression of the playback key to start disc playback.

<119> Upon completion of random playback of all the chapters in the selected title, the playback stops. During this random playback, normally, identical chapter numbers are prohibited from being repetitively played back, and the playback order alone is randomly determined. However, random playback including repetitive playback may be permitted, and random playback may repeat itself in an infinite loop unless the power supply is turned off or the stop key is pressed.

<120> When the clear key is pressed during random playback, the memory playback mode is canceled and normal playback can be started.

<121> When the random key is pressed during random playback, the random playback mode is canceled.

[Function of Slow Key (SLOW) 5sw]

<122> When the slow key is pressed during playback, forward slow playback starts at a 1/2 speed. At the same time, "1/2" or a corresponding numeral, symbol, or the like is displayed on the video picture which is being played back using the character generator.

<123> When the slow key is kept pressed, the forward slow playback speed is changed to 1/8 speed. When the slow key is further kept pressed, the slow playback speed is cyclically switched like 1/16→1/8→1/2→1/8→1/16 . . . , and the slow display on the video picture which is being played back changes accordingly.

<124> When the slow key is pressed during a playback pause (by the pause key), for example, 1/16 slow-speed playback starts. The subsequent depressions of the slow key effect in the same manner as described above.

<125> When the playback key is pressed during slow playback, normal playback restarts.

<126> When the title has changed during slow playback, the slow playback mode is canceled to restore normal playback.

<127> While a still image is played back in the cell playback mode, the slow key operation is not accepted.

<128> Normally, audio data is not played back during slow playback. However, audio data may be played back by changing its pitch in correspondence with the playback speed.

[Function of Last Play Key (LAST PLAY) 5tp]

<129> When this last play key is pressed after playback is interrupted by the stop key or turning off the power key (including a power failure) during disc playback, playback starts from the interrupted position or a position slightly before the interrupted position.

<130> When the disc tray is opened after playback is stopped, the last play key can be invalidated by clearing the memorized playback interrupted position. If the playback interrupted position is saved in the memory in the apparatus without being cleared, playback can be restarted from the interrupted position or a position slightly before the interrupted position by pressing the last play key even after the disc is removed from the tray and is set thereon again.

<131> When a first-play program chain (auto-start code) is included in that disc, this last play key is invalidated when playback is interrupted by turning off the power key. (That is, playback starts from the first-play program chain.)

<132> When playback is interrupted while a random program chain is being played back, playback can be restarted from the interrupted position or a position slightly before the interrupted position by pressing the last play key if the number of random playback loops is stored in the apparatus.

[Function of Setup Key (SETUP) 5y]

<133> This key is used for calling the setup menu for attaining various setups (e.g., to set the screen size/aspect ratio, angle mark, parental lock, desired spoken language type, desired superimposed dialogue language type, desired menu language type, auto-angle mode, and the like), and is effective only in the playback halt state.

<134> When this setup key is pressed while the setup menu is displayed, the setup menu display is cleared, and the playback halt state (blue-back screen) is set.

[Function of Title Number Key (T) 5tt]

<135> Upon designating the title number and chapter number to start a search or memory playback, a numerical value input by the ten-key pad before depression of this key is set as a title number, and a numerical value input by the ten-key pad after depression of this key is set as a chapter number.

<136> When this title number key is pressed before depression of the random key, not chapters but titles are randomly played back. For example, if the disc set on the tray records titles 1, 2, 3, 4, and 5, and the random key is pressed after depression of the title number key (also requires depression of the playback key in the halt state), random playback starts in units of titles in the order of, e.g., titles 2, 5, 1, 4, and 3.

[Function of Remote Controller Switch Key 5x]

<137> This key is used for switching remote controller 5 shown in FIG. 28 to that for operating equipment (e.g., AV television, VCR, or the like) other than the DVD video recorder shown in FIG. 26. Alternatively, when a single DVD video player and a single DVD video recorder are set at the same time, and single remote controller 5 is used for independently operating them, remote controller switch key 5x can be used for switching their operations.

The functions of the aforementioned keys are common to those of a DVD video player. Remote controller 5 of the DVD video recorder further has keys with the following functions.

[Function of Recording Mode Key 5rmd]

<138> Every time this key is pressed in the recording halt or pause state, the recording mode is cyclically switched like MPEG2/8 Mbps→MPEG2/6 Mbps→MPEG2/4 Mbps→MPEG2/2 Mbps→MPEG1/2 Mbps→MPEG1/1 Mbps→automatic picture quality mode (see ST226 in FIG. 50)→MPEG2/8 Mbps→, . . . .

If the user requires quality as high as an NTSC broadcast studio, he or she selects MPEG2/8 Mbps although the recording time becomes short. When the user wants to obtain picture quality equal to or higher than the S-VHS video standard mode by slightly prolonging the recording time, he or she selects MPEG2/6 Mbps or MPEG2/4 Mbps. When the user need only obtain picture quality as high as the S-VHS video 3×mode (or video CD) but requires a longer recording time, he or she can select MPEG1/2 Mbps or MPEG1/1 Mbps.

[Function of Recording Key 5rec]

<139> When this switch is pressed when DVD-RW (or DVD-R) disc 10 set in the main body shown in FIG. 27 has a free space and initial setups for recording (selection of MPEG2/MPEG1, setups of recording average bit rate, and the like) have already been done, recording starts.

When the user presses this recording key without such initial setups, default setup values are automatically selected as the initial setup values, and recording starts.

[Function of Display Mode Key 5dm]

<140> Every time this key is pressed while recordable DVD-RW (or DVD-R) disc 10 is set in the main body 200 shown in FIG. 27, OSD display (or display 48 of the apparatus main body) is switched to have the following contents:

(1) Recording source (TV channel number or AV input number)+current date;

(2) Current title set number, recorded time, remaining recordable time+average recording rate at that time;

(3) Display OFF

Note that contents (1) and (2) may be simultaneously displayed, as will be exemplified in FIG. 58.

[Function of OSD Key 5osd]

<141> When this key is pressed while MPU 30 shown in FIG. 26 outputs character (or image) data for OSD display, OSD display contents that the user does not desire (for example, a warning message on the upper portion of the screen in FIG. 58) are cleared from the monitor screen. When this key is pressed once again, OSD data output from MPU 30 is displayed on the monitor screen.

[Function of Timer Key 5tme]

<142> When this key is pressed, MPU 30 shown in FIG. 26 outputs a programming timer menu (including a table for designating a desired recording channel, recording programming date, recording mode, average recording rate, and the like in units of programs) is output (OSD) onto the screen of a monitor (not shown). On this menu, a program can be reserved by using cursor key 5q, ten-key pad 5t, enter key 5s, and the like.

<143> After programming timer operation, when this timer key 5tme and recording key 5rec are simultaneously pressed while recordable DVD-RW (or DVD-R) disc 10 is set in main body 200 shown in FIG. 27, the DVD video recorder shown in FIG. 26 enters a programming timer recording mode (timer recording standby state).

Note that an example of programming timer operation will be described later with reference to FIG. 49.

Figure 29:
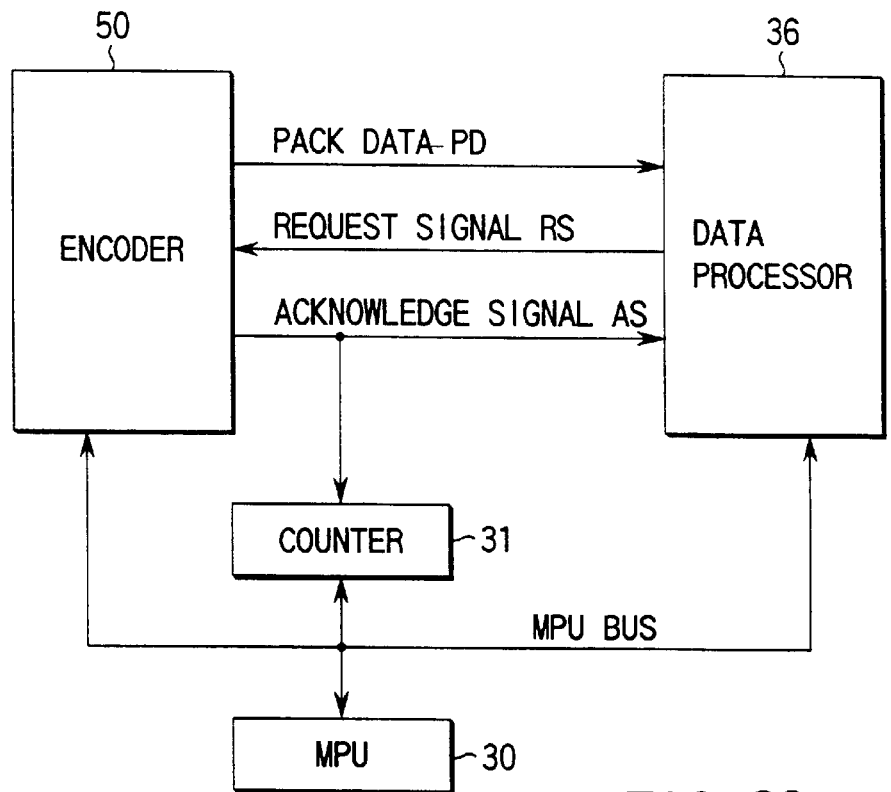
FIG. 29 is a block diagram for explaining a circuit (without transfer clocks) for detecting the number of recorded bytes of information recorded on the disc shown in FIG. 1 by counting the number of recorded bytes in the DVD video recorder shown in FIG. 26.
Figure 30:
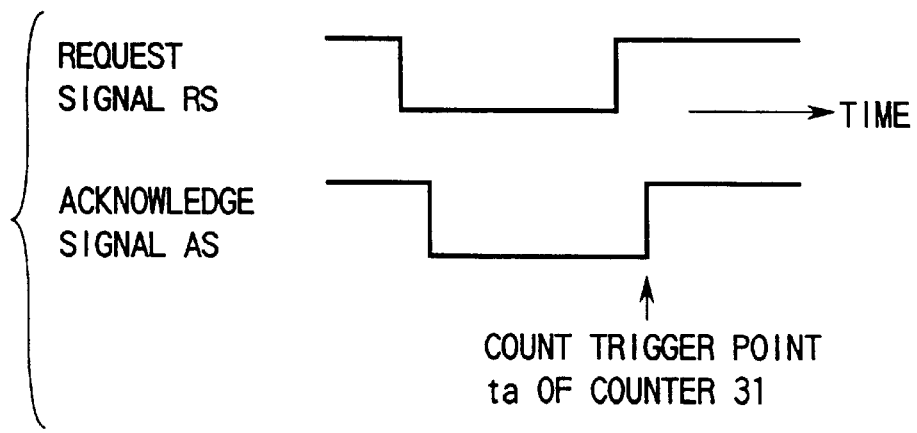
FIG. 30 is a timing chart for explaining the count timing of a recorded byte by a counter shown in FIG. 29.

FIG. 29 is a block diagram showing an example of a recording amount detection circuit (without transfer clocks) for detecting the number of recorded bytes of information recorded on disc 10 by counting the number of recorded bytes in the DVD video recorder shown in FIG. 26. FIG. 30 is a timing chart for explaining the count timings of recorded bytes by counter 31 in FIG. 29.

DVD recording data formatted by formatter 56 in encoder 50 in FIG. 26 is formed by a sequence of a plurality of data packs (2,048 bytes per pack) 86 to 91, as shown in FIG. 9.

When MPU 30 in FIG. 26 instructs recording of the DVD recording data via an MPU bus, data processor 36 sends request signal RS (upper signal in FIG. 30) for requesting transfer of data PD of the data packs to encoder 50. Upon reception of request signal RS, encoder 50 (formatter 56) outputs acknowledge signal AS that confirms preparation of data in response to this request to data processor 36 (lower signal in FIG. 30). Simultaneously with the output of acknowledge signal AS, encoder 50 (formatter 56) transfers data PD for one byte to data processor 36. That is, encoder 50 (formatter 56) outputs one-pulse acknowledge signal AS every time it transfers 1 byte to data processor 36.

Acknowledge signal AS is input to counter 31. Counter 31 counts up its contents by 1 in response to the leading edge (trigger point ta in FIG. 30) of signal AS, and holds the contents after the counting-up. The contents of counter 31 are sent back to MPU 30 via the MPU bus.

MPU 30 detects the number of bytes (i.e., the number of bytes recorded on disc 10 in FIG. 26) transferred from encoder 50 (formatter 56) to data processor 36 on the basis of the contents (count value) of counter 31. The number of data (the number of bytes) transferred to data processor 36 represents the data amount recorded on disc 10. By subtracting the recorded data amount (count value bytes) from the free space (the value written in FREE_SPACE in VMGI_MAT in FIG. 17) of disc 10, the remaining amount (the number of bytes that can be recorded) of disc 10 can be determined. Furthermore, when this remaining amount is divided by the average recording rate, the remaining time (indicating a predicted value of how much longer data can be recorded) of disc 10 can be determined.

Figure 31:
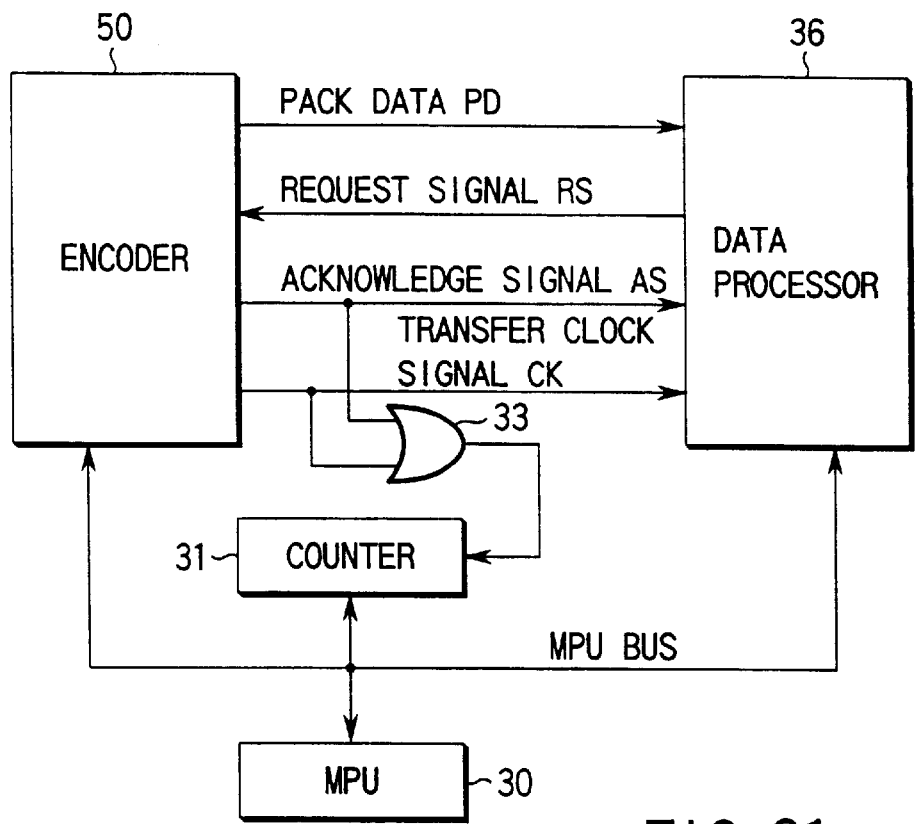
FIG. 31 is a block diagram for explaining a circuit (with transfer clocks) for detecting the number of recorded bytes of information recorded on the disc show in FIG. 1 by counting the number of recorded bytes in the DVD video recorder shown in FIG. 26.
Figure 32:
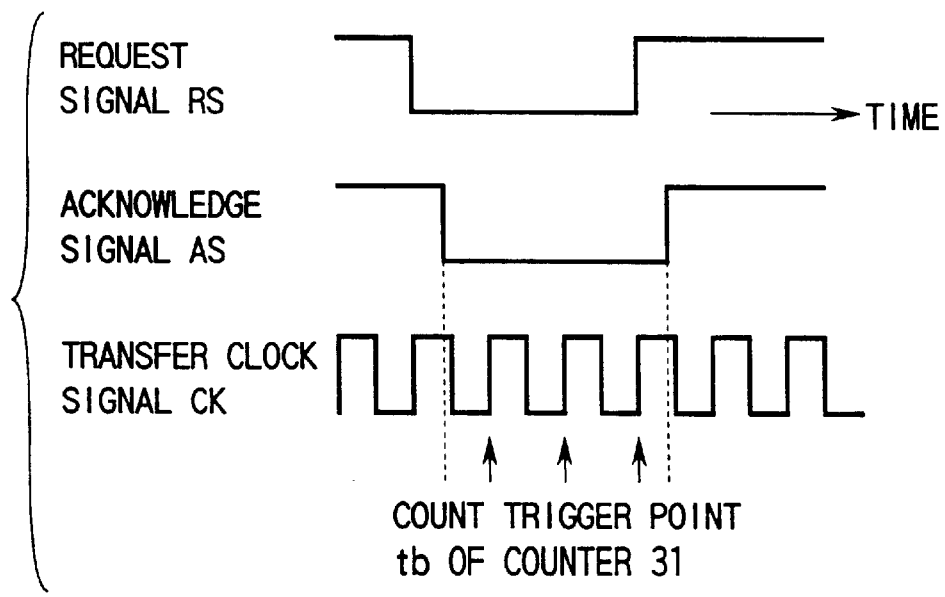
FIG. 32 is a timing chart for explaining the count timing of a recorded byte by a counter shown in FIG. 31.

FIG. 31 is a block diagram showing another example of the recording amount detection circuit (with transfer clocks) for detecting the number of recorded bytes of information recorded on disc 10 by counting the number of recorded bytes in the DVD video recorder shown in FIG. 26. FIG. 32 is a timing chart for explaining the count timings of recorded bytes by a counter in FIG. 31.

In the example shown in FIG. 31, transfer clock signal CK is output to encoder 50 every time pack data PD is transferred from encoder 50 to data processor 36.

That is, when data processor 36 sends a request signal (upper signal in FIG. 32) to encoder 50 in accordance with an instruction from MPU 30, encoder 50 sends back acknowledge signal AS (middle signal in FIG. 32) to data processor 36. Acknowledge signal AS is not generated every time 1 byte is transferred, but is a gate signal which is active during the transfer period for the number of bytes to be transferred. Transfer clock signal CK (lower signal in FIG. 32) output from encoder 50 is sent to data processor 36 as a synchronization signal for byte transfer.

Acknowledge signal AS is supplied to the first input of OR gate 33 as the gate signal. The second input of OR gate 33 receives transfer clock signal CK. Then, counter 31 counts up its contents by 1 in response to each leading edge (each of a plurality of trigger points tb in FIG. 32) of transfer signal CK during the active (logical "0") period of acknowledge signal AS, and holds the contents after the counting-up. The contents of counter 31 are sent back to MPU 30 via the MPU bus.

MPU 30 detects the number of bytes (the number of recorded bytes) transferred from encoder 50 to data processor 36 on the basis of the contents (count value) of counter 31. The contents of counter 31 represent the data amount recorded on disc 10. By subtracting (count value bytes) from the free space of disc 10, the remaining amount of disc 10 can be determined. Furthermore, when this remaining amount is divided by the average recording rate, the remaining time of disc 10 can be determined.

Figure 33:
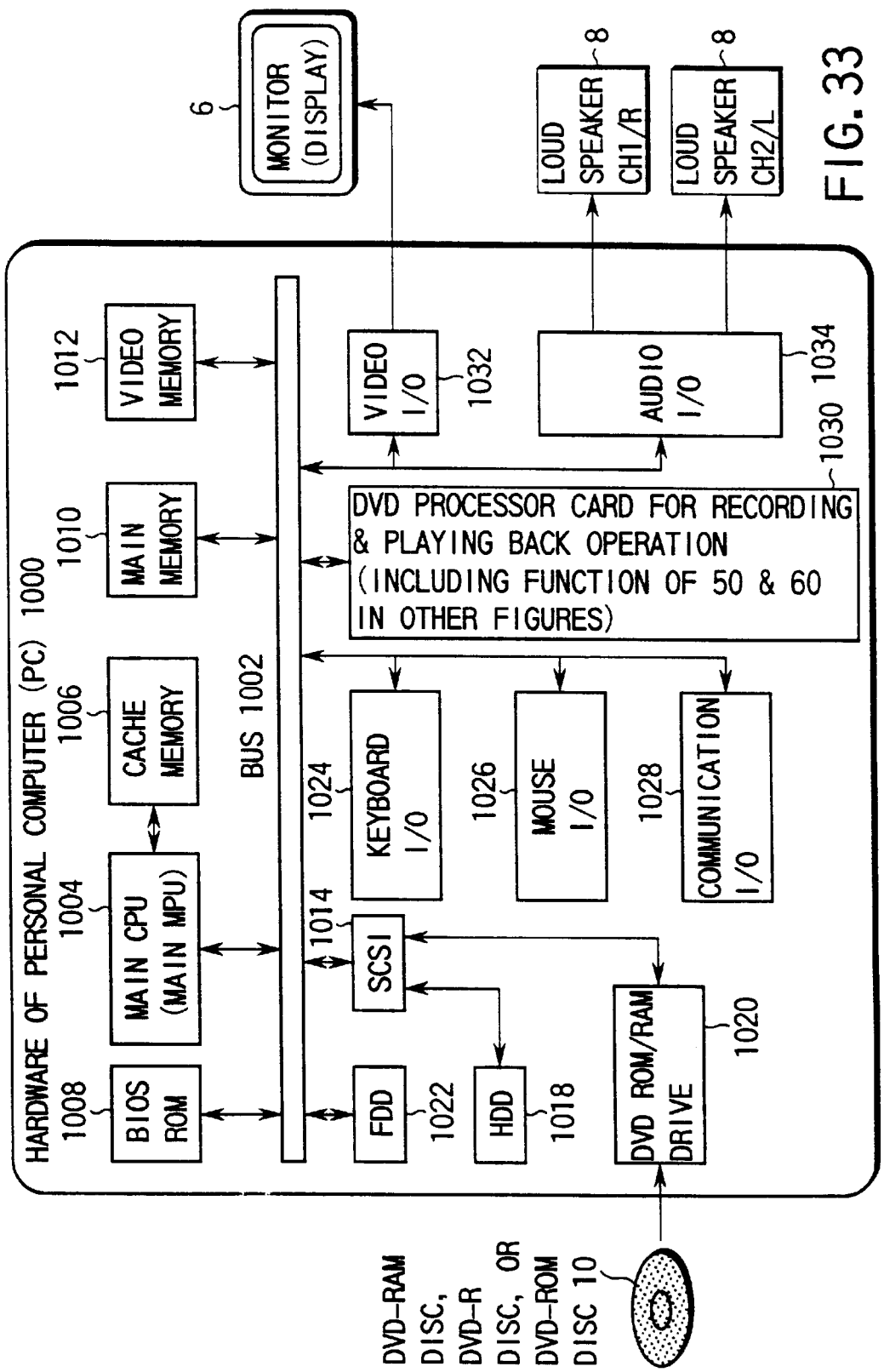
FIG. 33 is a block diagram for explaining the recording/playback function of the DVD video recorder shown in FIG. 26 implemented by a versatile personal computer.

FIG. 33 is a block diagram for explaining the recording/playback function of the DVD video recorder shown in FIG. 26 implemented using a versatile personal computer. Personal computer 1000 shown in FIG. 33 may use dedicated hardware, but may use a versatile personal computer with a general arrangement.

More specifically, internal bus 1002 of personal computer 1000 is connected with main CPU 1004, basic I/O system ROM (BIOS ROM) 1008, main memory 1010, video memory 1012, floppy disc drive (FDD) 1022, keyboard I/O device 1024, mouse I/O device 1026, communication I/O device 1028, and the like. Main CPU 1004 is directly connected to cache memory 1006 via a dedicated high-speed bus.

Internal bus 1002 of personal computer 1000 has a plurality of versatile bus slots (not shown). These slots receive SCSI interface (SCSI board) 1014, DVD processor card 1030, video I/O device (video card) 1032, audio I/O device (audio card) 1034, and the like.

SCSI board 1014 is connected with SCSI hard disc drive (HDD) 1018, and SCSI DVD-ROM/DVD-RAM compatible drive 1020 (drive 1020 may also be compatible with a CD).

Video card 1032 is connected with high-resolution bitmap display (analog RGB type) 6, and audio card 1034 is connected with a pair of 2-channel stereophonic loud speakers 8 (if card 1034 has no power amplifier, the power amplifier may be incorporated in loud speakers 8 or a stereophonic amplifier (not shown) may be inserted between card 1034 and loud speakers 8).

DVD processor card 1030 in FIG. 33 has hardware corresponding to devices 38, 50, 60, and the like shown in FIG. 26. Disc drive 32 shown in FIG. 26 corresponds to DVD-ROM/RAM drive 1020 in FIG. 33.

The storage area of memory 1010 or video memory 1012 in FIG. 33 may be partially used as temporal storage 34, buffer memory 57, or memory 63 of the separator in FIG. 26, as needed.

Furthermore, hard disc 1018 in FIG. 33 can also be partially used as temporal storage 34 in FIG. 26. If hard disc 1018 is a disc having an amount as large as several Gbytes (e.g., 3 to 5 GB), a predetermined area (for 2.6 GB) in this disc may be partitioned and may be used as virtual DVD-RAM (or DVD-RW or DVD-R) disc 10.

The functions of the operation keys of DVD video recorder main body 200 in FIG. 27 can be assigned to a keyboard (not shown) connected to keyboard I/O device 1024 in FIG. 33. Also, the functions of various keys (buttons and cursor) of remote controller 5 in FIG. 28 can be assigned to a keyboard (not shown) connected to keyboard I/O device 1024 in FIG. 33, a mouse (not shown) connected to mouse I/O device 1026, or an external controller (not shown) connected to communication I/O device 1028.

Typical data processing in the DVD video recorder shown in FIG. 26 includes recording (including variable bit rate recording of a moving picture and fixed bit rate recording of audio or sub-picture data), playback (reading), and special processes.

The recording process includes normal recording (FIGS. 34 and 53) and programming timer recording (FIGS. 49 to 52).

Figure 55:
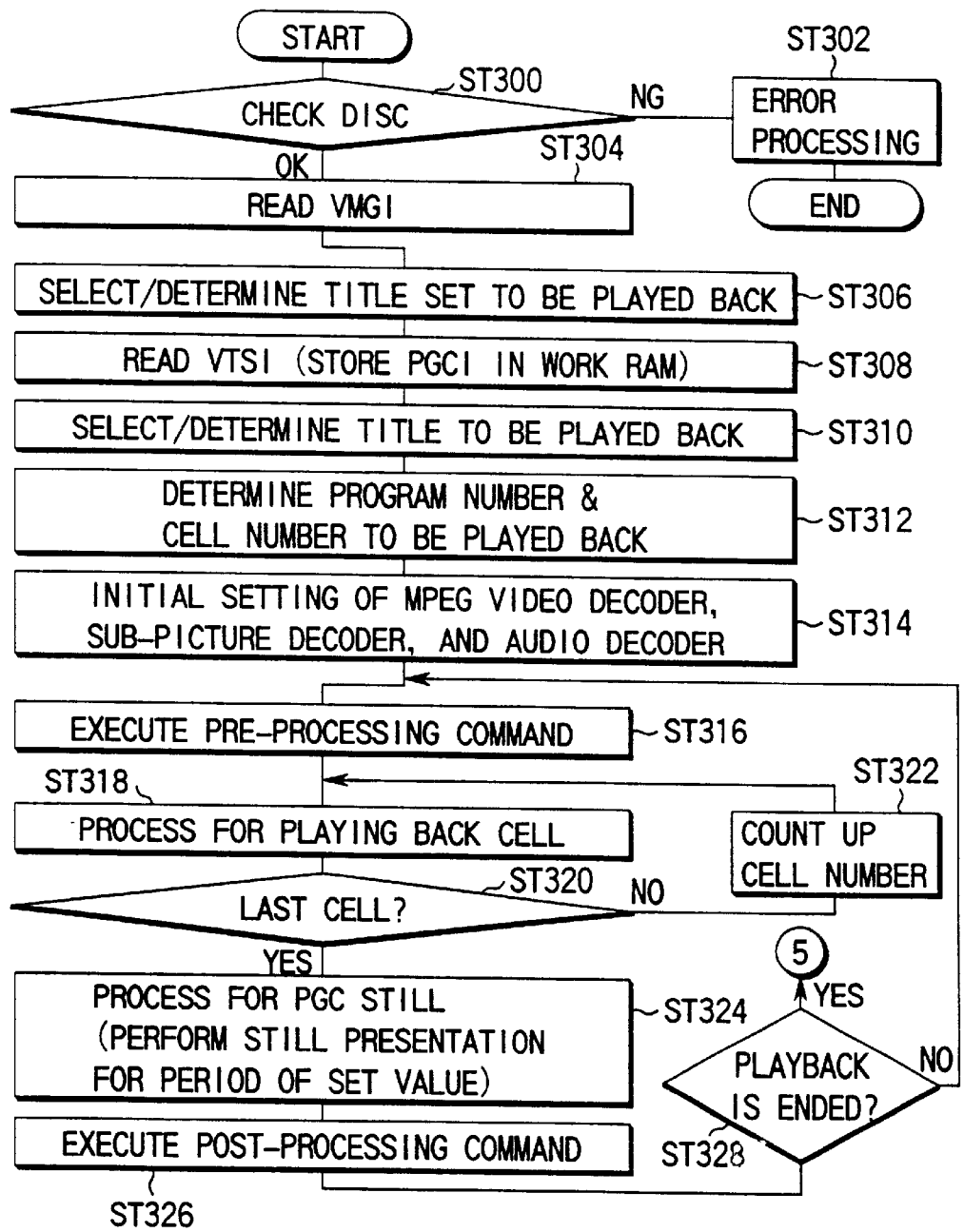
FIG. 55 is a flow chart for explaining an example of playback of the DVD video recorder shown in FIG. 26.
Figure 56:
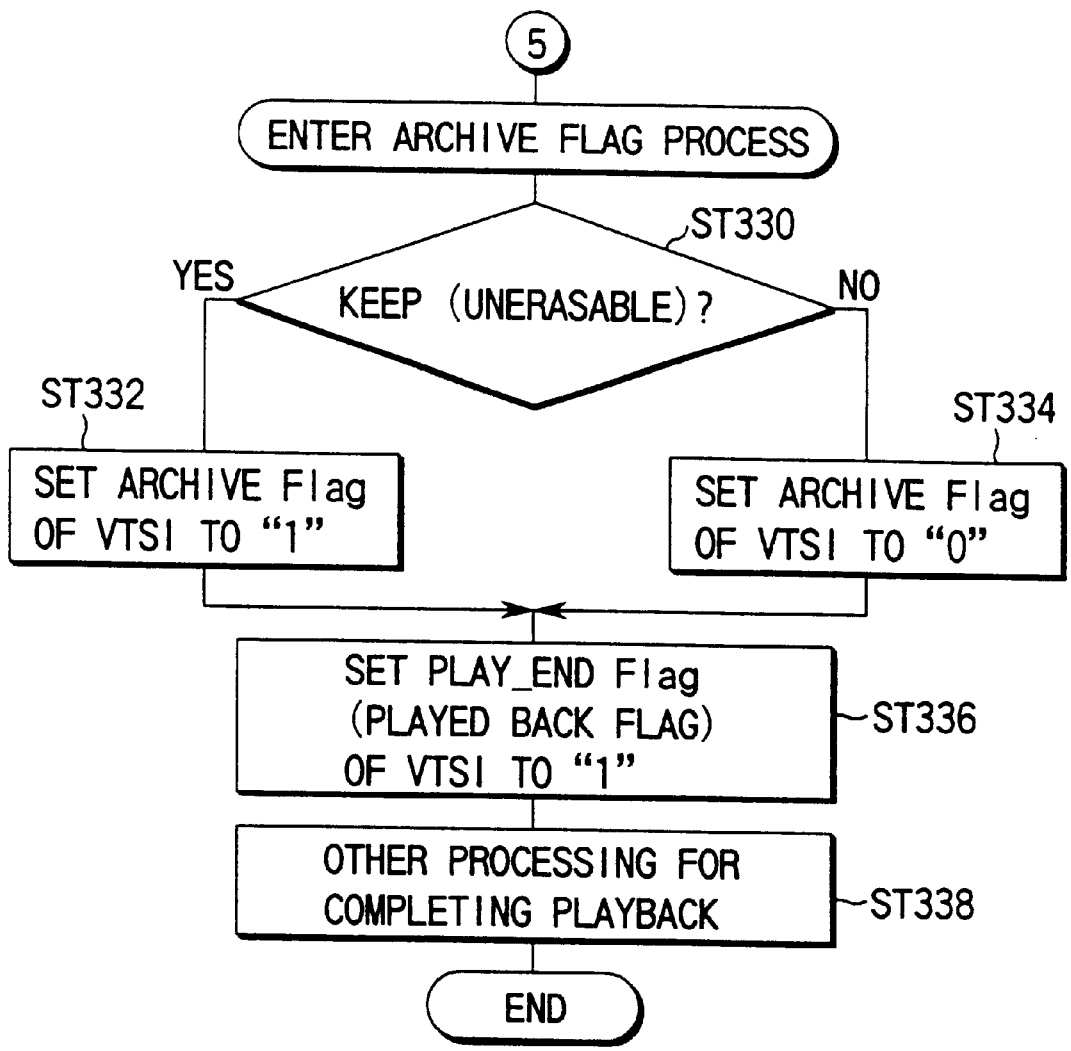
FIG. 56 is a flow chart for explaining updating of the archive flag and played back flag upon completion of playback by the sequence shown in FIG. 55.
Figure 57:
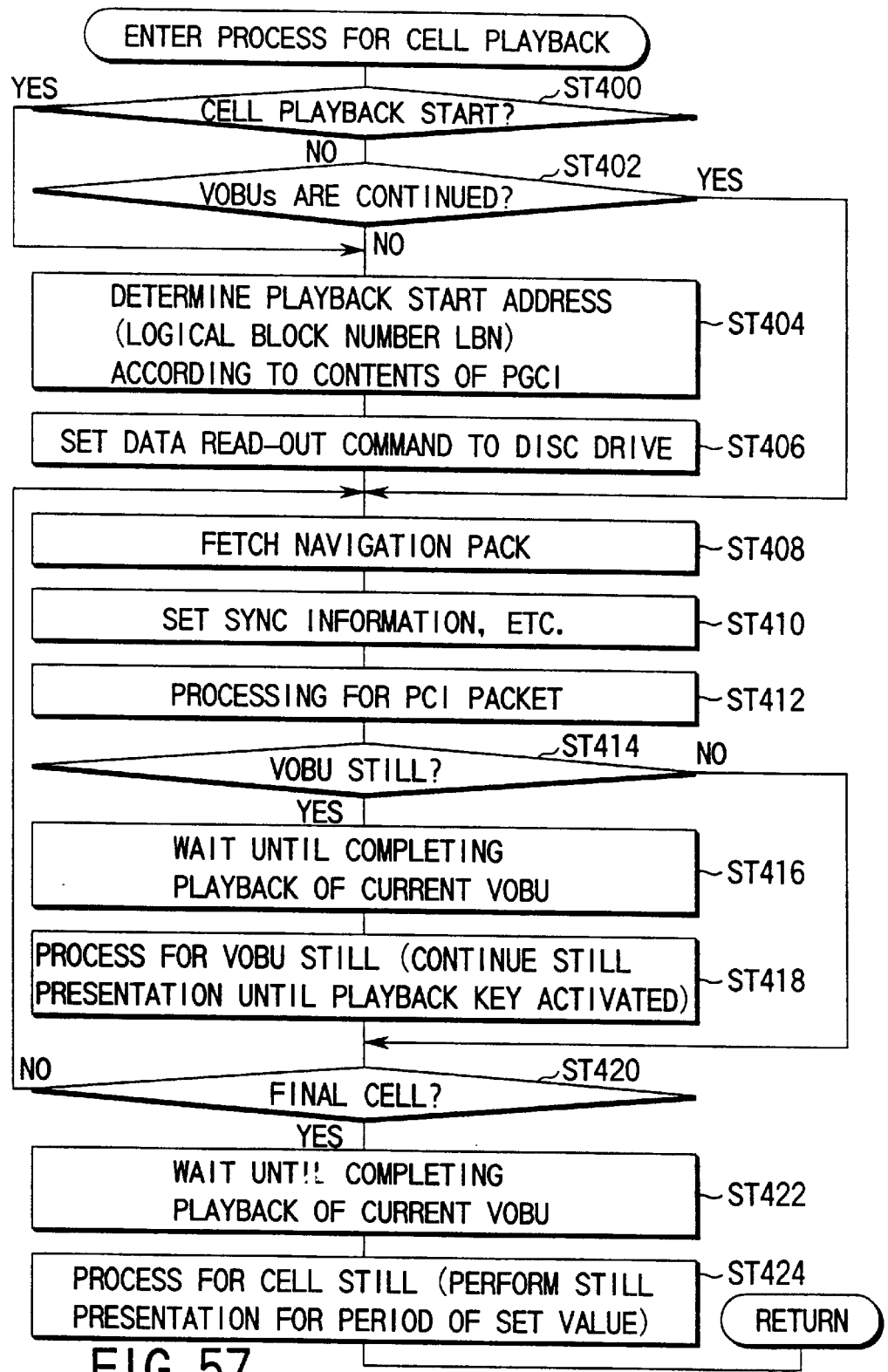
FIG. 57 is a flow chart for explaining the contents of step S318 (process for cell playback) in FIG. 55.

The playback process is substantially the same as that of a DVD video player (the processing corresponding to the key operations of remote controller 5 shown in FIG. 28), but includes some processes unique to the present invention, since the present invention relates to a DVD video recorder:

setup processing of a played back flag (read flag) for a recorded program (video title set VTS) that has been played back once, and setup processing of an archive flag for a recorded program (VTS) which is protected from being erased (to be permanently kept) (FIGS. 55 to 57).

Figure 53:
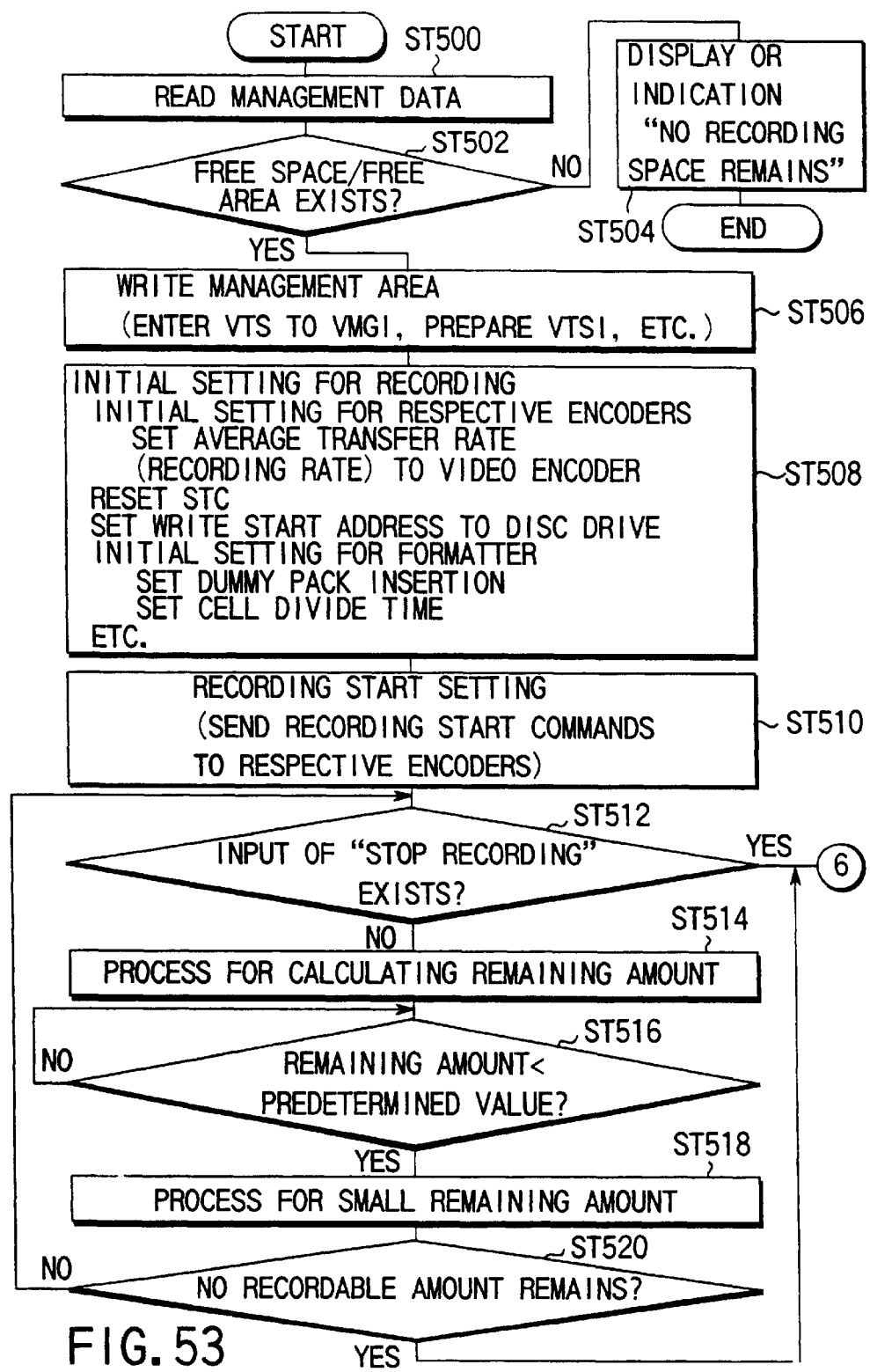
FIG. 53 is a flow chart for explaining still another example of programming timer recording of the DVD video recorder shown in FIG. 26.

Furthermore, the special process includes processing (FIG. 36) for monitoring the remaining amount of a recording disc, display processing (FIGS. 37 and 38) in case of a small remaining amount, disc arranging processing (FIGS. 39 to 41) for increasing the free space of a disc by selectively erasing specific programs in the recorded disc, disc exchange processing (FIGS. 45 to 48) for exchanging a recording disc when the disc is used up during recording, processing (FIG. 42) for setting the average recording rate for recording, MPEG switching processing (FIG. 43) for selecting a moving picture recording mode (MPEG2 or MPEG1), dummy insertion cancel processing (FIG. 44) for increasing the remaining amount when the remaining amount of the disc becomes small during recording, and processing (FIG. 54) for initializing the played back flag and archive flag upon completion of normal recording (FIG. 53).

The recording, playback, and special processes will be described hereinafter with reference to the flow charts in FIGS. 34 to 57 and monitor display examples in FIGS. 58 to 62.

Figure 34:
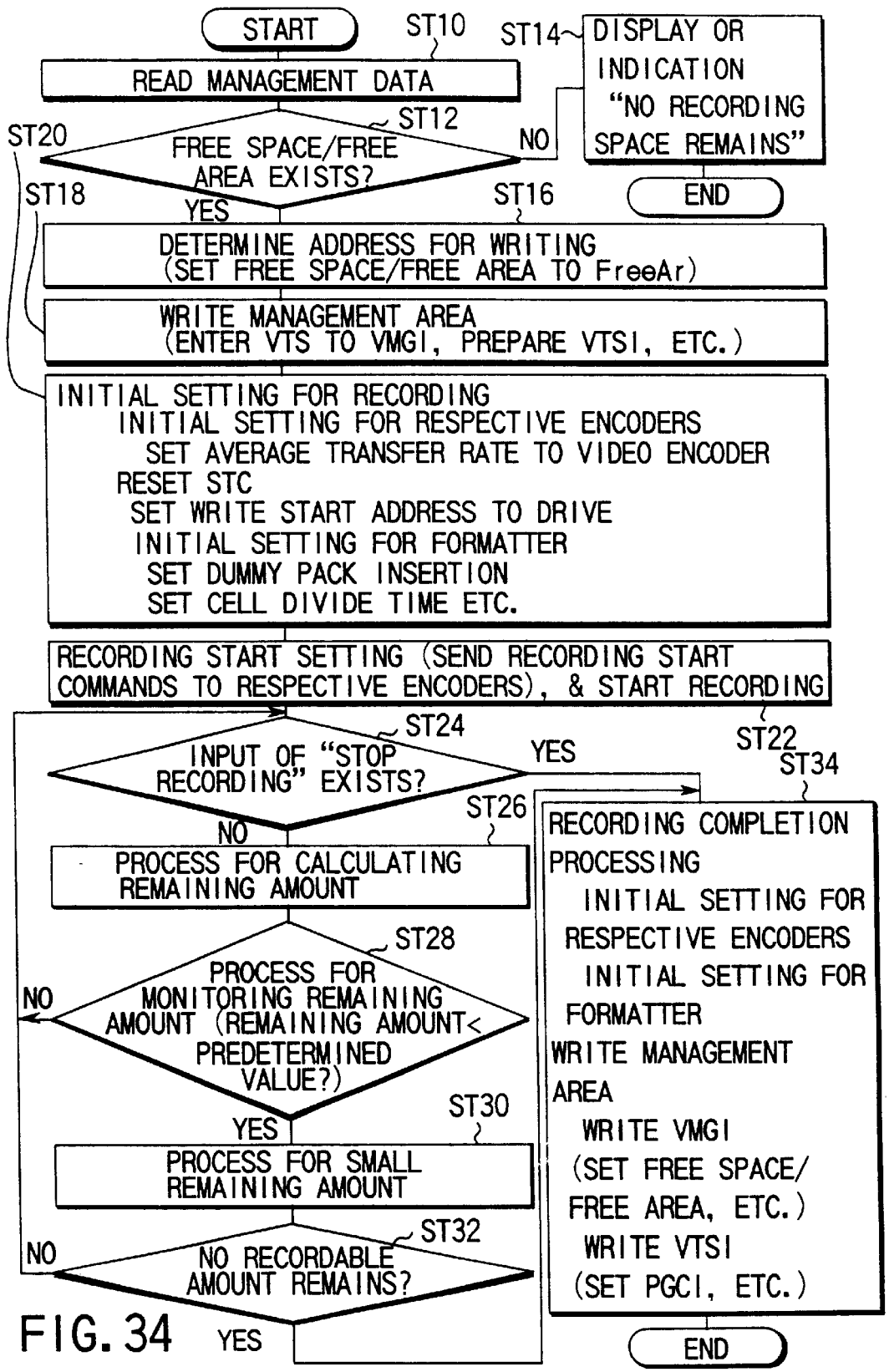
FIG. 34 is a flow chart for explaining an example of recording of the DVD video recorder shown in FIG. 26.

FIG. 34 is a flow chart for explaining an example of recording of the DVD video recorder shown in FIG. 26.

Upon reception of a recording command from remote controller 5 or a programming timer program, MPU 30 in FIG. 26 reads management data (VMGI_MAT in FIG. 17) of DVD-RAM (or DVD-R) disc 10 set in disc drive 36 from. drive 36 (step ST10).

It is checked based on free space information (FREE_SPACE) in the read management data if set disc 10 has a free space (step ST12).

If the contents of the free space information (FREE_SPACE) indicate zero or substantially zero (the disc becomes full of data several seconds after the beginning of recording) (NO in step ST12), an OSD display or indication with the contents "no recording space remaining" is output onto a monitor TV screen (not shown) (step ST14). At this time, a message "NO REC SPACE" having the same meaning as "no recording space remaining" may be displayed on a portion of display 48 of apparatus main body 200 shown in FIG. 27.

If some free space remains, e.g., if FREE_SPACE indicates 150 Mbytes or more corresponding to an MPEG2 recording time of approximately 5 min at an average rate of 4 Mbps, the control advances to the next process. In this case (YES in step ST12), an address for writing (the head position of the free space) onto set disc 10 is determined, and a free space value corresponding to the free space information (FREE_SPACE) read from the management data on disc 10 is written in register "FreeAr" allocated on an internal RAM of MPU 30 (step ST16).

Note that the "free space value" written in register "FreeAr" is expressed using 2,048 bytes, which correspond to the size of one logical sector in FIG. 2 or one pack in FIG. 9, as one unit of recording.

When disc 10 is designed to record data in a normal file format, uses a file allocation table (FAT) for managing the recording contents, and has no free space information mentioned above, the number of free clusters (the number of free blocks) may be read out from the FAT, and may be multiplied by the number of bytes per cluster (block) to calculate the free space of that disc.

Data is written in the management area of set disc 10 (step ST18). For example, video title set VTS corresponding to a program to be recorded is registered in video manager information VMGI and files that relate to this VTS are created.

More specifically, if this recording is the first one for that disc 10, VTS#1 in FIG. 3 is registered, and its related files (see the respective files in the VTS directory in FIG. 7) are created in step ST18. If VTS#1 has already been registered in disc 10 and some free space remains on that disc 10, registration of VTS#2 and creation of its related files are done in step ST18.

Then, initial setting for recording is done (step ST20). In this initial setting, the encoders (53 to 55) are initialized (to set, e.g., the average transfer rate of V encoder 53 and the like), system time counter STC is reset, the write start address is set in disc drive 32, formatter 56 is initialized (to set dummy pack insertion, cell divide time, and the like), and so forth (e.g., resetting of the counter in FIG. 29 or 31, and the like).

Upon completion of initial setting for recording (ST20), recording start setting is done (step ST22). With this setting, MPU 30 sends recording start commands to the respective encoders (53 to 55) in encoder 50 to start recording on the free space of disc 10 set in disc drive 32.

After that, upon reception of a "stop recording" input (i.e., if the user instructs the end of recording or the programming timer program issues a recording end command) (YES in step ST24), recording completion processing (step ST34) is executed, thus ending the recording shown in FIG. 34.

The recording completion processing in step ST34 includes initialization of the respective encoders (53 to 55) in FIG. 26 (to reset their recording rates to default values, and the like), initialization of formatter 56 (to reset various setup values to default values, and the like), a write pertaining to video manager information (to update the contents of FREE_SPACE in FIG. 17 and the like), and a write pertaining to video title set information (to update the contents of PGCI in FIG. 21 and the like).

If no "stop recording" input is detected (NO in step ST24), and recording continues, a process for calculating the remaining amount of disc 10 in which data is being recorded (see FIG. 36) is executed parallel to recording (step ST26).

If it is determined in the process in step ST26 that the remaining amount of disc 10 is smaller than a predetermined value (YES in step ST28; "1" is set in a minimum space flag in FIG. 36), the control enters a process for a small remaining amount (see FIG. 37) (step ST30).

On the other hand, if the remaining amount is equal to or larger than the predetermined value (NO in step ST28), the flow returns to step ST24.

As a result of the process in step ST30, if it is determined that disc 10 in which data is being recorded has no more recordable amount (YES in step ST32; zero remaining time in step ST422B in FIG. 37), the recording completion processing in step ST34 above is executed.

As a result of the process in step ST30, if it is determined that some recordable amount still remains on disc 10 in which data is being recorded (NO in step ST32), the loop of steps ST24 to ST32 repeats itself until the "stop recording" input is detected (YES in step ST24) or no recordable amount remains (YES in step ST28; YES in step ST32).

Figure 35:
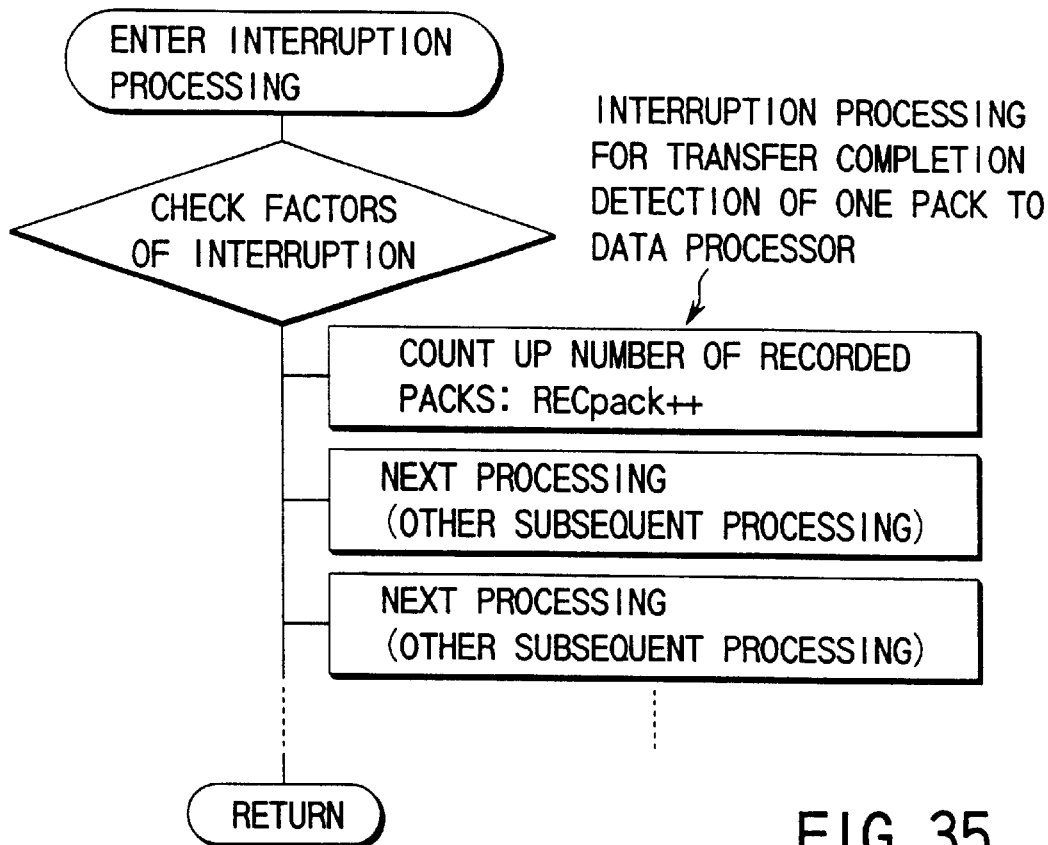
FIG. 35 is a flow chart for explaining the processing sequence of various kinds of interruption processing executed during recording shown in FIG. 34.

FIG. 35 is a flow chart for explaining the processing sequence of various processes executed during recording shown in FIG. 34.

The first interruption is produced in response to an interruption to data processor 36, i.e., transfer completion detection of one pack.

In this interruption, factors of interruption are checked. If the factor of interruption is the transfer completion of the number of packs (an increment of recorded packs; RECpack++), the contents of counter 31 in FIG. 29 or 31 are counted up.

Figure 36:
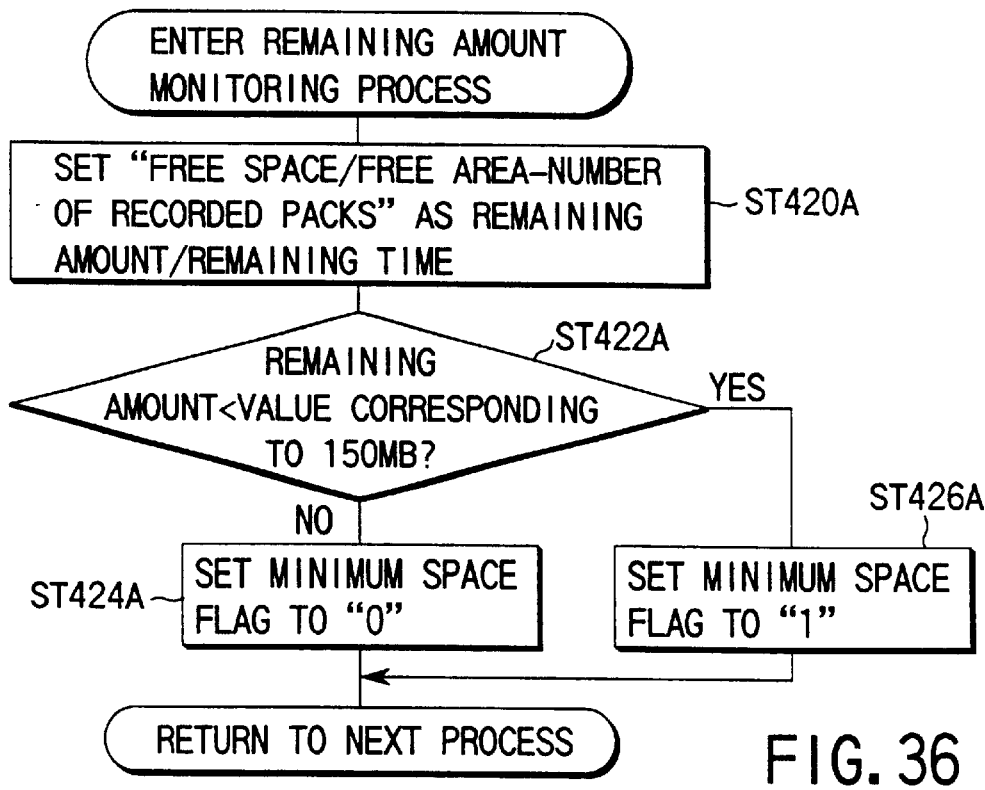
FIG. 36 is a flow chart for explaining processing for monitoring the remaining recordable amount which remains on a disc to be recorded in the interruption processing shown in FIG. 35.

FIG. 36 is a flow chart for explaining the processing for monitoring the recordable remaining amount on the disc to be recorded. This processing corresponds to step ST28 in FIG. 34 (or step ST42 in FIG. 35).

Initially, the contents of register FreeAr set in step ST16 in FIG. 34 are updated.

More specifically, before the beginning of the current recording, the number of recorded packs is subtracted from the free space set in register FreeAr. This "free space–the number of recorded packs" indicates the free space that remains on disc 10 in which data is being recorded at that time. The updated free space is re-set as the remaining amount.

Note that the number of recorded packs is obtained by dividing the accumulated number of recorded bytes counted by counter 31 in FIG. 29 or 31 by 2,048 bytes as one pack size, in case of hardware processing. That is, "the number of recorded packs=the accumulated number of recorded bytes±2,048 bytes".

In case of software processing, RECpack obtained by interruption processing in units of packs indicates the number of recorded packs, as shown in FIG. 35.

If the remaining amount of register FreeAr is equal to or larger than a predetermined value (NO in step ST422A), a minimum space flag is set at "0" (step ST424A); if the remaining amount is smaller than the predetermined value (YES in step ST422A), the minimum space flag is set at "1" (step ST426A).

The "predetermined value" in step ST422A need not always be fixed at a given value. In the example shown in FIG. 36, 150 Mbytes corresponding to approximately 5 min upon MPEG2 recording at an average bit rate of 4 Mbps are used as the predetermined value.

That is, when MPEG2 recording continues at an average bit rate of 4 Mbps, if the minimum space flag is "0", it is expected that recording for 5 min or more can be made; if the minimum space flag is "1", it is expected that disc 10 in which data is being recorded is used up within 5 min. (Since MPEG2 recording is variable bit rate recording, the remaining recordable time calculated based on the average bit rate includes errors. That is, even when the remaining amount obtained in step ST420A in FIG. 36 is accurate, the remaining recordable time varies depending on the subsequent recording contents. Hence, the estimated recordable time of 5 min is not so accurate. This value "5 min" is merely a yardstick.)

Figure 37:
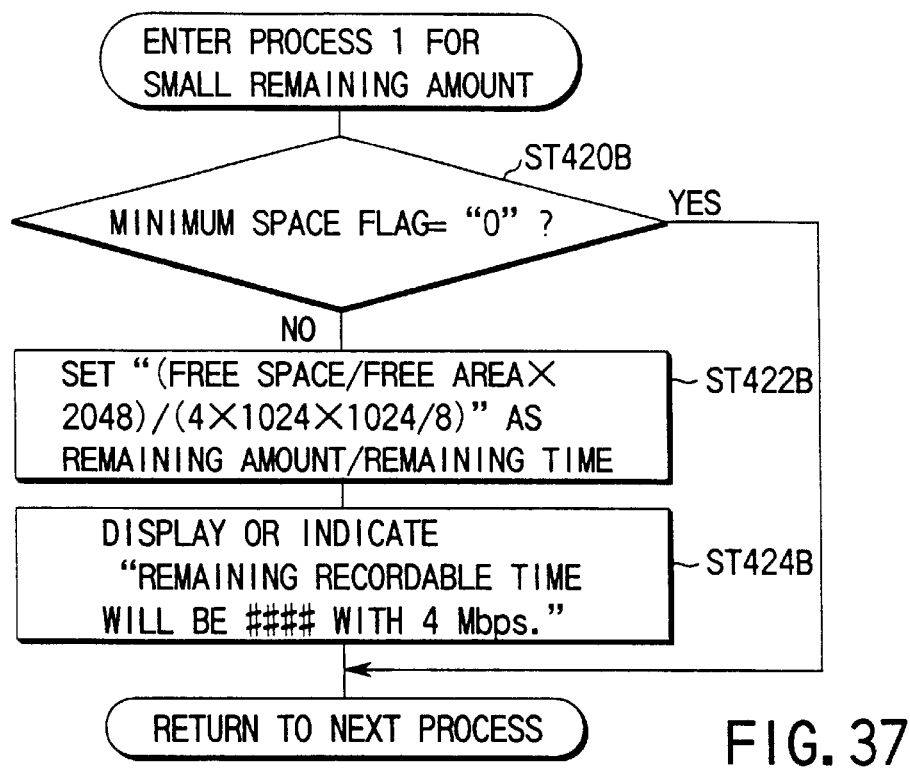
FIG. 37 is a flow chart for explaining an example of processing for a small remaining amount executed in accordance with the remaining amount monitoring processing result (the contents of a minimum space flag) in FIG. 36.

FIG. 37 is a flow chart for explaining an example of the process for a small remaining amount executed in correspondence with the result (the contents of the minimum space flag) of the process for monitoring the remaining amount in FIG. 36. FIG. 58 shows a display example of a warning display, average recording rate, and the remaining recordable time at that rate, and the like when the remaining amount of the disc in which data is being recorded is small, on the monitor TV screen.

If the minimum space flag in FIG. 36 is "0" (YES in step ST420B), since disc 10 in which data is being recorded still has a remaining amount, the process in FIG. 37 ends, and the control returns to the next process.

On the other hand, if the minimum space flag is "1" (NO in step ST420B), it is determined that disc 10 in which data is being recorded will become full of data soon. In this case, a value obtained by dividing [the remaining amount (using 2,048 bytes as one unit for recording)×2,048 bytes] by the average bit rate at that time (512 kbytes per second obtained by converting 4 Mbps into bytes) is the estimated "remaining time" (step ST422B).

MPU 30 in FIG. 26 OSD-displays a message "remaining time will be 5 min with 4 Mbps" or "remaining time will be 5 min in standard picture quality mode" assuming that 4 Mbps correspond to standard picture quality, on the monitor TV, using the "remaining time" calculated in step ST422B, and the average transfer rate (recording bit rate) set in step ST20 in FIG. 34. In this case, the TV channel number in recording, recording date/time, and the like may be simultaneously OSD-displayed. Furthermore, simultaneously with OSD display in step ST424B, a warning message for guiding the user as to how to continue recording (see the upper portion of the monitor screen in FIG. 58) may be OSD-displayed.

The OSD display contents such as the warning message and the like may be written in advance in the ROM in microcomputer block 30 in FIG. 26.

Let A be the number of recorded packs written at a given timing, and B be the previous number of recorded packs written before A packs are written. Then, in MPEG recording at a variable bit rate, the instantaneous value of the recording rate that changes time by time can be obtained from the absolute value of [A–B] (unit=pack; 2,048 bytes per pack=16,384 bits). More specifically, if T (sec) represents the predetermined time, the instantaneous recording rate (bps) can be calculated by the absolute value of [A–b]×16,384±T (sec). The "remaining time" may be calculated using the instantaneous recording rate in place of the average recording rate. In such case, the remaining time does not always monotonously decrease as recording progresses. However, even when this instantaneous recording rate is used, the remaining time can be calculated and the user or the like can be informed thereof.

Figure 38:
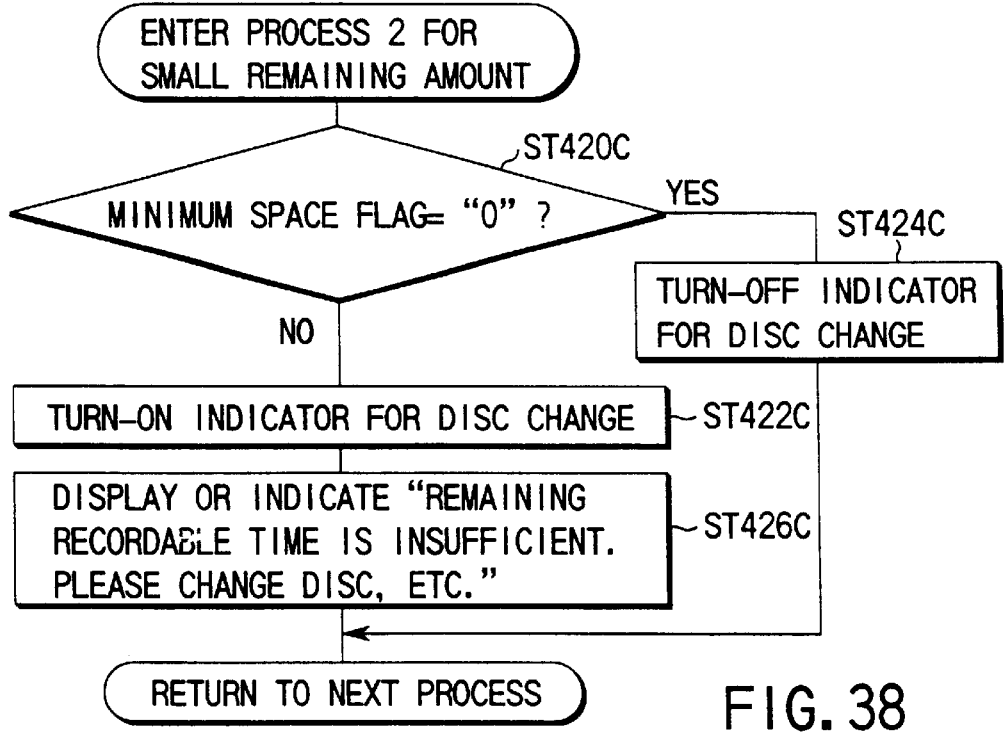
FIG. 38 is a flow chart for explaining another example of processing for a small remaining amount executed in accordance with the remaining amount monitoring processing result (the contents of a minimum space flag) in FIG. 36.

FIG. 38 is a flow chart for explaining another example of the process for a small remaining amount executed in correspondence with the result (the contents of the minimum space flag) of the process for monitoring the remaining amount in FIG. 36.

If the minimum space flag in FIG. 36 is "1" (NO in step ST420C), it is determined that disc 10 in which data is being recorded will become full of data soon. In this case, MPU 30 in FIG. 26 turns on a disc change indicator "DISC TO BE CHANGED" on display 48 of apparatus main body 200 in FIG. 27 (by continuously lighting the indicator illuminated with backlight or flickering it) (step ST422C). At the same time, MPU 30 OSD-displays a warning message (see the upper portion of the monitor screen in FIG. 58) that prompts the user to change a disc (step ST426C).

If the minimum space flag is "0" (YES in step ST420C), it is determined that disc 10 in which data is being recorded is still recordable. In this case, MPU 30 in FIG. 26 turns off the disc change indicator "DISC TO BE CHANGED" on display 48 of apparatus main body 200 in FIG. 27 (step ST424C).

After execution of the processing in step ST426C or ST422C, the process in FIG. 38 ends, and the control returns to the next process.

Figure 39:
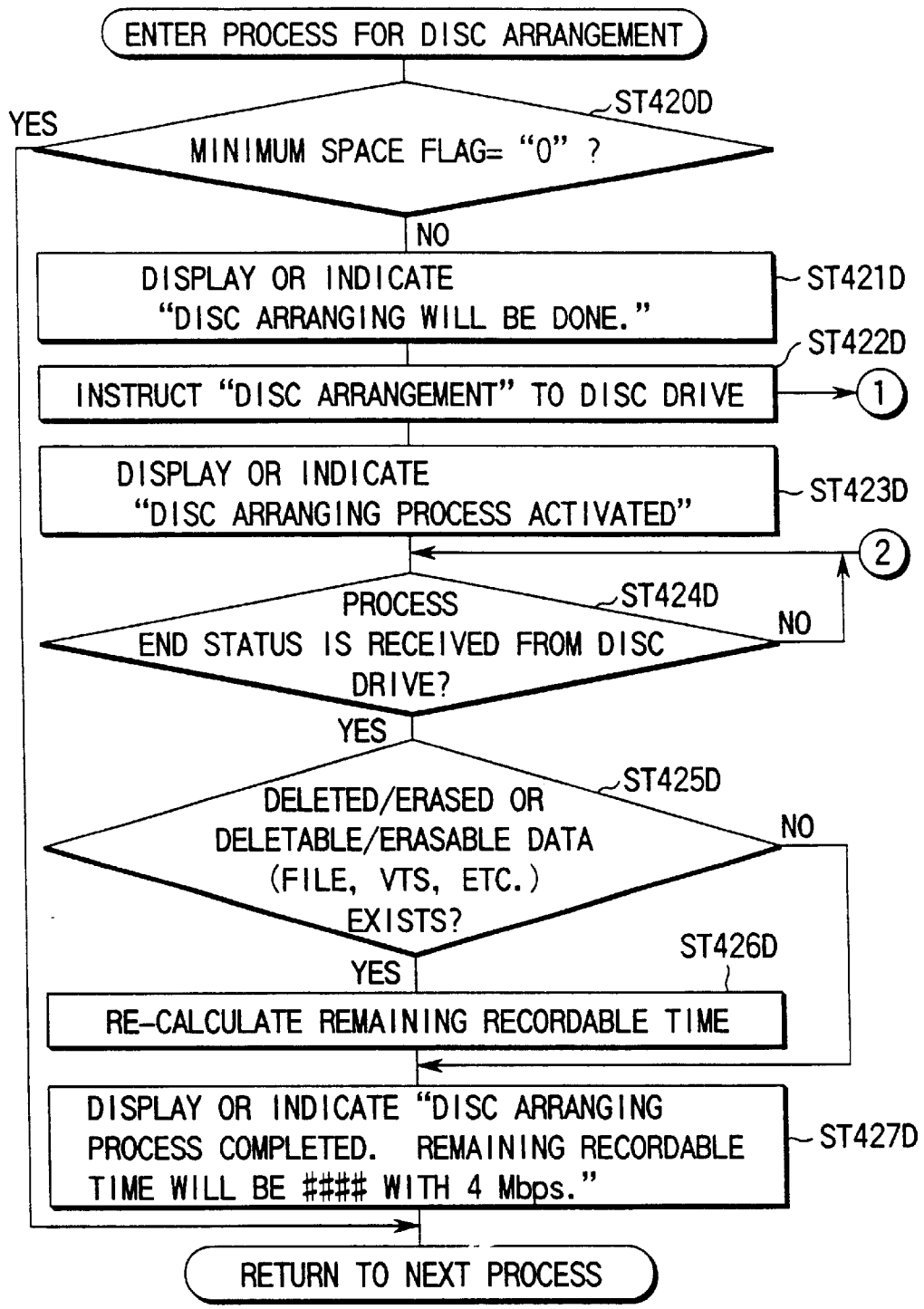
FIG. 39 is a flow chart for explaining processing on the MPU side for erasing unnecessary data from the disc to be recorded in the interruption processing shown in FIG. 35.
Figure 61:
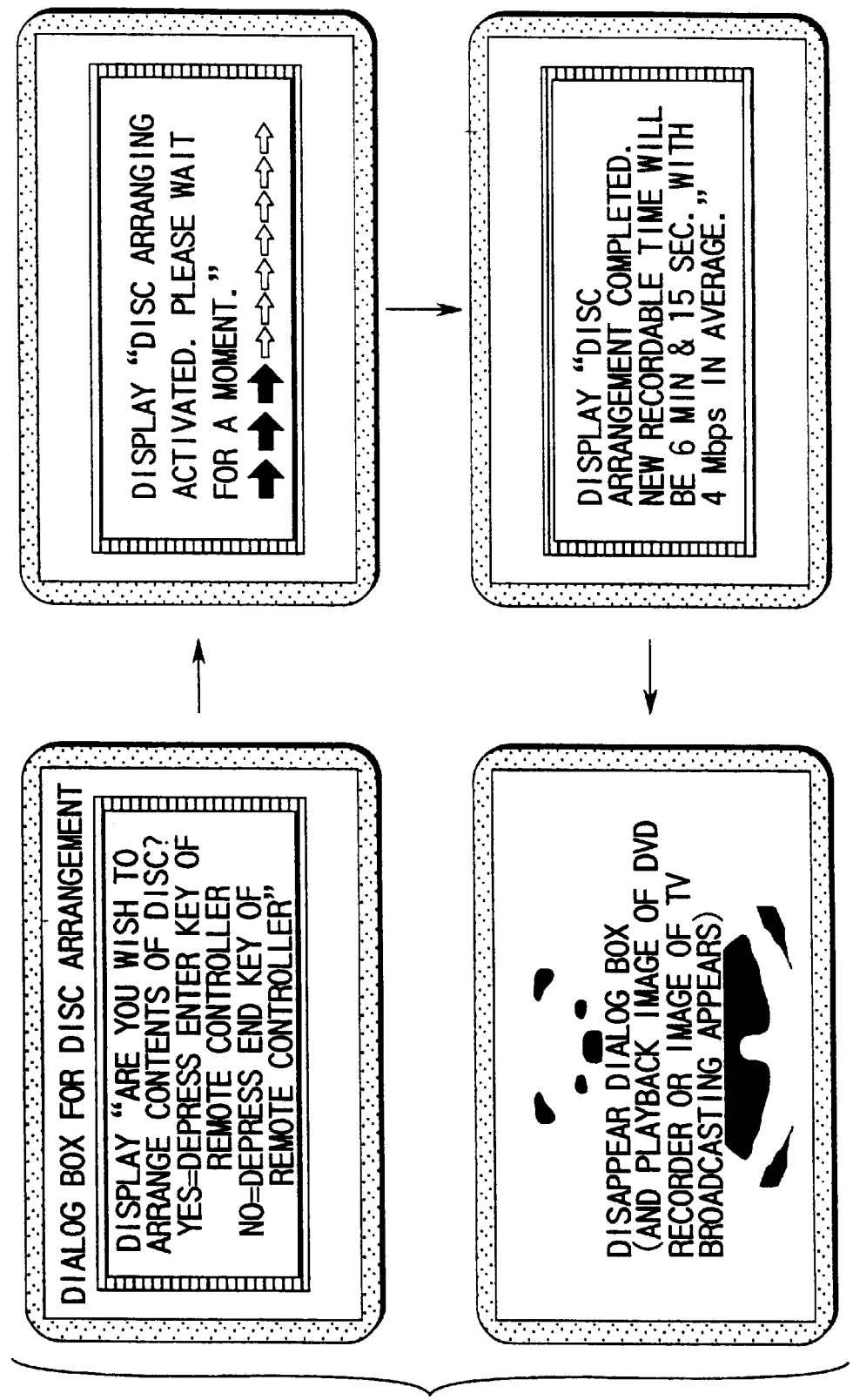
FIG. 61 is a view for explaining an example of dialog boxes displayed on the monitor during disc arranging (erasing unnecessary data)

FIG. 39 is a flow chart for explaining disc arranging processing (on the MPU side) for erasing played back data (data that has been completely played back previously) from the disc to be recorded, in the process for a small remaining amount shown in FIG. 34. FIG. 61 shows an example of dialog boxes displayed on the monitor during disc arranging (data erasure).

If the minimum space flag in FIG. 36 is "0" (YES in step ST420D), since disc 10 in which data is being recorded still has some remaining amount, the process in FIG. 39 ends, and the control returns to the next process.

On the other hand, if the minimum space flag is "1" (NO in step ST420D), it is determined that disc 10 in which data is being recorded will become full of data soon. In such case, MPU 30 pops up a dialog box (a kind of setup menu) shown in FIG. 61 on the monitor screen shown in FIG. 58.

When the user who watched the upper left dialog box in FIG. 61 turns on end key 5end on remote controller 5 in FIG. 28, the process in FIG. 39 ends and the control returns to the next process (not shown in the flow chart in FIG. 39).

When the user who watched the upper left dialog box in FIG. 61 turns on enter key 5s on remote controller 5 in FIG. 28, the control enters a disc arranging mode to OSD-display, e.g., a message "disc arranging will be done" (step ST421D).

After that a disc arranging instruction is sent to disc drive 32 in FIG. 26 (step ST422D), and OSD display with the contents exemplified on the upper right dialog box in FIG. 61 is made until the process on the disc drive 32 side is completed (step ST423D).

Figure 40:
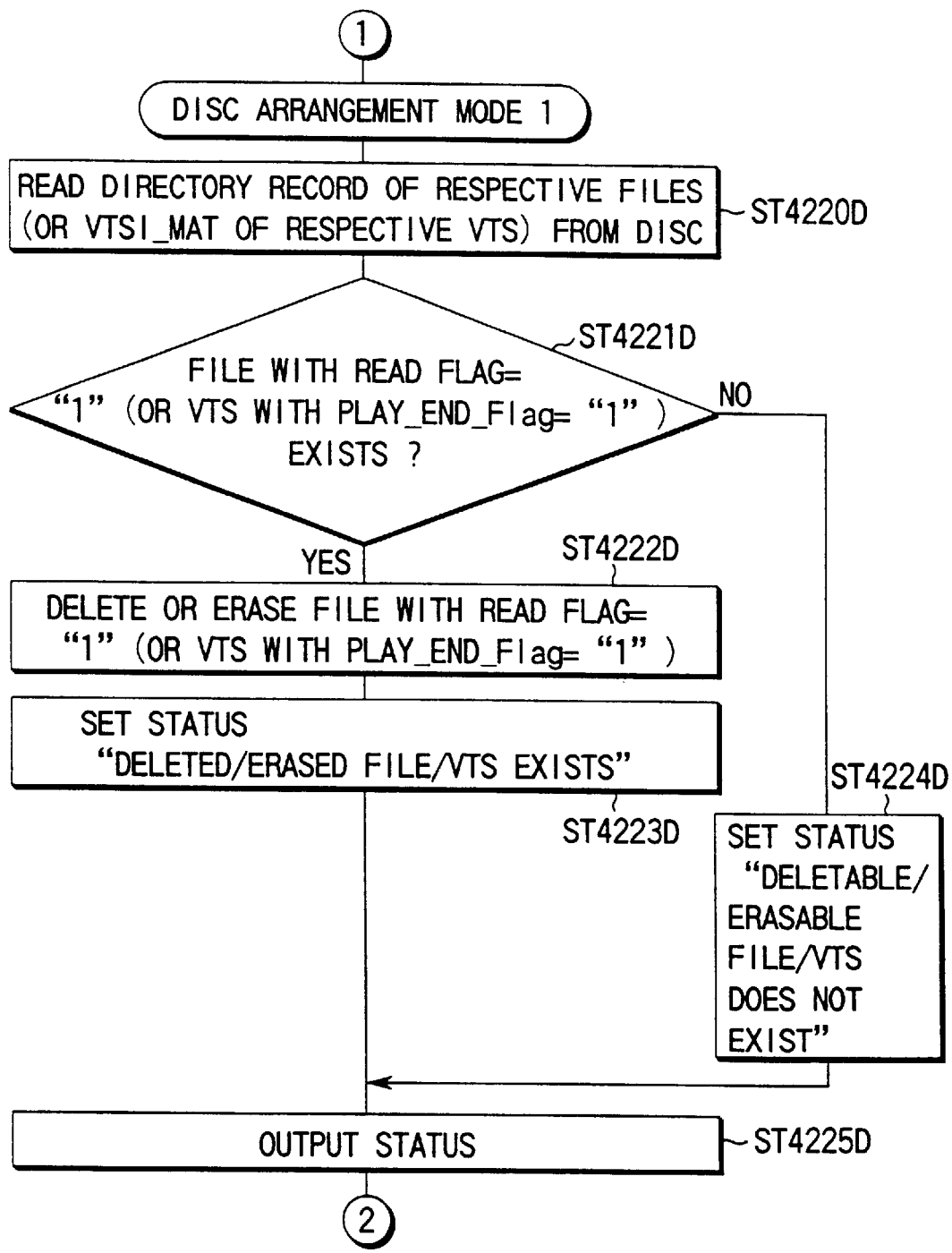
FIG. 40 is a flow chart for explaining an example of processing on the disc drive side for erasing unnecessary data from the disc to be recorded in the processing shown in FIG. 39.

The process (disc arranging mode 1) on the disc drive 32 side is as shown in, e.g., FIG. 40.

From disc 10 set in disc drive 32, the directory record (FIG. 8) of files (video title set files in FIG. 7) recorded on disc 10 or the management table (VTSI_MAT in FIG. 19) of video title sets is read (step ST4220D in FIG. 40).

It is checked if the read directory record includes a read flag "1" indicating completion of playback (or read video title set information management table VTSI_MAT includes PLAY_END Flag "1" indicating completion of playback) (step ST4221D).

If at least one file or VTS with a read flag "1" or PLAY_END Flag "1" is found (YES in step ST4221D), disc drive 32 (more particularly, an internal microcomputer (not shown) of drive 32) deletes or erases the file or VTS with a read flag "1" or PLAY_END Flag "1" (step ST4222D). Then, status "erased file/VTS exists" is set (step ST4223D), and is output to MPU 30 in FIG. 26 (step ST4225D).

The contents of the file or VTS erased in step ST4222D are not actually erased at that time; the file or VTS is merely set in a state capable of an overwrite. If recording continues, recording data is overwritten on the erased data area. With this overwrite, the erased file or VTS is actually erased.

If no file or VTS with a read flag "1" or PLAY_END Flag "1" is found (NO in step ST4221), status "erasable file or VTS does not exist" is set (step ST4224D) and is output to MPU 30 in FIG. 26 (step ST4225D).

MPU 30 in FIG. 26 waits for status (ST4225D in FIG. 40) sent from disc drive 32 (NO in step ST424D in FIG. 39). Whether or not data is erasable (erasable file or VTS) can be detected based on the contents of that status.

If erased or erasable data exists (YES in step S425D), MPU 30 re-calculates the remaining recordable. time of disc 10 set in disc drive 32 at that time (step ST426D). This remaining time calculation is done in the same manner as that in step ST422B in FIG. 37.

After that, OSD display with the contents exemplified on the lower right dialog box in FIG. 61 is made (step ST427D).

If erased or erasable data is found in step ST425D, since the free space of disc 10 increases in correspondence with the erased data, the re-calculated remaining time becomes longer than that before data erasure. In this case, the OSD display of the remaining time before disc arranging (e.g., 5 min with 4 Mbps) is modified to increase (e.g., display "5 min with 4 Mbps" is modified to the one "6 min 15 sec with 4 Mbps).

If no erased or erasable data is found in step ST425D (NO in step ST425D), OSD display of the remaining time (e.g., 5 min with 4 Mbps) corresponding to the remaining amount at that time is made in step ST427D without re-calculating the remaining time. In this case, the OSD display of the remaining time (5 min with 4 Mbps) uses the calculation result in step ST422B in FIG. 37.

Upon completion of disc arranging, the disc arranging dialog box is cleared, as exemplified on the lower left screen in FIG. 61, and an image which is being played back or received upon broadcasting is displayed on the monitor screen.

Figure 41:
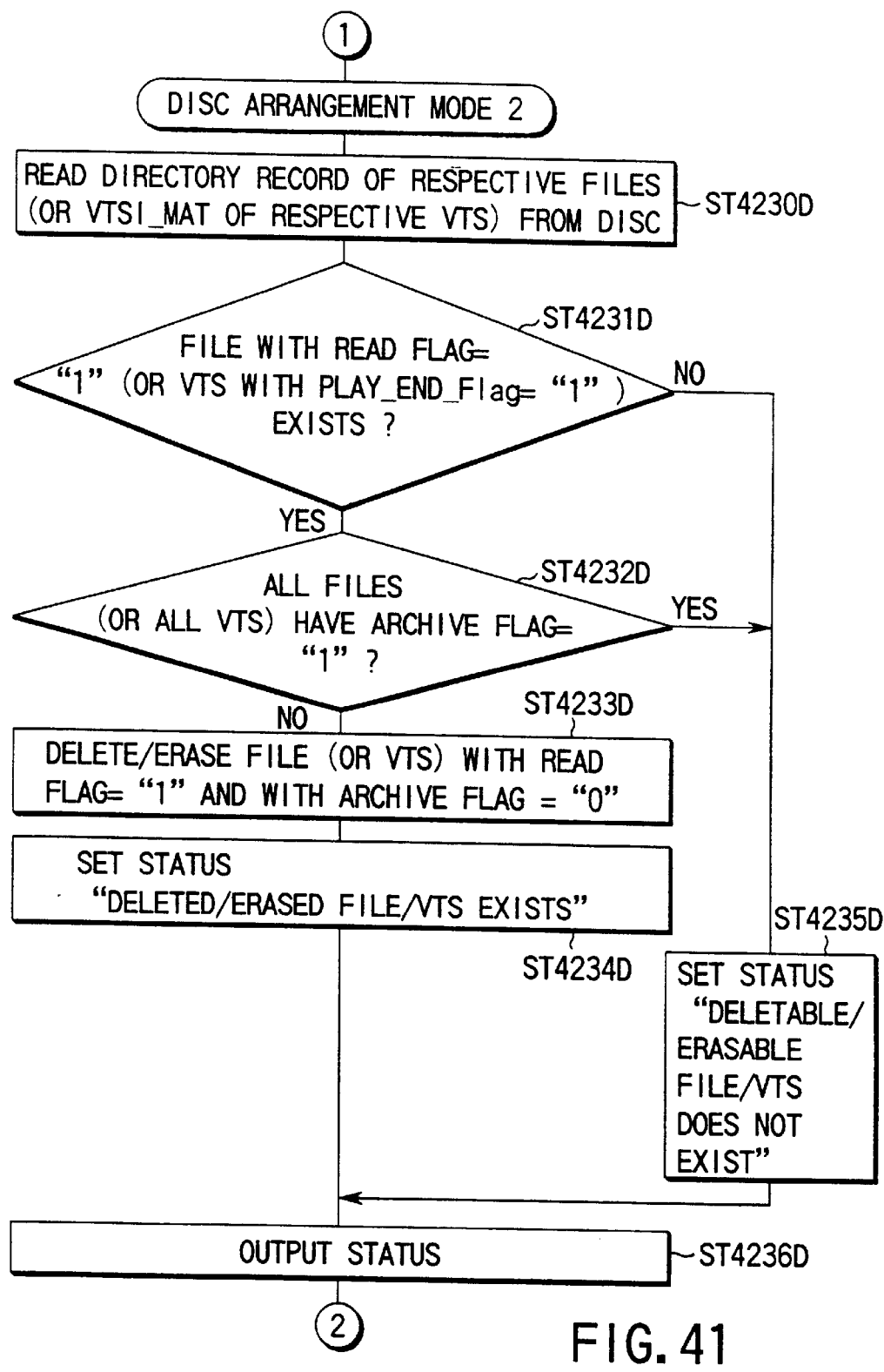
FIG. 41 is a flow chart showing another example of processing on the disc drive side for erasing unnecessary data from the disc to be recorded in the processing shown in FIG. 39.

FIG. 41 shows another example (a modification of FIG. 40) of the process on the disc drive side for erasing unnecessary data from the disc to be recorded, in the disc arranging process shown in FIG. 39.

The process (disc arranging mode 2) on the disc drive 32 side shown in FIG. 41 is as follows.

From disc 10 set in disc drive 32, the directory record (FIG. 8) of files recorded on disc 10 or the management table (VTSI_MAT in FIG. 19) of video title sets is read (step ST4230D).

It is checked if the read directory record includes a read flag "1" indicating completion of playback (or read video title set information management table VTSI_MAT includes PLAY_END Flag "1" indicating completion of playback) (step ST4231D).

If at least one file or VTS with a read flag "1" or PLAY_END Flag "1" is found (YES in step ST4231D), it is checked if the read directory record or video title set information management table VTSI_MAT includes an archive flag "1" indicating permanent keep (or erase error protection) (step ST4232D).

If at least one file or VTS with a read flag "1" or PLAY_END Flag "1" is found (YES in step ST4231D) and the file or VTS with a read flag "1" or PLAY_END Flag "1" has no archive flag "1" (i.e., includes at least one archive flag "0") (NO in step ST4232D), disc drive 32 executes the following process. That is, disc drive 32 erases the file or VTS with a read flag "1" or PLAY_END Flag "1", and archive flag "0" (step ST4233D). Then, status "erased file/ VTS exists" is set (step ST4234D), and is output to MPU 30 in FIG. 26 (step ST4236D).

On the other hand, if no file or VTS with a read flag "1" or PLAY_END Flag "1" is found (NO in step ST4231D), or if the file or VTS with a read flag "1" or PLAY_END Flag "1" includes an archive flag "1" (YES in step ST4232D), status "erasable file or VTS does not exist" is set (step ST4235D) and is output to MPU 30 in FIG. 26 (step ST4236D).

During disc arranging shown in FIGS. 39 to 41, recording onto disc 10 is suspended. During this interval, a recording program (e.g., TV broadcast program) input to the DVD video recorder shown in FIG. 26 is kept stored in temporal storage 34.

Upon completion of disc arranging shown in FIGS. 39 to 41, if the free space of disc 10 increases and disc 10 is ready to continue recording, recording on disc 10 is restarted while reading out contents stored in temporal storage 34 (or hard disc). For example, assume that disc arranging shown in FIG. 39 is started at 9:58:30 pm, Dec. 12, 1997, disc arranging is completed at 9:58:49, and recording is restarted at 9:58:50. In this case, a recording program after 9:58:30 recorded on temporal storage 34 proceeds to be recorded on disc 10.

In such case, temporal storage 34 serves as a recording time shift means for 20 sec. More specifically, even when an actual recording program ends at 10:00:00, recording on disc 10 proceeds until 10:00:20. As a result, even when a recording blank (20 sec) is produced by disc arranging from 9:58:30 to 9:58:50, the program which ended at 10:00:00 can be completely recorded without interrupting the contents broadcasted during that interval.

Alternatively, if disc drive 32 shown in FIG. 26 is capable of high-speed recording, the delay time used for disc arranging may be recovered during the remaining recording time (to catch up the normal recording pace). In such case, recording on disc 10 can end simultaneously with the end of an actual recording program.

Note that recording may continue while forming a recording blank for 20 sec from 9:58:30 to 9:58:50, and the broadcast program from 9:58:30 to 9:58:50 stored in temporal storage 34 may be recorded on the corresponding blank on disc 10 after completion of broadcast at 10:00:00.

In this case, the start address of the head VOBU from 9:58:30 to 9:58:50 recorded as a blank on disc 10 is written in a DSI packet (FIG. 10) in last navigation pack 86 (FIG. 9) upon recording interruption at 9:58:30 (by automatic processing of MPU 30). Similarly, the start address of the head VOBU of recorded data after 9:58:50 is written in DSI of the navigation pack in the last VOBU from 9:58:30 to 9:58:50 recorded as a blank on disc 10 (by automatic processing of MPU 30).

Immediately after completion of disc playback until 9:58:30, VOBUs from 9:58:30, which are additionally recorded on a blank of disc 10 are played back. Immediately after playback of data until 9:58:50, which is additionally recorded on a blank of disc 10, VOBUs from 9:58:50 to 10:00:00 recorded on another location on disc 10 are played back.

That is, each video object unit VOBU has a control pack called navigation pack 86 at its beginning (FIG. 9), and navigation pack 86 contains data search information (DSI) that allows a data search in units of video object units VOBU.

The above-mentioned "joint playback of temporally discontinuous recording program portions" is a merit obtained since recording data processed by the DVD video recorder of the present invention always has navigation pack 86 including data search information DSI at the beginning of each recording unit (VOBU). In addition, since recording medium 10 of the present invention is a disc and the access time can be shortened, the user need not wait in a jittery mood at the joint upon executing "joint playback of temporally discontinuous recording program portions", even when the recording locations are physically separated from each other. (If disc drive 32 has higher access speed, the user does not notice the joint.)

Figure 42:
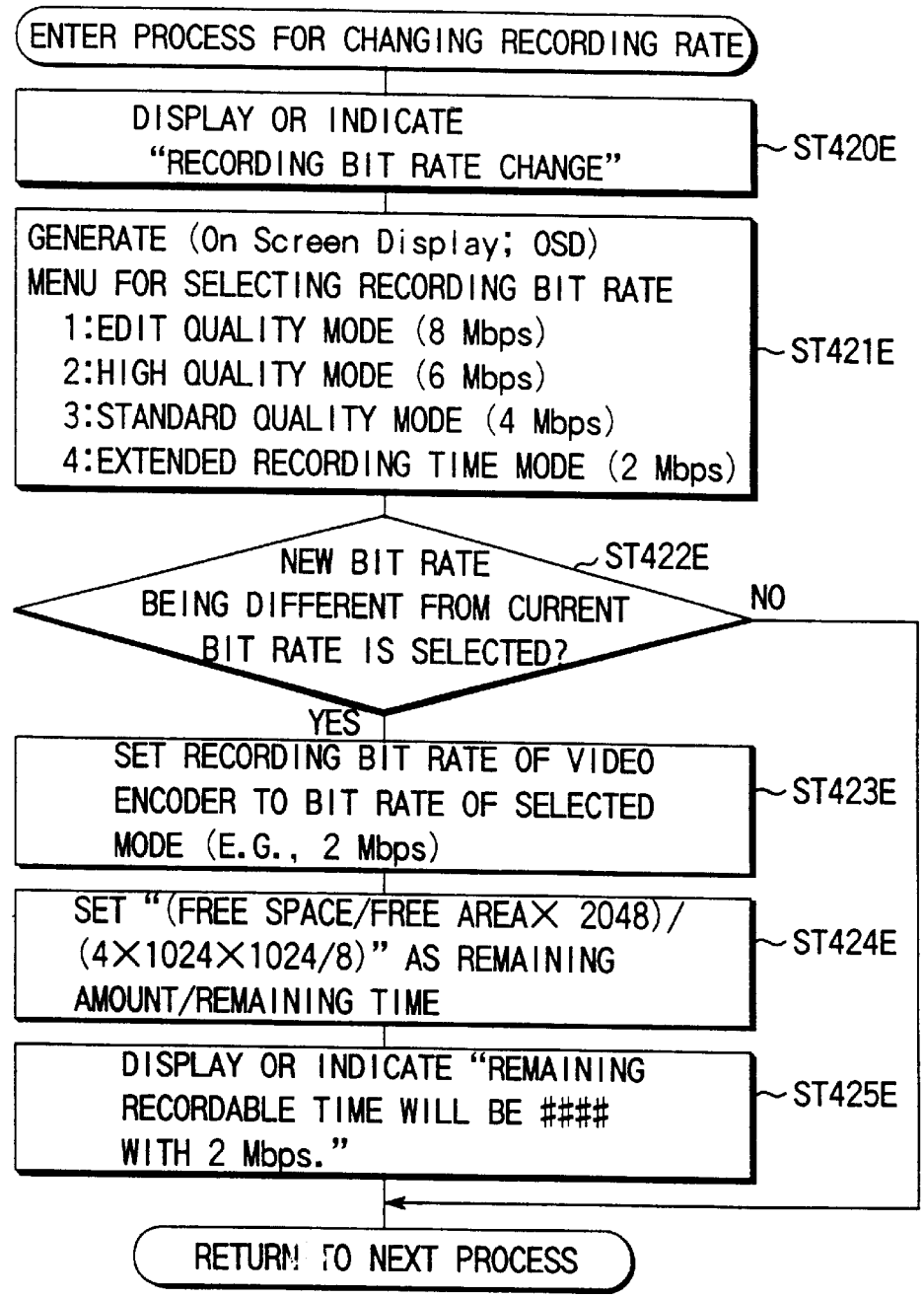
FIG. 42 is a flow chart for explaining processing for changing the recording bit rate of recording (MPEG2) in accordance with the required picture quality in the interruption processing shown in FIG. 35.
Figure 59:
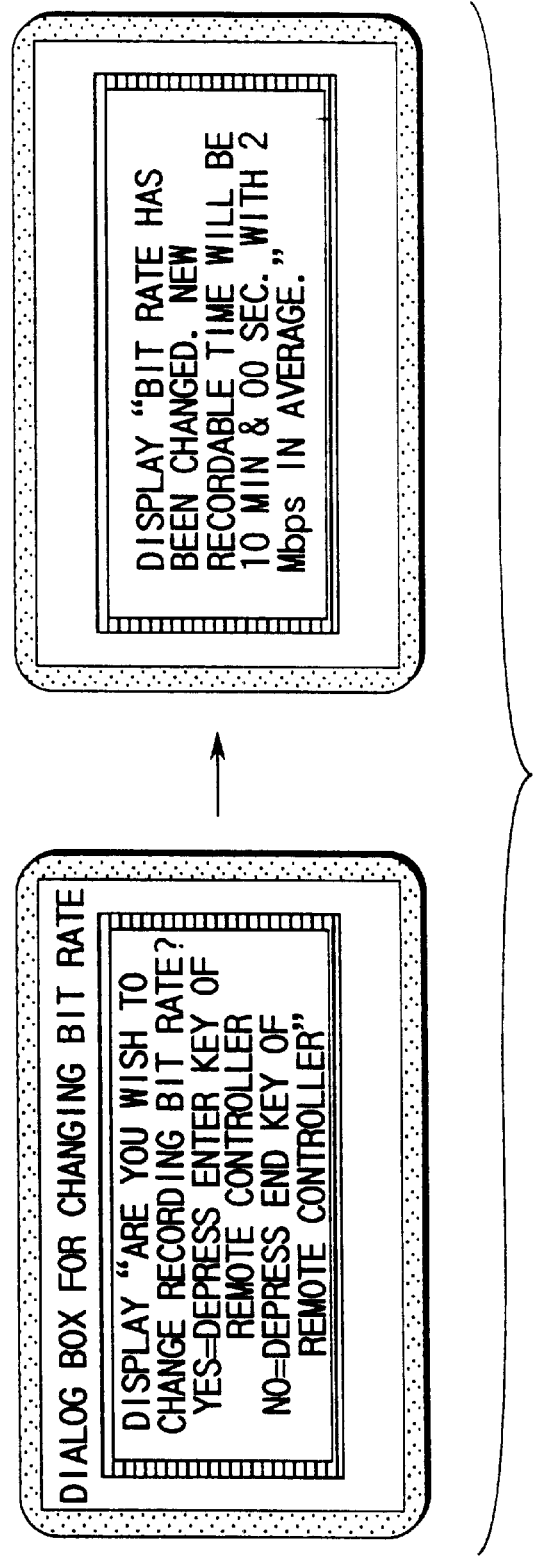
FIG. 59 is a view for explaining an example of a dialog box displayed on the monitor upon changing the average bit rate for recording.

FIG. 42 is a flow chart for explaining the process for changing the recording rate (average bit rate) of recording (MPEG2) in correspondence with required picture quality. This recording rate changing process is manually set by the user in "initial setting for recording" step ST20 in FIG. 34. FIG. 59 shows an example of dialog boxes OSD-displayed on the monitor screen upon changing the average bit rate for recording.

Assume that the user has simultaneously pressed menu key 5n and OSD key 5osd of those on remote controller 5 shown in FIG. 28. In response to this key combination, the left dialog box in FIG. 59 pops up on the monitor screen in FIG. 58 (step ST420E).

Upon depression of enter key 5s on remote controller 5, the left dialog box in FIG. 59 disappears, and selectable bit rates are OSD-displayed as "menu for selecting a recording bit rate" instead (step ST421E). Upon depression of end key 5end on remote controller 5, the left dialog box in FIG. 59 disappears, and the control returns to the state before the beginning of the process in FIG. 42.

The menu for selecting a recording bit rate includes edit quality mode 1 that uses the highest bit rate (8 Mbps) to minimize deterioration of picture. quality resulting from dubbing, high quality mode 2 that uses a bit rate (6 Mbps) which can assure high recording quality for a recording purpose that does not require repetitive dubbing, standard quality mode 3 that uses a bit rate (4 Mbps) which can obtain sufficiently high picture quality for a normal recording purpose, and extended recording time mode 4 that uses a bit rate (2 Mbps) which allows extended time recording although picture quality deteriorates more or less.

When the user adjusts the cursor position at one of modes 1 to 4 using cursor key 5q on remote controller 5, and then presses enter key 5s, the bit rate of the mode at the cursor position is selected as an average recording rate for MPEG2 recording.

Assume that the bit rate before the beginning of the process in FIG. 42 is 4 Mbps, and the user selects the extended recording time mode (2 Mbps) from the menu in step ST421E. In this case, since the bit rate different from the current one is selected (YES in step ST422E), the average transfer rate (recording bit rate) of V encoder 53 in FIG. 26 is set at that (2 Mbps) of the selected extended recording time mode (step ST423E). Then, the estimated remaining time corresponding to the current free space is calculated using the new bit rate (2 Mbps) (step ST424E). This calculation is made in the same manner as that in step ST422B in FIG. 37.

After the calculation result of the remaining time at the new bit rate (2 Mbps) is obtained, the new bit rate (2 Mbps) and the remaining time (estimated value) are OSD-displayed, as indicated by the right dialog box shown in FIG. 59 (step ST425E). This OSD display is generated instead of the menu in step ST421E after the menu is cleared, and may automatically disappear after an elapse of a predetermined period of time (e.g., 10 sec). Alternatively, instead of automatic disappearance, the dialog box in FIG. 59 may be cleared at an arbitrary timing upon depression of OSD key 5osd on remote controller 5 (FIG. 28).

When the user knows beforehand the correspondence between the average recording rates and picture quality modes (an instruction manual of the DVD video recorder and/or the menu display in step ST421E), the OSD message generated in step ST425E may be "remaining time is . . . in extended recording time mode" without using the average bit rate value.

On the other hand, when the bit rate before the beginning of the process in FIG. 42 is 4 Mbps and the user selects the standard quality mode (4 Mbps) from the menu in step ST421E, since a bit rate equal to the current one is selected (NO in step ST422E), the menu in step ST421E disappears (the dialog box in FIG. 59 disappears before that), and the control returns to the state (e.g., step ST20 in FIG. 34) before the beginning of the process in FIG. 42.

Figure 43:
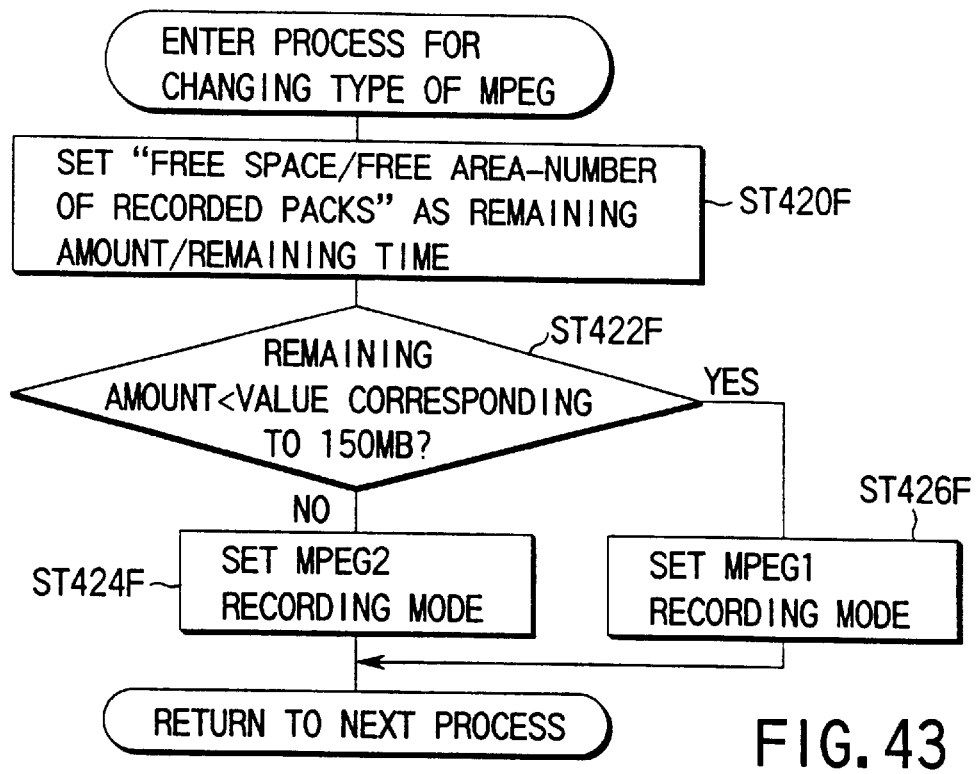
FIG. 43 is a flow chart for explaining processing for switching the recording mode to a low picture quality mode (MPEG1) with a relatively high compression rate when the remaining amount of the disc which is undergoing recording in a high picture quality mode (MPEG2) becomes short as compared to the prospective remaining recording time in the interruption processing shown in FIG. 35.

FIG. 43 is a flow chart for explaining the process for switching the recording mode to a low quality mode (MPEG1) with a relatively high compression rate when the remaining amount of the disc becomes insufficient as compared to the prospective remaining recording time during recording in the high quality mode (MPEG2) in the processing shown in FIG. 35.

The remaining amount is calculated by the same method as in step ST420A in FIG. 36 (step ST420F). If the calculated remaining amount is equal to or larger than the predetermined value (e.g., 150 Mbytes or an equivalent value) (NO in step ST422F), recording proceeds in the high quality mode (MPEG2) (step ST424F).

On the other hand, if the calculated remaining amount is smaller than the predetermined value (150 Mbytes) (YES in step ST422F), the recording mode (moving picture compression method) is changed from MPEG2 to MPEG1, and recording continues (step ST426F). MPEG1 allows longer time recording with the same space since it can set higher compression rate than MPEG2, although picture quality deteriorates as compared to MPEG2.

Note that a method of extending the recording time by lowering the average bit rate while fixing the recording mode at MPEG2, and a method of extending the recording time by switching the recording mode from MPEG2 to MPEG1 have different playback picture qualities obtained as their results.

That is, if the DVD video format is complied with, MPEG2 can assure a horizontal resolution of 500 lines in NTSC even when the average bit rate is lowered. However, when the recording mode is switched to MPEG1, the horizontal resolution is nearly halved. If the recording area used per unit time remains the same, MPEG2 that sets a relatively low average bit rate can consequently obtain higher picture quality than MPEG1 that sets a relatively high average bit rate.

For example, a certain high-quality program is recorded on two or three master discs (first recording discs) or a hard disc having an amount as large as 5 to 10 GB at a high bit rate (6 to 8 Mbps). After that, using the personal computer in FIG. 33, the contents of the master discs are edited (to cut commercial breaks, unnecessary comments, and the like) and are subjected to bit rate reduction for one to two passes (by pre-encoding described in the paragraphs of encoder 50 in FIG. 26) to lower the average bit rate to 2 to 3 Mbps. In this way, the recorded contents of two or three master discs can be stored in a single copy disc without large picture quality drop of the master discs (i.e., while maintaining the horizontal resolution of 500 lines). Creation of such high-quality copy disc is impossible if MPEG1 is used (that is, the high resolution of the master discs cannot be maintained).

On the other hand, when importance is attached to the recording time rather than picture quality (e.g., when a long-time sport program is stored in a single DVD-RW disc), the pre-encoded moving picture data can be recorded by MPEG1.

Figure 44:
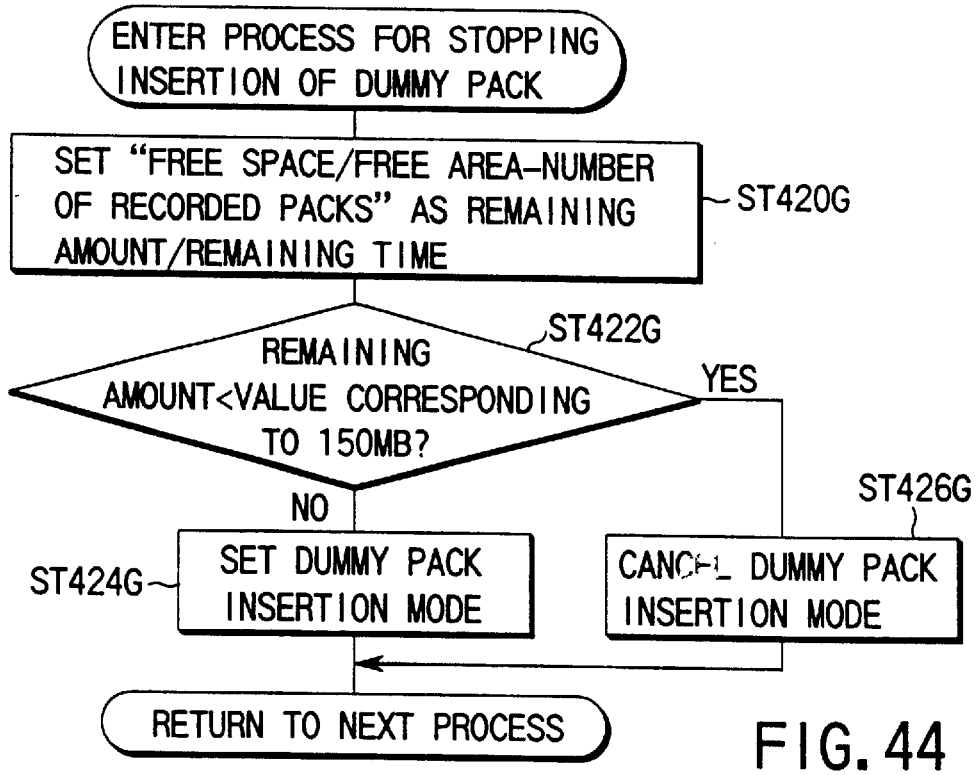
FIG. 44 is a flow chart for explaining processing for extending the moving picture recording area by canceling recording of a dummy pack when the remaining amount of a disc which is undergoing moving picture recording together with a dummy pack for editing becomes short as compared to the prospective remaining recording time in the interruption processing shown in FIG. 35.

FIG. 44 is a flow chart for explaining the process for expanding the moving picture recording area by canceling dummy pack recording when the remaining amount of disc 10 becomes insufficient as compared to the prospective remaining recording time during recording of a moving picture together with dummy packs for editing, in the processing shown in FIG. 35.

The remaining amount is calculated by the same method as in step ST420A in FIG. 36 (step ST420G). If the calculated remaining amount is equal to or larger than the predetermined value (e.g., 150 Mbytes or an equivalent value) (NO in step ST422G), recording proceeds by MPEG2 while inserting dummy packs into the respective video object units VOBU (85 in FIG. 9) (step ST424G).

On the other hand, if the calculated remaining amount is smaller than the predetermined value (150 Mbytes) (YES in step ST422G), dummy pack insertion into each VOBU is canceled to continue recording (step ST426G).

Assuming that the average bit rate for recording is set at 4 Mbps, and the average time of the recording contents stored in each VOBU 85 in FIG. 9 is 0.5 sec, data for 2 Mbits (256 kbytes) in average is consumed per VOBU. Since the size of each pack that forms VOBU 85 is 2,048 bytes (2 kbytes), one VOBU is formed by 128 packs in average (since the number of packs that form each VOBU varies depending on the pattern to be recorded, "128 packs" are an approximate average value).

As has been described above with reference to FIG. 12, a dummy pack is a wildcard pack that can become any of an audio, sub-picture, and video packs depending on its purpose. How many dummy packs are automatically inserted per VOBU is determined in initial setting in step ST20 in FIG. 34. One or a plurality of different numbers of dummy packs to be automatically inserted are prepared as default values by the manufacturer of the DVD video recorder in FIG. 26, and the user can input an arbitrarily number of dummy packs.

If the number of dummy packs to be automatically inserted is set to be around 28 packs in one VOBU (128 packs in average), the process for canceling dummy pack insertion (step ST426G) in FIG. 44 can extend the subsequent recordable time by about 28% (Only 100 packs per VOBU can be used for recording video data and the like before canceling, but 128 packs per VOBU can be used after canceling).

Figure 45:
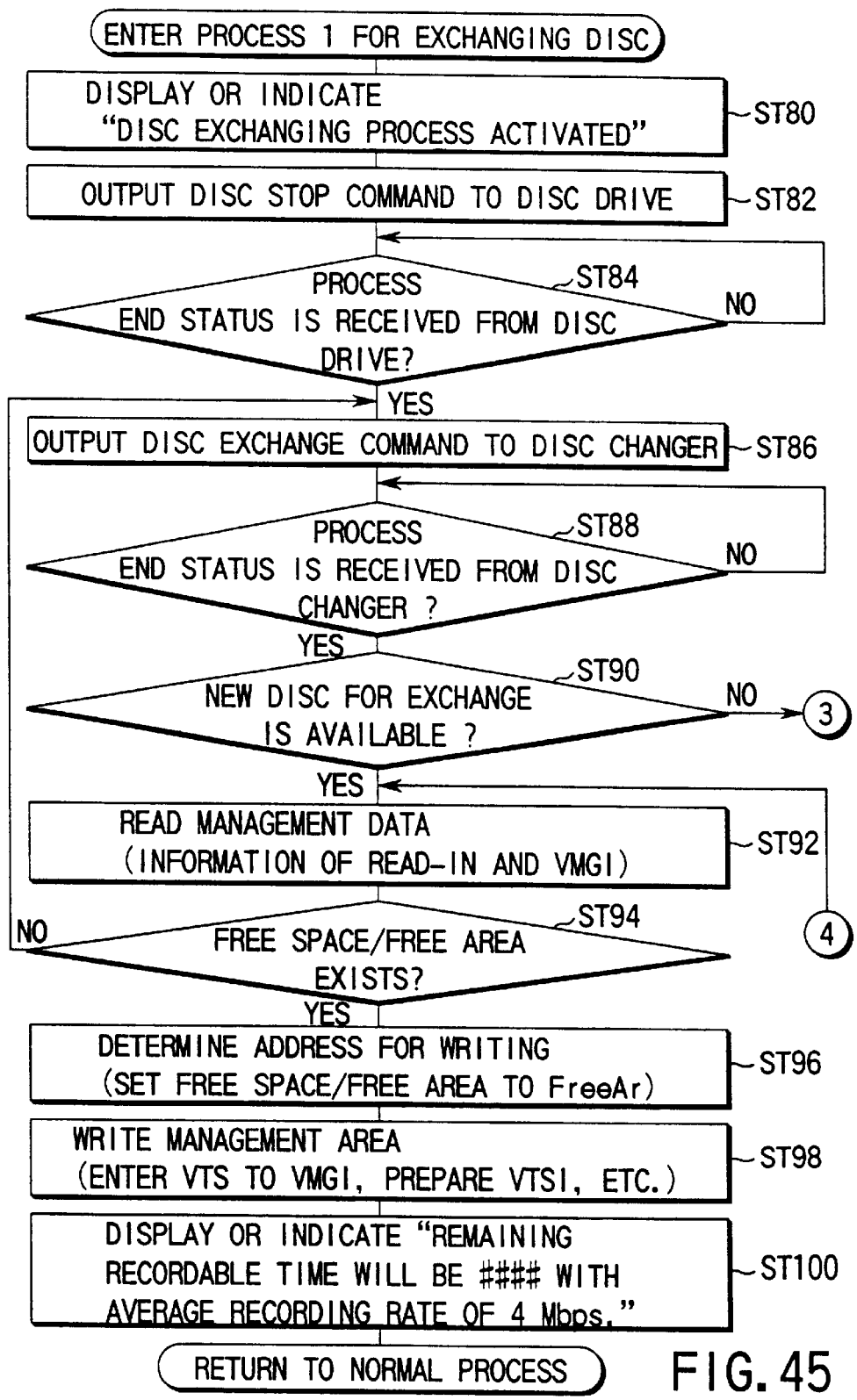
FIG. 45 is a flow chart for explaining an example of processing for automatically exchanging a recording disc using a disc changer in the interrupt processing shown in FIG. 35.
Figure 60:
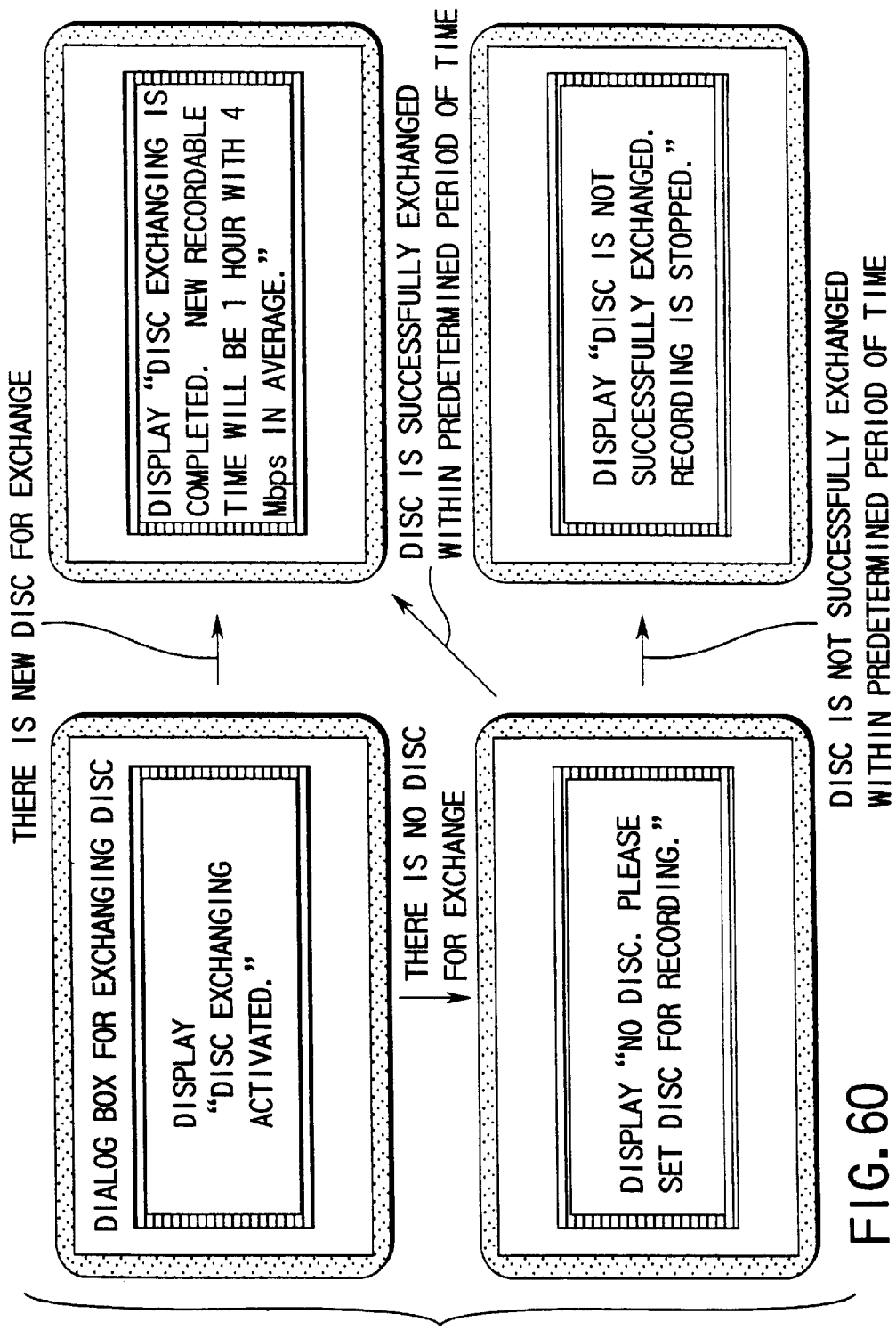
FIG. 60 is a view for explaining an example of dialog boxes displayed on the monitor during exchange of a disc.

FIG. 45 is a flow chart for explaining an example of a process for automatically exchanging a recording disc using the disc changer, in the processing shown in FIG. 35. FIG. 60 shows an example of dialog boxes displayed on the monitor during exchange of the disc.

The automatic disc exchange process in FIG. 45 is premised on that the DVD video recorder in FIG. 26 comprises disc changer 100 that can automatically set a plurality of DVD-RAM discs in disc drive 32 in turn. (When large-amount hard disc 1018 shown in FIG. 33 is partitioned in correspondence with the number of DVD-RAM discs, and these partitions are used as a plurality of DVD-RAM discs, that hard disc 1018 can serve as virtual disc changer 100.)

The automatic disc exchange process in FIG. 45 can be executed as one of the processes for "small remaining amount" (ST30) when the remaining amount of disc 10 in which data is being recorded is smaller than the predetermined value.

That is, if the remaining amount of disc 10 in which data is being recorded is smaller than the predetermined value (e.g., 150 Mbytes (YES in step ST28 in FIG. 34), the control enters disc exchange process 1 in FIG. 45.

In this process, MPU 30 in FIG. 26 OSD-displays the upper left dialog box in FIG. 60 on the monitor screen in FIG. 58 (step ST80 in FIG. 45).

Subsequently, MPU 30 outputs a disc stop command of disc 10 which is being subjected to recording to disc drive 32 in FIG. 26 (step ST82). Upon reception of the disc stop command, a microcomputer (not shown) of disc drive 32 suspends recording on disc 10, stores end information in file management information VTSI, stores the address for writing upon suspending recording, stops rotation of disc 10, and sends back end status of that process to MPU 30.

Upon reception of the process end status (YES in step ST84), MPU 30 outputs a disc exchange command to disc changer 100 (step ST86).

Upon reception of the disc exchange command, the microcomputer (not shown) of disc changer 100 checks if DVD-RAM (DVD-RW) discs or DVD-R discs are set in disc changer 100. As a result, if one or more DVD-RW discs 10 are set, the microcomputer sends back process end status indicating this to MPU 30.

Upon reception of that process end status (YES in step ST88), MPU 30 checks based on the contents of the received status if one or more DVD-RAM (DVD-RW) discs or DVD-R discs are set in disc changer 100 (step ST90).

If it is determined that one or more DVD-RAM (DVD-RW) discs or DVD-R discs are set in disc changer 100 (YES in step ST90), MPU 30 reads management data from that disc (when two or more discs are set, a disc in a slot with a smaller disc slot number or a disc with a smaller disc ID) (step ST92).

Upon reading the management data, video manager information management table VMGI_MAT (FIG. 17) in video manager VMG on objective disc 10 is read first. If the table has no entry of FREE_SPACE indicating the free space, free space information written in physical format information (FIG. 6) in the lead-in area of objective disc 10 is then read out. In this case, the free space information in the lead-in area is written in field FREE_SPACE (byte position "46 to 49" in FIG. 17) of VMGI_MAT.

If the free space written in FREE_SPACE in VMGI_MAT is zero or insufficient (e.g., the remaining time corresponding to the free space of the disc is only 3 min although timer-programmed recording is expected to end 5 min later) (NO in step ST94), the disc is re-exchanged.

More specifically, MPU 30 outputs a disc exchange command to disc changer 100 again (step ST86). If a second new disc for exchange is available (YES in step ST90), management data is read out from that disc (step ST92). If the free space written in FREE_SPACE in VMGI_MAT of the second new disc for exchange is sufficient (for example, the remaining time calculated using the average recording rate used at that time is 10 min or more) (YES in step ST94), an address for writing (the head position of a free space) on second new disc 10 for exchange is determined based on the file management information, and a free space value corresponding to the free space information (FREE_SPACE) read from the management data (VMGI_MAT) of second new disc 10 for exchange is written in register "FreeAr" allocated on the RAM in MPU 30 (step ST96).

Then, data is written in the management area of second new disc 10 for exchange (step ST98). For example, video title set VTS corresponding to a program to be recorded is registered in video manager information VMGI and files that relate to this VTS are created.

After that, MPU 30 OSD-displays, e.g., a message "remaining recordable time will be 10 min at average recording rate of 4 Mbps" on the TV monitor (step ST100), and the control returns to the normal process. (e.g., a loop of steps ST24 to ST32 in FIG. 34).

Figure 46:
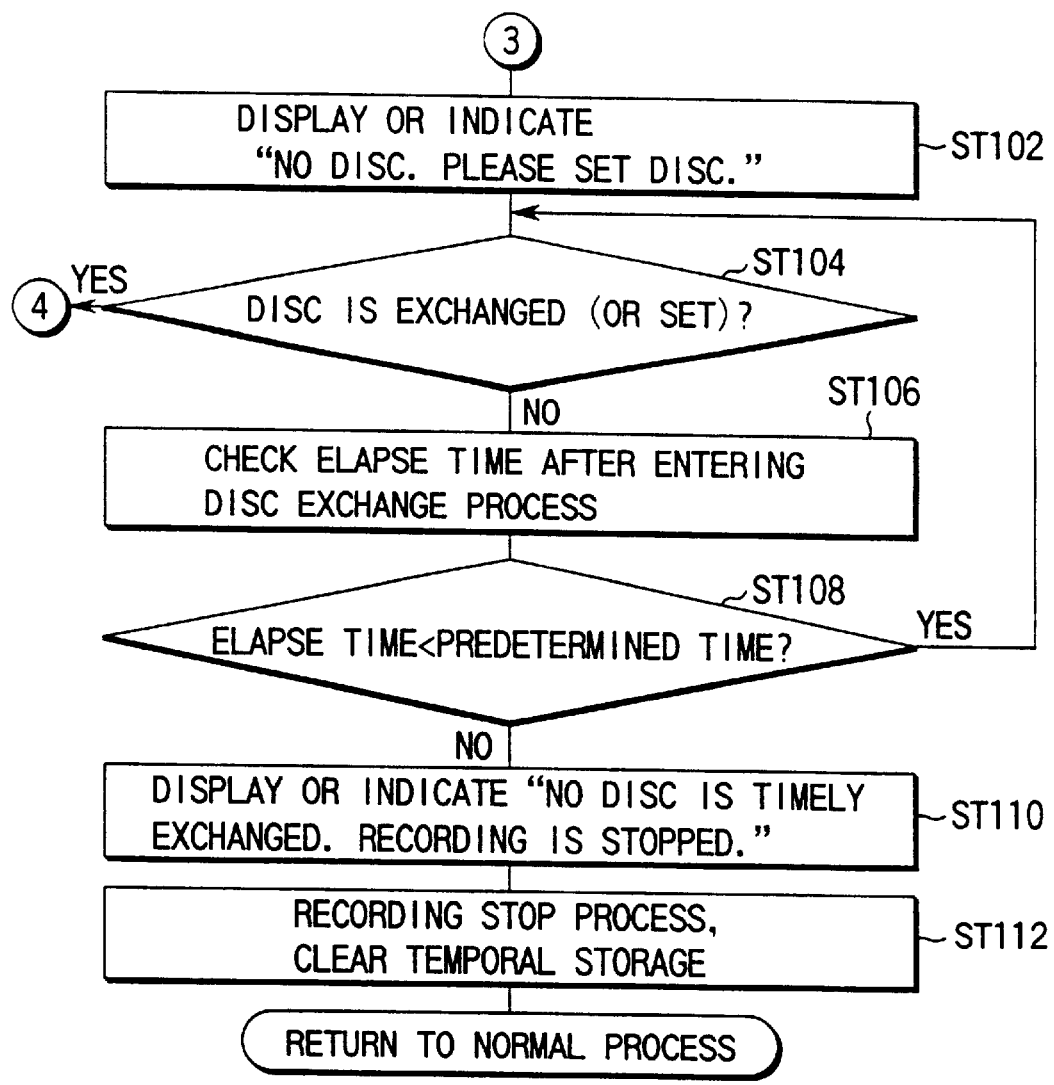
FIG. 46 is a flow chart for explaining processing when the disc changer has no new disc for exchange in the processing shown in FIG. 45.

FIG. 46 is a flow chart for explaining a process when no new disc for exchange is available in disc changer 100 in step ST90 in FIG. 45.

MPU 30 in FIG. 26 OSD-displays a dialog box (lower left one in FIG. 60) including a message for prompting the user to load a recording disc on the monitor screen in FIG. 58 if no new disc for exchange is available in disc changer 100 (or a disc loaded in disc changer 100 has no free space) (step ST102).

If the user sets disc 10 in disc changer 100 (YES in step ST104), the flow returns to step ST92 in FIG. 45 to check the free space of set disc 10 (step ST94). If set disc 10 has no free space (NO in step ST94), and no more new disc for exchange is available in disc changer 100 (NO in step ST90), the flow advances to step ST102 in FIG. 46 again.

The elapse time from when the control enters the disc exchange process in FIG. 45 until the control returns to the recording process loop (ST24 to ST32) in FIG. 34 (i.e., the elapse time from when it is detected that disc 10 is to be exchanged until new disc 10 that can be used to continue recording is set in disc drive 32 in FIG. 26) is measured by a timer (not shown) in microcomputer block 30 in FIG. 26. MPU 30 periodically monitors the time measurement value of this timer (step ST106 in FIG. 46).

If a time elapses before the user can find a new disc for exchange and the time measurement value of the timer exceeds a predetermined time (NO in step ST108), a message "disc is not successfully exchanged. Recording is stopped" is OSD-displayed, as exemplified by the lower right dialog box in FIG. 60 (step ST110).

Note that the predetermined time to be checked in step ST118 is determined on the basis of the time within which data can be reliably buffered on temporal storage 34 in FIG. 26 at the average bit rate at that time. For example, when the temporal storage 34 has an amount capable of buffering a recording program for at least 30 sec at 4 Mbps in average, the predetermined time for the average recording rate of 4 Mbps uses, e.g., 25 sec.

If the disc cannot be exchanged within the predetermined time, recording on disc 10 set in disc drive 32 in FIG. 26 at that time is stopped, and recording information buffered on temporal storage 34 is cleared (step ST112). When recording is stopped in such way, the lower right dialog box in FIG. 60 is OSD-displayed.

The recording stop process in step ST112 corresponds to detection of the "stop recording" input (YES in step ST24 in FIG. 34). In such case, the recording completion processing in step ST34 is executed to stop recording of the DVD video recorder in FIG. 26. With this recording completion processing in step ST34, the value upon determining "no free space" in step ST94 in FIG. 45 (i.e., zero or a value that becomes zero within a very short time) is written in FREE_SPACE (FIG. 17) in VMGI_MAT in DVD-RAM (or DVD-RW) disc 10 set in disc drive 32 at that time.

On the other hand, if new DVD-RAM (or DVD-RW) disc 10 is set in disc changer 100 (YES in step ST104 in FIG. 46) and that disc has a sufficient free space (YES in step ST94 in FIG. 45), the upper right dialog box in FIG. 60 is OSD-displayed by the subsequent processes in steps ST96 to ST100.

Figure 47:
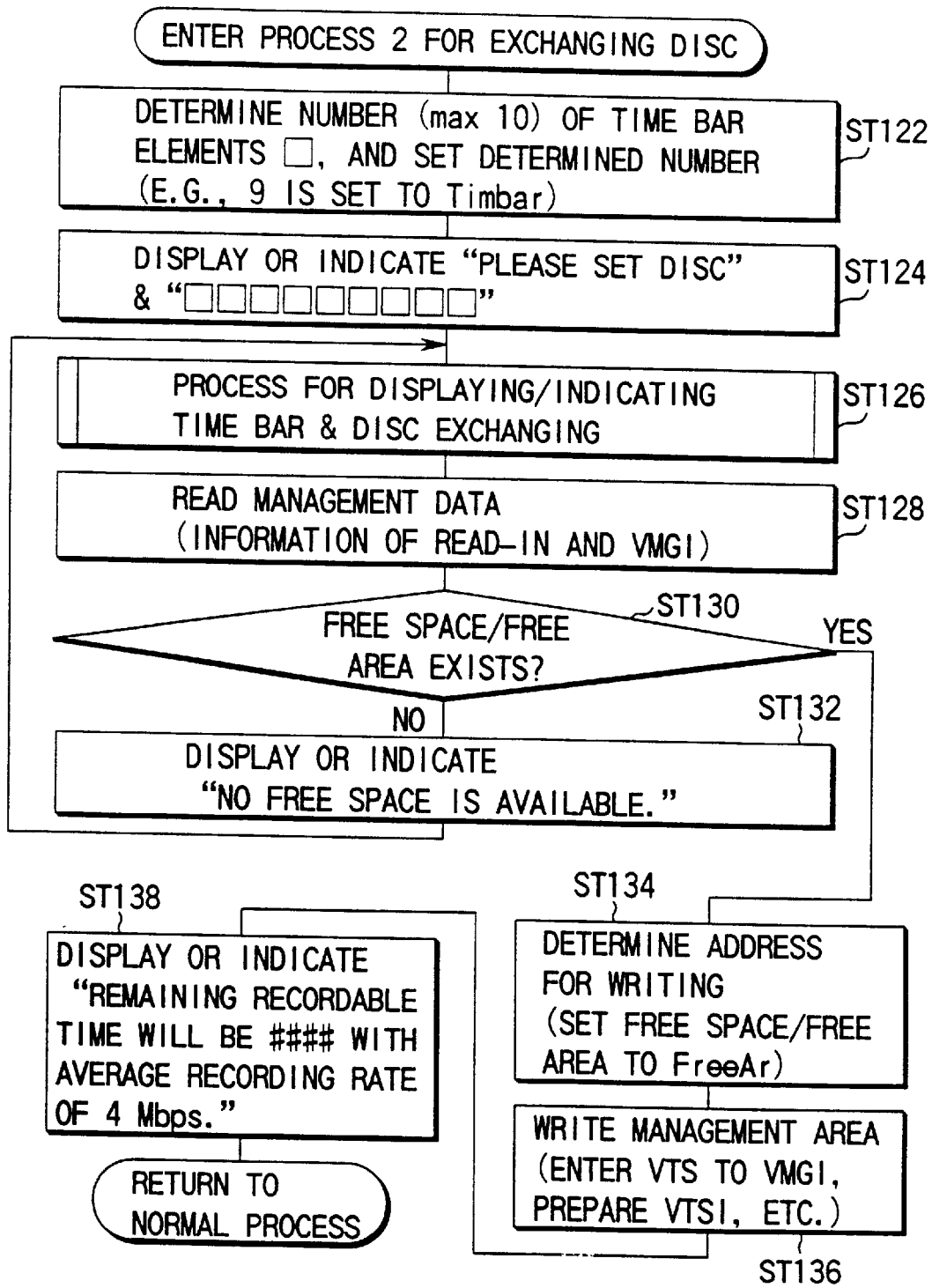
FIG. 47 is a flow chart for explaining an example of processing for manually exchanging a recording disc by the user in the interrupt processing shown in FIG. 35.
Figure 62:
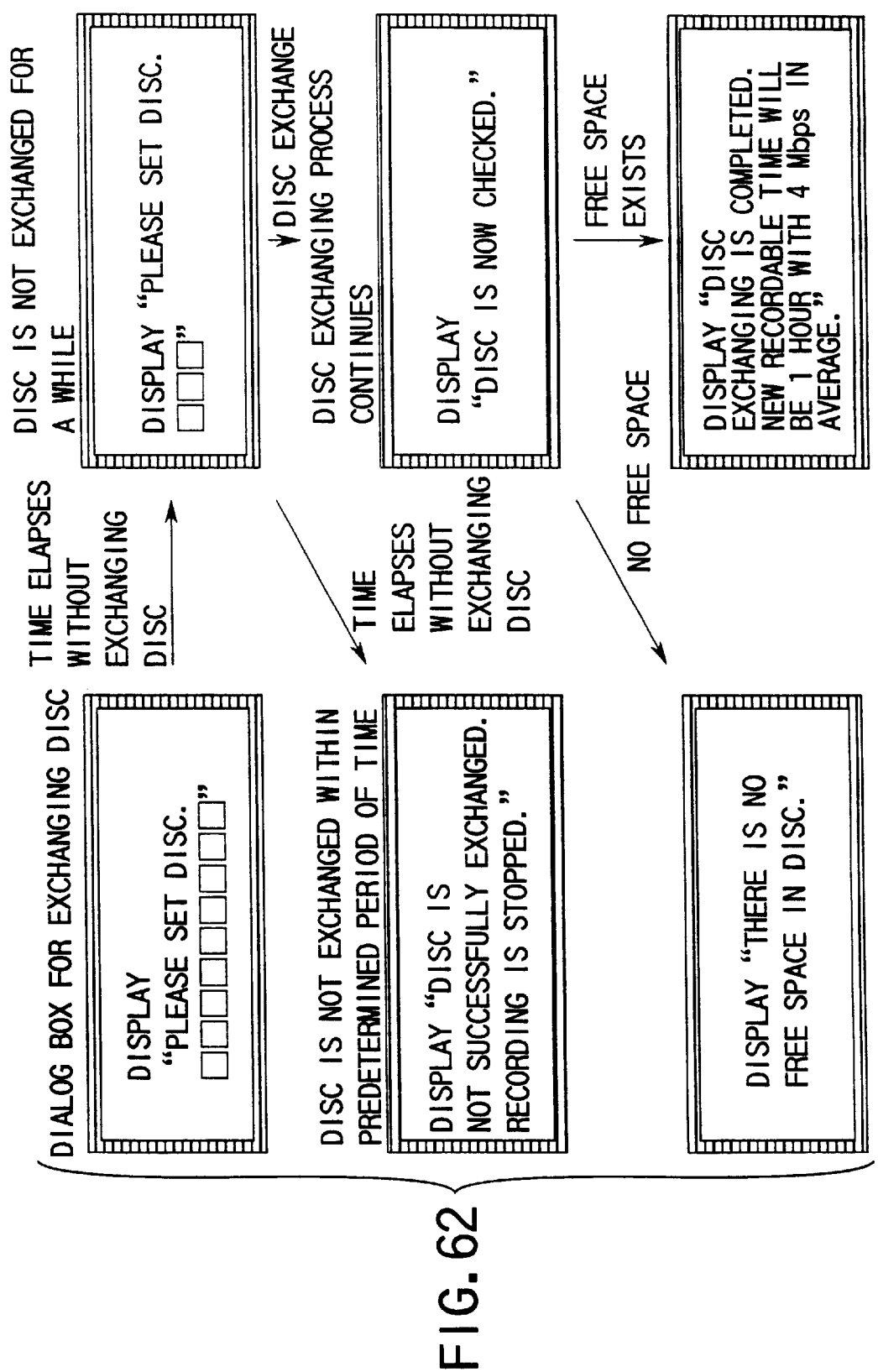
FIG. 62 is a view for explaining an example of dialog boxes for informing the user of an elapse of the disc exchange time and the like upon manually exchanging a disc by the user.

FIG. 47 is a flow chart for explaining an example of a process for manually exchanging a recording disc by the user. FIG. 62 shows an example of dialog boxes that inform the user of an elapse of the disc exchange time and the like upon manually exchanging the disc by the user.

The disc exchange process shown in FIG. 47 is used when the DVD video recorder shown in FIG. 26 comprises only disc drive 32 that processes disc 10 one by one, but no disc changer 100. Note that this process can also be used when no blank disc for exchange is available in the disc changer even when the recorder comprises disc changer 100.

The disc exchange process shown in FIG. 47 can be executed as one of the processes (ST30) for "small remaining amount" when the remaining amount of disc 10 in which data is being recorded becomes smaller than the predetermined value.

That is, if the remaining amount of disc 10 in which data is being recorded is smaller than the predetermined value (e.g., 150 Mbytes) (YES in step ST28 in FIG. 34), the control enters the disc exchange process shown in FIG. 47.

Upon entering this process, MPU 30 in FIG. 26 issues a disc stop command of disc 10 which is being subjected to recording to disc drive 32. Upon reception of the disc stop command, the microcomputer (not shown) of disc drive 32 suspends recording on disc 10, stores the address for writing upon suspending recording, stops rotation of disc 10, and sends back end status of that process to MPU 30.

Upon reception of the process end status, MPU 30 initially sets a time bar for informing the user of an elapse of a disc exchange time (step ST122). More specifically, register "Timebar" is allocated on the internal RAM of microcomputer block 30, and a parameter representing the time bar in this register "Timebar" (this time bar parameter has an upper limit (e.g., a maximum of "10"), and assume that "9" is used in initial setting in this case).

Upon completion of initial setting of the time bar, MPU 30 pops up a dialog box (e.g., the upper left one in FIG. 62) including a "time bar as a sequence of nine square marks □" on the monitor screen in FIG. 58, thus displaying a message and time bar that prompt the user to exchange the disc (step ST124). After that, the control enters a time bar process for shortening the "time bar as a sequence of nine square marks □" and the disc exchange process (step ST126). (Note that solid square marks are used in the drawing, but the specification uses open square marks □ as the time bar marks).

Figure 48:
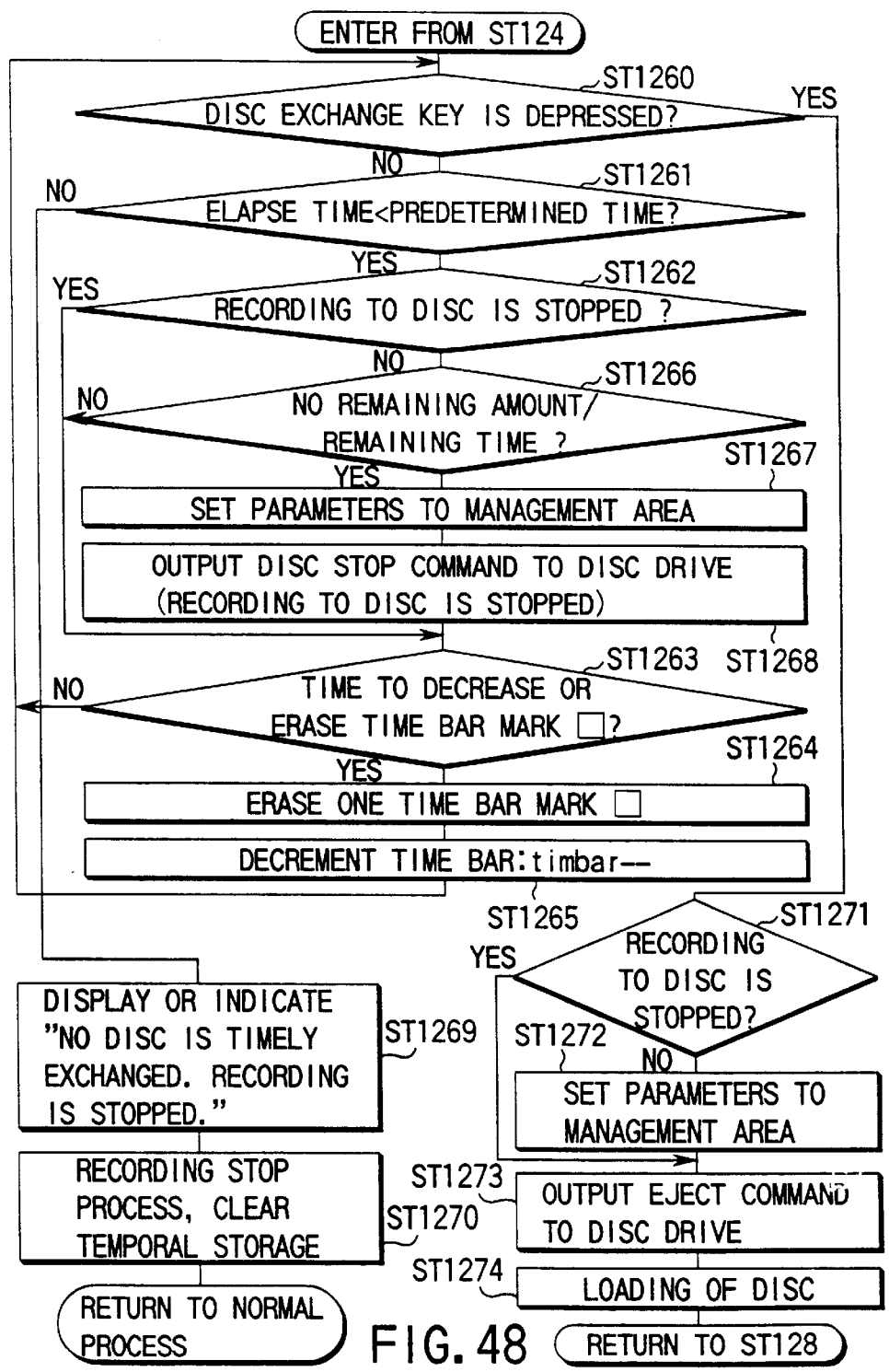
FIG. 48 is a flow chart for explaining processing for informing the user of the time elapsed until a disc is exchanged in the processing shown in FIG. 47.

FIG. 48 is a flow chart for explaining an example of the time bar display process and disc exchange process (step ST126) in FIG. 47.

When a time elapses while the user who watched a message "please set disc" displayed in step ST124 in FIG. 47 does not press a disc exchange key (not shown; this key is placed on a predetermined position of apparatus main body 200 in FIG. 27 or remote controller in FIG. 28) (NO in step ST1260), MPU 30 in FIG. 26 checks the elapse time (step ST1261).

MPU 30 in FIG. 26 comprises a clock oscillator, a main timer for monitoring the elapse time (up to, e.g., 27 sec) while counting clock pulses output from the clock oscillator, and a sub timer for monitoring the split time (up to, e.g., 3 sec corresponding to one time bar mark □) within this elapse time, although not shown.

If the time checked by MPU 30 falls within a predetermined time (e.g., within 27 sec corresponding to nine time bar marks □ initially set in step ST122 in FIG. 47; the timer value used for checking whether or not the elapse time falls within the predetermined time is decremented along with the elapse of time, and finally becomes zero) (YES in step ST1261), MPU 30 in FIG. 26 checks if the user has stopped recording to disc 10 in use (e.g., he or she cancels recording by pressing the stop key on the apparatus main body or remote controller) (step ST1262).

If recording to disc 10 is not stopped (NO in step ST1262) and if that disc 10 has no remaining amount (YES in step ST1266), parameters (the free space value of that disc 10 and the like) are set in the management area (file management areas of VMGI, VTSI) of that disc (step ST1267), and a disc stop command is output to disc drive 32 (step ST1268). Upon reception of this disc stop command, the microcomputer (not shown) of disc drive 32 stops recording to disc 10. After that, MPU 30 checks if the time to decrease or erase one time bar mark □ is reached (step ST1263)

If recording to disc 10 is stopped (YES in step ST1262) or if that disc 10 has a sufficient remaining amount (NO in step ST1266), the processes in steps ST1267 and ST1268 are skipped, and the process of MPU 30 jumps to the step of checking if the time to erase one time bar mark □ is reached (step ST1263).

If it is determined that the time to erase one time bar mark □ is not reached (i.e., 3 sec corresponding to one mark □ have not elapsed yet) (NO in step ST1263), the flow returns to step ST1260 and MPU 30 executes a loop of steps ST1260 to ST1263.

On the other hand, if it is determined that the time to erase one time bar mark □ has been reached (i.e., 3 sec have elapsed) (YES in step ST1263), MPU 30 erases one OSD-displayed time bar mark □, as indicated by the upper left dialog box in FIG. 62 (step ST1264). Then, MPU 30 decrements the contents of register "Timebar" by 1 (step ST1265), and the flow returns to step S1260. MPU 30 executes a loop of steps ST1260 to ST1265.

If time elapses along with the loop process in steps ST1260 to ST1265, and 27 sec have elapsed from a timing immediately after the control entered the process in FIG. 48 after nine time bar marks □ (each corresponding to 3 sec) were set in step ST122 in FIG. 47, i.e., the checked time falls outside the predetermined time (NO in step ST1261), a message "disc is not successfully exchanged. Recording is stopped" is OSD-displayed on the monitor screen in FIG. 58, as indicated by the middle left dialog box in FIG. 62 (step ST1269). Recording is stopped at that time, and recording information buffered on temporal storage 34 in FIG. 26 is cleared (step ST1270). After that, the control returns to the normal process (in this case, a process for waiting for user's operations such as playback operation in a disc halt state) of the DVD video recorder shown in FIG. 26.

On the other hand, if the user who watched the message "please set disc" displayed in step ST124 in FIG. 47 presses the disc exchange key (not shown) (YES in step ST1260), MPU 30 in FIG. 26 checks if the user has stopped recording to disc 10 in use (e.g., he or she has cancelled recording by pressing the stop key on the apparatus main body or remote controller) (step ST1271).

If the user has not stopped recording to disc 10 (NO in step ST1271), MPU 30 sets parameters (the free space value of that disc 10 and the like) in the management area (file management areas of VMGI, VTSI) of that disc (step ST1272), and issues an eject command of that disc to disc drive 32 (step ST1273).

However, if recording to that disc 10 has been stopped (YES in step ST1271), MPU 30 issues an eject command of that disc to disc drive 32 (step ST1273). In this case, the parameter setting process (step ST1272) to the management area (VMGI, VTSI) of disc 10 is skipped.

Upon reception of the eject command, the microcomputer (not shown) in disc drive 32 ejects disc 10 which is currently set. After that, when the user sets new disc 10 on tray 202 of apparatus main body 200 in FIG. 27 and presses open/close key 5g on remote controller 5 in FIG. 28, new disc 10 is retracted into apparatus main body 200 and is loaded into disc drive 32 (step ST1274). Upon completion of loading, the flow returns to step ST128 in FIG. 47.

After the control returns to the process in FIG. 47, MPU 30 in FIG. 26 reads management data (physical format information of the lead-in area, the management table of video manager information VMGI, and the like) of disc (exchanged disc) 10 loaded into disc drive 32 in step ST1247 in FIG. 48 (step ST128), and checks if exchanged disc 10 has a free space (step ST130). During this checking, the middle right dialog box shown in FIG. 62 is OSD-displayed.

If disc 10 has no free space (NO in step ST130), MPU 30 OSD-displays the lower left dialog box in FIG. 62 that informs the user that disc (exchanged disc) 10 set in disc drive 32 has no free space (step ST132).

After that, MPU 30 enters the process shown in FIG. 48 again and waits until the user loads another disc 10 into disc drive 32 within the predetermined time (step ST1274). Upon completion of disc loading, the flow returns to step ST126 in FIG. 47.

In this way, the loop of steps ST126 to ST132 including the process in FIG. 48 repeats itself until new disc 10 with a sufficient free space is loaded or set on disc drive 32 within a predetermined period of time.

If new disc 10 set in disc drive 32 has a free space (YES in step ST130), an address for writing to disc 10 is determined, and free space information (FREE_SPACE) read from the management data of new disc 10 is written in register "FreeAr" allocated on the internal RAM of MPU 30 (step ST134). Then, data is written in the management area (file management areas of VMGI, VTSI, and the like) of set new disc 10 (step ST136).

For example, the remaining recordable time (estimated value) is calculated on the basis of the average recording rate selected at that time and the free space set in register "FreeAr" by the same method as in step ST422B in FIG. 37. The calculated remaining time is OSD-displayed using the lower right dialog box in FIG. 62 together with the average recording rate at that time (step ST138). In this way, when new disc 10 with a sufficient free space is set in disc drive 32 within the predetermined time, the control returns to the normal process for proceeding recording. With this process, recording to new disc 10 is restarted using recording information buffered on temporal storage 34 in FIG. 26.

Figure 49:
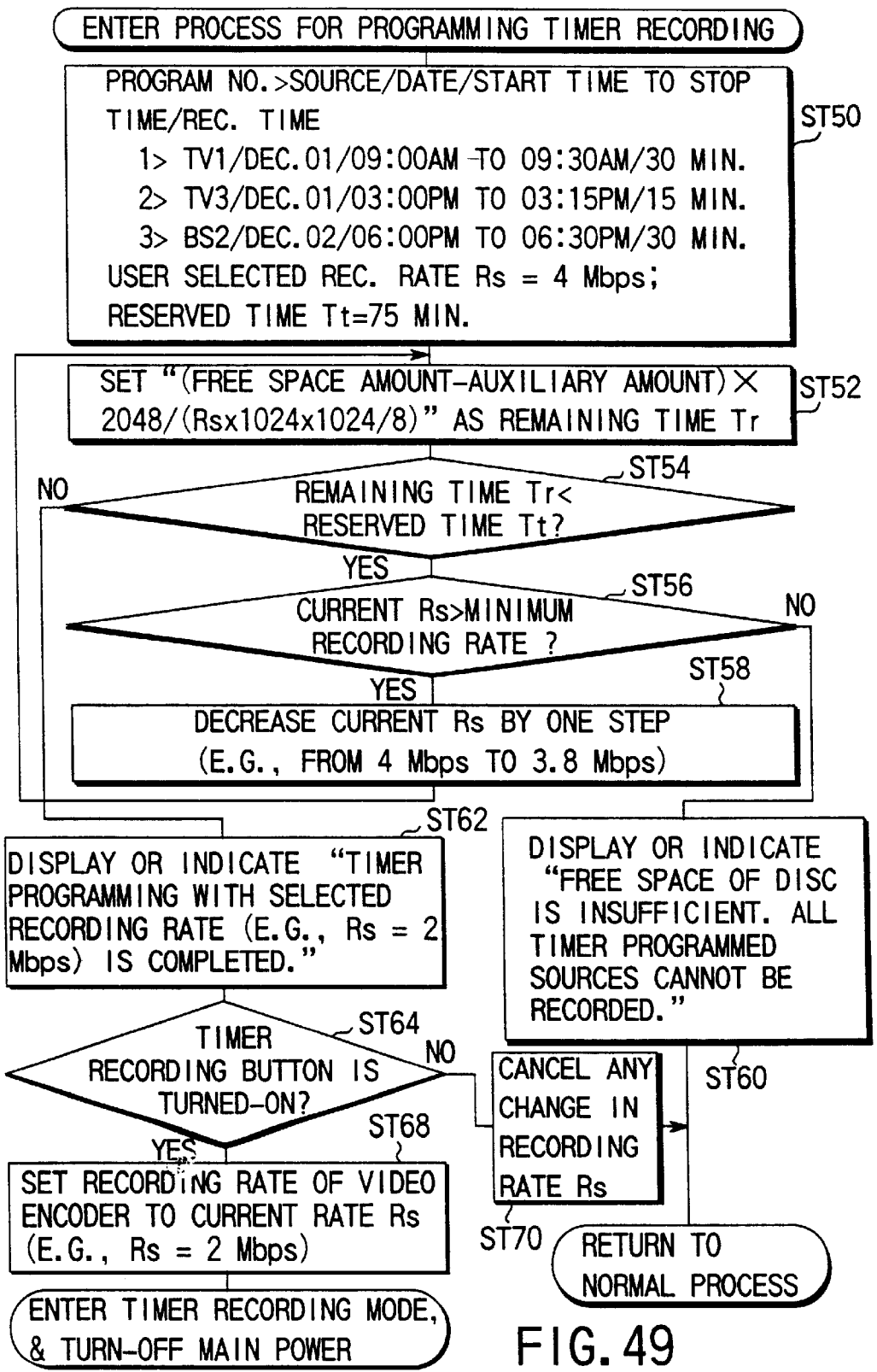
FIG. 49 is a flow chart for explaining programming timer recording of the DVD video recorder shown in FIG. 26.

FIG. 49 is a flow chart for explaining timer recording of the DVD video recorder shown in FIG. 26. In this process, the recording rate is automatically set even when the user does not designate a specific recording rate.

When the user of the DVD video recorder shown in FIG. 26 presses timer key 5tme on remote controller 5 in FIG. 28, MPU 30 outputs a timer recording menu (including a table for designating a channel to be recorded, programming recording date/time, recording mode, average recording rate, and the like in units of programs) on the monitor screen in FIG. 58 (step ST50). The timer recording setting on this menu can be done using cursor key 5q, ten-key pad 5t, enter key 5s, and the like. On the other hand, the recording mode (MPEG2 or MPEG1) and average recording rate upon recording can be desirably set by the user using recording mode key 5rmd and on remote controller 5.

Upon completion of timer recording setting in step ST50, when the user presses enter key 5s on remote controller 5 in FIG. 28, MPU 30 in FIG. 26 calculates remaining recordable time Tr on the basis of the free space (the value obtained by subtracting an auxiliary amount from the remaining amount corresponding to the number of free packs of that disc) of the disc set in the disc drive 32, and selected average recording rate Rs (step ST52).

Since the estimated remaining time based on the remaining amount of disc 10 and the average recording rate to be used may contain errors, such anticipated errors (a margin for preventing incomplete recording) are preferably considered. The auxiliary amount is determined in correspondence with such errors. For example, as a result of various simulations of timer recording, if it is determined that remaining time calculated value Tr includes an error of a maximum of 10%, the amount 10% of the remaining amount can be set as the auxiliary amount.

As the auxiliary amount, space areas in units of zones in the data area on disc 10 can be assigned. DVD disc 10 is divided into lead-in area 27, data area 28, and lead-out area 26. Data area 28 is broken up into 24 zones, i.e., zones 0 to 23. Among these zones, the linear velocity of the optical pickup upon reading is constant. Furthermore, on a DVD-RAM disc, each zone is divided into a user area as an actual data area, and a space area. This space area is prepared as a substitute sector used when a defective sector is produced in that zone. For this reason, when no defective sector is produced, this space area is a free area. That is, this free area can be used as the auxiliary amount.

Subsequently, MPU 30 in FIG. 26 compares total time (reserved time) Tt of programs reserved in step ST50 with remaining time Tr calculated in step ST52 (step ST54).

If remaining time Tr is shorter than reserved time Tt (YES in step ST54), it is checked if recording rate (current recording rate) Rs for timer recording set in step ST50 is smaller than the minimum average recording rate (e.g., 1.8 Mbps to 2 Mbps) used by the DVD video recorder shown in FIG. 26 (step ST58).

If current recording rate Rs is larger than minimum recording rate (YES in step ST56), recording rate RS is slightly decreased (e.g., from 4 Mbps to 3.8 Mbps) (step ST58), since remaining time Tr can be increased by decreasing rate Rs.

Remaining time Tr is re-calculated based on decreased, new recording rate Rs (step ST52). If re-calculated remaining time Tr is still shorter than reserved time Tr (YES in step ST54), a loop of steps ST52 to ST58 repeats itself.

During repetition of the loop of steps ST52 to ST58 (remaining time Tr is shorter than reserved time Tt), if recording rate Rs becomes equal to or smaller than the minimum recording rate (NO in step ST56), all the timer programmed sources cannot be recorded within remaining time Tr of disc 10 even at the minimum recording rate. In this case, MPU 30 OSD-displays a message "free space of disc is insufficient. All timer programmed sources cannot be recorded" (step ST60), and returns to the normal process.

The normal process after the return may be the state before timer recording, but timer recording may be forced to start.

Assume that remaining time Tr is only 60 min even by recording at minimum recording rate Rs=2 Mbps, although reserved time Tr is 75 min. In such case, if MPU 30 is programmed to start forced timer recording, timer recording of program number <3> in step ST50 cannot be completed (last 15 min cannot be recorded).

On the other hand, if remaining time Tr calculated in step ST52 is equal to or longer than reserved time Tt (NO in step ST54), MPU 30 in FIG. 26 OSD-displays, e.g., a message "timer programming with recording rate of 2 Mbps is completed" (step ST62). When the user simultaneously presses timer key 5tme and recording key 5rec on remote controller 5 in FIG. 28 (YES in step ST64), the value (2 Mbps or the like) of average recording rate Rs displayed in step ST62 is set in video encoder 53 in FIG. 26 (step ST68) and the control enters a timer recording mode, thus turning off the power supply of the DVD video recorder shown in FIG. 26.

In the OSD display state in step ST62, if the user presses operation key stop key 5e, end key 5end, clear key 5cr, or the like) of remote controller 5 other than timer key 5tme+ recording key 5rec, timer recording is canceled, and the change in recording rate is also canceled (step ST70). For example, if the average recording rate set before timer recording is 4 Mbps, and the average recording rate in step ST62 via the loop processes of steps ST52 to ST58 in FIG. 49 has changed to 2 Mbps, this recording rate "2 Mbps" is canceled to restore 4 Mbps.

Figure 50:
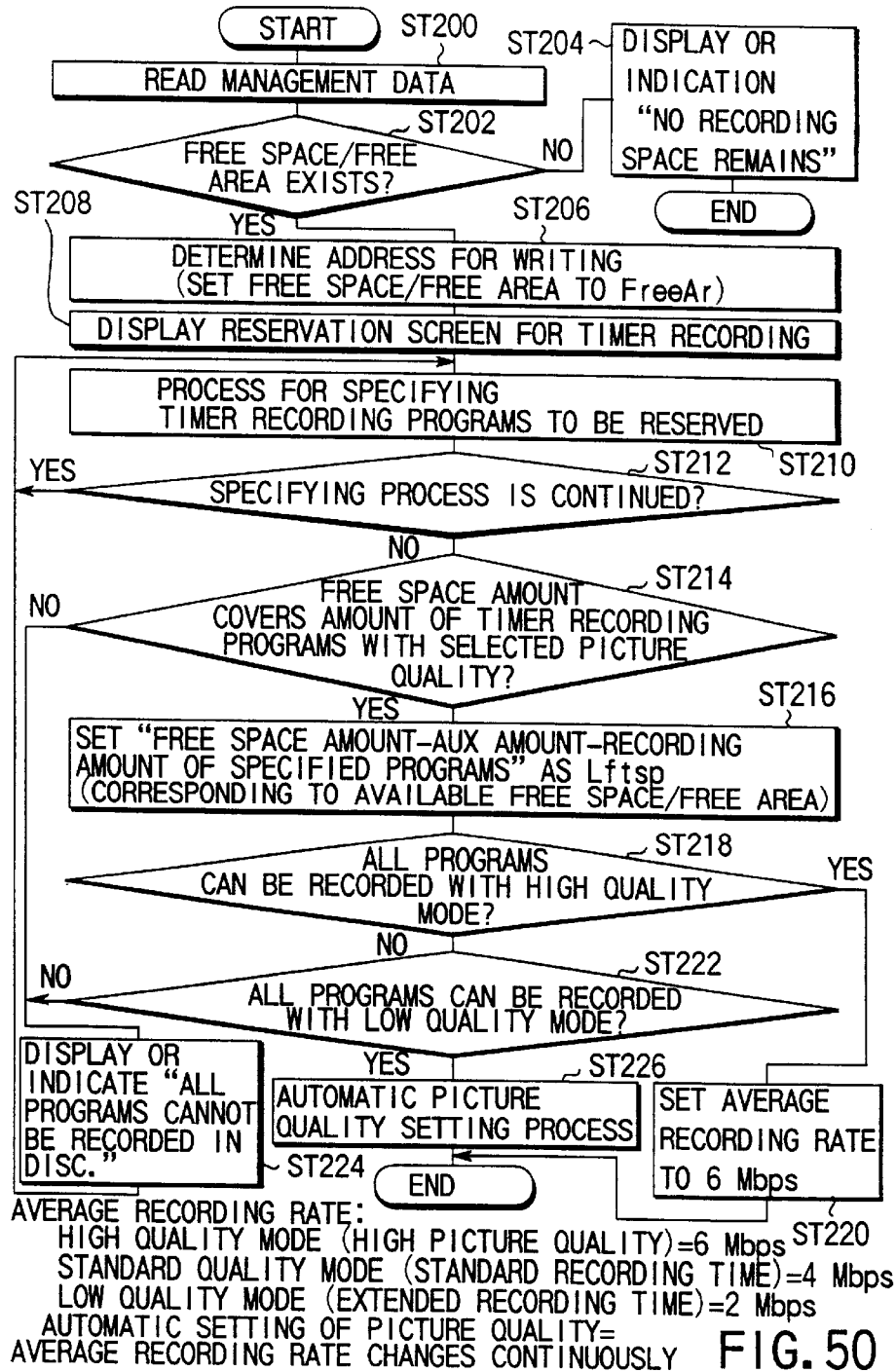
FIG. 50 is a flow chart for explaining another example (including automatic picture quality setting processing) of programming timer recording of the DVD video recorder shown in FIG. 26.

FIG. 50 is a flow chart for explaining another example (including an automatic picture quality setting process) of programming timer recording by the DVD video recorder shown in FIG. 26.

When DVD-RAM (DVD-RW) disc 10 is set in disc drive 32 in FIG. 26, MPU 30 reads management data (VMGI_

MAT) of that disc to detect the current free space (FREE_SPACE) of set disc 10 (step ST200).

If the detected free space is zero (or substantially zero) (NO in step ST202), MPU 30 OSD-displays a message "no recording space remains" on the monitor screen in FIG. 58 (step ST204), thus ending the processing in FIG. 50.

If it is detected that set disc 10 has a sufficient free space (YES in step ST202), MPU 30 determines an address for writing to that disc 10, and writes the detected free space in register "FreeAr" (step ST206).

After that, the same "timer recording menu" as that in step ST50 in FIG. 49 is OSD-displayed on the monitor screen in FIG. 58 (step ST208). The user specifies recording programs to be reserved (N programs) while observing the "timer recording menu" (step ST210).

Upon specifying the programs to be reserved, the user specifies requires programs, their recording times, and one of picture quality modes, i.e., high, standard, low, and automatic quality modes.

Upon completion of program reservation, if the user presses end key 5end on remote controller 5 in FIG. 28 (NO in step ST212), MPU 30 in FIG. 26 checks if the remaining amount (corresponding to the free space written in register "FreeAr" upon the first recording) of disc 10 set in disc drive 32 at that time covers the recording amount (corresponding to the product of the total reserved time and the average bit rate set as a default at that time) corresponding to the total of the reserved times of all the reserved programs (N programs) (step ST214).

If the recording amount exceeds the remaining amount of disc 10 (NO in step ST214), MPU 30 OSD-displays, e.g., a message "all programs cannot be recorded in disc" (step ST224), and returns to the process for specifying programs to be reserved (ST210).

When the user has changed the reservation convents in this process for specifying programs to be reserved (ST210) (e.g., he or she has decreased the number N of programs to be reserved or decreased the reserved times of one or more reserved programs), if the remaining amount of disc 10 can cover the recording amount (YES in step ST214), MPU 30 stores (remaining amount−auxiliary amount−recording amount of programs specified in step ST210) in register "Lftsp" indicating a new remaining amount (step ST216).

If the remaining amount stored in register "Lftsp" is large enough to record all the programs set with the automatic quality mode of those reserved at that time at a high quality rate (e.g., 6 Mbps) as the recording rate for the automatic quality mode (YES in step ST218), 6 Mbps are selected as the high quality rate (step ST220), thus ending the process in FIG. 50.

After that, if the user has simultaneously pressed, e.g., recording key 5rec and playback key 5c on remote controller 5 shown in FIG. 28, the DVD video recorder shown in FIG. 26 begins to record the programs reserved in step ST210 at the high quality rate (6 Mbps).

If the remaining amount stored in register "Lftsp" can neither record all the programs set with the automatic quality mode of those reserved at that time at a high quality rate (e.g., 6 Mbps) (NO in step ST218) nor can record all the reserved programs at a low quality rate (e.g., 2 Mbps) (NO in step ST222), MPU 30 OSD-displays a message "all programs cannot be recorded in disc" (step ST224), and the flow returns to the process for specifying programs to be reserved (ST210) again.

If the remaining amount stored in register "Lftsp" cannot record all the programs set with the automatic quality mode of those reserved at that time at a high quality rate (e.g., 6 Mbps) (NO in step ST218) but can record all the reserved programs at a low quality rate (e.g., 2 Mbps) (YES in step ST222), MPU 30 enters an automatic picture quality setting process (step ST226).

Figure 51:
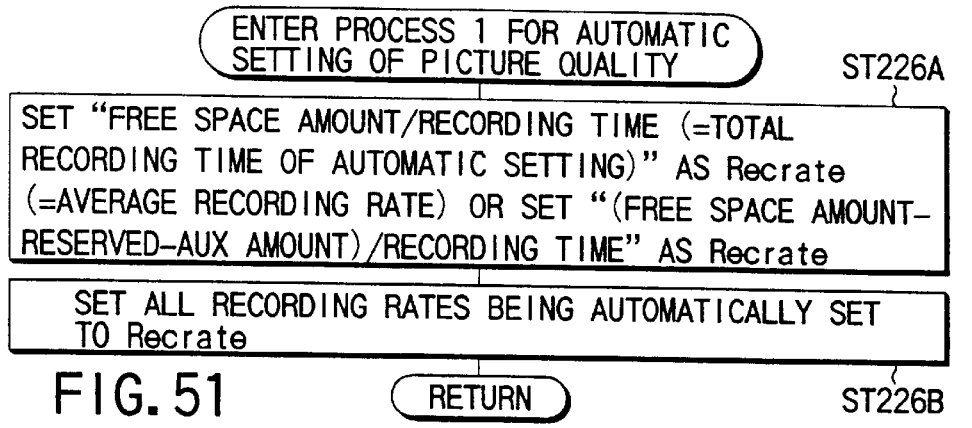
FIG. 51 is a flow chart for explaining an example of average recording rate setting processing in the automatic picture quality setting process shown in FIG. 50.

FIG. 51 is a flow chart for explaining an example of an average rate setting process in the automatic picture quality setting process (ST226) in FIG. 50.

If the total recording time represents a total of the recording times of all the programs set with the automatic quality mode of those reserved in step ST210 in FIG. 50, the value (remaining amount÷total recording time) obtained by dividing the above-mentioned remaining amount by this total recording time is registered as average recording rate Recrate (step ST226A). Alternatively, in consideration of the aforementioned auxiliary amount, [remaining amount−reserved auxiliary amount]÷total recording time is registered as average recording rate Recrate (step ST226A).

Subsequently, all the average recording rates of recording programs, the recording rates of which are to be automatically set, are set in Recrate registered in step ST226A (step ST226B), and the flow returns to the process in FIG. 50.

Figure 52:
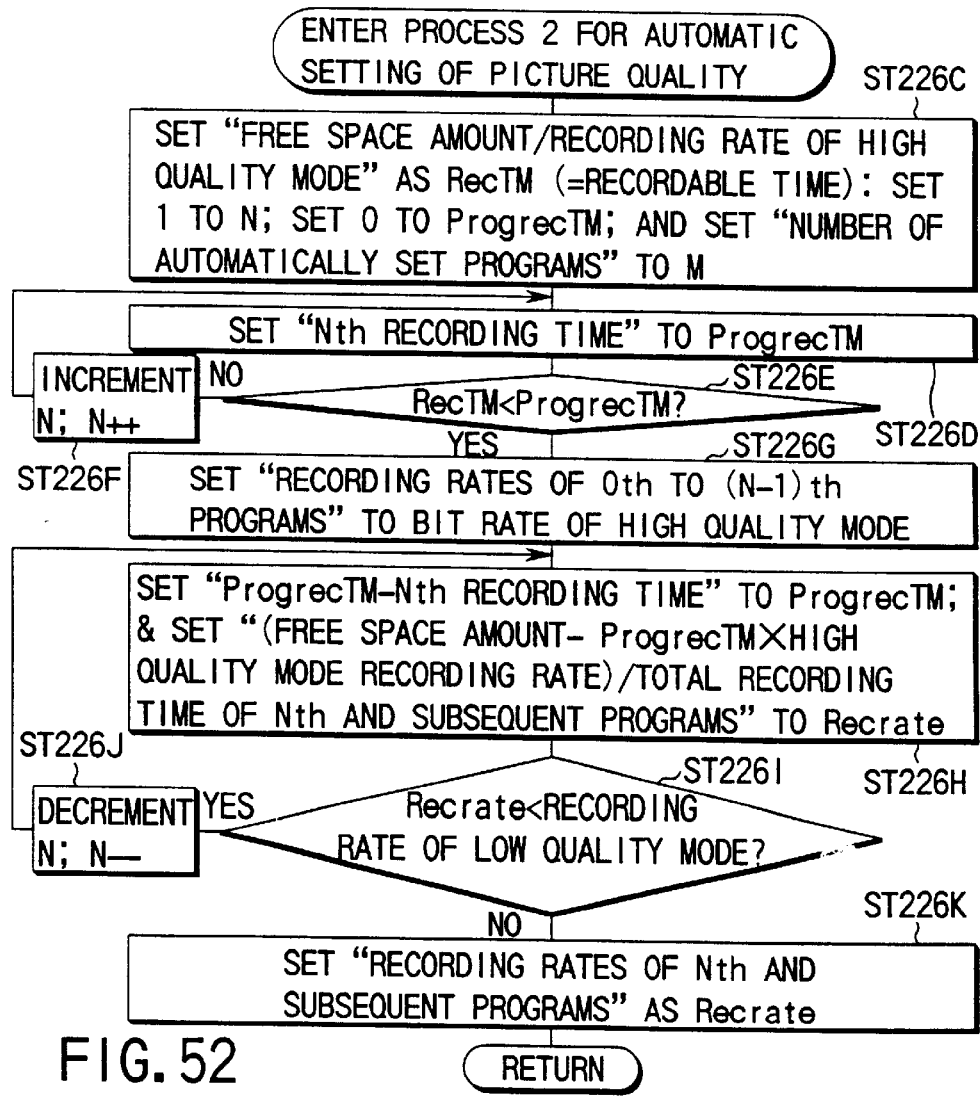
FIG. 52 is a flow chart for explaining another example of the average recording rate setting processing in the automatic picture quality setting process shown in FIG. 50.

FIG. 52 is a flow chart showing another example of the average recording rate setting process in the automatic picture quality setting process (ST226) in FIG. 50.

Initially, the value obtained by dividing the above-mentioned remaining amount by a predetermined high quality recording rate (e.g., 6 Mbps) is registered as recordable time RecTM, program number index N of the reserved programs is initialized to "1", program recording time ProgrecTM to "0", and the number of programs, the recording rates of which are to be automatically set, is set in program number parameter M (step ST226C).

Next, the sum of the N-th (initially, first) recording time and program recording time ProgrecTM (initially, zero) is registered as new program recording time ProgrecTM (step ST226D). As a result, ProgrecTM records the recording time of the first reserved program.

ProgrecTM obtained in this way is compared with recordable time RecTM registered in step ST226C (step ST226E).

If ProgrecTM is not larger than RecTM (i.e., the recordable time can cover the recording time of the reserved program) (NO in step ST226E), reserved program number N is incremented by 1 (step ST226F), and the sum of the second recording time and ProgrecTM (first recording time) so far is registered as new program recording time ProgrecTM (step ST226D). As a result, ProgrecTM records the total of the recording times of the first and second reserved programs.

After repetition of the loop of steps ST226D to ST226F above, if ProgrecTM becomes larger than RecTM (i.e., the recordable time cannot cover the total recording time of the reserved program) (YES in step ST226E), the average recording rates of the first to (N−1)-th reserved programs are set at the high quality recording rate (6 Mbps in this case) in step ST226C (step ST226G).

With the aforementioned process, the first to (N−1)-th (if N=3, the first and second) reserved programs are automatically set in the high quality mode using the high quality recording rate.

Since the N-th to M-th (e.g., third to sixth) reserved programs cannot be recorded at the high quality recording rate, average recording rate Recrate used for recording these programs is changed (step ST226H). This change begins with registration of the value obtained by subtracting the N-th recording time from ProgrecTM (total recording time of the first to N-th reserved programs) as new program recording time ProgrecTM. This means ProgrecTM represents the total recording time of the first to (N−1)-th reserved programs that can be recorded with high quality. Since the N-th recording time is subtracted, recordable time RecTM becomes equal to or larger than ProgrecTM. Hence, average recording rate Recrate for making the N-th and subsequent (up to M-th) reserved programs fall within RecTM is calculated (step ST226H).

Note that Recrate (assumed to be Recrate1) in step ST226H is calculated by [remaining amount−ProgrecTM× high quality recording rate]÷the total recording time of N-th to M-th (e.g., from N=3 to M=6) reserved programs.

If calculated Recrate is smaller than the rate (e.g., 1.8 Mbps) of the low quality mode that can assure minimum required picture quality, program number index N of reserved programs is decremented by 1 (e.g., from N=3 to N=2) (step ST226J). As a result, ProgrecTM calculated in step ST226H decreases (the total recording time from the first to third reserved program decreases to that of the first and second reserved programs). Consequently, since recording time ProgrecTM for the high quality rate that consumes a large amount of data per unit time decreases, [remaining amount−ProgrecTM×high quality recording rate] increases.

When [remaining amount−ProgrecTM×high quality recording rate] increased in this manner is divided by the total recording time of the N-th to M-th (second to sixth in this case) reserved programs, new average recording rate Recrate (assumed to be Recrate2) is re-calculated in step ST226H. The re-calculated Recrate2 is smaller than Recrate1 above.

If the calculated Recrate2 is equal to higher than the rate of the low quality mode that assures minimum required picture quality (e.g., 1.8 Mbps) (NO in step ST226I), picture quality is automatically set so that the N-th and subsequent reserved programs (second to sixth reserved programs in this case) are to be recorded at average recording rate Recrate2 (step ST226K).

Note that the programming process shown in FIGS. 50 to 52 can be used in timer recording, but is not limited to programming timer recording. That is, when the user makes recording start operation after the programming process shown in FIGS. 50 to 52, reserved programs (not as those for timer recording) can be efficiently recorded on the free space of disc 10 at various average recording rates.

FIG. 53 is a flow chart for explaining still another example of recording of the DVD video recorder shown in FIG. 26.

The flow of a video signal upon recording by the DVD video recorder shown in FIG. 26 will be briefly explained.

AV signals input by TV tuner 44 or AV input (external input) 42 are A/D-converted. The converted digital video signal is input to video encoder 53, and the converted digital audio signal is input to audio encoder 54. Also, TV tuner 44 inputs a closed caption signal or text signal of teletext to sub-picture encoder 55 if such signal is present in addition to the video and audio signals.

Encoders 53 to 55 compress and packetize the input signals, and input the signal packets to formatter 56. In this case, each packet is formed to have a size of 2,048 bytes per pack. Note that encoders 53 to 55 determine and record presentation time stamp PTS and decode time stamp DTS of each packet in accordance with the value of STC 38, as needed.

Note that the STC can comprise a timer for counting 90-kHz clocks to have the recording start time of, e.g., "0000".

Formatter 56 temporarily stores packet data in buffer memory 57, and then packs and mixes the input packet data in units of groups of pictures (GOPS) by MPEG. Formatter 56 adds navigation pack 86 (FIG. 11) to the beginning of each GOP, and sends data to data processor 36.

Data processor 36 forms ECC groups each including 16 packs of data sent from formatter 56, adds error correction code ECC to each group, and sends them to disc drive 32. At this time, if disc drive 32 is not ready to record data on disc 10, it transfers data sent from data processor 36 to temporal storage 34, and waits until it is ready to record data. When disc drive 32 is ready to record data on disc 10, it starts recording. Note that temporal storage 34 uses a large-amount memory to hold recording data for several minutes by high-speed accesses.

Upon completion of recording, the address data of the respective navigation packs are recorded on fastforward and rewind data fields (not shown) assured in each navigation pack 86. After that, required information is recorded on the management area (VMGI, VTSI, and the like), thus ending recording.

When, for example, DVD-RW disc 10 is set in the DVD video recorder that performs such recording, its management data (lead-in, VMGI) is read (step ST500).

It is checked based on free space information (FREE_SPACE) in the read management data if set disc 10 has a free space (step ST502).

If the contents of the free space information (FREE_SPACE) indicate zero or substantially zero (i.e., the disc will become full of data within several seconds after the beginning of recording) (NO in step ST502), a message "no recording space remains" is OSD-displayed (step ST504).

If a free space exists (YES in step ST502), data is written in the management area of set disc 10 (step ST506). For example, video title set VTS corresponding to a program to be recorded is registered in video manager information VMGI and files that relate to this VTS are created.

Subsequently, initial setting for recording is done (step ST508). In this initial setting, the respective encoders (53 to 55) in FIG. 26 are initialized (to set the average transfer rate, i.e., average recording rate of V encoder 53, and the like), system time counter STC is reset, the write start address is set in disc drive 32, formatter 56 is initialized (to set dummy pack insertion, cell divide time, and the like), and so forth.

Upon completion of initial setting for recording (ST508), a recording start command is set (step ST510). With this process, recording start commands are sent from MPU 30 to the respective encoders (53 to 55) in encoder 50, thus starting recording on the free space of disc 10 set in disc drive 32.

If no input of "stop recording" is detected (NO in step ST512), and recording continues, the process for calculating or monitoring the remaining amount of disc 10 in which data is being recorded (FIG. 36) is executed parallel to recording (step ST514).

As a result of the process in step ST514, if it is determined that the remaining amount of disc 10 has become smaller than the predetermined value (YES in step ST516; "1" is set in the minimum space flag in FIG. 36), the control enters the process for a small remaining amount (FIG. 37 and the like) (step ST518).

As a result of the process in step ST518, if disc 10 in which data is being recorded still has a recordable amount (NO in step ST520), a loop of steps ST512 to ST520 repeats itself until the input of "stop recording" is detected (YES in step ST512) or no recordable amount remains (YES in step ST520).

Figure 54:
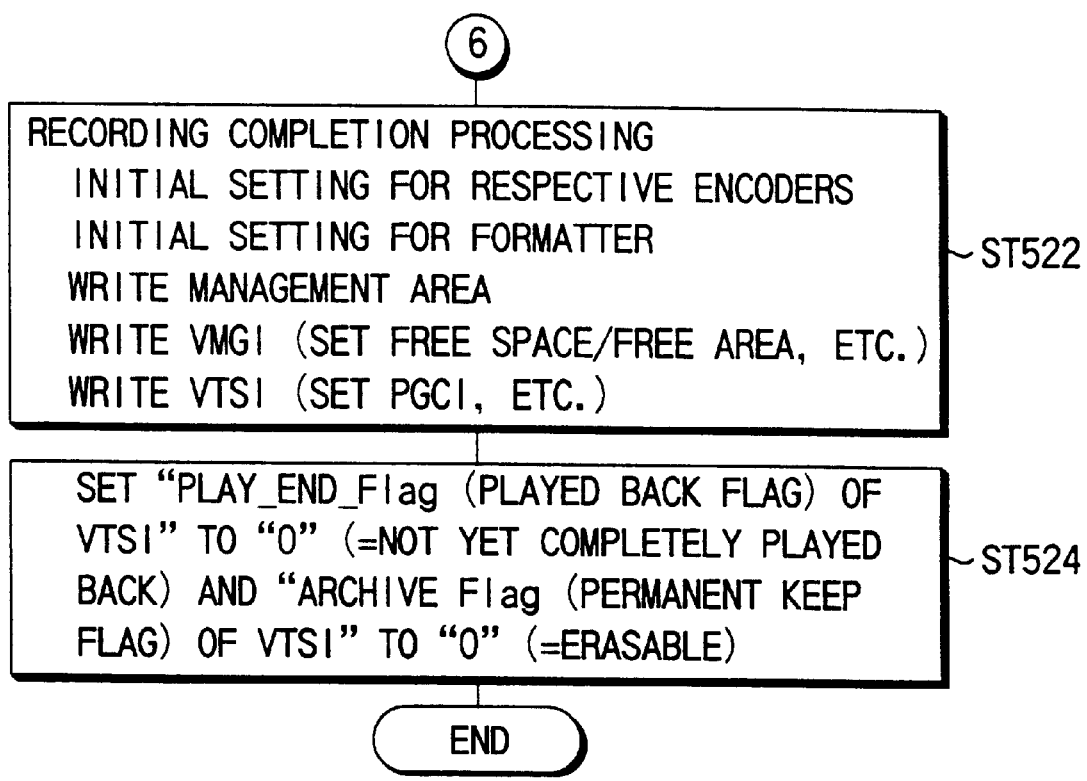
FIG. 54 is a flow chart for explaining a write in a management area and default setups of a played back flag and archive flag upon completion of recording by the sequence shown in FIG. 53.

If it is determined that no more recordable amount remains in disc 10 in which data is being recorded (YES in step ST520) or the input of "stop recording" is detected (YES in step ST512) during repetition of the loop of steps ST512 to ST520, the control enters the process shown in FIG. 54.

FIG. 54 is a flow chart for explaining a write to the management area and default setting of the played back flag and archive flag upon completion of recording in the sequence shown in FIG. 53.

When the control exits the loop of steps ST512 to ST520 in FIG. 53 and enters the process in FIG. 54, recording completion processing is executed (step ST522). In this recording completion processing, the respective encoders (53 to 55) in FIG. 26 are initialized (to reset the recording rate to a default value, and the like), formatter 56 is initialized (to reset various setting values to default values, and the like), a write pertaining to video manager information VMGI is made (to update the contents of FREE_SPACE in FIG. 17, and the like), a write pertaining to video title set VTSI is made (to update the contents of PGCI in FIG. 21), and so forth.

After that, the played back flag (PLAY_END_Flag) in management table VTSI_MAT of video title set information VTSI is set at "0" to indicate that the recorded contents are not yet completely played back, and the archive flag (ARCHIVE Flag) in VTSI_MAT is also set at "0" to indicate the recorded contents are not to be kept (i.e., erasable or overwritable) (step ST524).

In this way, the recording exemplified in FIGS. 53 to 54 ends. According to this recording, a recorded program can be prevented from being accidentally erased by overwrite before it is not played back using the played back flag ("0").

FIG. 55 is a flow chart for explaining an example of playback operation of the DVD video recorder shown in FIG. 26.

The flow of a video signal upon playback in the DVD video recorder shown in FIG. 26 will be described first.

Upon reception of a playback command by, e.g., remote controller operation by the user, MPU 30 in FIG. 26 reads the management area of disc 10 from disc drive 32 via data processor 36, thus determining the address to be played back.

MPU 30 then sends the determined address of data to be played back and a read command to disc drive 32.

Disc drive 32 reads out sector data from disc 10 in accordance with the received command. Readout data are error-corrected by data processor 36, and are sent to decoder 60 in the form of pack data.

In decoder 60, the readout pack data are received by separator 62. Separator 62 packetizes the received pack data. Then, separator 62 transfers video packet data (MPEG video data) to video decoder 64, audio packet data to audio decoder 68, and sub-picture packet data to SP decoder 65 in correspondence with their purposes. Also, a navigation pack is saved in the internal memory (RAM) of MPU 30. In this fashion, MPU 30 can access the contents of the navigation pack in its internal memory as needed.

At the beginning of transfer of each packet data output from separator 62, presentation time stamp PTS is loaded into system time counter STC 38. More specifically, MPU 30 sets PTS included in the navigation pack in STC 38, and video decoder 64 automatically sets PTS of video data in STC 38.

After that, the respective decoders (64, 65, 68) play. back in synchronism with the PTS values in packet data (while comparing PTS and STC values), and supply, e.g., moving picture data with audio and superimposed dialog data to an external monitor TV via AV output 46.

When, for example, DVD-RW disc 10 is set in the DVD video recorder that plays back in such way, recorded data is read from the lead-in area of that disc 10. If the read lead-in data contains data that cannot be recognized by the DVD video recorder in FIG. 26 or if error correction of the read data fails (NG in step ST300), the DVD video recorder performs error processing (step ST302) to stop playback. In this error processing, for example, a message "this disc cannot be played back" is displayed.

If the read data is free from any errors or if error correction is successful even when errors have been produced and the read lead-in data can be recognized by the DVD video recorder shown in FIG. 26 (OK in step ST300), the DVD video recorder reads the management data (VMGI) of that disc (step ST304).

Then, one or more title sets recorded on set disc 10 are displayed on a TV monitor (not shown) in the form of a menu. The user who watched the menu selects a desired title set using cursor key 5q on remote controller 5 in FIG. 28, and then presses enter key 5s to determine that title set (step ST306).

After the title set to be played back is determined in such way, MPU 30 in FIG. 26 reads information VTSI (FIG. 20) of the selected video title set VTS from set disc 10. MPU 30 then stores program chain information PGCI (FIG. 21) in read VTSI in the work area of the internal RAM of microcomputer block 30 (step ST308).

If the determined title set contains a plurality of titles (or a plurality of chapters), the user selects and determines the title (chapter) to be played back from the menu by operating the remote controller (step ST310).

In this way, the program number and cell number (e.g., PGC#1 and C_IDN#1 in FIG. 3) of the title to be played back are determined (step ST312).

Subsequently, MPU 30 in FIG. 26 refers to program chain information PGCI (FIG. 21) stored in its internal RAM. MPU 30 initially sets MPEG video decoder 64, sub-picture decoder 65, and audio decoder 68 in correspondence with the initial setting upon recording (ST508 in FIG. 53) (step S314).

After the initial setting, a pre-processing command is executed (step ST316), and the control then enters a cell playback process (step ST318). With this cell playback process, for example, cells that form program chain PGC#1 in FIG. 3 are played back in turn.

If the last cell is not reached in cell playback (NO in step ST320), cell playback progresses (a loop of ST318 to ST322) while counting up the cell number counter (not shown) every time one cell has been played back (step ST322).

If the last cell is reached in cell playback (YES in step ST320), MPU 30 executes a still process of PGC#1 played back so far (to present one frame of the last cell of that PGC as a still image for a predetermined period of time).

If the still time has elapsed, MPU 30 executes a predetermined post-processing command (step ST326). If it is determined that playback is not ended (NO in step ST328), the flow returns to step ST316.

After the still time has elapsed and the post-processing command is executed (step ST326), if it is determined that playback is ended (e.g., if the user has pressed stop key 5e on remote controller 5) (YES in step ST328), MPU 30 enters the process shown in FIG. 56.

FIG. 56 is a flow chart for explaining updating of the archive flag and played back flag upon completion of playback in the sequence shown in FIG. 55.

A menu (not shown) that inquires of the user as to whether the title set played back so far is to be permanently kept (or to be unerasable) is OSD-displayed on the monitor TV. If the user selects to keep that title set (YES in step ST330), MPU 30 sets "1" in the archive flag (FIG. 19) in the video title set information (step ST332). On the other hand, if the user selects not to keep that title set (NO in step ST330), "0" is set in this archive flag (step ST334).

Upon completion of setting of the archive flag, the played back flag (FIG. 19) of the title set that has been finished to play back is set at "1" (step ST336), and other processing for completing playback (a stop command is output to disc drive 32 in FIG. 26, an indication "STOP" is made on display 48, and so forth) is executed (step ST338), thus ending the playback process in FIGS. 55 and 56.

With this playback process, if the user determines that a given program which has already played back is erasable, such program is automatically set to be erasable (overwritable) using the played back flag ("1"). Also, a program which has already been played back but is to be kept can be prevented from being inadvertently erased by, e.g., overwrite by setting the archive flag (setting it at "1").

FIG. 57 is a flow chart for explaining the contents of step ST318 upon cell playback in FIG. 55.

If cell playback starts (YES in step ST400), MPU 30 in FIG. 26 determines the playback start address on the basis of the contents (FIGS. 21 to 25) of program chain information PGCI (step ST404). MPU 30 then sets a data read-out command in disc drive 32 (step ST406).

If cell playback is not started (NO in step ST400) and VOBUs are not continued (NO in step ST402), processes in steps ST404 to ST406 are executed. On the other hand, if cell playback is not started (NO in step ST400) and VOBUs are continued (YES in step ST402), processes in steps ST404 to ST406 are skipped.

After the above-mentioned process, MPU 30 reads navigation pack 86 (FIG. 9) at the beginning of each VOBU (step ST408), and sets sync information and the like (step ST410).

Furthermore, MPU 30 processes PCI packet 116 in navigation pack 86 (FIG. 11) (step ST412). PCI packet 116 (FIG. 13) contains presentation control information PCI (FIG. 14), and this PCI contains general information PCI_GI of PCI (FIG. 15). MPU 30 executes a highlight process using highlight information HLI (FIG. 14) in PCI, and executes operation for prohibiting specific user's operations using user control information VOBU_UOP_CTL (FIG. 15) in PCI_GI.

Note that the highlight process includes a process for highlighting a sub-picture frame that bounds selectable items in, e.g., green, and changing that color to red when the user selects an item.

Also, the user's operation prohibition operation includes a process for prohibiting angle switching when the user presses angle key 5ang on remote controller 5 in FIG. 28, and displaying a mark indicating that the key operation is prohibited on the TV monitor.

Upon completion of the process in step ST412, MPU 30 checks if a VOBU still process is to be done (step ST414).

If the VOBU still process is to be done (e.g., the cell playback mode (FIG. 24) of cell playback information C_PBI in program chain information PGCI is "1") (YES in step ST414), MPU 30 waits until playback of that VOBU ends (step ST416). Since the playback time of one VOBU is around 0.4 to 1.2 sec, this wait time is not so long.

Upon completion of playback of that VOBU, the VOBU still process starts at the end of the playback (step ST418). For example, a frame which appears at the end of the VOBU is played back as a still image. This still image is kept played back until the user presses the playback key on the remote controller (FIG. 28) or DVD video recorder main body (FIG. 27).

If the user does not press pause key 5d in step ST414 (NO in step ST414), or if the user presses playback key 5c during the VOBU still process, MPU 30 check if the cell is a final one which includes the VOBU (step ST420).

If the cell is not the final one (NO in step ST420), the flow returns to step ST408 to read navigation pack 86 of the next VOBU, thus repeating the processes in steps ST408 to ST420. If the cell is the final one (YES in step ST420), the control waits until playback of the VOBU at that time ends (step ST422).

After that, the control enters a cell still process, and a frame that appears at the end of the cell is played back as a still image until the time set as the cell still time (FIG. 24) in program chain information PGCI elapses (step ST424). Upon completion of cell still playback, the control returns to the process shown in FIG. 55.

To restate, according to the embodiments of the present invention, when the remaining amount of the disc is small, files that have already been played back are arranged, and data to be recorded can be recorded without suspending recording.

Figure 63:
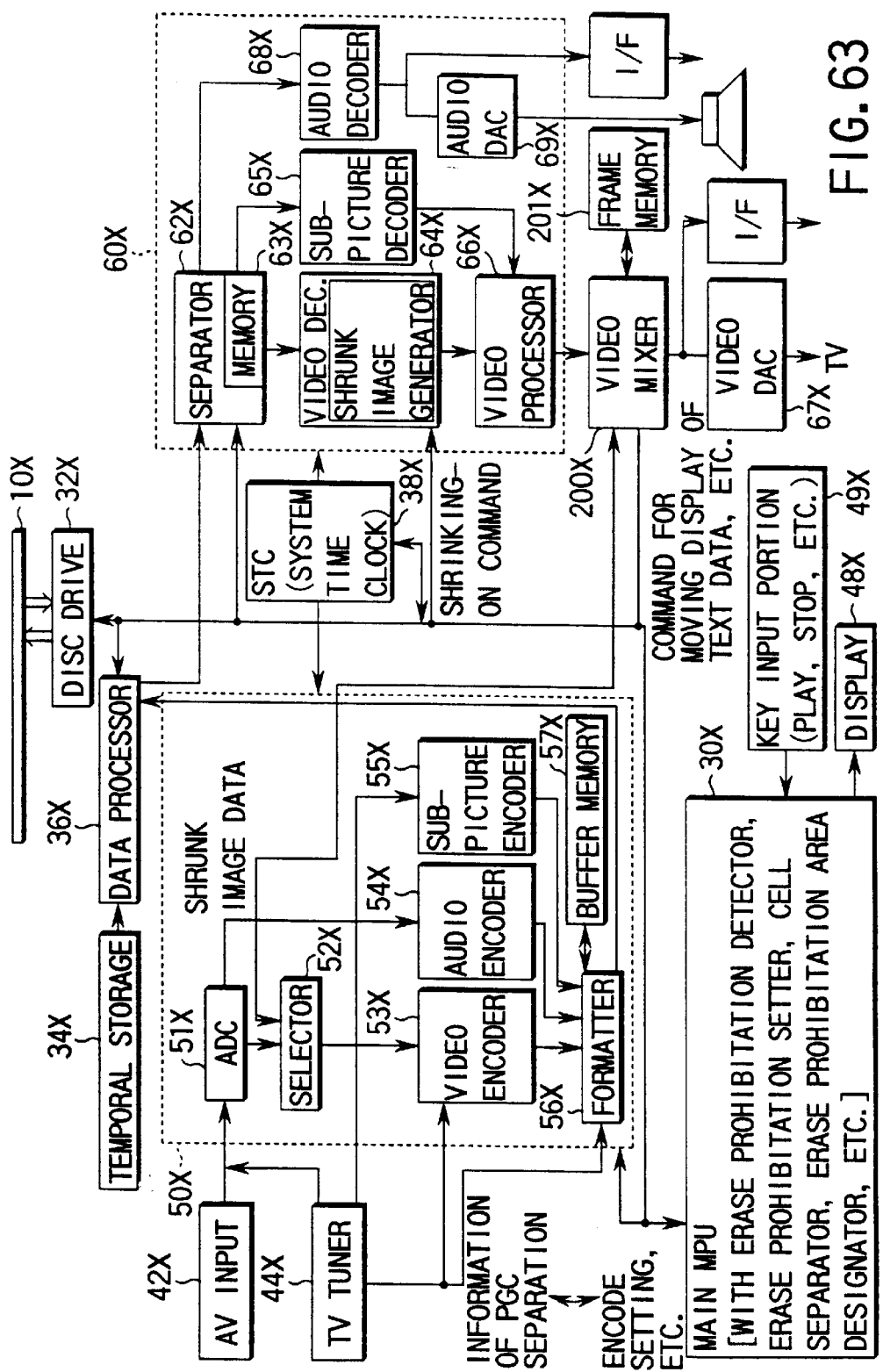
FIG. 63 is a block diagram showing another embodiment of a recording/playback apparatus according to the present invention.

FIG. 63 shows another embodiment of an apparatus (DVD video recorder) for recording and playing back digital moving picture information at a variable recording rate.

The apparatus main body of the DVD video recorder has disc drive 32X for rotating DVD-RAM or DVD-R disc 10X, and reading/writing information to/from disc 10X. Also, the apparatus main body has encoder 50X on the recording side, decoder 60X on the playback side, and microcomputer block 30X for controlling operations of the apparatus main body.

Encoder 50X comprises ADC (analog-to-digital converter) 51X, selector (SEL) 52X, video encoder (V-EN) 53X, audio encoder (A-EN) 54X, sub-picture encoder (SP-EN) 55X, formatter 56X, and buffer memory 57X.

ADC 51X receives an external analog video signal+ external analog audio signal from AV input 42X, or an analog TV signal+analog audio signal from TV tuner 44X. ADC 51X converts the input analog video signal into a digital signal at a sampling frequency of, e.g., 13.5/6.75 MHz and 8 quantization bits. (That is, luminance component Y, color difference component Cr (or Y−R), and color difference component Cb (or Y−B) are respectively quantized, with the ratio of 4:2:2 (or 4:4:4), by 8 bits).

Similarly, ADC 51X converts the input analog audio signal into a digital signal at a sampling frequency of, e.g., 48 kHz and 16 quantization bits.

When an analog video signal and digital audio signal are input to ADC 51X, the digital audio signal passes through ADC 51X.

On the other hand, when a digital video signal and digital audio signal are input to ADC 51X, these signals pass through ADC 51X.

A digital video signal output from ADC 51X is supplied to formatter 56X via video encoder 53X. Also, a digital audio signal component output from ADC 51X is supplied to formatter 56X via audio encoder 54X.

Selector 52X selects a signal output from video mixer 200X upon recording a shrunk image for editing (to be described later).

V encoder 53X has a function of converting the input digital video signal into a digital signal compressed at a variable bit rate by MPEG2 or MPEG1.

A encoder 54X has a function of converting the input digital audio signal into a digital signal compressed at a fixed bit rate (or linear PCM digital signal) by MPEG or AC-3.

When a DVD video signal with the data structure based on the aforementioned format is input from AV input 42X (e.g., a signal coming from a DVD video player with a dedicated sub-picture signal output terminal), or when a DVD video signal with such data structure is broadcasted and received by TV tuner 44X, a sub-picture signal component (sub-picture pack) in the DVD video signal is input to sub-picture encoder (SP encoder) 55X. Sub-picture data input to SP encoder 55X is arranged into a predetermined signal format, and is then supplied to formatter 56X.

Formatter 56X performs predetermined signal processing for the input video signal, audio signal, sub-picture signal, and the like while using buffer memory 57X as a work area, and outputs recording data that matches the above-mentioned format (file structure) to data processor 36X.

In the above-mentioned processing, cells as minimum units of the main picture data (video data) are set, and cell playback information (C_PBI) is generated. Then, the structure of cells that construct a program chain, attributes of main picture, sub-picture, and audio data, and the like are set (some of these attributes use information obtained upon encoding the individual data), and information management table information (VMGI_MAT and VTSI_MAT) containing various kinds of information is created.

The encoded main picture data, audio data, and sub-picture data are segmented into packs each having a predetermined size (2,048 bytes). Dummy packs are appropriately inserted into these packs. Packs other than the dummy packs describe time stamps such as a PTS (presentation time stamp), DTS (decode time stamp), and the like. As for the PTS of sub-picture data, a time arbitrarily delayed from that of main picture data or audio data in the same playback time zone can be described.

The data cells are arranged while adding navigation pack 86 at the beginning of each VOBU 85 so as to play back data in the order of their time codes, thus forming VOB 83 constructed by a plurality of cells. VOBS 82 containing one or more VOBs 83 is formatted to the structure of VTS 72.

The disc drive means that writes/reads (records/plays back) information to/from DVD disc 10X comprises disc drive 32X, temporal storage 34X, data processor (D-PRO) 36X, and system time clock (STC) 38X.

Temporal storage 34X is used for buffering a predetermined amount of those of data to be written in disc 10X via D-PRO 36X (i.e., data output from encoder 50X), and for buffering a predetermined amount of those of data played back from disc 10X via disc drive 32X (i.e., data input to decoder 60X).

For example, when temporal storage 34X is comprised of a 4-Mbyte semiconductor memory (DRAM), it can buffer recording or playback data for approximately 8 sec at an average recording rate of 4 Mbps. On the other hand, when temporal storage 34X is comprised of a 16-Mbyte EEPROM (flash memory), it can buffer recording or playback data for approximately 30 sec at an average recording rate of 4 Mbps. Furthermore, when temporal storage 34X is comprised of a 100-Mbyte very compact HDD (hard disc), it can buffer recording or playback data for more than 3 min at an average recording rate of 4 Mbps. Temporal storage 34X can also be used for temporarily storing recording information until disc 10X is exchanged by a new one, when disc 10X has been fully recorded during recording.

D-PRO 36X supplies DVD recording data output from encoder 50X to disc drive 32X, receives a DVD playback signal played back from disc 10X via drive 32X, rewrites management information (directory record, VMGI_MAT, VTSI_MAT, and the like) recorded on disc 10X, and erases data (files or VTS) recorded on disc 10X under the control of microcomputer block (MPU) 30X.

MPU 30X includes a CPU, a ROM written with control programs and the like, and a RAM that provides a work area required for executing programs.

MPU 30X executes free space detection, recording amount (the number of recorded packs) detection, remaining amount detection, warning, recording mode change instruction, and other processes (to be described later) using the RAM as a work area in accordance with the control programs stored in the ROM.

Furthermore, MPU 30X especially has an erase prohibition range specification function, erase prohibition setting function, cell divide function, and erase prohibition detection function for cell units, thus improving the operability of the system for the user.

Of the execution results of MPU 30X, the contents that the DVD video recorder user is informed of are displayed on display 48X of the DVD video recorder, or are displayed on a monitor display in an on-screen display (OSD) mode.

Decoder 50X comprises separator 62X for separating and extracting packs from DVD playback data with the pack structure described early, memory 63X used upon signal processes such as pack separation and the like, video decoder (V-DE) 64X for decoding the contents of video pack 88 separated by separator 62X, sub-picture decoder (SP-DE) 65X for decoding the contents of subpicture pack 90 separated by separator 62X, audio decoder (A-DE) 68X for decoding the contents of audio pack 91 separated by separator 62X, and video processor (V-PRO) 66X for appropriately synthesizing sub-picture data output from SP-DE 65X with video data output from V decoder 64X, and outputting main picture data with superimposed sub-picture data such as menus, highlight buttons, superimposed dialog, and the like.

The output from video processor 66X is supplied to a monitor such as a television receiver via video digital-to-analog converter (V•DAC) 67X. The output from audio decoder 68X is supplied to an external loudspeaker via digital-to-analog converter (DAC) 69X. Also, the output from audio decoder 68X can be output as a digital signal via an interface. Video mixer 200X is connected to frame memory 201X as a work memory. Also, MPU 30 is connected to key input portion 49X, and display 48X for a recorder/player.

Operation of this apparatus will be described briefly below.

Upon reception of a recording command from key input portion 49X, MPU 30X reads management data via disc drive 32X, and determines an area in which data are to be written. Then, MPU 30X sets management data in the management area so that data can be written in the determined area, and sets the write start address of video data in disc drive 32X, thus preparing for data recording. If the disc has no recordable space, a warning sound is produced or a warning message is displayed. MPU 30X resets the time in STC 38X. Note that STC 38X is a system timer, and recording/playback is done with reference to the value of STC 38X. Furthermore, MPU 30X sets other units.

The flow of a video signal is as follows.

AV signals input from TV tuner 44X or an external input are A/D-converted. The converted video signal is supplied to video encoder 53X, and the converted audio signal to audio encoder 54X. Also, a text signal of, e.g., teletext is input from TV tuner 44X to SP encoder 55X.

The respective encoders compress and packetize their input signals (respective packets are formed while being segmented to have a size of 2,048 bytes per pack when they are packed), and supply packets to formatter 56X. Note that the respective encoders determine the PTS and DTS of each packet in accordance with the value of STC 38X as needed.

Formatter 56X temporarily stores packet data in buffer memory 57X, then packs and mixes the input packet data in units of GOPs, adds an NV pack to the beginning of each GOP, and inputs them to D-PRO 36X.

D-PRO 36X forms ECC groups each including 16 packs, adds an ECC to each group, and sends these groups to disc drive 32X. In this case, when disc drive 32X is not ready to record on the disc, it transfers data to temporal storage 34X, waits until it becomes ready to record data, and then starts recording when ready. Note that temporal storage 34X assumes a large-amount memory to hold recording data for several minutes or more by high-speed accesses.

Upon completion of recording, the address data of the respective NV packs are recorded in the fastforward and rewind data fields in each NV pack, and required information is recorded in the management area, thus ending recording.

MPU 30X can access D-PRO 36X via a microcomputer bus to read/write data in the management area of a file.

Upon completion of recording, an erase prohibition flag (ARCHIVE Flag) for each cell used by the system of this embodiment is cleared to indicate "erasable". The erase prohibition flag is described in C_PBI, as described later. That is, at the beginning of recording, erase is allowed. When VMT includes an erase prohibition flag, that flag is also cleared.

Furthermore, data processing upon playback is as follows. Upon reception of a playback command, MPU 30X reads data in the management area from disc drive 32X via D-PRO 36X, and determines the playback start address. MPU 30X sends the determined address of data to be played back, and a read command to drive 32X.

Drive 32X reads out sector data from disc 10X in accordance with the received command. D-PRO 36X performs error correction of readout data, and outputs them to decoder 60X in the form of pack data. In decoder 60X, separator 62X receives the readout pack data, and packetizes them. Then, separator 62X transfers video packet data (MPEG video data) to video decoder 64X, audio packet data to audio decoder 68X, and sub-picture packet data to SP decoder 65X in accordance with the purposes of these data. Furthermore, separator 62X saves NV packs in the internal memory of MPU 30X since they are processed by MPU 30X, so that the NV packs can be accessed by MPU 30X as needed.

In each transferred packet data, the PTS included in its header is loaded into STC 38X at the beginning of transfer (the MPU sets a PTS in each NV pack in STC, and video decoder 64X automatically sets the PTS of video data in STC 38X). After that, the respective decoders play back in synchronism with the PTS values in packet data (while comparing PTS and STC values) to play back moving picture data with audio and superimposed dialog data on the TV monitor.

In order to finely manage data, the erase prohibition flag can be set in cell playback information (C_PBI), as shown in FIG. 23.

That is, in this system, since erase prohibition flags are set in units of not titles but cells, erase prohibition can be set in units of cells, and data can be managed precisely.

Figure 66:
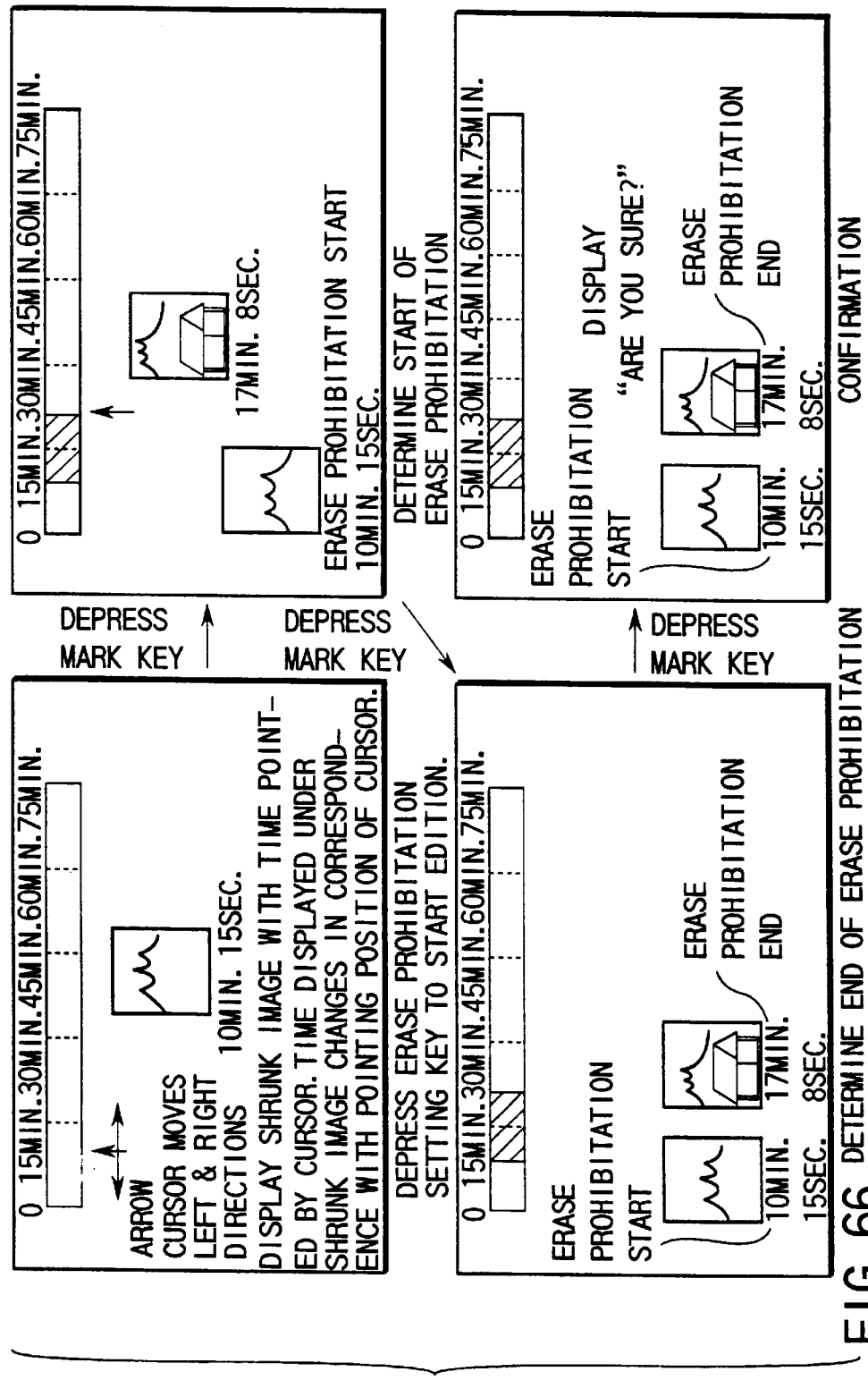
FIG. 66 shows an example of images on the screen upon erase prohibition setting.
Figure 67:
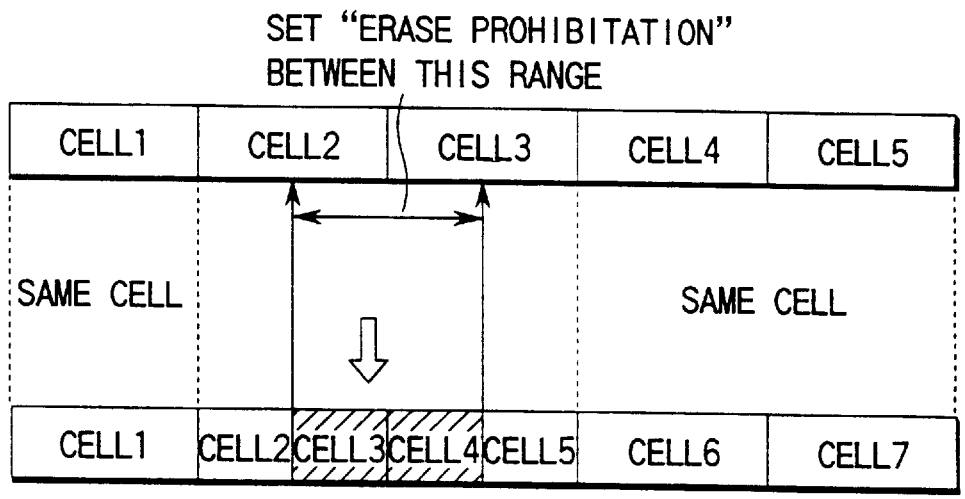
FIG. 67 is a view for explaining the method of dividing a cell.

The operation flow of the erase prohibition setting will be explained below with reference to FIGS. 64 and 65. FIG. 66 shows changes in screen image at that time, and if a cell must be divided, FIG. 67 shows that image. Erase prohibition setting is executed as follows.

1) The user selects a title to be erase-prohibited.

2) Then, a time bar corresponding to the playback time of the selected title (VTS or PGC) and a cursor for specifying a range are displayed. At this time, when the displayed time bar is divided by dotted lines in units of cells, the user can recognize that the portion within the range bounded by the dotted lines indicates an identical scene (FIG. 22). That is, in case of a video camera, a sequence from the beginning of recording until depression of a pause key or recording end key corresponds to this scene. In case of a TV drama, a sequence from a given commercial (CM) to the next one corresponds to the scene.

3) The user specifies the erase prohibition setting start position using the cursor and a marker key, and the address and the like of a VOBU corresponding to the specified position are saved in a work memory. At this time, I-picture data at the beginning the VOBU indicated by the cursor is displayed as a shrunk image to allow easy selection. Also, the playback time at that time can be displayed. Note that the playback time is obtained by calculating the elapse time of cells from the beginning of the title to the immediately preceding cell+C_ELTM in the NV pack on the basis of C_ELTM in the NV pack and C_PBTM in C_PBI.

4) The user specifies the erase prohibition setting end position using the cursor and marker key, and the address and the like of a VOBU corresponding to the specified position are saved in the work memory.

5) It is then checked if the user accepts the selected range. If the user does not accept, the control returns to the process of item 4).

Figure 64:
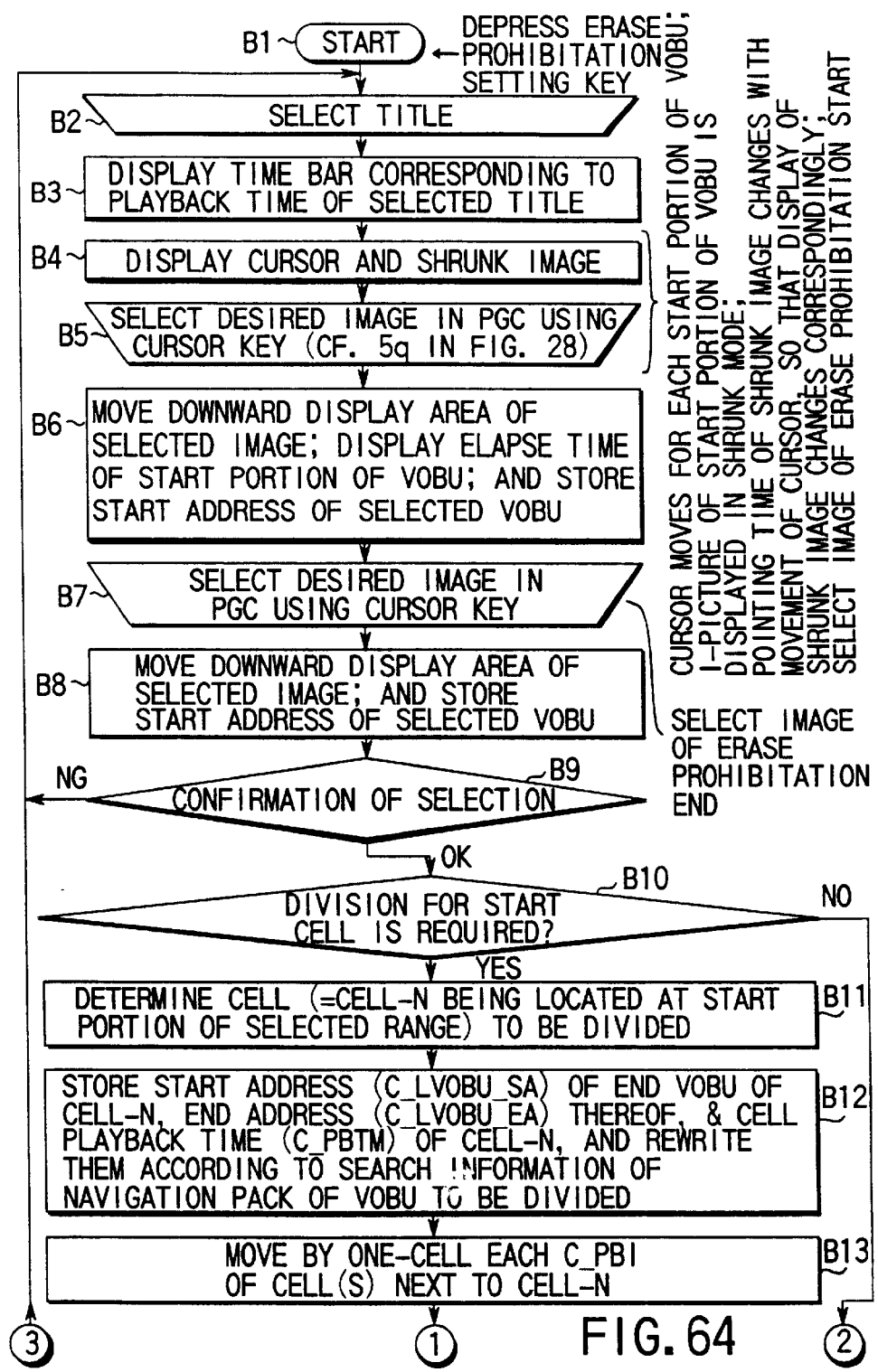
FIG. 64 is a flow chart for explaining erase prohibition setting according to the present invention.

The above-mentioned processes correspond to steps B1 to B9 in FIG. 64.

6) It is checked if the cell at the setting start position must be divided (to check if the cell start position agrees with the setting start position). If the cell need not be divided, the control jumps to the process of item 8).

7) If the cell must be divided, a cell (CELL_N) to be divided is determined (based on the start and end VOBUs in C_PBI of each cell; or using the cell number determined and saved upon setting using the cursor), and is divided.

More specifically, the start address: C_FVOBU_SA and end address: C_LVOBU_EA of the end VOBU in C_PBI of CELL_N, and C_PBTM are saved, and C_FVOBU_SA, C_LVOBU_EA, and C_PBTM are rewritten based on search information of NV_PACK in the VOBU to be divided.

C_PBI of each cell next to CELL_N is moved by one cell.

New C_PBI with the following contents is recorded at the moved place.

C_CAT: the same as that of CELL_N. C_PBTM: the divided playback time. C_FVOBU_SA: the start address of the divided VOBU. C_FILVU_EA: the end address of the divided ILVU. C_LVOBU_SA: C_LVOBU_SA before the change of CELL_N. C_LVOBU_EA: C_LVOBU_EA before the change of CELL_N.

8) Erase prohibition flags are set in cells between the setting start and end positions.

Figure 65:
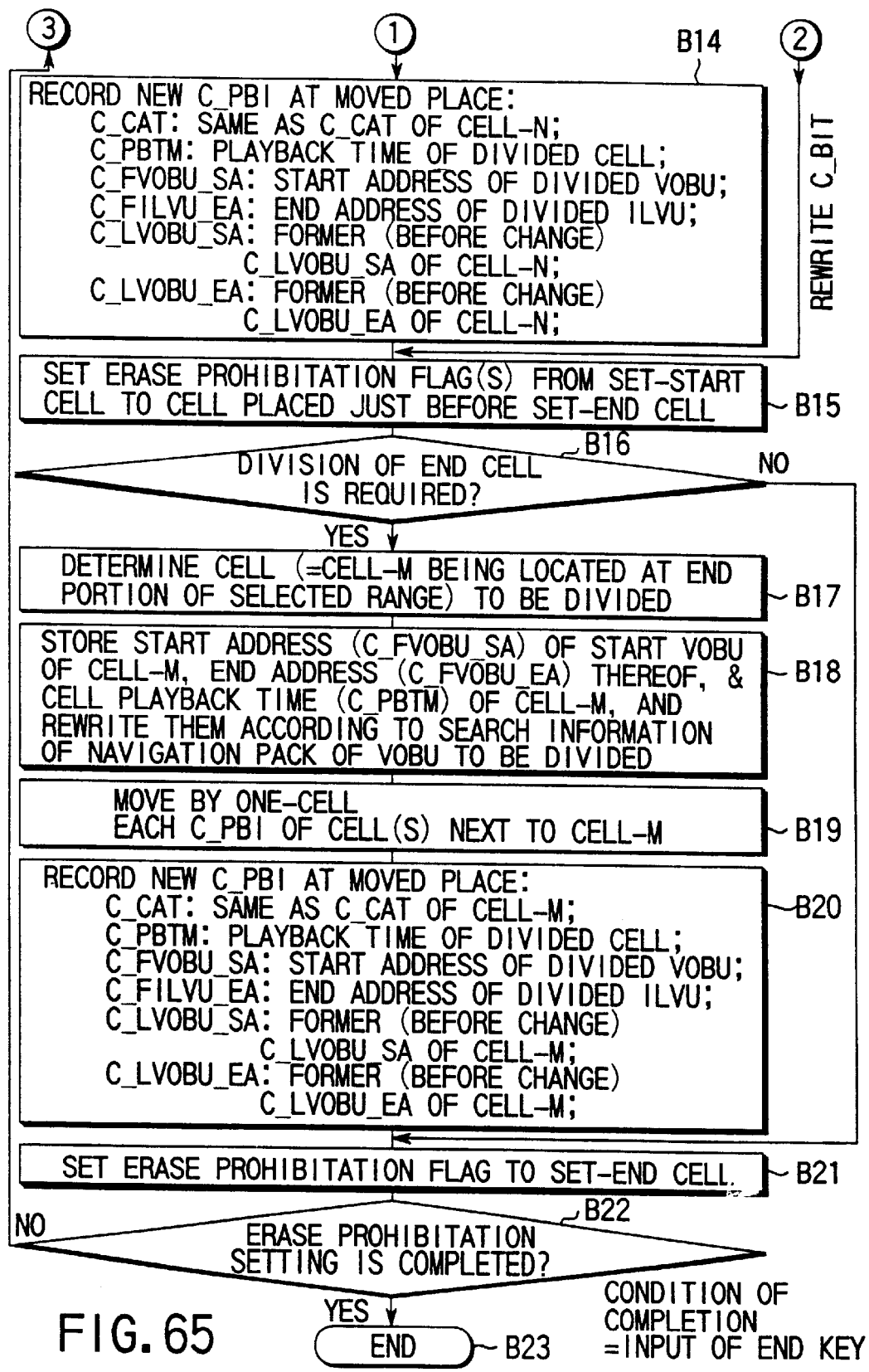
FIG. 65 is a flow chart for explaining the remaining part of FIG. 64.

The processes described above correspond to steps B10 (FIG. 64) to B15 (FIG. 65).

9) It is checked if the cell at the setting end position must be divided (i.e., if the cell end position agrees with the setting end position). If the cell need not be divided, the control jumps to item 11).

10) A cell (CELL_N) to be divided is determined (based on the start and end VOBUs in C_PBI of each cell; or using the cell number determined and saved upon setting using the cursor), and is divided.

More specifically, the start address: C_FVOBU_SA and end address: C_LVOBU_EA of the end VOBU in C_PBI of CELL_N, and C_PBTM are saved, and C_FVOBU_SA, C_LVOBU_EA, and C_PBTM are rewritten based on search information of NV_PACK in the VOBU to be divided.

C_PBI of each cell next to CELL_N is moved by one cell.

New C_PBI with the following contents is recorded at the moved place.

C_CAT: the same as that of CELL_N. C_PBTM: the divided playback time. C_FVOBU_SA: the start address of the divided VOBU. C_FILVU_EA: the end address of the divided ILVU. C_LVOBU_SA: C_LVOBU_SA before the change of CELL_N. C_LVOBU_EA: C_LVOBU_EA before the change of CELL_N.

11) An erase prohibition flag is set in the cell at the setting end position.

12) It is checked if setting ends. If setting does not end, the control returns to 1).

The above-mentioned processes correspond to steps B16 to B23 in FIG. 65.

In this embodiment, the processes are done based on the DVD-video format. When a VOBU map and time map (e.g., used in Japanese Patent Application Publication No. 040876/98) exist, cell division can be done based on data from the VOBU map without using data from each NV pack. Hence, the processes of this embodiment can be attained by only data on the management area.

Figure 68:
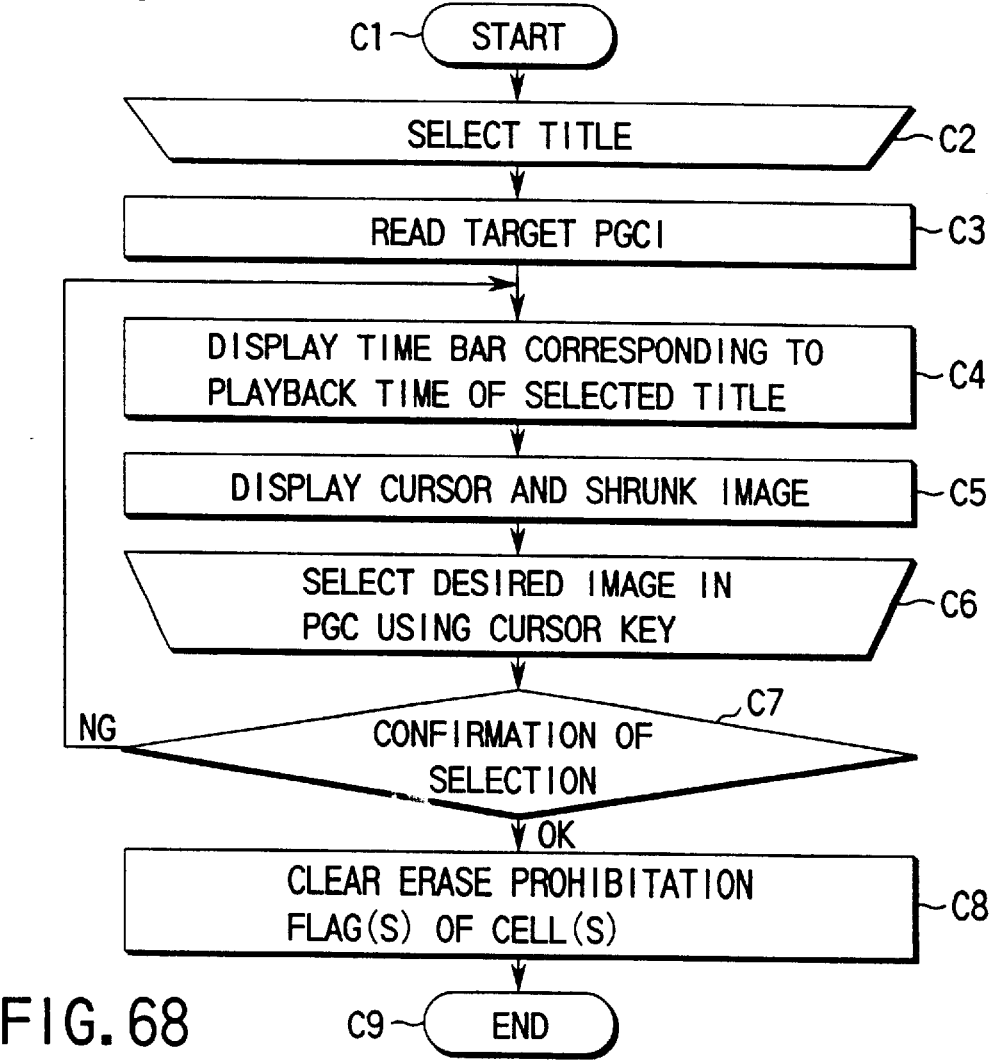
FIG. 68 is a flow chart for explaining title erase processing of the apparatus according to the present invention.
Figure 69:
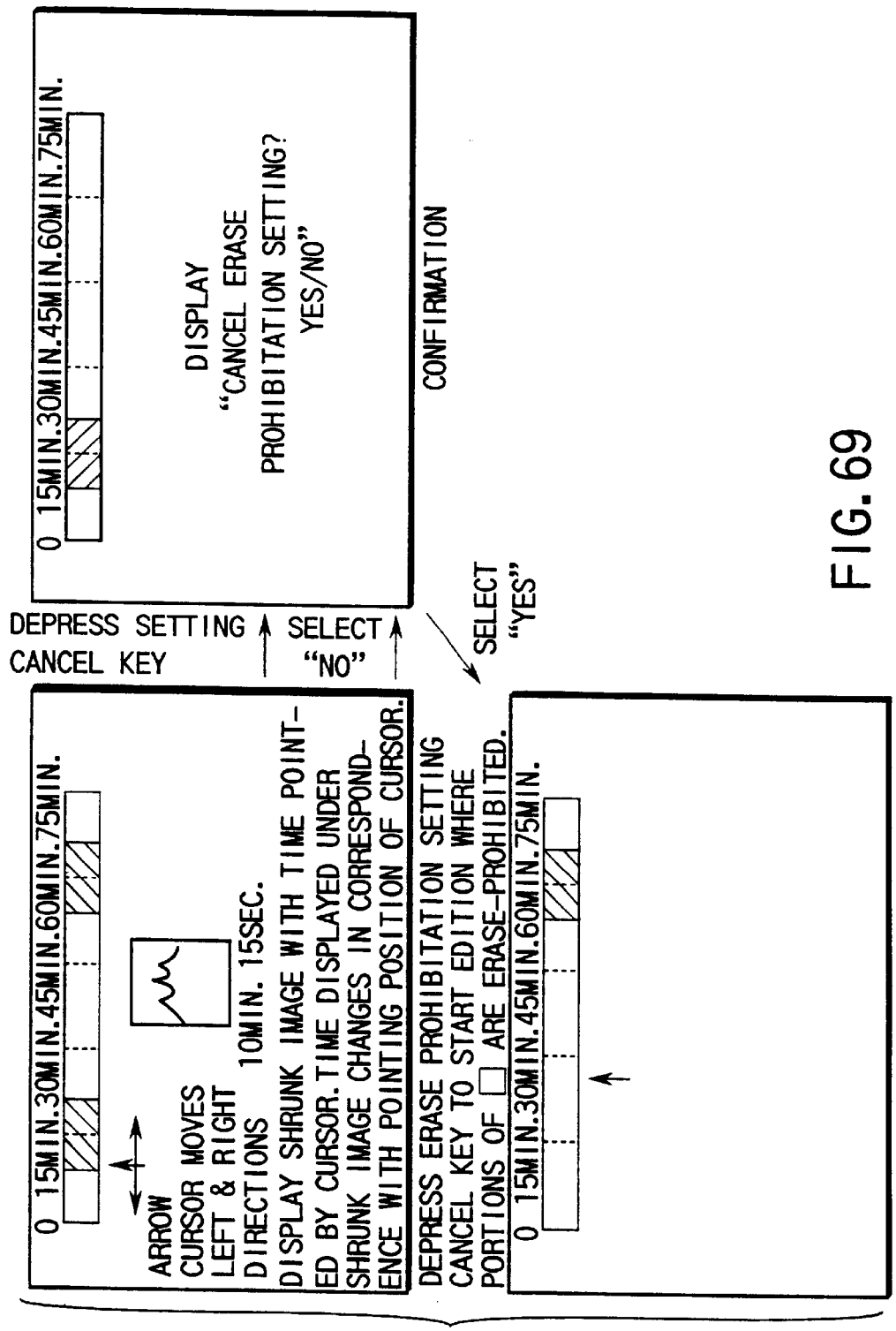
FIG. 69 shows a screen display example upon title erase processing of the apparatus according to the present invention.

FIG. 68 shows the operation flow upon canceling erase prohibition setting in units of cells, and FIG. 69 shows the display examples on the TV screen.

1) The user selects a title to be erase-prohibited.

2) A time bar corresponding to the playback time of the selected title (VTS or PGC) and a cursor for specifying a cell are displayed (see FIG. 69).

3) The user specifies a cell, erase prohibition of which is to be canceled, using the cursor and a marker key.

These processes correspond to steps C1 to C6.

4) It is confirmed if erase prohibition of the specified cell is to be canceled. If erase prohibition of the specified cell is not to be canceled, the control returns to item 2).

5) If erase prohibition of the specified cell is to be canceled, the erase prohibition flag of the specified cell is cleared.

These processes correspond to steps C7 to C9.

Figure 70:
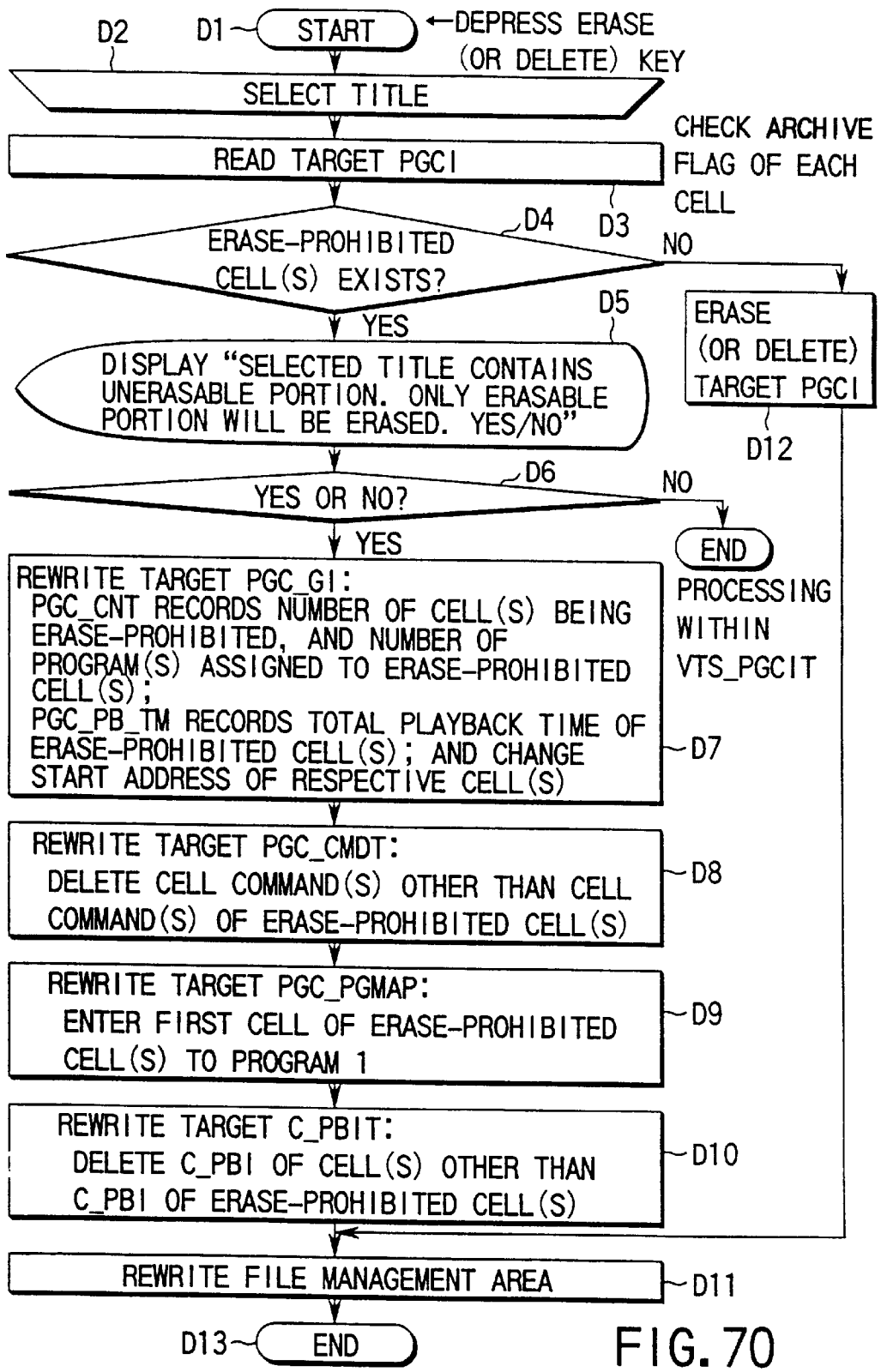
FIG. 70 is a flow chart for explaining erase prohibition cancel processing of the apparatus according to the present invention.
Figure 71:
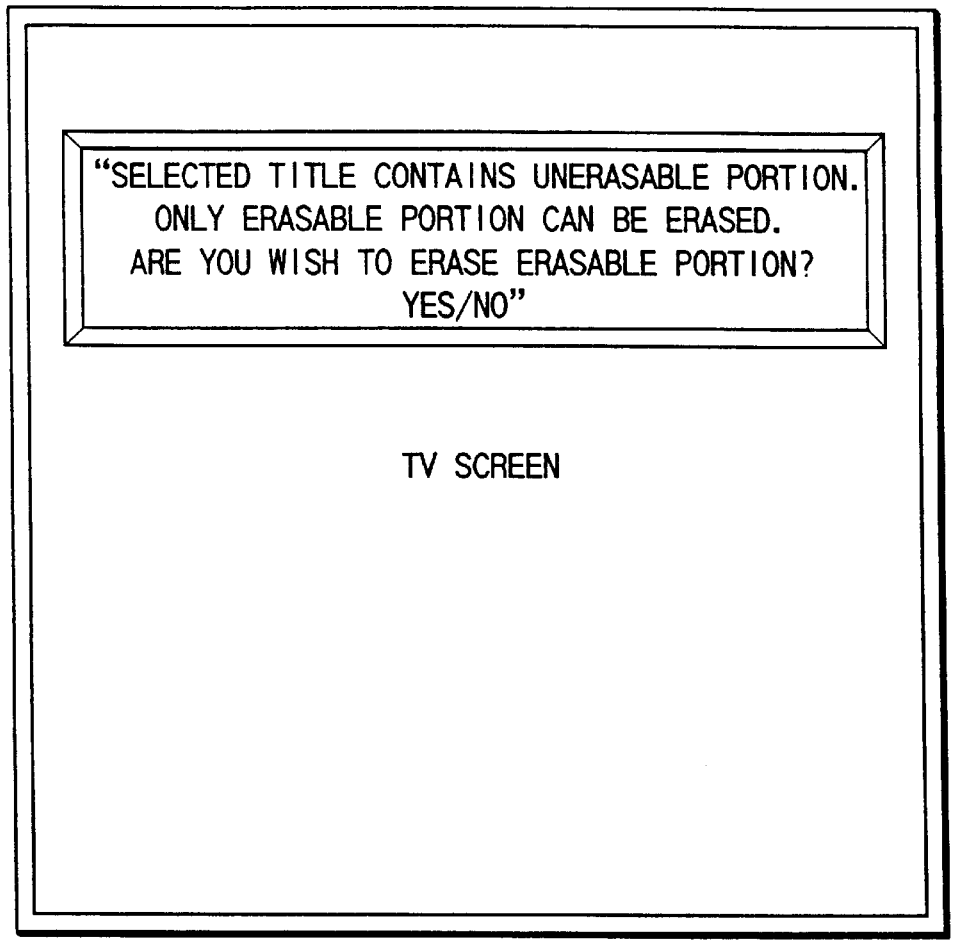
FIG. 71 is shows a screen display example upon canceling erase prohibition of the apparatus according to the present invention.

FIG. 70 shows the operation flow of erase operation at that time, and FIG. 71 shows display examples on the TV screen.

1) The user selects a title to be erased.

2) It is checked if the target title (VTS or PGC) includes erase-prohibited cells. If the title does not include any erase-prohibited cells, normal erase operation is made. In this checking, ARCHIVE_FLAG (erase prohibition flag) in C_PBI of each cell is checked.

3) A message indicating the presence of erase-prohibited cells is displayed for the user to make the user select whether or not an erasable portion is to be erased. If the user selects "NO", the process ends (see FIG. 71).

4) Each C_PBI in the target PGCI except for erase-prohibited cells is erased and PGCI is reconstructed.

These processes correspond to steps D1 to D6.

5) In the file management information, new management data for files of VTSs erased in units of cells is created and rewritten (steps D7 to D12).

With these processes, by adding an erase prohibition flag to C_PBI, erase prohibition setting can be specified in smaller units.

Note that the present invention is not limited to the above embodiments, and various modifications may be made. That is, since marks (erase prohibition flags) can be set in units of small cells, these flags can also be used as erase flags. Especially, when a cell is divided within a specific range to form advanced cells, erase prohibition or erase setting can be done within smaller ranges. Such operation can be arbitrarily set by the processing function of the player used.

The present invention is not limited to the above embodiment. For example, software that represents the processing sequences shown in the operation flows may be recorded in a recording medium in advance, and may be read by a player to prepare for an environment that automatically implements the functions of the respective operation flows. Hence, the system of the present invention includes a case wherein the DVD disc itself records information (software application) for making the player implement the operation flows.

The recording medium, recording method, recording apparatus, and playback apparatus according to the present invention can be summarized as follows.

The characteristic feature of the present invention lies in an area of playback management information in a management area of the recording medium. That is, a field for setting an erase prohibition flag in units of cells is assured in this area.

Therefore, a recordable information recording medium is defined by a management area and data area, the data area records data while being divided into a plurality of sequences, each of which consists of a plurality of cells, each of which consists of data units, each of which is recorded by packing video and audio data to be played back within a predetermined period of time into a plurality of packs, the management area stores a management table for managing the sequences, a management table for managing the cells, and a management table for managing the data units independent of each other or to include (belong) each other. In this medium, a field for recording erase prohibition information is assured in the cell management table.

Also, according to the present invention, a method or apparatus for recording data on such recording medium is characterized by having a cell erase prohibition setting process or processing unit for adding erase prohibition information to the cell management table.

Furthermore, the present invention is characterized by having a cell division detection process (means) for determining if a specified data unit is located at a division of cells, when erase prohibition is specified in units of data units, and a cell divide process (means) for dividing the cell when it is determined on the basis of the result of the cell division detection process that cell division is required.

Moreover, the present invention is characterized by having an erase prohibition range specifying process (means) for specifying the erase prohibition range by displaying a time bar corresponding to a playback time of a sequence, and displaying a cursor on the time bar, and a video display process (means) for displaying video data of a data unit closest to the playback time corresponding to the position of the cursor, thus allowing the user to easily specify the erase prohibition range.

In addition, the present invention is characterized by having an erase prohibition range specifying process (means) for specifying the erase prohibition range by displaying a time bar corresponding to a playback time of a sequence, and displaying a cursor on the time bar, and a video display process (means) for displaying the playback time corresponding to the position of the cursor, thus allowing the user to easily specify the erase prohibition range.

Furthermore, the present invention is characterized by having an erase-prohibited cell detection process (means) for determining if a specified sequence includes erase-prohibited cells, when erase in units of sequences is specified by an information recording/playback process (means) for recording/playing back the recording medium, and a sequence reconstruction process (means) for reconstructing the sequence using the erase-prohibited cells alone, when it is determined based on the detection result that the sequence includes erase-prohibited cells.

Also, the present invention has a cell erase unit for erasing only erase-prohibited cells.

Furthermore, the present invention has an erase-prohibited cell detection unit for determining if a specified sequence includes erase-prohibited cells, when erase is specified in units of sequences, and a display for displaying a message indicating the presence of the erase-prohibited cells. Moreover, the present invention has a cell erase prohibition unit for prohibiting cells appended with the erase prohibition information from being erased. Also, the present invention has a cell erase prohibition cancel unit for canceling erase prohibition of the cells appended with the erase prohibition information. Further, the present invention comprises a combination of the aforementioned functions or independent functions.

To reiterate, according to the embodiments of the present invention, since erase prohibition setting can be specified in smaller units, data management can be attained more flexibly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital information recording medium having a first recording area for management information and a second recording area for contents of recording, wherein said second recording area includes a plurality of data units each containing data packs;

at least one of said data units comprises one or more audio packs configured to store a primary audio stream;

at least one of said data units including one or more dummy packs configured to record a secondary audio stream comprising after-recorded audio data; and said management information includes an erase prohibition flag for protecting a portion of recorded contents from erasure.

2. An apparatus for recording digital information on a digital information recording medium having a first recording area for management information and a second recording area for contents of recording, wherein said second recording area includes a plurality of data units each containing data packs, at least one of said data units comprises one or more audio packs for primary audio stream, at least one of said data units including one or more dummy packs for a secondary audio stream comprising after-recorded audio data, said management information includes an erase prohibition flag for protecting a portion of recorded contents from erasure, said apparatus comprising:

an encoder for encoding given AV information to provide a digital signal compressed by MPEG; and means for recording the digital signal provided by said encoder section on said digital information recording medium.

3. An apparatus for playing back digital information from a digital information recording medium having a first recording area for management information and a second recording area for contents of recording, wherein said second recording area includes a plurality of data units each containing data packs, at least one of said data units comprises one or more audio packs for primary audio stream, at least one of said data units including one or more dummy packs for a secondary audio stream comprising after-recorded audio data, said management information includes an erase prohibition flag for protecting a portion of recorded contents from erasure, said apparatus comprising:

means for reproducing said contents of recording from said digital information recording medium; and a decoder for decoding the reproduced recording contents from said reproducing means so as to provide decoded AV information.

* * * * *